United States Patent
Kobayashi et al.

(10) Patent No.: US 7,277,079 B2
(45) Date of Patent: Oct. 2, 2007

(54) ILLUMINATION DEVICE AND LIQUID CRYSTAL DISPLAY DEVICE USING THE SAME

(75) Inventors: Tetsuya Kobayashi, Kawasaki (JP); Toshihiro Suzuki, Kawasaki (JP); Mari Sugawara, Kawasaki (JP); Tetsuya Hamada, Kawasaki (JP); Keiji Hayashi, Kawasaki (JP); Fumiaki Yamada, Kawasaki (JP); Yasutake Furukoshi, Kawasaki (JP); Masanori Nishido, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 520 days.

(21) Appl. No.: 10/696,504

(22) Filed: Oct. 29, 2003

(65) Prior Publication Data

US 2004/0114396 A1    Jun. 17, 2004

(30) Foreign Application Priority Data

| Oct. 29, 2002 | (JP) | ............................. 2002-314955 |
| Mar. 10, 2003 | (JP) | ............................. 2003-063676 |
| Mar. 31, 2003 | (JP) | ............................. 2003-093244 |

(51) Int. Cl.
    *G09G 3/36*  (2006.01)

(52) U.S. Cl. .................. 345/102; 349/62; 362/615

(58) Field of Classification Search ........... 345/102; 362/615; 349/62, 63, 64, 65
    See application file for complete search history.

(56) References Cited

U.S. PATENT DOCUMENTS 6,608,657 B2 *  8/2003  Hiyama et al. ............... 349/62

(Continued)

FOREIGN PATENT DOCUMENTS

JP         05-303078          11/1993

(Continued)

OTHER PUBLICATIONS

Sekiya et al., "29.3L:Late-News Paper: Eye-Trace Integration Effect on the Perception of Moving Pictures and a New Possibility for Reducing Blur on Hold-Type Displays," SID 02 Digest, pp. 930-933.

Furuhashi et al., "48.3:Invited Paper: High Quality TFT-LCD for Moving Picture," SID 02 Digest, pp. 1284-1287.

(Continued)

*Primary Examiner*—Sumati Lefkowitz
*Assistant Examiner*—Seokyun Moon
(74) *Attorney, Agent, or Firm*—Greer, Burns & Crain, Ltd.

(57) ABSTRACT

An illumination device is provided which can reduce a movement blur and a tailing phenomenon on a motion picture display while a drop in display brightness is suppressed, and which can suppress power consumption, can be made small and light, and can prolong the lifetime, and a liquid crystal display device using the same is provided. A light source control part of a control circuit synchronizes a latch pulse signal outputted from a gate driver control part to a gate driver, and outputs light emission control signals to respective light source power supply circuits. The respective light source power supply circuits change emission states of cold cathode fluorescent lamps to one of a first to a third emission states on the basis of the inputted light emission control signals, and illuminate an LCD panel from a rear surface of a display area. A first stage emission state is a non-lighting state, a second stage emission state is a maximum lighting state in which maximum lighting brightness is obtained, and a third emission state is an intermediate lighting state in which brightness of about one half of the second stage emission state is obtained.

9 Claims, 77 Drawing Sheets

U.S. PATENT DOCUMENTS

| | | | |
|---|---|---|---|
| 6,636,190 B2* | 10/2003 | Hirakata et al. | 345/74.1 |
| 6,977,642 B2* | 12/2005 | Nagatani | 345/102 |
| 7,001,059 B2* | 2/2006 | Han et al. | 362/616 |
| 2001/0053072 A1* | 12/2001 | Takemoto | 362/31 |
| 2002/0067332 A1* | 6/2002 | Hirakata et al. | 345/102 |
| 2003/0063456 A1* | 4/2003 | Katahira | 362/27 |
| 2003/0067436 A1* | 4/2003 | Hara et al. | 345/102 |
| 2003/0198039 A1* | 10/2003 | Jeong et al. | 362/31 |

FOREIGN PATENT DOCUMENTS

| | | |
|---|---|---|
| JP | 09-325715 | 12/1997 |
| JP | 11-202285 | 7/1999 |
| JP | 11-202286 | 7/1999 |
| JP | 2000-194312 | 7/2000 |
| JP | 2000-321551 | 11/2000 |
| JP | 2001-125066 | 5/2001 |
| JP | 2001-184034 | 7/2001 |

OTHER PUBLICATIONS

Sasaki et al., "29.2:Motion Picture Simulation for Designing High-Picture-Quality Hold-Type Displays," SID 02 Digest, pp. 926-929.

Ohtsuki et al., "40.5L:Late-News Paper: 18.1-inch XGA TFT-LCD with Wide Color Reproduction using High Power LED-Backlighting," SID 02 Digest, pp. 1154-1157.

Harbers et al., "1-15-.3: LED Backlighting for LCD-HDTV", Paper for Lumileds Lighting, LLC, pp. 1-4.

T. Kurita, "Display Method for Hold-Type Displays and Picture Quality of Moving Picture Display," NHK Science & Technical Research Laboratories, draft for the 1st LCD Forum.

Television Image Information Engineering Handbook, Ohmsha, pp. 70-71/copy not available.

ASIA Display, IDW'01 pp. 1779-1780, pp. 1781-1782/copy not available.

Ohmsha; Television/Image Information Engineering Handbook; Edited by the Institute of Image Information and Television Engineers; Nov. 30, 1990; pp. 70-71; 5-5-7 Evaluation of Motion Pictures.

H. Oura et al.; Improved Image Quality of Moving Images on TFT-LCD by FFD (Feedforward Driving) and Sequentially Intermittent Switching Backlighting; Oct. 19-19, 2001; ASIA Display IDW '01; pp. 1779-1780.

J. Hirakata et al.; Moving Picture Quality Improvement for S-TFT-LCD by Blink Backlight System; Oct. 10-19, 2001; ASIA Display IDW '01; pp. 1781-1782.

Y. Kurita; Display Method for Hold-Type Displays and Picture Quality of Moving Picture Display; Aug. 28, 1998; NHK Science & Technical Research Laboratories 3D stereophony; Preprint of First LCD Forum pp. 2-3.

Sekiya et al., "29.3L:Late-News Paper: Eye-Trace Integration Effect on the Perception of Moving Pictures and a New Possibility for Reducing Blur on Hold-Type Displays," SID 02 Digest, pp. 930-933, May 2002.

Furuhashi et al., "48.3:Invited Paper: High Quality TFT-LCD for Moving Picture," SID 02 Digest, pp. 1284-1287, May 2002.

Sasaki et al., "29.2:Motion Picture Simulation for Designing High-Picture-Quality Hold-Type Displays," SID 02 Digest, pp. 926-929, May 2002.

Ohtsuki et al., "40.5L:Late-News Paper: 18.1-inch XGA TFT-LCD with Wide Color Reproduction using High Power LED-Backlighting," SID 02 Digest, pp. 1154-1157, May 2002.

Harbers et al., "1-15-.3: LED Backlighting for LCD-HDTV", Paper for Lumileds Lighting, LLC, pp. 1-4, Dec. 2002.

T. Kurita, "Display Method for Hold-Type Displays and Picture Quality of Moving Picture Display," NHK Science & Technical Research Laboratories, draft for the 1st LCD Forum, Aug. 1998.

Television Image Information Engineering Handbook, Ohmsha, pp. 70-71/copy not available, Nov. 1990.

ASIA Display, IDW'01 pp. 1779-1780, pp. 1781-1782/copy not available, Oct. 2001.

* cited by examiner

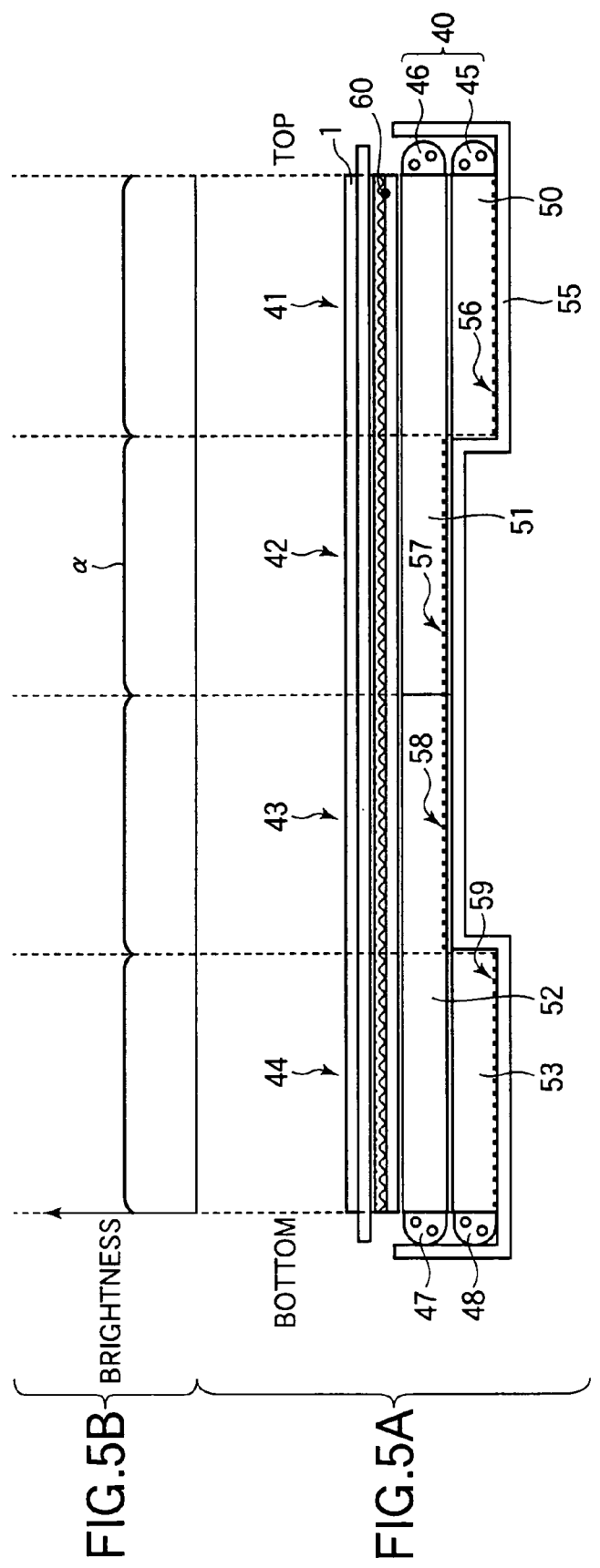

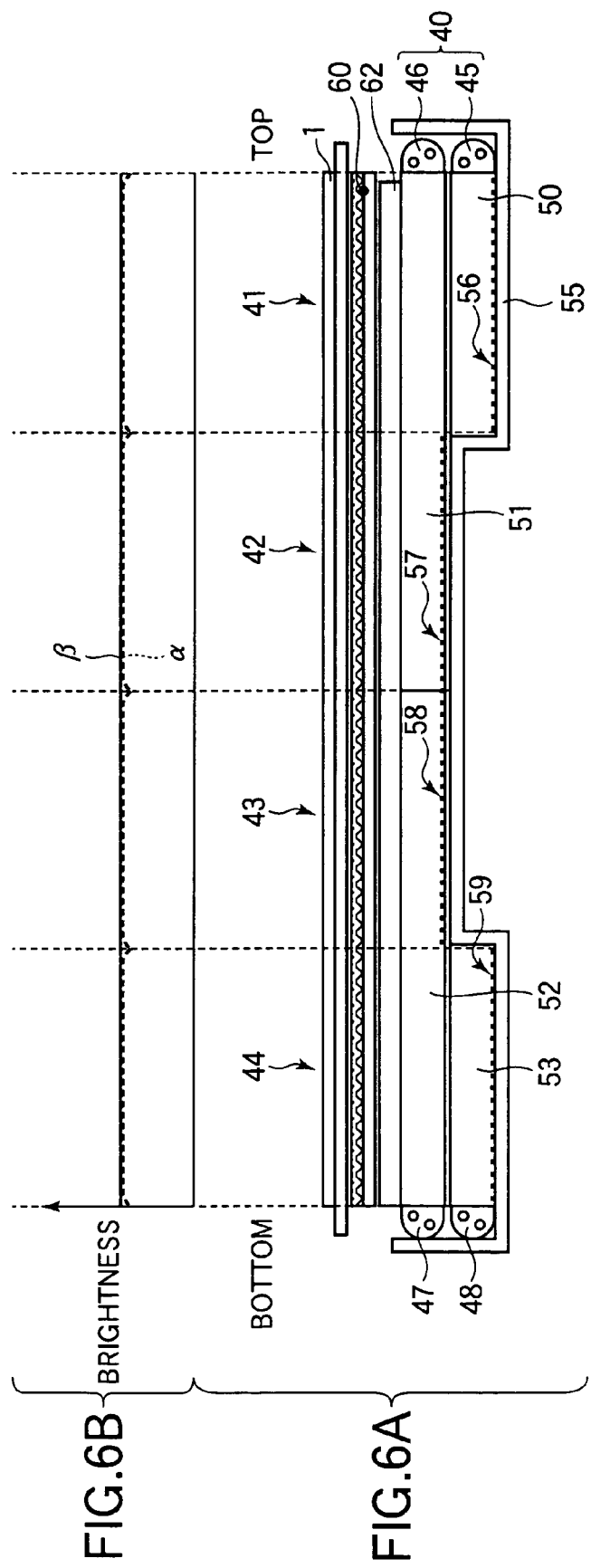

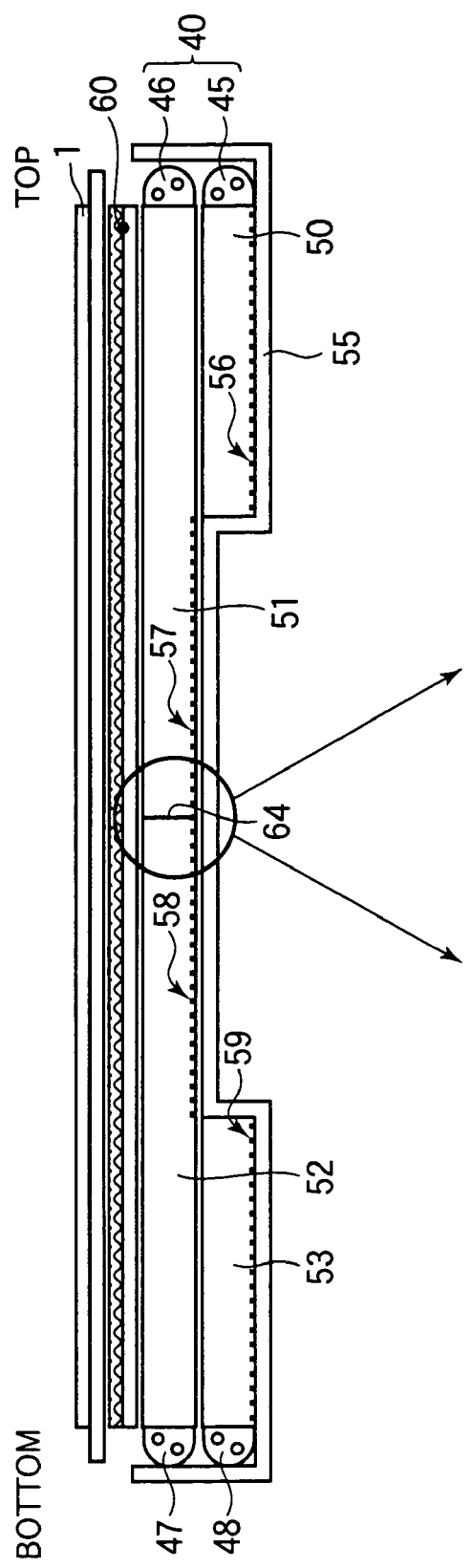
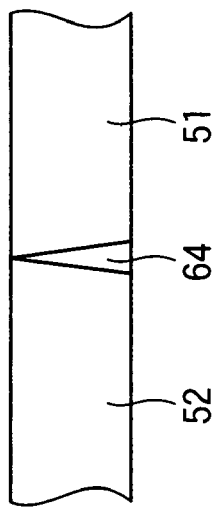
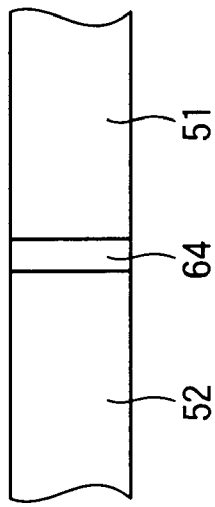

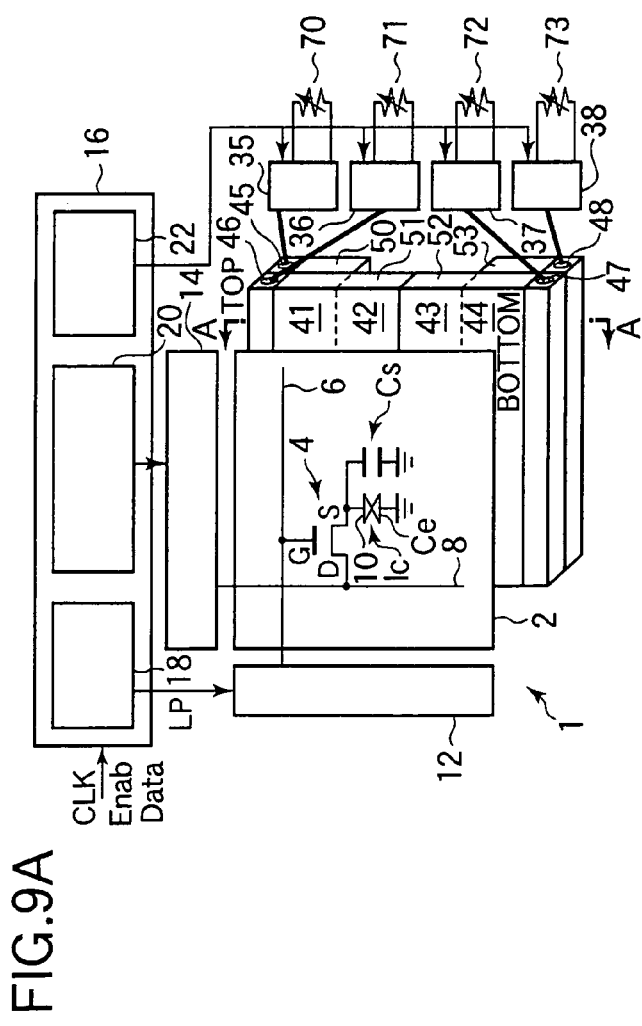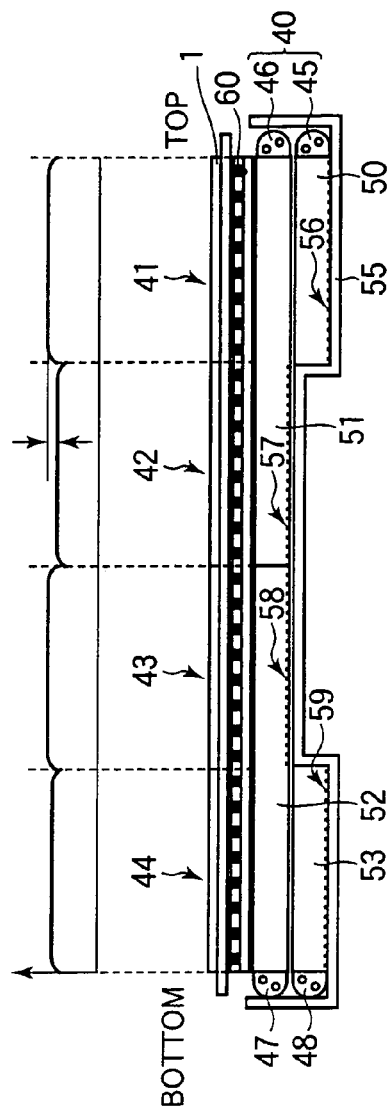
FIG.9A
FIG.9C
FIG.9B

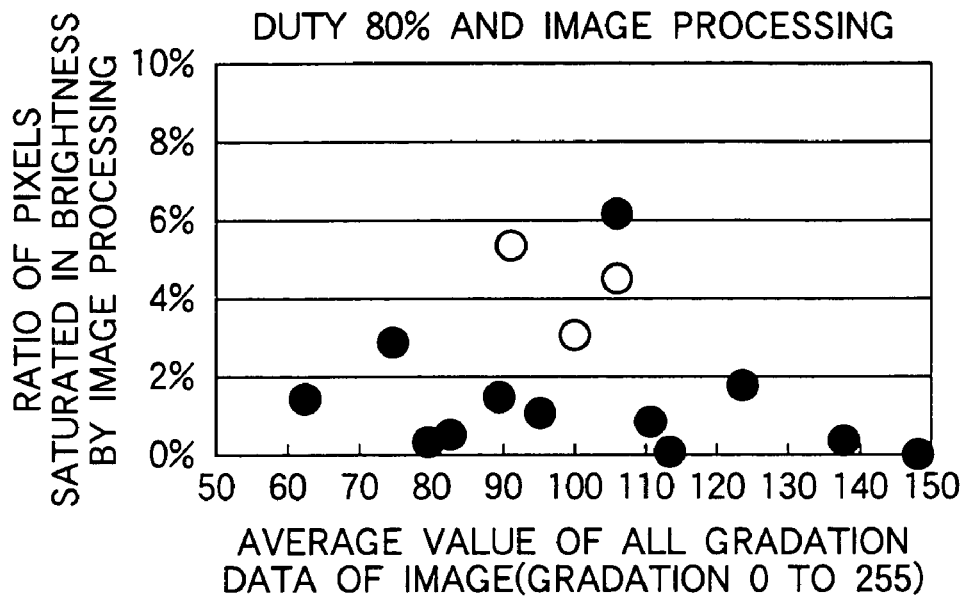
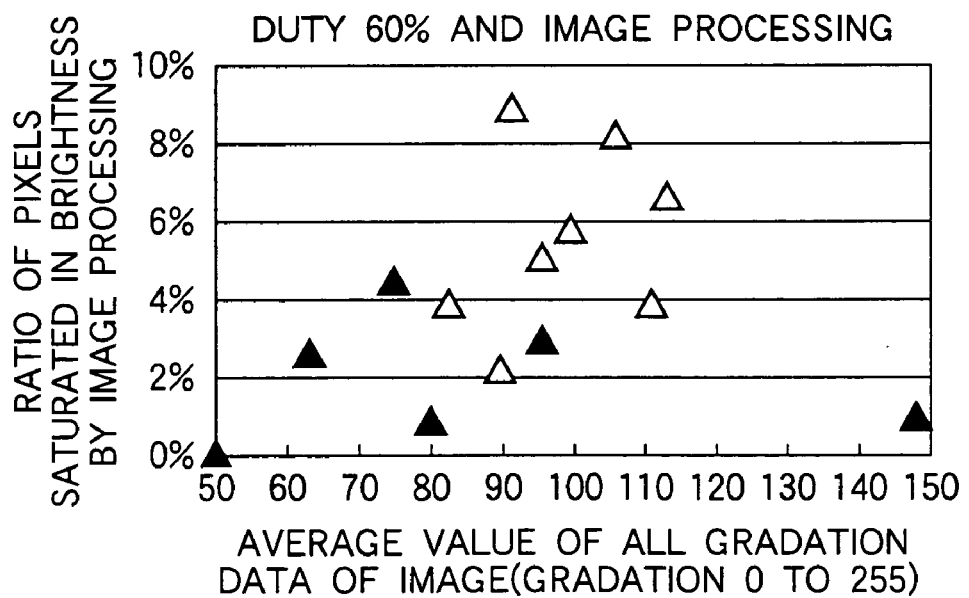

FIG.15

| Yα | duty |
|---|---|
| 63 | 100% |
| 62 | 96% |
| 61 | 93% |
| 60 | 90% |
| ... | ... |
| 2 | 0.4% |
| 1 | 0.3% |
| 0 | 0.2% |

FIG.16

| Yα → | 63 | 62 | ... | 0 |
|---|---|---|---|---|
| 63 | 100% | 100% | 100% | 100% |
| 62 | 96% | 100% | 100% | 100% |
| 61 | 93% | | | 100% |
| ... | | | | 100% |
| 1 | 0.3% | 0.3% | | 100% |
| 0 | 0.2% | 0.2% | | 0.2% |

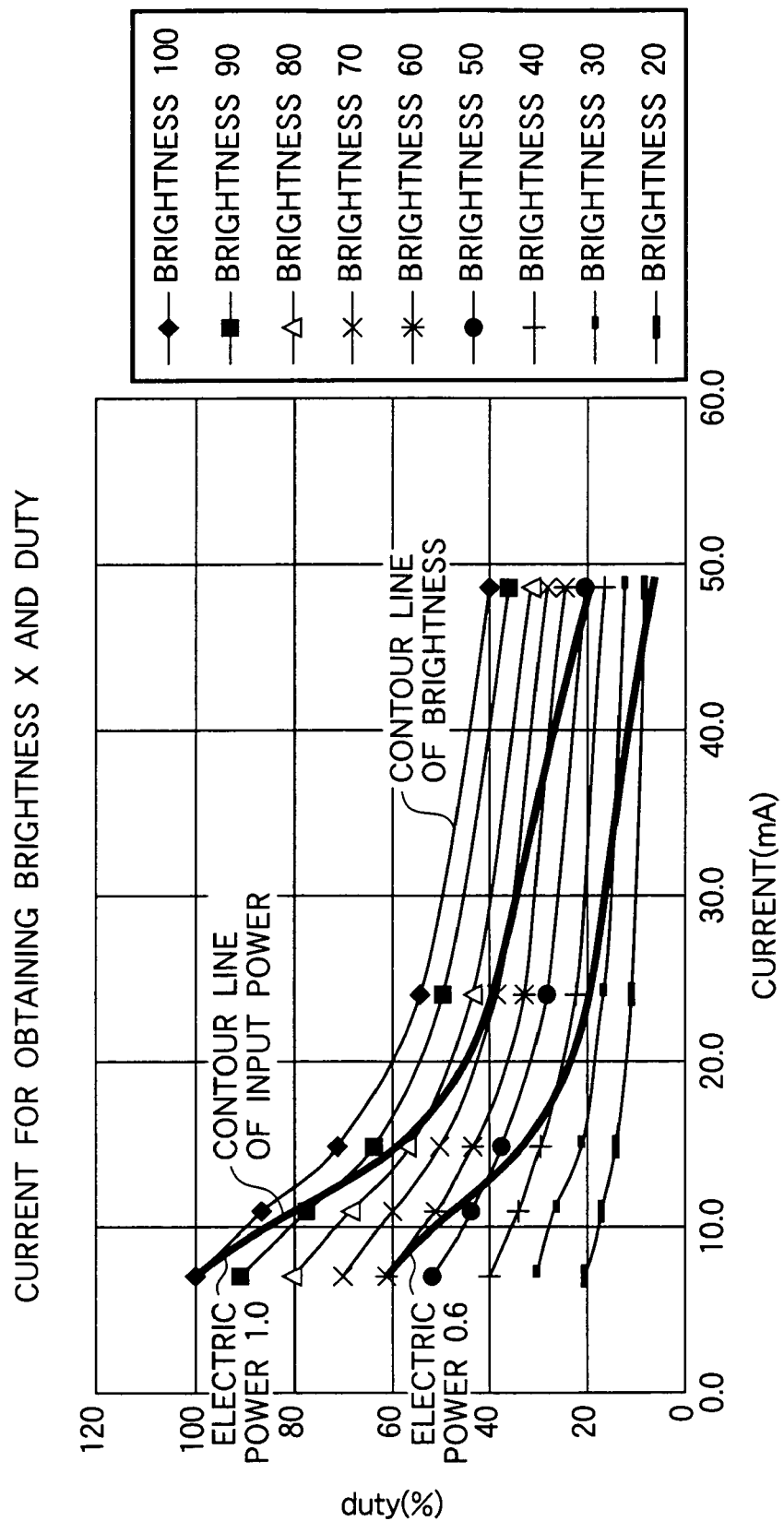

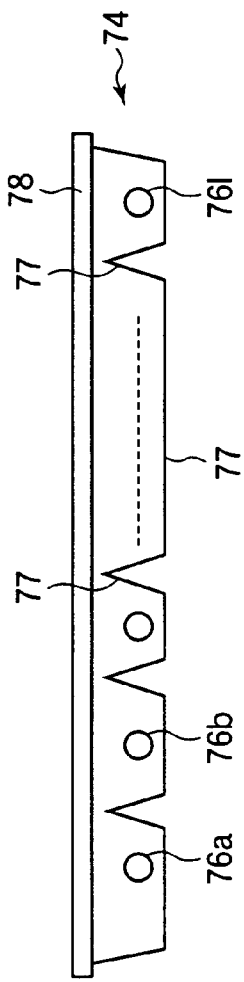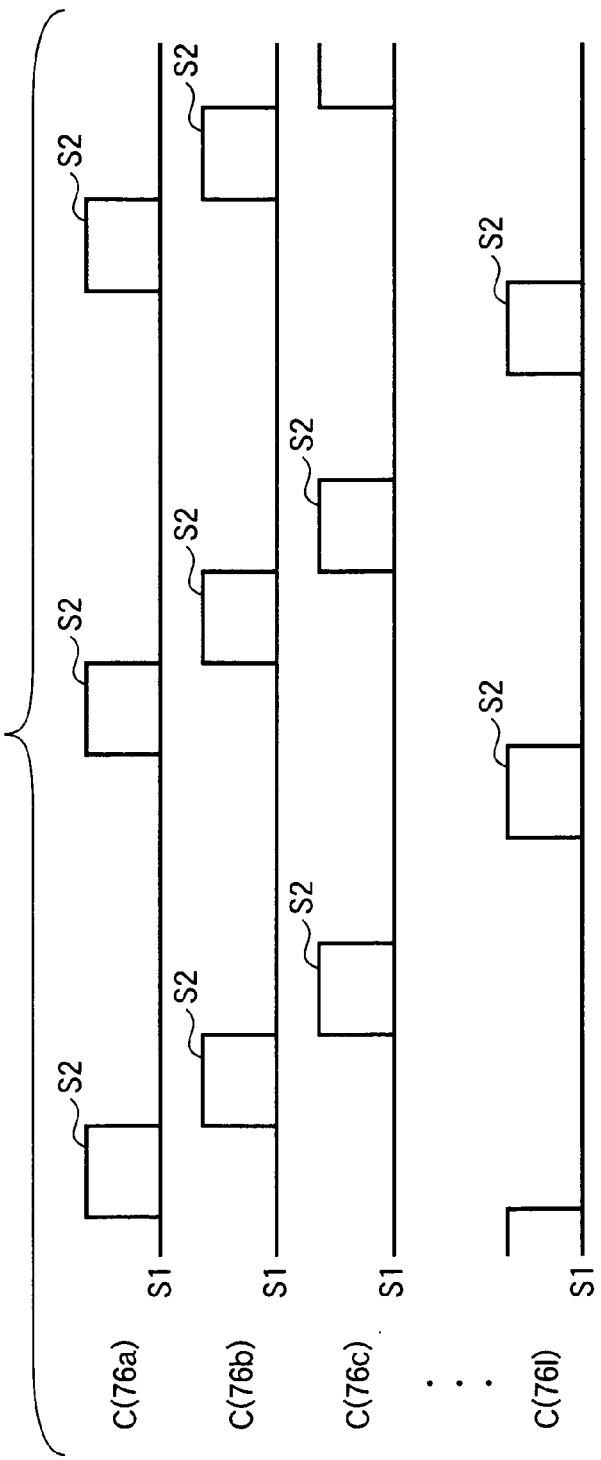
FIG.45A
FIG.45B

ILLUMINATION DEVICE AND LIQUID CRYSTAL DISPLAY DEVICE USING THE SAME

BACKGROUND OF THE INVENTION

1. Field of the Invention

The present invention relates to an illumination device for illuminating a display area of a liquid crystal display device, and a liquid crystal display device using the same. Particularly, the invention relates to an illumination device which improves motion picture blur and a tailing phenomenon at the time of display of motion pictures, and a liquid crystal display device using the same.

2. Description of the Related Art

[First Related Art]

As alternate means of a CRT (Cathode Ray Tube) which is a conventional typical display device, in recent years, an active matrix type liquid crystal display device (hereinafter abbreviated to TFT-LCD) in which a TFT (Thin Film Transistor) or the like is provided as a switching element at each pixel has gone mainstream.

In principle, in the TFT-LCD, gradation data written into each pixel is held for one frame period (equal to a period of a vertical synchronization signal Vsync). In such a hold type display system, when a motion picture is displayed, the display can not respond to a quick image change, and degradation in picture quality can occur in which an image blur and a tailing phenomenon are visually recognized.

In order to solve this problem, a method is proposed in which a display period of gradation data of each pixel is limited to a specific period in one frame period in synchronization with a vertical synchronization signal Vsync (for example, see undermentioned patent document 1). Besides, in order to realize the method, a method is proposed in which an illumination area of an illumination device, such as a backlight unit, for illuminating an image display area of a TFT-LCD is divided into plural parts in the image display area, illumination of the respective divided areas is sequentially turned on and off, and a display period (illumination period) of each divided area is limited to a specific period in one frame period (for example, see patent undermentioned documents 2 to 5).

[Second Related Art]

More specifically, a cold cathode fluorescent lamp (CCFL) is used as a light source of a backlight unit for a conventional TFT-LCD, and a display area of the LCD is illuminated while the cold cathode fluorescent lamp is always turned on. When a motion picture display is carried out while the cold cathode fluorescent lamp is always in a lightening state, in the case where gradation data is rewritten in a frame period (period) of, for example, 16.7 ms and the motion picture is displayed, since a response time of a liquid crystal molecule to a change in electric field intensity is several tens ms, next gradation data is written before the response of the liquid crystal molecule is completed, and accordingly, there occurs a disadvantage that a "blur" is seen to be produced on the motion picture display.

Besides, in the TFT-LCD, since data written in a certain frame is held until the gradation data is rewritten in the next frame, a display blur called trail vision on the basis of a human engineer viewpoint is also visually recognized, and therefore, there is a problem that the degree of the blur of the motion picture becomes large.

The above problem is explained in detail in undermentioned nonpatent document 1 and nonpatent document 2. The nonpatent document 2 discloses a study to improve the motion picture blur by turning on and off the cold cathode fluorescent lamp of the backlight unit.

However, when the cold cathode fluorescent lamp of the backlight unit is simply turned on and off, an afterimage of a former frame remains, and this is visually recognized as a ghost of a moving body in an image. Especially in the case where a line segment is moved, a tailing phenomenon is visually recognized in which the line segment is seen doubly or triply, which causes the display quality to be remarkably degraded.

Then, as a countermeasure against the ghost, a scan backlight system is proposed in which a backlight unit is divided into plural areas and a light source of each divided area is turned on and off in synchronization with the writing of gradation data. In order to realize this, a direct type backlight unit is proposed in which plural light sources such as fluorescent lamps are arranged substantially in parallel to a gate bus line (scanning line), and the light sources are sequentially turned on and off for a plurality of the respective plural divided areas.

FIG. 74 shows a section obtained by cutting a direct type backlight unit, which is used for a conventional TFT-LCD to support a motion picture display, along a plane orthogonal to a tube axial direction of a cold cathode fluorescent lamp, and a brightness distribution of illumination light from the backlight unit. In FIG. 74, a gate bus line (not shown) of a TFT-LCD 1008 is extended in a direction vertical to a paper plane. Besides, a display start line of one frame exists at an "upper (top)" side of the left in the drawing, and a final display line exists at a "lower (bottom)" side of the right in the drawing. A backlight unit 1000 is divided into four areas from the "top" to the "bottom" of the drawing. The respective divided areas are separated by U-shaped lamp reflectors (reflection plate) 1002, and a cold cathode fluorescent lamp 1004 whose tube axis extends in the extending direction of the gate bus line is disposed in each of the lamp reflectors. A light emission port of the backlight unit 1000 is disposed at the rear surface of a display area of the TFT-LCD 1008 through a transmission diffused plate 1006.

[Third Related Art]

In recent years, the screen of the TFT-LCD 1008 has been enlarged and its brightness has been intensified, and also in the backlight unit 1000, there occurs a necessity to improve light emission brightness by increasing the number of luminous tubes.

Besides, as compared with a CRT, the TFT-LCD 1008 continues to output light for one frame, so that an image blur occurs in a motion picture display, and picture quality performance is inferior to the CRT of impulse light emission (undermentioned nonpatent document 3). In order to cope with this, the patent document 1 proposes a method of causing an LCD to perform an impulse operation, and a technique to realize an impulse operation is disclosed in undermentioned patent document 2 or patent document 6 in which the backlight unit 1000 is duty (flicker) driven in a unit of one frame, and in undermentioned patent document 7 in which image data and black writing are alternately performed. However, when the duty driving or black writing is merely performed, a light output time is reduced and the brightness of a display is lowered, and accordingly, it is necessary to raise the output of the backlight unit 1000 at the same time.

[Fourth Related Art]

Besides, in a scan type or a blinking type surface illumination device and liquid crystal display device, a cold cathode fluorescent lamp or an LED is used as a light source, and for the purpose of improving the quality of motion pictures (reducing the blur of a contour), duty driving is performed in which turning on and off a light is repeated at a frequency of 60 Hz.

[Fifth Related Art]

FIG. 75 shows a structure of a direct type backlight unit used for a conventional TFT-LCD to support a motion picture display when viewed from a display area side. As shown in FIG. 75, a backlight unit 1000 is divided into four areas from the top to the bottom of the drawing. Respective divided areas 1010 to 1013 are separated by lamp reflectors (reflection plates) 1002 (not shown in FIG. 75) having U-shaped sections. A cold cathode fluorescent lamp 1004 whose tube axis extends in the extending direction of a gate bus line of a TFT-LCD 1008 (not shown in FIG. 75) is disposed in each of the lamp reflectors 1002. A light emission port of the backlight unit 1000 is disposed at the rear surface of a display area of the TFT-LCD 1008 through a transmission diffused plate 1006. As a scan type illumination device, this direct type is mainstream.

FIG. 76 shows a structure of a sidelight type backlight unit as another scan type illumination device. As shown in FIG. 76, respective divided areas 1010 to 1013 of a backlight unit 1000 respectively include light guide plates 1020 optically separated from each other and arranged in a plane. A dot-like light source such as an LED 1022 is disposed at each of both end faces of each of the light guide plates 1020 to 1023.

Incidentally, the documents of the related art are as follows:

[Patent Document 1]
JP-A-9-325715
[Patent Document 2]
JP-A-11-202285
[Patent Document 3]
JP-A-11-202286
[Patent Document 4]
JP-A-2000-321551
[Patent Document 5]
JP-A-2001-125066
[Patent Document 6]
JP-A-5-303078
[Patent Document 7]
JP-A-2001-184034
[Patent Document 8]
JP-A-2000-194312
[Nonpatent Document 1]
Television Image Information Engineering Handbook, Ohmsha P70 to 71
[Nonpatent Document 2]
ASIA Display/IDW'01 P1779-1780, 1781-1782
[Nonpatent Document 3]
Yasuichiro Kurita, "Display System of Hold-Type Display and Picture Quality in Motion Picture Display", Preprint of First LCD Forum
[Nonpatent Document 4]
J. Hirakata et al.: "High Quality TFT-LCD System for Moving Picture", SID 2002 Digest, p. 1284-1287 (2002)
[Nonpatent Document 5]
D. Sasaki et al.: "Motion Picture Simulation for Designing High-Picture-Quality Hold-Type Displays", SID 2002 Digest, p. 926-929 (2002)
[Nonpatent Document 6]
K. Sekiya et al.: "Eye-Trace Integration Effect on The Perception of Moving Pictures and A New Possibility for Reducing Blur on Hold-Type Displays", SID 2002 Digest, p. 930-933 (2002)

[Nonpatent Document 7]
H. Ohtsuki et al.: "18. 1-inch XGA TFT-LCD with Wide Color Reproduction using High Power LED-Backlighting", SID 2002 Digest, p. 1154-1157 (2002)
[Nonpatent Document 8]
Gerald Harbers, and two others, "LED Backlighting for LCD-HDTV, [online], Internet <URL: http://www.lumileds.com/pdfs/techpaperspres/IDMC_Paper.pdf>

[Problem of First Related Art]

In the case of the first related art, when the illumination light source is simply turned on and off, the display brightness is remarkably lowered, and there arises a problem that the LCD has low brightness and low picture quality. For example, in the case where the display area is divided into five divided areas, and illumination of 20% is sequentially performed in one frame, in the one frame period, the brightness becomes ⅕ as compared with the time of illumination of 100%. On the other hand, when a lighting time in each divided area is made long, although the brightness is raised, there arises a problem that degradation of picture quality such as motion blur becomes remarkable.

[Problem of Second Related Art]

In the direct type backlight unit 1000 of the second related art explained by using FIG. 74, since the cold cathode fluorescent lamp 1004 is disposed to be close to the rear surface of the TFT-LCD 1000, as shown in the upper stage of FIG. 74, there is a defect that uneven brightness is apt to occur. The horizontal axis of the upper stage of FIG. 74 indicates the position of the TFT-LCD 1008 on the rear surface of the display area, and the vertical axis indicates the brightness. In the direct type backlight unit 1000, as indicated by a brightness distribution curved line of the upper stage of FIG. 74, a difference in brightness is apt to occur between a place just above the cold cathode fluorescent lamp 1004 and a boundary of the adjacent cold cathode fluorescent lamps 1004, and there is a defect that uneven brightness is apt to occur by this. As a method of causing the difference in brightness to be inconspicuous, a method has been adopted in which a gap between the transmission diffused plate 1006 and the TFT-LCD 1008 is widened to diffuse and mix the illumination light, or a method has been adopted in which the degree of diffusion of the transmission diffused plate 1006 is raised to further diffuse and uniform the light emitted to a space just above the cold cathode fluorescent lamp 1004. However, the former has a problem that the thickness of the device is increased, and the latter has a problem that the diffused light is again incident on the cold cathode fluorescent lamp and is absorbed, and the light quantity is lowered.

[Problem of Third Related Art]

When the light emission brightness of the cold cathode fluorescent lamp 1004 of the backlight unit 1000 is raised to increase the brightness as in the third related art, there arises a problem that power consumption and cost are increased. Further, even in the case where an image having a low average brightness on a screen is displayed, the light emission brightness of the cold cathode fluorescent lamp 1004 remains high, and accordingly, the temperature of the TFT-LCD 1008 rises. It is also necessary to improve the cooling structure for suppressing this temperature rise, and according to circumstances, there arises a problem that the device volume of the TFT-LCD 1008 is increased.

[Problem of Fourth Related Art]

In the cold cathode fluorescent lamp or the LED, since current fed to cause light emission or power supply is restricted, there is a problem that the brightness can not be made high by the duty driving. That is, in order to increase the supplied current, a stabilizer of the cold cathode fluorescent lamp becomes large. Thus, the stabilizer becomes heavy and thick, and further its cost becomes high. Furthermore, there is a problem that with the increase of the current, the driving voltage becomes high, so that the current-to-light conversion efficiency of the cold cathode fluorescent lamp is lowered, and the lifetime becomes short. Besides, for example, in a display device of a portable electronic equipment such as a notebook computer, strict restrictions are imposed on the power supply. Also in a solid emission type light source such as an LED, there arises a problem that the current-to-light conversion efficiency is lowered by the current increase, and the lifetime becomes short.

[Problem of Fifth Related Art]

In the direct type backlight unit 1000 of the fifth related art described by use of FIG. 5, since the cold cathode fluorescent lamp 1004 is disposed to be close to the rear surface of the TFT-LCD 1008, there is a defect that the brightness distribution is apt to become irregular, and the uneven brightness on the display is apt to occur.

Besides, in the sidelight type backlight unit 1000 of the fourth related art described by use of FIG. 76, since a light source, such as the cold cathode fluorescent lamp 1004, having a relatively large light emission quantity and a long length can not be used, there is a problem that the brightness is low.

SUMMARY OF THE INVENTION

An object of the invention is to provide an illumination device which can reduce a movement blur and a tailing phenomenon on a motion picture display while a drop in display brightness is suppressed, and a liquid crystal display device using the same.

Besides, another object of the invention is to provide an illumination device which can suppress power consumption, can be made small and light, and can prolong the lifetime, and a liquid crystal display device using the same.

The above objects can be achieved by an illumination device for illuminating a display area of an active matrix type liquid crystal display device, which is characterized by comprising at least one light source capable of changing light emission brightness, at least one light-emitting area for emitting light from the light source, and a light source control system for switching between a maximum lighting state in which the light-emitting area is made to emit light at a specified maximum brightness and an intermediate lighting state in which the light-emitting area is made to emit light at a specified intermediate brightness lower than the maximum brightness.

BRIEF DESCRIPTION OF THE DRAWINGS

FIGS. 5A and 5B are views showing the rough structure of the illumination device according to the second embodiment of the invention, in which FIG. 5A is a sectional view taken along line A-A of FIG. 4 and shows a section obtained by cutting the illumination device (sidelight type backlight unit) 40, which is used for a TFT-LCD 1 to support a motion picture display according to this embodiment, along a plane orthogonal to a tube axial direction of a cold cathode fluorescent lamp, and FIG. 5B shows a brightness distribution of illumination light from the illumination device 40 at a rear surface side of a display area of the TFT-LCD 1;

FIGS. 6A and 6B are views showing a modified example of the illumination device 40 according to the second embodiment of the invention and the TFT-LCD 1 using the same;

FIGS. 7A to 7C are views for explaining another modified example of the illumination device 40 according to the second embodiment of the invention, in which FIG. 7A shows an illumination device 40 in a state where a double-sided reflection member 64 is disposed in a gap between light guide plates 51 and 52, FIG. 7B is a view showing the double-sided reflection member 64, and FIG. 7C is a view showing another double-sided reflection member 64;

FIGS. 8A and 8B are views for explaining an expression 1 in the second embodiment of the invention, in which FIG. 8A is an enlarged view of FIG. 7C, and FIG. 8B is a view showing the course of light in an end face at the side of the light guide plate 52;

FIGS. 9A to 9C are views for explaining still another modified example of the illumination device according to the second embodiment of the invention and the liquid crystal display device using the same, in which FIG. 9A is a view showing a rough structure of an illumination device of this modified example and a liquid crystal display device using the same, FIG. 9B is a sectional view taken along line A-A of FIG. 9A and is a view showing a section obtained by cutting the illumination device (sidelight type backlight unit) 40, which is used for a TFT-LCD 1 to support a motion picture display according to this embodiment, along a plane orthogonal to a tube axial direction of a cold cathode fluorescent lamp, and FIG. 9C is a view showing a brightness distribution of illumination light from the illumination device 40 at the rear side of a display area of the TFT-LCD 1;

FIGS. 10A and 10B are views showing subjective evaluation as to whether or not a difference in picture quality from the original image is felt in a case where in a third embodiment of the invention, a ratio (duty ratio) of a lighting time of a backlight unit in one frame period is changed, and further, gradation data is processed and liquid crystal transmissivity is adjusted;

FIG. 15 is a view showing a duty ratio selection lookup table used for selection of a duty ratio of a light source in the illumination device according to the third embodiment of the invention and the liquid crystal display device using the same;

FIG. 16 is a view showing a signal control value selection lookup table for determining a control value when processed gradation data is outputted to plural data bus lines 8, which is made to correspond to the threshold lightness Yα in the illumination device according to the third embodiment of the invention and the liquid crystal display device using the same;

FIG. 28 is a view showing a state in which in a display device provided with a scan type backlight unit shown in FIG. 1, a duty ratio is 80%, the first 20% of one frame period is turned off, and the remaining 80% of the period is totally turned on;

FIG. 40 is a view showing characteristics of a cold cathode fluorescent lamp;

FIGS. 45A and 45B are views showing a conventional direct type backlight structure and duty driving as a comparative example of the illumination device according to the fourth embodiment of the invention;

DESCRIPTION OF THE PREFERRED EMBODIMENTS

First Embodiment

Figure 1:
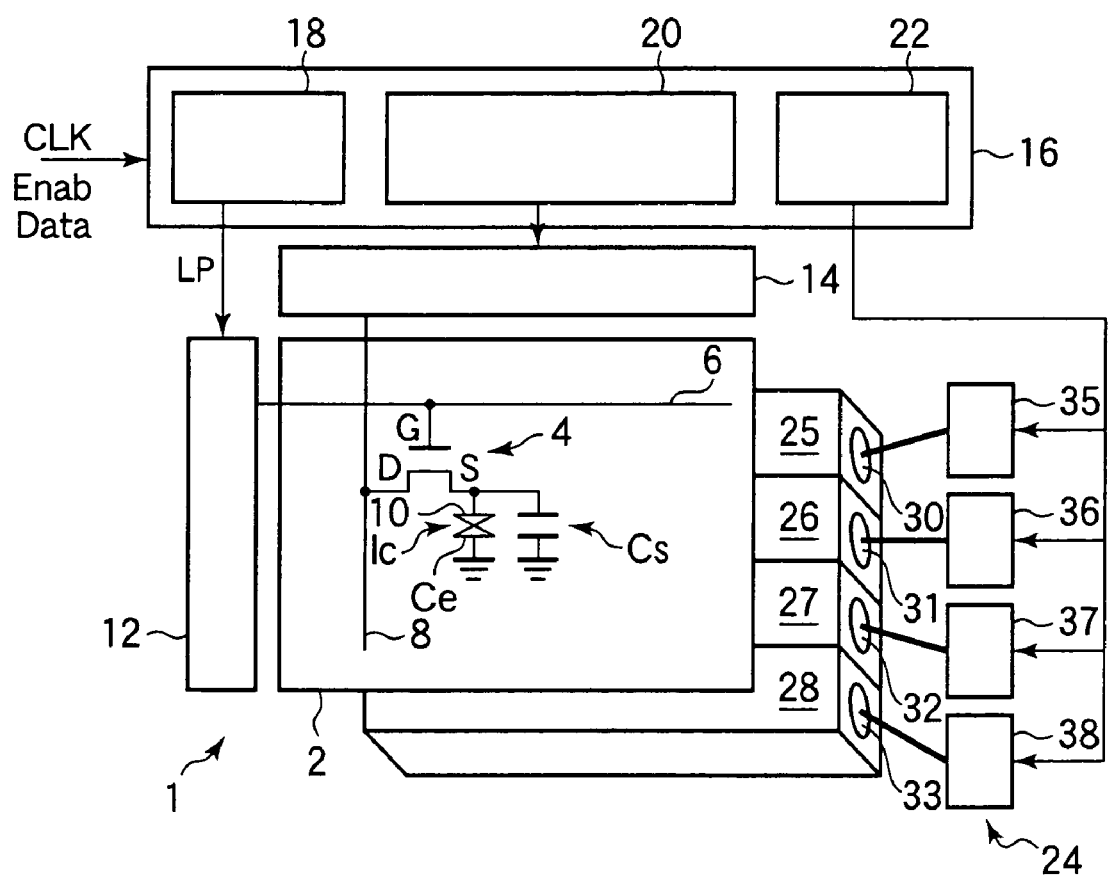
FIG. 1 is a view showing a rough structure of an illumination device according to a first embodiment of the invention and a liquid crystal display device using the same.

An illumination device according to a first embodiment of the invention and a liquid crystal display device using the same will be described with reference to FIGS. 1 to 3. First, the rough structure of the illumination device according to this embodiment and the liquid crystal display device using the same will be described with reference to FIG. 1. FIG. 1 shows a schematic state in which a TFT-LCD 1 as an example of the display device is viewed from the side of a panel display surface. In an LCD panel 2, a liquid crystal 1c is sealed between two glass substrates, that is, an array substrate (not shown) on which TFTs 4 are formed and an opposite substrate (not shown) on which common electrodes Ce are formed. In the illustrated LCD panel 2, an equivalent circuit of one pixel is shown. On the array substrate, for example, plural gate bus lines 6 extending in the horizontal direction of the drawing are formed in parallel with each other in the vertical direction. Plural data bus lines 8 extending in the vertical direction of the drawing are formed in parallel with each other in the horizontal direction through a not-shown insulating film. Each of plural matrix-shaped areas defined by the gate bus lines 6 and the data bus lines 8 formed in the horizontal and vertical directions as stated above forms a pixel area. A pixel electrode 10 is formed in each pixel area.

A TFT 4 is formed in the vicinity of an intersection between the gate bus line 6 and the data bus line 8 in each pixel area, a gate electrode G of the TFT 4 is connected to the gate bus line 6, and a drain electrode D is connected to the data bus line 8. Besides, a source electrode S is connected to the pixel electrode 10. The gate bus line 6 is driven by a gate driver 12, and the data bus line 6 is driven by a data driver 14. Gradation voltages (gradation data) are outputted from the data driver 14 to the respective data bus lines 8, and when a gate signal (gate pulse) is outputted to any one of the gate bus lines 6, a series of TFTs 4 whose gate electrodes G are connected to the gate bus line 6 are turned on. The gradation voltages are applied to the pixel electrodes 10 connected to the source electrodes S of those TFTs 4, and the liquid crystals 1c are driven between the pixel electrodes and the common electrodes Ce formed at the opposite substrates. Besides, in each pixel, a liquid crystal capacitance C1c is formed of the pixel electrode 10, the common electrode Ce and the liquid crystal 1c, and a storage capacitance Cs is also formed in parallel with the liquid crystal capacity C1c.

The TFT-LCD 1 is provided with a control circuit 16 to which a clock CLK, a data enable signal Enab and a gradation data Data, which are outputted from a system side such as a PC (Personal Computer), are inputted.

The gate driver 12 includes, for example, a shift driver, receives a latch pulse signal LP from a gate driver control part 18 in the control circuit 16, and sequentially outputs a gate pulse from a display start line to perform line sequential driving.

Besides, the control circuit 16 includes a display data conversion circuit 20. The display data conversion circuit 20 has such a function that for example, gradation data Data to be displayed is compared with previous gradation data Data, and when a data value is changed to exceed a specified threshold, the gradation data Data to be displayed is subjected to a specified weighting processing, and the output gradation data is outputted to the data driver 14.

Further, the control circuit 16 includes a light source control part 22 which controls an illumination device 24 for illuminating an image display area of the LCD panel 2. The illumination device 24 of this example uses, as an example, a direct type backlight unit. The direct type backlight unit of this embodiment includes plural (four in this example) divided light-emitting areas 25 to 28, and is disposed so that the LCD panel 2 can be illuminated from the rear surface of the display area. When the number of gate bus lines in one frame is L, the first light-emitting area 25 has an illumination range from the first gate bus line 6 as the display start line to the (L/4)-th gate bus line 6. Similarly, the second light-emitting area 26 has an illumination range from the (L/4+1)-th gate bus line 6 to the (2L/4)-th gate bus line 6, the third light-emitting area 27 has an illumination range from the (2L/4+1)-th gate bus line 6 to the (3L/4)-th gate bus line 6 and the fourth light-emitting area 28 has an illumination range from the (3L/4+1)-th gate bus line 6 to the L-th gate bus line 6.

Each of the light-emitting areas 25 to 28 has such a structure that a light emission opening which is substantially parallel to an extension direction of the gate bus line 6 is formed at a rear surface side of the LCD panel 2, and a portion other than that is surrounded by a reflection plate or the like. In areas surrounded by the reflection plates of the respective light-emitting areas 25 to 28, for example, rod-shaped cold cathode fluorescent lamps 30 to 33, whose light emission brightness can be changed by controlling a supplied current, are respectively disposed while the tube axial direction is made substantially parallel to the extension direction of the gate bus line 6. Specified driving currents are fed to the respective cold cathode fluorescent lamps 30 to 33 from light source power supply circuits 35 to 38. The light source power supply circuits 35 to 38 can give at least three stage emission states to each of the cold cathode fluorescent lamps 30 to 33 on the basis of current control signals from the light source control part 22 of the control circuit 16. Here, a first stage emission state is a non-lighting state S1, a second stage emission state is a maximum lighting state S2 in which the maximum lighting brightness is obtained, and a third stage emission state is an intermediate lighting state S3 in which about one half of the brightness of the second stage emission state is obtained. Incidentally, the maximum lighting brightness does not necessarily mean the maximum brightness on specifications, which can be produced by the cold cathode fluorescent lamps 30 to 33, and also includes the highest brightness in the brightness ranges adjusted by the light source power supply circuits 35 to 38. A light source control system is constituted by at least the light source control part 22 and the light source power supply circuits 35 to 38.

The light source control part 22 of the control circuit 16 outputs the light emission control signal to each of the light source power supply circuits 35 to 38 in synchronization with the latch pulse signal LP outputted to the gate driver 12 from the gate driver control part 18. Each of the light source power supply circuits 35 to 38 changes the emission state of each of the cold cathode fluorescent lamps 30 to 33 to any one of the emission states S1 to S3 on the basis of the inputted light emission control signal and illuminates the LCD panel 2 from the rear surface of the display area.

Figure 2:
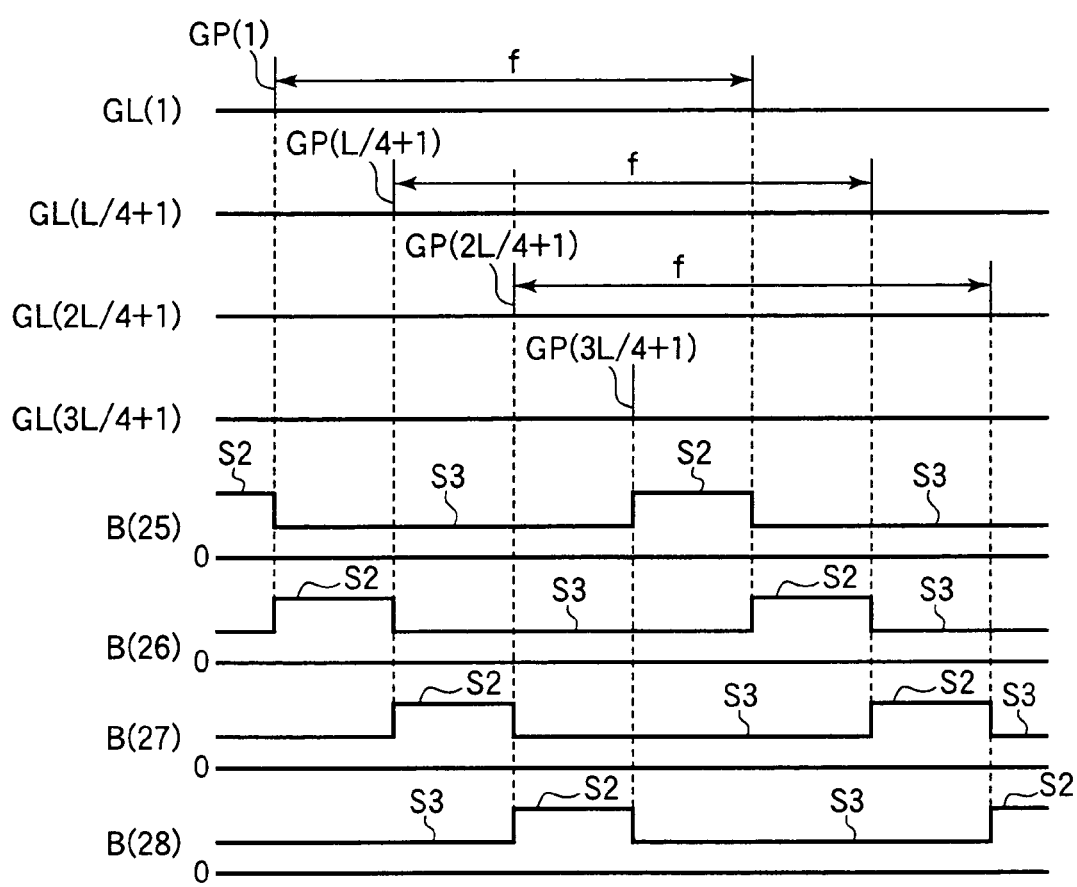
FIG. 2 is a view showing output timings of gate pulses GP outputted to respective gate bus lines 6 from a gate driver 12 in synchronization with the input of a latch pulse signal LP, and light emission brightnesses B(25) to B(28) of respective light-emitting areas 25 to 28 in the illumination device according to the first embodiment of the invention and the liquid crystal display device using the same.

FIG. 2 shows output timings of the gate pulses GP outputted to the respective gate bus lines 6 from the gate driver 12 in synchronization with the input of the latch pulse signal LP, and light emission brightnesses B25 to B28 of the respective light-emitting areas 25 to 28. The horizontal direction indicates time. Here, it is assumed that as described above, the L gate bus lines 6 exist in the display area and are denoted by line numbers GL(1), GL(2), . . . , GL(L−1), GL(L) in sequence from the display start line.

The light source control part 22 synchronizes with the latch pulse LP for causing the gate pulse GP(1) to be outputted to the gate bus line GL(1) as the display start line, and outputs the light emission control signal for controlling the current, which is to be fed to the cold cathode fluorescent lamp 30, to the light source power supply circuit 35. By this, the current fed to the cold cathode fluorescent lamp 30 from the light source power supply circuit 35 is controlled, and the light emission brightness B(25) of the light-emitting area 25 becomes the intermediate lighting state S3 of almost one half of the maximum lighting brightness. Thereafter, until the latch pulse LP for causing the gate pulse GP(3L/4+1) to be outputted to the gate bus line GL(3L/4+1) is outputted, the light emission brightness B(25) of the light-emitting area 25 is kept at the intermediate lighting state S3.

When the latch pulse LP for causing the gate pulse GP(3L/4+1) to be outputted to the gate bus line GL(3L/4+1) is outputted, the light source control part 22 synchronizes with it and outputs a specified light emission control signal to the light source power supply circuit 35. By this, the current fed to the cold cathode fluorescent lamp 30 from the light source power supply circuit 35 is controlled, and the light emission brightness B(25) of the light-emitting area 25 becomes the maximum lighting state S2 in which the maximum lighting brightness is obtained. Thereafter, one frame period f is completed, a next frame period f is started, and until the latch pulse LP for causing the gate pulse GP(1) to be outputted to the gate bus line GL(1) is outputted, the light emission brightness B(25) of the light-emitting area 25 is kept at the maximum lighting state S2. Each time the next frame period f starts, the above operation is repeated.

By this illumination operation, the light emission brightness B(25) of the light-emitting area 25 becomes the maximum lighting state S2 only in the ¼ frame period before the end of the one frame period f, and the area of the ¼ frame from the top of the one frame (display area) is illuminated with the maximum brightness. For the other period of from the start of the one frame period f to the ¾ frame point of time, the light emission brightness B(25) of the light-emitting area 25 is kept at the intermediate lighting state S3, and the area of the ¼ frame from the top of the one frame is illuminated with the intermediate brightness.

Next, when attention is paid to the light-emitting area 26, the light source control part 22 synchronizes with the latch pulse LP for causing the gate pulse GP(L/4+1) to be outputted to the gate bus line GL(L/4+1) shifted from the display start line by ¼ frame, and outputs the light emission control signal for controlling the current, which is to be fed to the cold cathode fluorescent lamp 31, to the light source power supply circuit 36. By this, the current fed from the light source power supply circuit 36 to the cold cathode fluorescent lamp 31 is controlled, and the light emission brightness B(26) of the light-emitting area 26 becomes the intermediate lighting state S3 of almost one half of the maximum lighting brightness. Thereafter, until the latch pulse LP for causing the gate pulse GP(1) to be outputted to the gate bus line GL(1) is outputted, the light emission brightness B(26) of the light-emitting area 26 is kept at the intermediate lighting state S3.

When the latch pulse LP for causing the gate pulse GP(1) to be outputted to the gate bus line GL(1) is outputted, the light source control part 22 synchronizes with it and outputs a specified light emission control signal to the light source power supply circuit 36. By this, the current fed from the light source power supply circuit 36 to the cold cathode fluorescent lamp 31 is controlled, and the light emission brightness B(26) of the light-emitting area 26 becomes the maximum lighting state S2 in which the maximum lighting brightness is obtained. Thereafter, until the latch pulse LP for causing the gate pulse GL(L/4+1) to be outputted to the gate bus line GL(L/4+1) is outputted, the light emission brightness B(26) of the light-emitting area 26 is kept at the maximum lighting state S2. The above operation is repeated at the frequency of the frame period f.

By this illumination operation, the light emission brightness B(26) of the light-emitting area 26 becomes the maximum lighting state S2 only for the first ¼ frame period of the one frame period f, and only in the period, the area of the ¼ frame in the range of ¼ to ½ from the top of the one frame is illuminated with the maximum brightness. In the period other than that, the light emission brightness B(26) of the light-emitting area 26 is kept at the intermediate lighting state S3, and the area of the ¼ frame in the range of ¼ to ½ from the top of the one frame is illuminated with the intermediate brightness.

Next, when attention is paid to the light-emitting area 27, the light source control part 22 synchronizes with the latch pulse LP for causing the gate pulse GP(2L/4+1) to be outputted to the gate bus line GL(2L/4+1) shifted from the display start line by the ½ frame, and outputs the light emission control signal for controlling the current, which is to be fed to the cold cathode fluorescent lamp 32, to the light source power supply circuit 37. By this, the current fed from the light source power supply circuit 37 to the cold cathode fluorescent lamp 32 is controlled, and the light emission brightness B(27) of the light-emitting area 27 becomes the intermediate lighting state S3 of almost one half of the maximum lighting brightness. Thereafter, until the latch pulse for causing the gate pulse GP(L/4+1) to be outputted to the gate bus line GL(L/4+1) is outputted, the light emission brightness B(27) of the light-emitting area 27 is kept at the intermediate lighting state S3.

When the latch pulse LP for causing the gate pulse GP(L/4+1) to be outputted to the gate bus line GL(L/4+1) is outputted, the light source control part 22 synchronizes with it and outputs a specified light emission control signal to the light source power supply circuit 37. By this, the current fed from the light source power supply circuit 37 to the cold cathode fluorescent lamp 32 is controlled, and light emission brightness B(27) of the light-emitting area 27 becomes the maximum lighting state S2 in which the maximum lighting brightness is obtained. Thereafter, until the latch pulse for causing the gate pulse GP(2L/4+1) to be outputted to the gate bus line GL(2L/4+1) is outputted, the light emission brightness B(27) of the light-emitting area 27 is kept at the maximum lighting state S2. The above operation is repeated at the frequency of the frame period f.

By this illumination operation, the light emission brightness B(27) of the light-emitting area 27 becomes the maximum lighting state S2 only in the ¼ frame period in the range of ¼ to ½ from the head of the one frame period, and only in the period, the area of the ¼ frame in the range of ½ to ¾ from the top of the one frame is illuminated with the maximum brightness. In the other period, the light emission brightness B(27) of the light-emitting area 27 is kept at the intermediate lighting state S3, and the area of the ¼ in the range of ½ to ¾ from the top of the one frame is illuminated with the intermediate brightness.

Similarly, in the light-emitting area 28, the light source control part 22 synchronizes with the latch pulse LP for causing the gate pulse GP(3L/4+1) to be outputted to the gate bus line GL(3L/4+1) shifted from the display start line by the ¾ frame, and outputs the light emission control signal for controlling the current, which is fed to the cold cathode fluorescent lamp 33, to the light source power supply circuit 38. By this, the current fed from the light source power supply circuit 38 to the cold cathode fluorescent lamp 33 is controlled, and the light emission brightness B(28) of the light-emitting area 28 becomes the intermediate lighting state S3 of about one half of the maximum lighting brightness. Thereafter, until the latch pulse LP for causing the gate pulse GP(2L/4+1) to be outputted to the gate bus line GL(2L/4+1) is outputted, the light emission brightness B(28) of the light-emitting area 28 is kept at the intermediate lighting state S3.

When the latch pulse LP for causing the gate pulse GP(2L/4+1) to be outputted to the gate bus line GL(2L/4+1) is outputted, the light source control part 22 synchronizes with it and outputs a specified light emission control signal to the light source power supply circuit 38. By this, the current fed from the light source power supply circuit 38 to the cold cathode fluorescent lamp 33 is controlled, and the light emission brightness B(28) of the light-emitting area 28 becomes the maximum lighting state S2 in which the maximum lighting brightness is obtained. Thereafter, until the latch pulse LP for cause the gate pulse GP(3L/4+1) to be outputted to the gate bus line GL(3L/3+1) is outputted, the light emission brightness B(28) of the light-emitting area 28 is kept at the maximum lighting state. The above operation is repeated at the frequency of the frame period f.

By this illumination operation, the light emission brightness B(28) of the light-emitting area becomes the maximum lighting state S2 only in the ¼ frame period in the range of ½ to ¾ of the one frame period f, and only in the period, the lowest stage area of the ¼ frame is illuminated with the maximum brightness. In the other period, the light emission brightness B(28) of the light-emitting area 28 is kept at the intermediate lighting state S3, and the lowest stage area of the ¼ frame is illuminated with the intermediate brightness.

By the lighting operation as described above, as shown in FIG. 2, the illumination is obtained in which the whole display area is illuminated with the intermediate brightness, and the light emission brightness of the areas obtained by longitudinally dividing the display area into four band-shaped areas parallel to the gate bus line 6 becomes maximum sequentially in time sequence.

According to this embodiment, the display to support the motion picture can be realized while the brightness is sufficiently suppressed to the brightness of ⅝ (=(¼)A+¾×(½)A A: maximum lighting brightness) times as the brightness of the conventional hold type illumination device which is always driven by the maximum lighting brightness. Besides, since the conventional scan type illumination device to support the motion picture has the brightness of ¼ times as the conventional hold type illumination device, according to the illumination device of this embodiment, the display having the high brightness of 2.5 times as the conventional scan type illumination device can be realized.

In this embodiment, although the operation example has been described in which the illumination having the maximum lighting brightness is performed only in the ¼ period of the one frame period f (for example, 16.7 ms), it is also possible to prolong the illumination period of the maximum lighting brightness, and by this, a higher brightness can be realized. Besides, in this embodiment, although the description has been given of the case where the intermediate brightness in the intermediate lighting state S3 is set to about one half of the maximum lighting brightness, it is needless to say that the intermediate level can be set to a brightness other than that.

Figure 3:
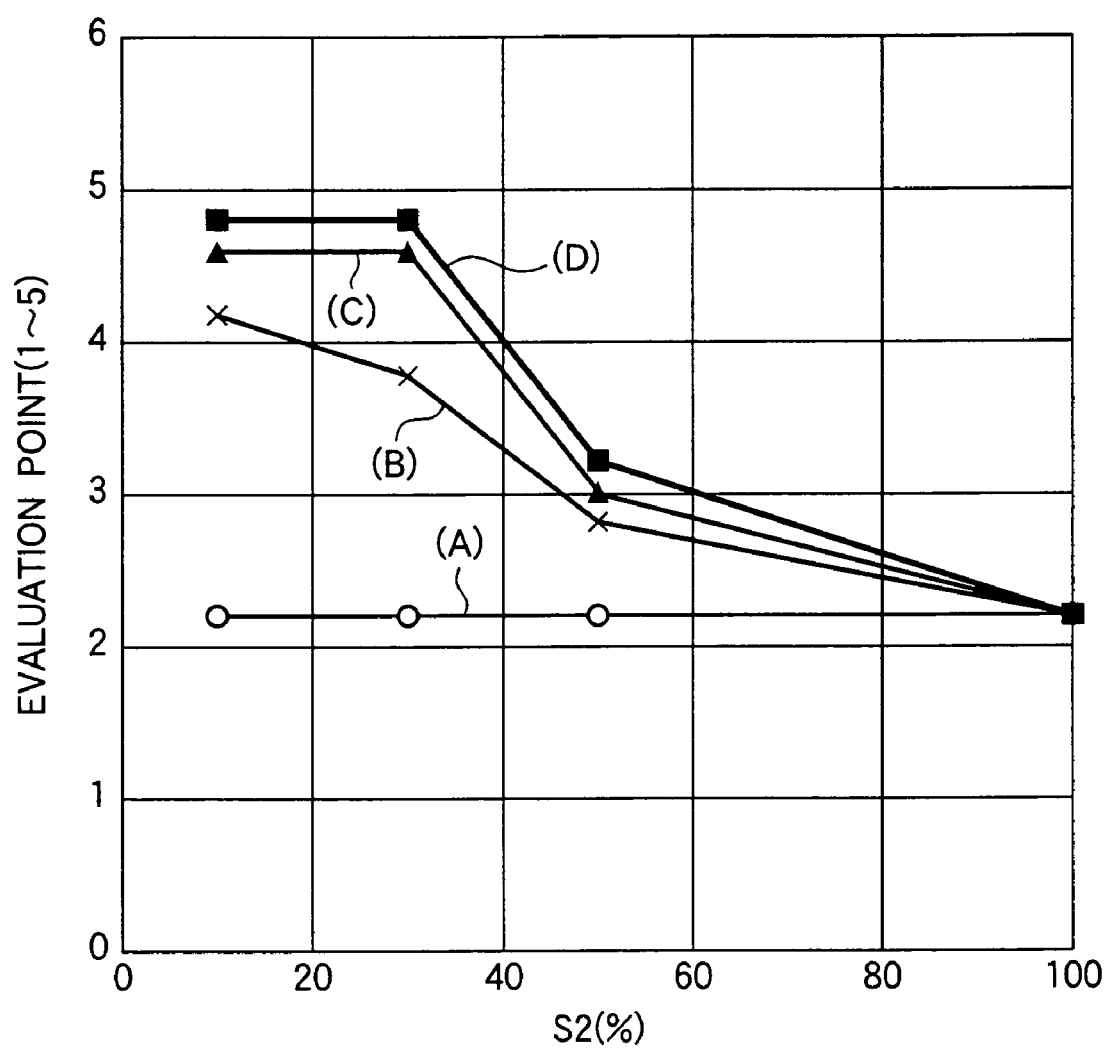
FIG. 3 is view showing, as subjective evaluations by plural observers, display quality when a motion picture is displayed on a display area of a TFT-LCD 1 shown in FIG. 1 while an illumination period at a maximum lighting brightness and a level of an intermediate brightness are changed in the illumination device according to the first embodiment of the invention and the liquid crystal display device using the same.

FIG. 3 is a graph showing, as subjective evaluations by plural observers, display quality when a motion picture is displayed on the display area of the TFT-LCD 1 shown in FIG. 1 while an illumination period at the maximum lighting brightness and an intermediate brightness level are changed.

In FIG. 3, the horizontal axis indicates the ratio (%) of the maximum lighting state S2 to one frame period f, and the vertical axis indicates the evaluation according to evaluation points of stages 1 to 5. The evaluation point 1 indicates a case where a motion picture blur, a tailing phenomenon and the like on the motion picture display are "very obstructive", and the evaluation point 2 indicates a case where those becomes "obstructive". The evaluation point 3 indicates a case where the motion picture blur and the like are "annoying but tolerable", the evaluation 4 indicates a case where "a difference is seen but is tolerable", and the evaluation point 5 indicates a case where "picture quality is equivalent to a still picture and is excellent".

In the drawing, a straight line (A) connecting circular marks indicates a case where the bright level of the intermediate lighting state S3 is the same as the brightness level of the maximum lighting state S2. Accordingly, irrespective of the ratio of the maximum lighting state S2 to the one frame period f (hereinafter abbreviated to "the ratio of the maximum lighting state S2), the illumination with the maximum brightness level is performed throughout the one frame period f. That is, the display is equivalent to the hold type driving, and accordingly, the picture image quality is such that the motion picture blur and the tailing phenomenon become very obstructive, and the evaluation point is 1.

In the drawing, a polygonal line (B) connecting x marks indicates a case where the brightness level of the intermediate lighting state S3 is about one half of the brightness level of the maximum lighting state S2. In this case, when the ratio of the maximum lighting state S2 is within the range of about 10% to 30%, the motion picture blur and the tailing phenomenon are hardly visually recognized and the excellent image quality is obtained, and accordingly, the evaluation point is 4. When the ratio of the maximum lighting state exceeds 30%, the evaluation is gradually lowered, however, the evaluation point 3 is obtained until the ratio becomes about 50%.

In the drawing, a polygonal line (C) connecting triangular marks indicates a case where the brightness level of the intermediate lighting state S3 is 30% of the brightness level of the maximum lighting state S2. In this case, when the ratio of the maximum lighting state S2 is within the range of about 10% to 30%, the motion picture blur and the tailing phenomenon are hardly visually recognized and the excellent image quality is obtained, and accordingly, the evaluation point is close to 5. When the ratio of the maximum lighting state S2 exceeds 30%, the evaluation is gradually lowered, however, the evaluation point 3 is obtained until the ratio becomes about 50%.

In the drawing, a polygonal line (D) connecting square marks indicates a case where the brightness level of the intermediate lighting state S3 is 0 (zero) and a period other than the maximum lighting state S2 becomes the non-lighting state S1. This is the same as the illumination method of the conventional scan type LCD. In this case, when the ratio of the maximum lighting state S2 is within the range of about 10% to 30%, the motion picture blur and the tailing phenomenon are hardly visually recognized and the excellent image quality is obtained, and accordingly, the evaluation point becomes closer to 5. Besides, when the ratio of the maximum lighting state S2 exceeds 30%, the evaluation is gradually lowered, however, the evaluation point of 3 or higher is obtained until the ratio becomes about 50%.

From FIG. 3, it is understood that even if the brightness level of the intermediate lighting state S3 is made about 30% of the brightness level of the maximum lighting state S2, the display quality comparable to the conventional scan type LCD indicated by the polygonal line (D) can be obtained. Further, when the brightness level of the intermediate lighting state S3 is lower than about 50% of the brightness level of the maximum lighting state S2, it is regarded as being within the allowable range.

Besides, when the illumination time of the maximum lighting state S2 is 30% or less of the one frame period f, the motion picture blur and the tailing phenomenon hardly occur, and until the illumination time increases up to 50%, it is regarded as being within the allowable range.

Incidentally, in this embodiment, the pixel is illuminated with the maximum brightness at the point of time when f/2 to 3f/4 has passed since the gradation data was written into the pixel electrode 10. This is adopted in view of the response time of a liquid crystal molecule in the liquid crystal 1c to a change of electric field, and when a liquid crystal material capable of responding at high speed is used, it is also possible to illuminate the pixel with the maximum brightness at the point of time when for example, f/4 to f/2 has passed since the gradation data was written.

As described above, the illumination device 24 of this embodiment is characterized in that in synchronization with the output control signal (latch pulse LP) of the gate pulse GP, the illumination device switches between the maximum lighting state S2 and the intermediate lighting state S3.

Besides, the illumination device 24 of this embodiment performs such a control that the gate pulse GP is outputted to the gate bus line 6, the TFT 4 connected to the gate bus line 6 is turned on, the gradation data is written into the pixel electrode 10, and in a period when the liquid crystal molecule of the liquid crystal 1c is performing an inclination operation by this to a desired inclination angle, the intermediate lighting state S3 is kept, and when the inclination response of the liquid crystal molecule is almost completed, the maximum lighting state S2 is made to occur. By doing so, it is possible to solve the problem of the conventional scan type LCD in which as the maximum lighting state S2 becomes short, the picture quality degradation such as the movement blur can be improved, however, since the period other than the state S2 is kept at the non-lighting state S1, the brightness of the display screen becomes low. In the illumination device 24, even if the time of the maximum lighting state S2 is short, since the illumination is continued at the specified intermediate brightness level by the intermediate lighting state S3, it is possible to lessen the drop of the brightness.

The picture quality degradation such as the movement blur is suppressed by using the illumination device 24 because the illumination method thereof skillfully uses a human engineering feature that the human eye senses a change with emphasis. That is, the human eye senses an image at the instant when the intermediate lighting state S3 is changed to the maximum lighting state S2, and brands it on the retina. This image recognition operation is performed every frame, and the visual recognition of the movement blur and the tailing phenomenon is prevented. On the other hand, since a human being senses the integration value of incident light to the retina as the brightness, an average of the light quantity at the intermediate lighting state S3 and the light quantity at the maximum lighting state becomes the brightness of the display area of the TFT-LCD 1.

By using this embodiment, a liquid crystal display device having high brightness and less movement blur can be realized with a simple and thin structure, and the invention can contribute to the improvement in display quality, the reduction in cost of the device, and the miniaturization.

In the above embodiment, although the description has been given of the scan type illumination device in which one frame is divided into four parts, the structure and the method of the embodiment can be applied to any case where one frame is divided into N parts (N is an integer of 1 or larger). For example, in the case of N=1, in a period when gradation data is being written into all pixels of the display area of the LCD panel 2, the whole is illuminated in the intermediate lighting state S3, and after a specified liquid crystal response time has passed since the pixel writing of the final line, the whole is illuminated in the maximum lighting state S2. The maximum lighting state S2 is realized in, for example, a vertical blanking period. By doing so, one cold cathode fluorescent lamp (light source) is used and the TFT-LCD can be realized in which the motion blur and the tailing phenomenon are reduced while the drop of brightness is suppressed.

Besides, in the above embodiment, although the description has been given of the direct type backlight unit as an example, the invention is not limited to this, and the structure and method of this embodiment may be naturally applied to a sidelight type backlight unit in which a light source is disposed at the end of a light guide plate.

Incidentally, the illumination driving method in the illumination device 24 used in this embodiment may be naturally applied to a driving method of, for example, an EL (Electro Luminescence) display device (using an organic EL element or an inorganic EL element) as a self-luminous plane display device.

Second Embodiment

Figure 4:
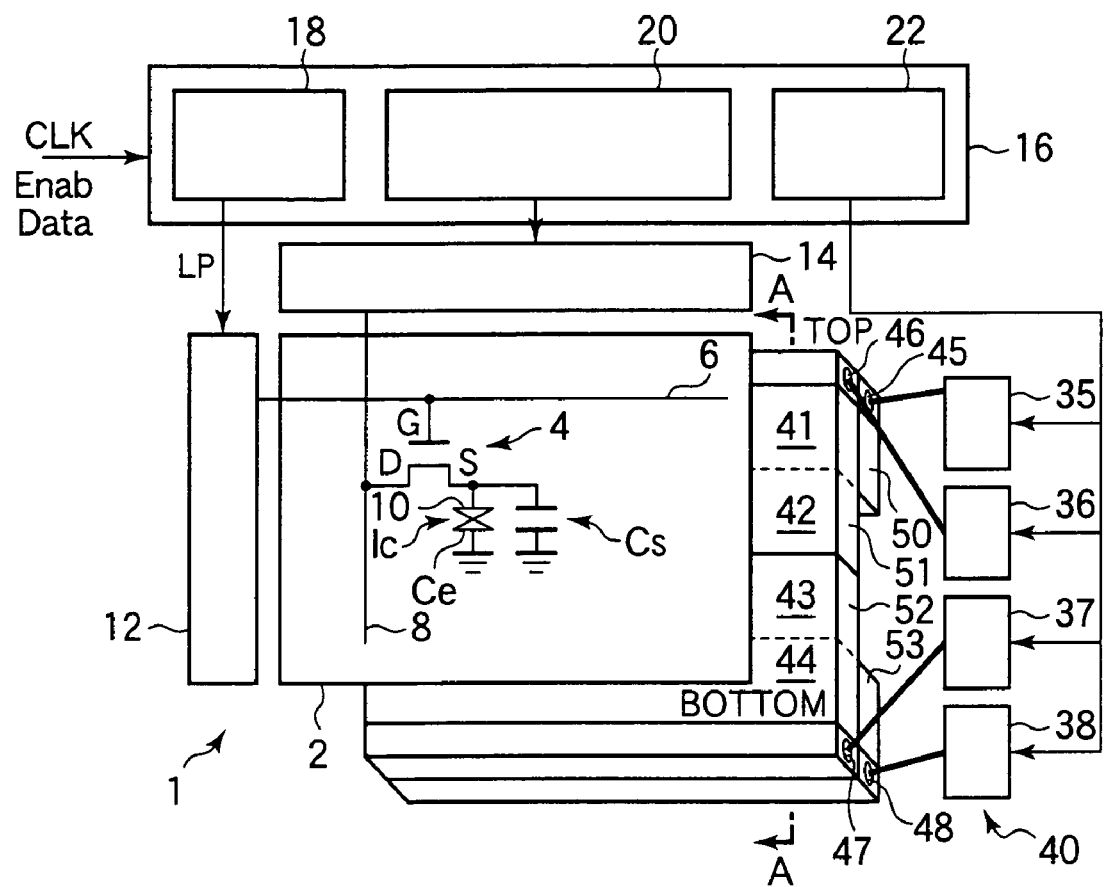
FIG. 4 is a view showing a rough structure of an illumination device according to a second embodiment of the invention and a liquid crystal display device using the same.

An illumination device according to a second embodiment of the invention and a liquid crystal display device using the same will be described with reference to FIGS. 4 to 8. First, a rough structure of the illumination device according to this embodiment and the liquid crystal display device using the same will be described with reference to FIGS. 4, 5A and 5B. FIG. 4 shows the rough structure of the illumination device according to this embodiment and the liquid crystal display device using the same. A TFT-LCD 1 shown in FIG. 4 is the same as the TFT-LCD 1 of the first embodiment explained by use of FIG. 1, and structural elements having the same operation and function are denoted by the same symbols, and the description will be omitted. FIG. 5A is a sectional view taken along line A-A of FIG. 4 and shows a section obtained by cutting an illumination device (sidelight type backlight unit) 40, which is used for the TFT-LCD 1 to support the motion picture display according to this embodiment, along a plane orthogonal to a tube axial direction of a cold cathode fluorescent lamp. FIG. 5B shows a brightness distribution of illumination light from the illumination device 40 at the rear surface side of a display area of the TFT-LCD 1.

The illumination device 40 of this embodiment is a sidelight type backlight unit which has a structure for emitting internally guided light to the outside and in which cold cathode fluorescent lamps are disposed along the end of a light guide plate. The sidelight type backlight unit of this example includes plural (four in this example) divided light-emitting areas 41 to 43, and is disposed so that an LCD panel 2 can be illuminated from the rear surface of the display area.

When the number of gate bus lines in one frame is L, the first light-emitting area 41 has an illumination range of from the first gate bus line 6 as the display start line to the (L/4)-th gate bus line 6. Similarly, the second light-emitting area 42 has an illumination range of from the (L/4+1)-th gate bus line 6 to the (2L/4)-th gate bus line 6, the third light-emitting area 43 has an illumination range of from the (2L/4+1)-th gate bus line 6 to the (3L/4)-th gate bus line 6 and the fourth light-emitting area 44 has an illumination range of from the (3L/4+1)-th gate bus line 6 to the L-th gate bus line 6.

As shown in FIG. 5A, two light guide plates 51 and 52 are disposed on substantially the same plane at the side facing the rear surface of the TFT-LCD 1. The light guide plate 51 is disposed in the first and the second light-emitting areas 41 and 42, and the light guide plate 52 is disposed in the third and the fourth light-emitting areas 43 and 44. A cold cathode fluorescent lamp 46 is disposed at an end of the light guide plate 51 opposite to an end facing the light guide plate 52, and a cold cathode fluorescent lamp 47 is disposed at an end of the light guide plate 52 opposite to an end facing the light guide plate 51.

Besides, a light guide plate 50 is disposed in the first light-emitting area 41 and to be adjacent to a surface of the light guide plate 51 at the side opposite to the side of the TFT-LCD 1. A cold cathode fluorescent lamp 45 is disposed at one end of the light guide plate 50. A light guide plate 53 is disposed in the fourth light-emitting area 44 and to be adjacent to a surface of the light guide plate 52 at the side opposite to the side of the TFT-LCD 1. A cold cathode fluorescent lamp 48 is disposed at an end of the light guide plate 53. The cold cathode fluorescent lamps 45 to 48 are formed into, for example, linear rod shapes. Besides, the light emission brightnesses of the cold cathode fluorescent lamps 45 to 48 can be changed by controlling the supplied current.

Specified driving currents are fed from light source power supply circuits 35 to 38 to the respective cold cathode fluorescent lamps 45 to 48. The respective light source power supply circuits 35 to 38 can give at least three stage emission states to the respective cold cathode fluorescent lamps 45 to 48 on the basis of current control signals from a light source control part 22 of a control circuit 16. Here, a first stage emission state is a non-lighting state S1, a second stage emission state is a maximum lighting state S2 in which maximum lighting brightness is obtained, and a third stage emission state is an intermediate lighting state S3 in which about one half of the brightness of the second stage emission state is obtained. Here, the maximum lighting brightness does not necessarily mean the maximum brightness on specifications, which can be produced by the cold cathode fluorescent lamps 45 to 48, and also includes the highest brightness in the brightness range adjusted by the light source power supply circuits 35 to 38.

The illumination device 40 according to this embodiment as described above is constructed such that a light source unit (50, 45) including the light guide plate (light guiding member) 50 and the cold cathode fluorescent lamp 45 disposed at the end thereof and for emitting light from one surface is laminated on a light source unit (51, 46) including the light guide plate 51 and the cold cathode fluorescent lamp 46 disposed at the end thereof. Besides, the illumination device 40 is constructed such that a light source unit (53, 48) including the light guide plate 53 and the cold cathode fluorescent lamp 48 disposed at the end thereof and for emitting light from one surface is laminated on a light source unit (52, 47) including the light guide plate 52 and the cold cathode fluorescent lamp 47 disposed at the end thereof. Further, the illumination device 40 is constructed such that the light source unit (51, 46) and the light source unit (52, 47) are disposed on the same plane. Besides, the illumination device 40 is constructed such that the light source unit (50, 45) and the light source unit (53, 48) are disposed on the same plane.

Each of the light-emitting areas 41 to 44 is constructed such that a light emission opening is formed at the rear side of the LCD panel 2, and a portion other than that is surrounded by a diffuse reflection plate 55. A diffusion sheet 60 is disposed between the rear surface of the TFT-LCD 1 and the light emission opening of the illumination device 40. As light extraction structures 56 to 59, for example, light scattering patterns are printed on the rear surface of the light guide plate 50 in the first light-emitting area 41, the rear surface of the light guide plate 51 in the second light-emitting area 42, the rear surface of the light guide plate 52 in the third light-emitting area 43, and the rear surface of the light guide plate 53 in the fourth light-emitting area 44. A light extraction structure is not formed on the rear surface of the light guide plate 51 in the first light-emitting area 41 and the rear surface of the light guide plate 52 in the fourth light-emitting area 44.

By the arrangement of the light extraction structures 56 and 57, most of the light from the cold cathode fluorescent lamp 45 is guided through the light guide plate 50 while being scattered by the light extraction structure 56, and further passes through the portion of the first light-emitting area 41 of the light guide plate 51 and is emitted from the first light-emitting area 41. At this time, part of the light is guided through the light guide plate 51, is scattered by the light extraction structure 57, and is emitted from the second light-emitting area 42. Further, part of the light is guided from the light guide plate 51 to the light guide plate 52 and the light guide plate 53, is scattered by the light extraction structures 58 and 59, and is emitted from the third and the fourth light-emitting areas 43 and 44. That is, most of the light from the cold cathode fluorescent lamp 45 is used for the illumination of the first light-emitting area 41, and the remainder is used for the illumination of the second to the fourth light-emitting areas 42 to 44.

Similarly, most of the light from the cold cathode fluorescent lamp 46 is guided through the light guide plate 51, and is emitted from the second light-emitting area 42 while being scattered by the light extraction structure 57. At this time, part of the light is guided to the light guide plates 50, 52 and 53, is scattered by the light extraction structures 56, 58 and 59, and is emitted from the first light-emitting area 41, and the third and the fourth light-emitting areas 43 and 44. That is, most of the light from the cold cathode fluorescent lamp 46 is used for the illumination of the second light-emitting area 42, and the remainder is used for the illumination of the first light-emitting area 41, and the third and the fourth light-emitting areas 43 and 44.

On the other hand, by the arrangement of the light extraction structures 58 and 59, most of the light from the cold cathode fluorescent lamp 48 is guided through the light guide plate 53 while being scattered by the light extraction structure 59, and further passes through the portion of the fourth light-emitting area 44 of the light guide plate 52 and is emitted from the fourth light-emitting area 44. At this time, part of the light is guided through the light guide plate 52, is scattered by the light extraction structure 58, and is emitted from the third light-emitting area 43. Further, part of the light is guided from the light guide plate 52 to the light guide plate 51 and the light guide plate 50, is scattered by the light extraction structures 57 and 56 and is emitted from the second and the first light-emitting areas 42 and 41. That is, most of the light from the cold cathode fluorescent lamp 48 is used for the illumination of the fourth light-emitting area 44, and the remainder is used for the illumination of the first to the third light-emitting areas 41 to 43.

Similarly, most of the light from the cold cathode fluorescent lamp 47 is guided through the light guide plate 52, and is emitted from the third light-emitting area 43 while being scattered by the light extraction structure 58. At this time, part of the light is guided to the light guide plates 50, 51 and 53, is scattered by the light extraction structures 56, 57 and 59, and is emitted from the first light-emitting area 41, the second light-emitting area 43 and the fourth light-emitting area 44. That is, most of the light from the cold cathode fluorescent lamp 47 is used for the illumination of the third light-emitting area 43, and the remainder is used for the illumination of the first and the second light-emitting areas 41 and 42, and the fourth light-emitting area 44.

The light source control part 22 of the control circuit 16 shown in FIG. 4 synchronizes with the latch pulse signal LP outputted to the gate driver 12 from the gate driver control part 18 and outputs the light emission control signal to the respective light source power supply circuits 35 to 38. Each of the light source power supply circuits 35 to 38 changes the emission state of each of the cold cathode fluorescent lamps 41 to 44 to any one of the first to the third emission states S1 to S3, and the LCD panel 2 is illuminated from the rear surface of the display area.

In the structure as stated above, illumination driving similar to that of the first embodiment shown in FIG. 2 is performed. In this embodiment, the light emission brightnesses B(25) to B(28) of FIG. 2 are read as light emission brightnesses B(41) to B(44).

The light source control part 22 synchronizes with the latch pulse LP for causing the gate pulse GP(1) to be outputted to the gate bus line GL(1) as the display start line, and outputs the emission control signal for controlling the current, which is to be fed to the cold cathode fluorescent lamp 45, to the light source power supply circuit 35. By this, the current fed from the light source power supply circuit 35 to the cold cathode fluorescent lamp 45 is controlled, and the light emission brightness B(41) of the light-emitting area 41 becomes the intermediate lighting state S3 of about one half of the maximum lighting brightness. Thereafter, until the latch pulse LP for causing the gate pulse GP(3L/4+1) to be outputted to the gate bus line GL(3L/4+1) is outputted, the light emission brightness B(41) of the light-emitting area 41 is kept the intermediate lighting state S3.

When the latch pulse LP for causing the gate pulse GP(3L/4+1) to be outputted to the gate bus line GL(3L/4+1) is outputted, the light source control part 22 synchronizes with it and outputs a specified light emission control signal to the light source power supply circuit 35. By this, the current fed from the light source power supply circuit 35 to the cold cathode fluorescent lamp 45 is controlled, and the light emission brightness B(41) of the light-emitting area 41 becomes the maximum lighting state S2 in which the maximum lighting brightness is obtained. Thereafter, one frame period f is completed, a next frame period f is started, and until the latch pulse LP for causing the gate pulse GP(1) to be outputted to the gate bus line GL(1) is outputted, the light emission brightness B(41) of the light-emitting area 41 is kept the maximum lighting state S2. Each time the next frame period f is started, the above operation is repeated.

By this illumination operation, the light emission brightness B(41) of the light-emitting area 41 becomes the maximum lighting state S2 only in the ¼ frame period before the end of the one frame period f, and the area of the ¼ frame from the top of the one frame (display area) is illuminated with the maximum brightness. In the other period from the start of the one frame period f to the ¾ frame point of time, the light emission brightness B(41) of the light-emitting area 41 is kept the intermediate lighting state S3, and the area of the ¼ frame from the top of the one frame is illuminated with the intermediate brightness.

Similarly to the description of the first embodiment, the emission operations in the light-emitting areas 42, 43 and 44 are performed, and as shown in FIG. 2, the illumination is obtained in which the whole display area is illuminated with the intermediate brightness, and the light emission brightnesses of the areas obtained by longitudinally dividing the display area into four band-shaped areas parallel to the gate bus line 6 become maximum sequentially in time sequence. Although this description has been given of the example in which the maximum lighting state S2 and the intermediate lighting state S3 are switched, the same effect can also be obtained when the maximum lighting state S2 and the non-lighting state S1 are switched.

Besides, in this embodiment, although the description has been given of the structure that the two light guide plates are laminated, and two such pairs are disposed in the plane, the same effect can also be obtained when the number of laminated plates is increased. Besides, in the structure shown in FIG. 5A, when the light source power supply circuits 35 to 38 and the like are disposed in recess parts (rear surface of the light-emitting areas 42 and 43) of the backlight, or the cold cathode fluorescent lamps 45 and 48 are disposed therein, the reduction in thickness of the device and the miniaturization can be realized.

As stated above, although the illumination device 40 according to this embodiment is of the sidelight type, the light source unit for mainly illuminating one light-emitting area supplies part of the light to the other adjacent light-emitting area, and on the other hand, the light source unit for illuminating the other light-emitting area supplies part of the light to the one adjacent light-emitting area, and mutual compensation can be made, and accordingly, as shown in FIG. 5B, a uniform brightness distribution a can be realized. Besides, the light source is disposed at the end face of each light guide member, and lighting and non-lighting of this light source, or lighting and darkening thereof are individually controlled, so that the illumination device of the liquid crystal display device suitable for motion picture display can be realized to be thin.

Next, a modified example of the illumination device 40 according to this embodiment and the TFT-LCD 1 using the same will be described with reference to FIGS. 6A and 6B. The structure shown in FIG. 6A is the same as the structure shown in FIG. 5 except that a structure of an illumination device 40 partially varies. The illumination device 40 shown in FIG. 6 has a feature that a light mixing area 62 is provided between a diffusion sheet 60 and light guide plates 51 and 52 of laminated light source units at a side of a TFT-LCD 1.

The light mixing area 62 is formed of a transparent plate made of acryl or polycarbonate, a diffused plate in which a minute material having different refractivity, such as a fiber, is mixed in the transparent plate or an air layer. When the air layer of a space of 0.5 mm to 10 mm is used, as compared with a brightness distribution a (identical to the brightness distribution α of FIG. 5B) in the case where the air layer does not exist and indicated by a broken line of FIG. 6B, a brightness distribution β indicated by a solid line is obtained in which brightness irregularity at a boundary portion of the light-emitting areas is relieved, and a brightness change is not visually recognized.

According to this embodiment, minute brightness changes at the boundary of the light-emitting areas are mutually mixed, and transversal-shaped uneven brightness, which was visually recognized at the boundary portion, can be relieved or eliminated.

Incidentally, in the illumination device 40 shown in FIGS. 5A and 6A, although all the light extraction structures 56 to 59 of the light guide plates 50 to 53 are disposed at the lower side of the light guide plates 50 to 53, when the light extraction structures 56 and 59 of the first and the fourth light-emitting areas 41 and 44 are disposed on the upper surfaces of the light guide plates 50 and 53, the light extraction structures 56 to 59 are disposed on the one plane so that the brightness can be made further uniform.

Next, a modified example of the illumination device of this embodiment will be described with reference to FIGS. 7A to 7C. The structure shown in FIG. 7A is the same as the structure shown in FIG. 5A except that a structure of an illumination device 40 partially varies. The illumination device 40 shown in FIG. 7A has a feature that a double-sided reflection member 64 to perform regular reflection or diffuse reflection as shown in FIG. 7B or 7C is disposed in a gap between light guide plates 51 and 52. At the boundary portion of the second and the third light-emitting areas 42 and 43 of the illumination device 40 shown in FIGS. 5A and 6A, part of the light is reflected toward the side of the light source by surface reflection at the end face of the light guide plate, and is again guided and the remainder is emitted from the end face and is incident on the other illumination area. Thus, there is a possibility that emitted lights are mixed and the motion picture performance is degraded. Then, the double-sided reflection plate 64 is disposed in the gap between the light guide plates 51 and 52. By this, the mixture of the emitted lights is prevented, and the motion picture performance can be improved.

FIG. 7B shows such a structure that the opposite end faces of the light guide plates 51 and 52 face with each other in parallel and are substantially orthogonal to the light emission surfaces of the light guide plates 51 and 52, and the double-sided reflection member 64 made of a double-sided regular reflection plate or a double-sided regular reflection sheet is disposed in the gap.

FIG. 7C shows such a structure that a Λ-shaped gap opening to the rear surface side is provided at the opposite end faces of the light guide plates 51 and 52, and the double-sided reflection member 64 made of a double-sided regular reflection plate or a double-sided regular reflection sheet is disposed in the gap. Since the double-sided reflection member 64 shown in FIG. 7B has a finite thickness, when viewed from the light emission side (side of the TFT-LCD 1) of the light guide plates 51 and 52, the gap is visually recognized as a shadow and the uneven brightness is produced. On the other hand, when the structure as shown in FIG. 7C is adopted, the double-sided reflection member 64 is not seen from above, and the effect of improving the uneven brightness is obtained. Incidentally, even when the structure is adopted such that the light guide plates are in contact with each other in the vicinity of the Λ-shaped apex, a sufficiently superior effect with respect to the motion picture performance can be obtained.

When the refractivity of the light guiding material is n, it is preferable that the apex angle θ of the Λ-shaped double-sided reflection member 64 satisfies θ≦180°−4×sin⁻¹ (1/n) . . . (expression 1). In the case where the apex angle of the Λ shape is larger than θ of the above expression, part of the light guided through the light guide plate and reflected at the end face is emitted upward from the light guide plate. Thus, there is a case where linear clear unevenness occurs on the liquid crystal panel plane. Accordingly, when the apex angle θ satisfying the above expression 1 is adopted, since the end face reflected light is entirely guided, it becomes possible to prevent the uneven brightness.

Figure 8A:
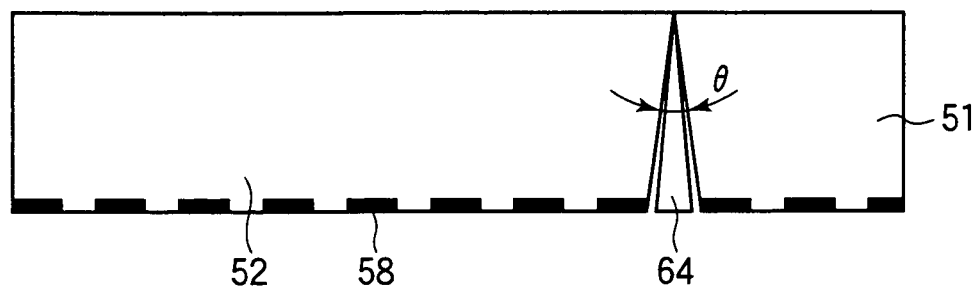
Figure 8B:
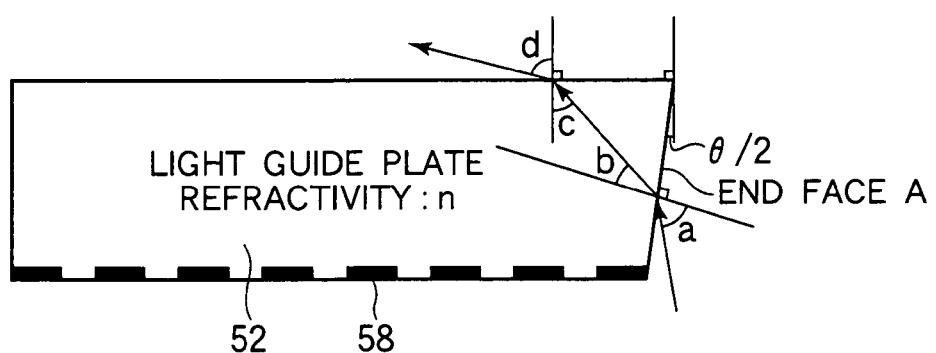

The expression 1 will be described with reference to FIGS. 8A and 8B. FIG. 8A is an enlarged view of FIG. 7C, and FIG. 8B shows the course of light at the end face on the side of the light guide plate 52. In FIG. 8B, the emission light of the light guide plate 52 is composed of light beams scattered by the printed scattering pattern of the light extraction structures 58 of the lower surface of the light guide plate 52, and when the incident light from the end face A is emitted to the light-emitting area from the light guide plate 52, only a portion within the reach of the light beam from the end face A comes to have high brightness, and the uneven brightness occurs.

The apex angle θ is determined by the condition that the incident light beam from the end face A is not emitted from the emission surface of the light guide plate 52. Here, the incident angle of the light beam incident on the end face A is made a, the refraction angle of the light beam incident on the light guide plate 52 from the end face A is made b, the incident angle of the light beam incident from the end face A on the light-emitting area opening surface of the light guide plate 52 is made c, and the refractivity of the light guide plate 52 is made n. The incident light from the Λ-shaped end face A of the light guide plate 52 is refracted according to Snell's law.

(1) sin(a)=n×sin(b)

(2) n×sin(c)=sin(d)

Besides, the refraction angle b and the incident angle c are expressed by the following expression.

(3) 90°=b+c+θ/2

Here, if d≧90°, light incident on the light guide plate 52 from the end face A is not emitted from the light guide plate 52.

(4) Besides, since there is a possibility of incidence from any direction, the incident angle a becomes ±90°.

The expression (1) can be modified to b=sin⁻¹(1/n), and the expression (2) can be modified to c=sin⁻¹(1/n).

When these are substituted into the expression (3),

θ=180°−4×sin⁻¹(1/n)

From the condition of (4),

θ≦180°−4×sin⁻¹(1/n).

For example, in the case of PMMA of a normal light guide plate material, n=1.48, and accordingly, θ=9.97°.

Next, still another modified example of the illumination device of this embodiment will be described with reference to FIGS. 9A to 9C. The structure shown in FIG. 9B is the same as the structure shown in FIG. 5A except that a structure of an illumination device 40 partially varies. FIG. 9A shows a rough structure of the illumination device of this modified example and a liquid crystal display device using the same. A TFT-LCD 1 shown in FIG. 9A is the same as the TFT-LCD 1 of this embodiment explained by use of FIG. 4, and structural elements having the same operation and function are denoted by the same symbols and the description will be omitted. FIG. 9B is a sectional view taken along line A-A of FIG. 9A, and shows a section obtained by cutting the illumination device (sidelight type backlight unit) 40, which is used for the TFT-LCD 1 to support the motion picture display according to this embodiment, along a plane orthogonal to a tube axial direction of a cold cathode fluorescent lamp. FIG. 9C shows a brightness distribution of illumination light from the illumination device 40 at the rear surface side of a display area of the TFT-LCD 1.

The structure shown in FIG. 9A is the same as the structure shown in FIG. 4 except that the structure of the illumination device 40 partially varies. The illumination device 40 shown in FIG. 9A has a feature that brightness adjusting volumes 70 to 73 are provided for light source power supply circuits 35 to 38, respectively, and the quantities of emission lights from respective light-emitting areas 41 to 44 can be finely adjusted and can be made uniform.

Originally, the emission light quantities of the cold cathode fluorescent lamps are different from each other. Thus, there can arise a problem that the brightnesses of the first to the fourth light-emitting areas 41 to 44 are different from each other. As a countermeasure against this problem, it is conceivable that the brightness of each of the cold cathode fluorescent lamps is evaluated, and the cold cathode fluorescent lamps having the same brightness are combined and used, however, there is a problem that the manufacturing cost becomes high. On the other hand, according to this structure, the uneven brightness is lowered at low cost, and the display surface brightness can be made uniform.

As described above, according to this embodiment, the liquid crystal display device which can obtain the uniform brightness distribution and is suitable for the motion picture display can be manufactured to be small and thin.

Third Embodiment

An illumination device according to a third embodiment of the invention and a liquid crystal display device using the same will be described with reference to FIGS. 10A to 29 and FIG. 1 showing the first embodiment. This embodiment has been made to solve the problem of the third related art, and realizes a display device in which even if a lighting period of a cold cathode fluorescent lamp of an illumination device is made short, light emission brightness of the cold cathode fluorescent lamp is not required to be raised, and a high quality motion picture image can be obtained.

Subjective evaluation was performed as to whether or not a difference in picture quality was felt in the case where a ratio (duty rate) of a lighting time of a backlight unit in one frame period was changed, and further, gradation data was processed and transmissivity of liquid crystal was adjusted. It has been found that even if the duty ratio is the same, according to image data, a difference in picture quality from the original image is felt or is not felt. Examples of the subjective evaluation result are shown in FIGS. 10A and 10B. FIG. 10A shows the subjective evaluation result at a duty ratio of 80%, and FIG. 10B shows the subjective evaluation result at a duty ratio of 60%. The horizontal axis of FIGS. 10A and 10B indicates an average value of all gradation data of 64 gradations of 0 to 63 displayed on one frame. The vertical axis indicates a ratio (%) of the number of pixels saturated in brightness by processing of image data to the number of total display pixels. When the number of high brightness pixels saturated in brightness by adjustment of the transmissivity of the liquid crystal is examined, it varies according to the content of the image, and at both the duty ratio of 80% and the duty ratio of 60%, when the ratio of the number of pixels saturated in brightness to the number of all display pixels is 2% or less of the whole display, the difference in picture quality from the original image is not felt irrespective of the average value (average brightness of the image) of all gradation data of the image. Although individual illustration is omitted, it has been found that when the ratio of the pixels saturated in brightness is 2% or less of the whole, even if the duty ratio is lowered, the difference in picture quality from the original image is not felt in any image.

From the above, pixels at a specified ratio and selected in descending order of brightness in an image are made to have the maximum display brightness, and the respective brightnesses of the remaining pixels except for those are reproduced by lowering the duty ratio of the light source of the backlight unit and raising the transmissivity of the liquid crystal, so that it becomes possible to make the quality of the motion picture display equivalent to the original image even if the duty ratio is lowered.

The liquid crystal display device according to this embodiment has the same structure as the structure described in the first and the second embodiments and shown in FIGS. 1 and 4. The same structural elements as those of FIGS. 1 and 4 are denoted by the same symbols and the detailed description will be omitted. A TFT-LCD 1 includes an LCD panel 2 to modulate light transmissivity of respective sub-pixels of red (R), green (G) and blue (B), which are two-dimensionally arranged in a matrix form, on the basis of gradation data. An illumination device 24 (or an illumination device 40, hereinafter, the description will be given using the illumination device 24) for irradiating light is provided at the rear surface of a display area of the LCD panel 2. The illumination device 24 includes light sources (cold cathode fluorescent lamps 30 to 33) and light source power supply circuits 35 to 38 for driving them.

Figure 11:
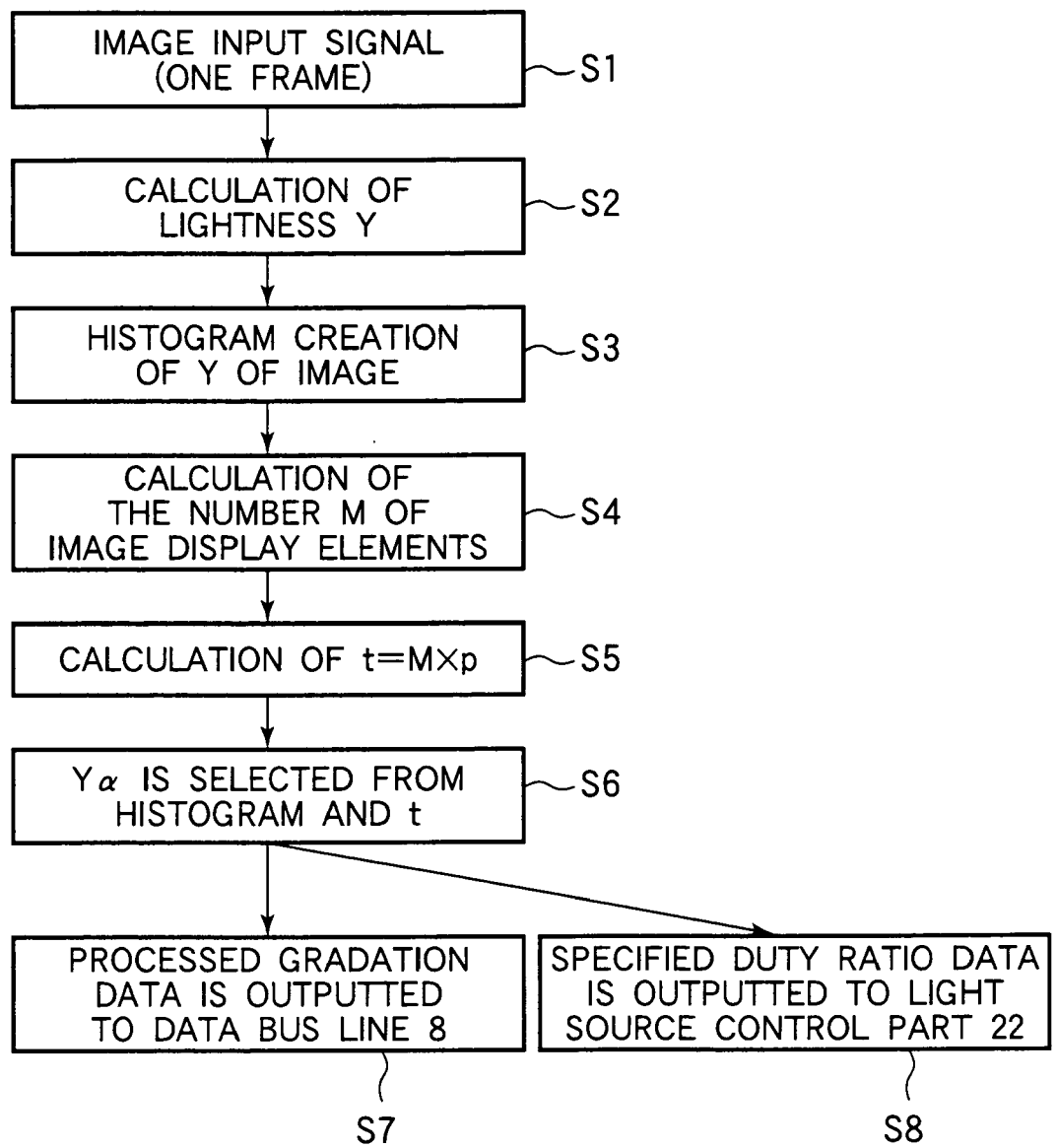
FIG. 11 is a view showing a rough operation procedure of a display data conversion circuit 20 of an illumination device according to the third embodiment of the invention and a liquid crystal display device using the same.

A control circuit 16 of this embodiment is provided with various circuits for driving the TFT-LCD 1, and a display data conversion circuit 20 for analyzing gradation data inputted from the outside. FIG. 11 shows a rough operation procedure of the display data conversion circuit 20. As shown in FIG. 11, the display data conversion circuit 20 stores the gradation data of pixels (combination of sub-pixels of R, G and B) of one frame inputted to the control circuit 16 (step S1), obtains lightness $Y=r \times R+g \times G+b \times B$ (r, g and b are real numbers including a numerical value of 0) from the respective gradation data (R, G, B) corresponding to the respective pixels (step S2), and creates a histogram of the lightness Y of the image (step S3). Next, the number M of pixels relating to an image display in one frame is calculated (step S4), a specific number $t=M \times p$ of a product of the number M of pixels and a specified brightness saturation ratio p (step S5), and threshold lightness $Y\alpha$ is determined from the histogram of the lightness Y of the image and the specific number t (step S6). Next, the processed gradation data is outputted to the plural data bus lines 8 on the basis of the threshold lightness $Y\alpha$ (step S7), and specified duty ratio data is outputted to the light source control part 22 for controlling the light source power supply circuits 35 to 38 (step S8). The light source control part 22 controls the light source power supply circuits 35 to 38 on the basis of the duty ratio data, and turns on the cold cathode fluorescent lamps 30 to 33 at the specified duty ratio.

For example, the display data conversion circuit 20 determines the duty ratio so that the product of the maximum value which the light transmissivity can take (maximum value which the gradation data can take) and the illumination quantity (duty ratio) of the illumination device 24 becomes equal to the threshold lightness $Y\alpha$, the gradation data of the pixels of the lightness Y higher than the threshold lightness $Y\alpha$ is processed so that the light transmissivity comes to have the maximum value, and in the other pixel, the gradation data is processed so that the product of the processed gradation data and the determined duty ratio becomes equal to the lightness Y of the original gradation data of the pixel.

Figure 12:
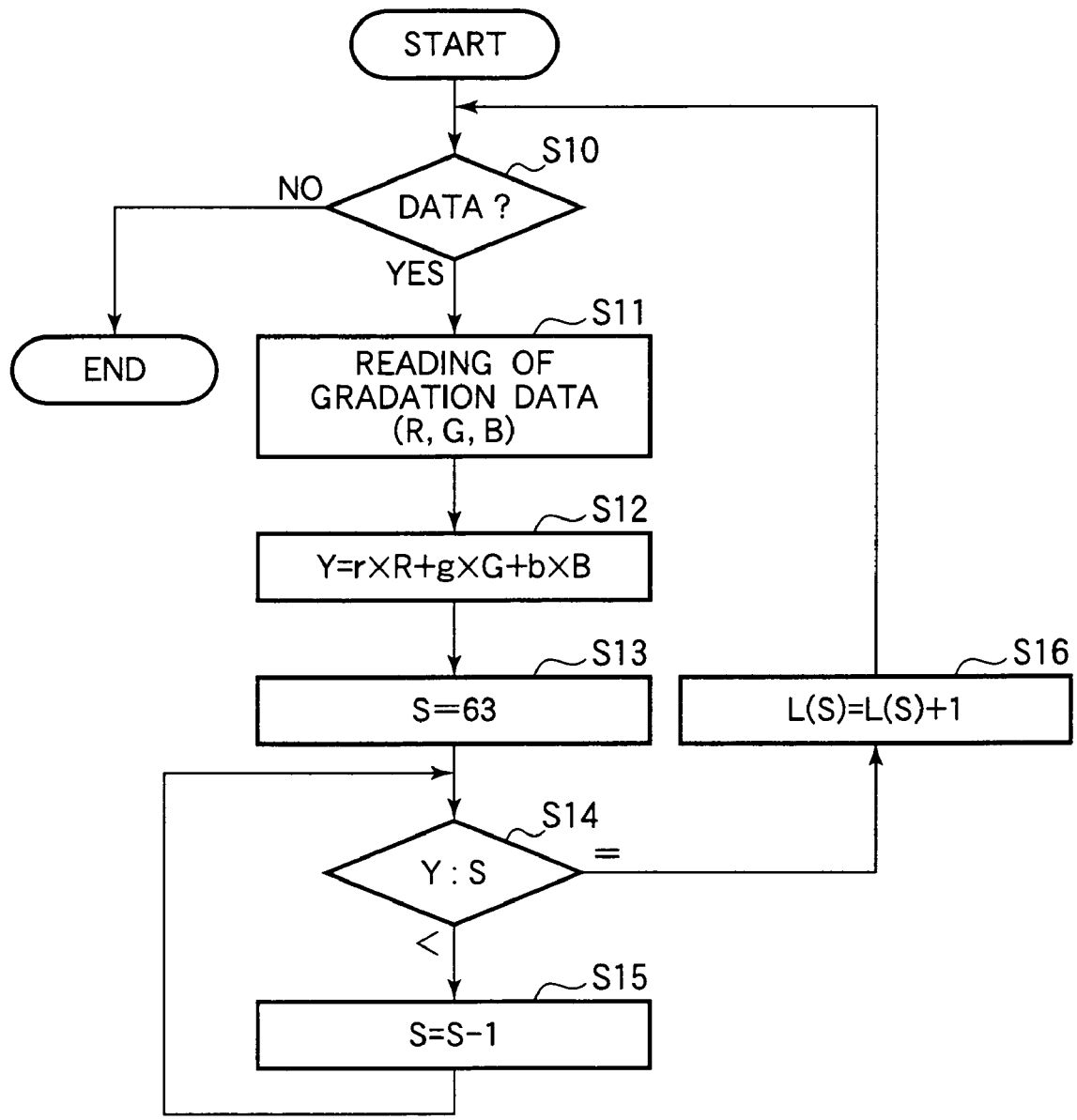
FIG. 12 is a flowchart showing calculation of lightness Y and a procedure of histogram creation in the display data conversion circuit 20 of the illumination device according to the third embodiment of the invention and the liquid crystal display device using the same.

FIG. 12 is a flowchart showing a calculation of the lightness Y in the display data conversion circuit 20 and a procedure of histogram creation. The display data conversion circuit 20 sequentially reads gradation data D (R, G, B) of one frame stored in a not-shown storage device (memory) (steps S10 and S11), sets a constant to be, for example, (r, g, b)=(0.2126, 0.7152, 0.0722), and calculates the lightness Y=r×R+g×G+b×B for the read gradation data (R, G, B) (step S12). Next, a variable s is set to 63 (step S13), and the values of Y and s are compared with each other (step S14). If Y≠s, the procedure proceeds to step S15, 1 is subtracted from the value of s, the comparison of the Y value and the s value is performed again at the step S14, and the steps S14 and S15 are repeated until Y=s is established. If Y=s, the procedure proceeds to step S16, 1 is added to a frequency L(s) indicating the number of times of appearance of the lightness Y=s in one frame, and the procedure returns to the step S10. For example, when the gradation data (R, G, B)=(58, 30, 25) is read at the step S11, the lightness Y=35 is calculated at the step S12, and 1 is added to the value of the frequency L(35) indicating the number of times of appearance of the lightness Y=35 in one frame (step S16). The procedure from the step S10 to the step S16 is repeated by the number of gradation data of one frame, so that the respective values of the frequencies L(0) to L(63) of the lightness Y=0 to 63 in the one frame are obtained, and the histogram L of the lightness Y is calculated.

Figure 13:
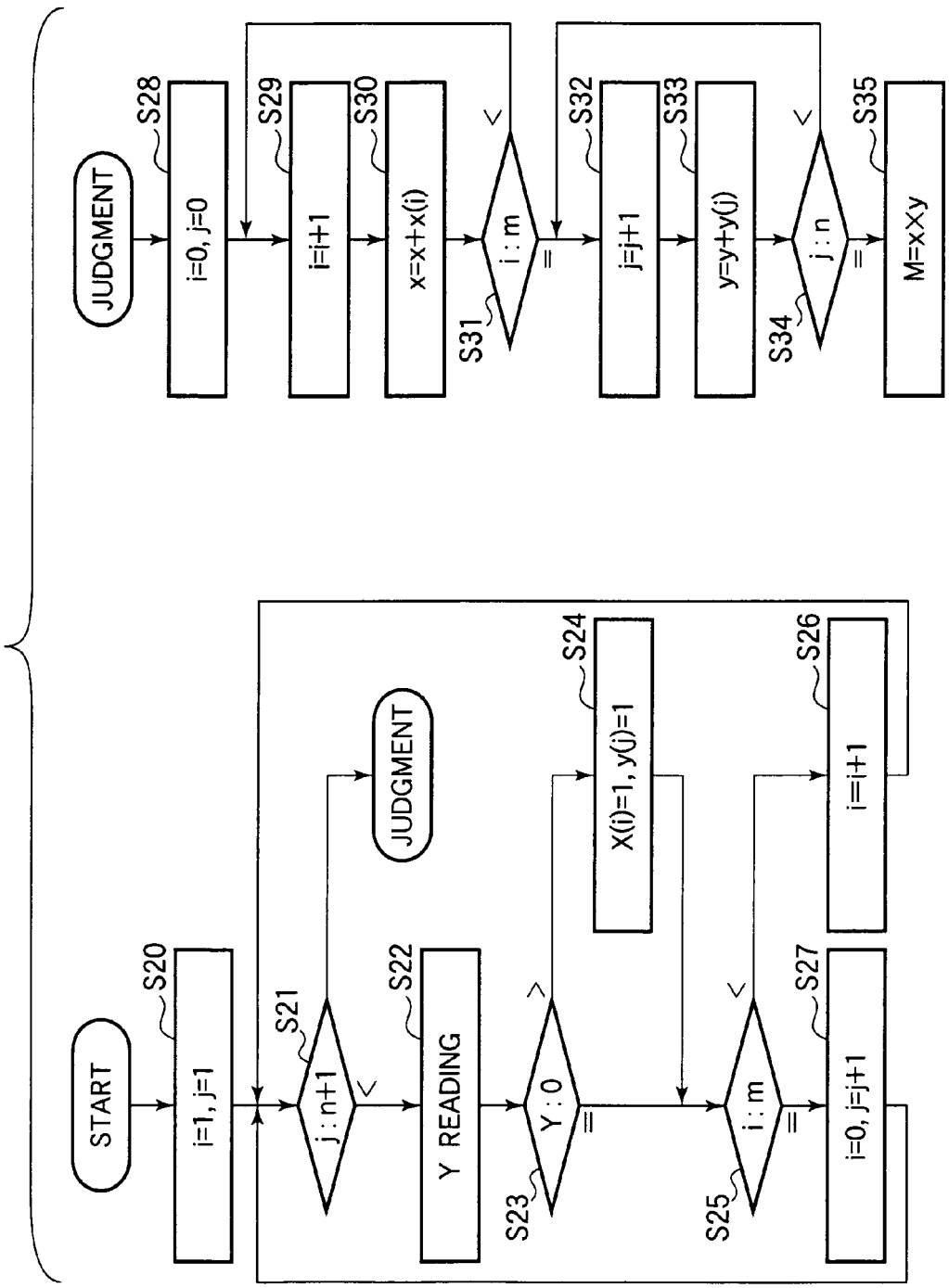
FIG. 13 is a flowchart showing a procedure of calculating the number M of pixels occupied by an image in the case where the image exists in only a part of one frame (screen) in the illumination device according to the third embodiment of the invention and the liquid crystal display device using the same.

FIG. 13 is a flowchart showing a procedure for calculating the number M of pixels which an image occupies in the case where the image exists only in a part of one frame (screen). Pixels of two-dimensional arrangement are made to have m rows and n columns, and it is assumed that when the lightness Y of gradation data (R, G, B) at an i-th row and a j-th column is 0 (that is, black display in a normally black mode), x(i)=y(j)=0 is made to be satisfied at a pixel (x(i), y(i)), and in the other case, x(i)=y(j)=1 is made to be satisfied. With respect to all pixels of the one frame, a comparison between the lightness Y and the value 0 is made, and x(i)=y(j)=0 or x(i)=y(j)=1 is substituted into a coordinate (x(i), y(i)) of each pixel. Since the image is almost square, when all pixels in a vertical or horizontal column or row become black (a pixel which becomes black display has x(i)=y(j)=0), they are regarded as a background, and the other pixels are selected as the image and the number M is obtained. That is, the number of pixels of x(i)=1 and the number of pixels of y(i)=1 are calculated, and the product of both is obtained, so that the number M is obtained. For example, in the case where pixels for display exist substantially in the center of the frame, among pixels of xm rows and yn columns in the whole frame, the number M of pixels is obtained in a range except for x1 to xb rows, xc to xm rows, y1 to yf columns and yg to yn columns in which all image signals are 0.

Specifically, in all i and j, from a state of x(i)=y(j)=0, at step S20 of FIG. 13, variables are set to be i=1 and j=1, the variable j=1 and a column value (n+1) are compared with each other (step S21). If j=1<n+1, since reading of data is not performed up to the final column n, the procedure proceeds to step S22, and the lightness Y of a pixel (1, 1) of the first row and the first column is read. Next, the read lightness Y and the value 0 (zero) are compared with each other (step S23), and if Y>0, since gradation data other than black exists in the pixel (1, 1), the procedure proceeds to step S24, x(1) is set to the value 1, y(1) is set to the value 1, and the procedure proceeds to step S25. In the case of Y=0, the procedure proceeds to step S25 without executing the step S24. In this case, the pixel remains x(1)=y(1)=0.

Next, at the step S25, the variable i=1 and the row value m are compared with each other. If i=1<m, since data reading is not performed up to the final row m, the value of i is increased by one (step S26), the procedure again returns to the step S21, the lightness Y of a next pixel (2, 1) is read, the lightness Y and the value 0 are compared with each other (step S23), and if Y>0, the setting of x(2)=1 and y(1)=1 is made at (x(2), y(1)) (step S24). By repeating this operation up to i=m, the processing of the m pixels at the column j=1 is ended.

Next, the procedure proceeds to step S27 from the step S25, the value of i is set to the initial value 0, the value of the variable j is increased by one, the procedure again returns to the step S21, and the lightness Y of the pixel (1, 2) at the first row and the second column is read. Next, the read lightness Y and the value 0 (zero) are compared with each other (step S23), and if Y>0, since gradation data other than black exists in the pixel (1, 2), the procedure proceeds to the step S24, x(1) of (x(1), y(2)) is set to the value 1, y(2) is set to the value 1, and the procedure proceeds to step S25. In the case of Y=0, the procedure proceeds to step S25 without performing the step S24. In this case, the pixel remains x(1)=y(2)=0.

Next, at the step S25, the variable i=1 and the row value m are compared with each other. If i=1<m, since data reading is not performed up to the final row m, the value of i is increased by one (step S26), the procedure again returns to the step S21, the lightness Y of the next pixel (2, 2) is read, and the lightness Y and the value 0 are compared with each other (step S23), and if Y>0, the setting of x(2)=1 and y(2)=1 is made (step S24). By repeating this operation up to i=m, the processing of the m pixels at the column j=2 is ended. The above operation is repeated and when the variable j becomes j=n+1 at the step S21, the procedure proceeds to a "judgment" routine.

In the "judgment" routine, after i=0 and j=0 are set at step S28, the value of i is increased by one at step S29, and the value of x(i) is added to the variable x (step S30). This processing is repeated up to i=m (row) (step S31), and when the value becomes i=m, the procedure proceeds to step S32. By the processing up to the step S31, the number x of pixels used for the image display in the row direction is grasped.

Next, the value of j is increased by one at the step S32, and the value of y(j) is added to the variable y (step S33). This processing is repeated up to j=n (column) (step S34), and the procedure proceeds to step S35 when j=n is obtained. By the processing up to the step S34, the number y of pixels used for the image display in the column direction is grasped.

Next, at the step S35, the product of the number x of image display pixels in the row direction and the number y of image display pixels in the column direction are obtained, and the number M of image display pixels of the one frame is obtained.

Figure 14:
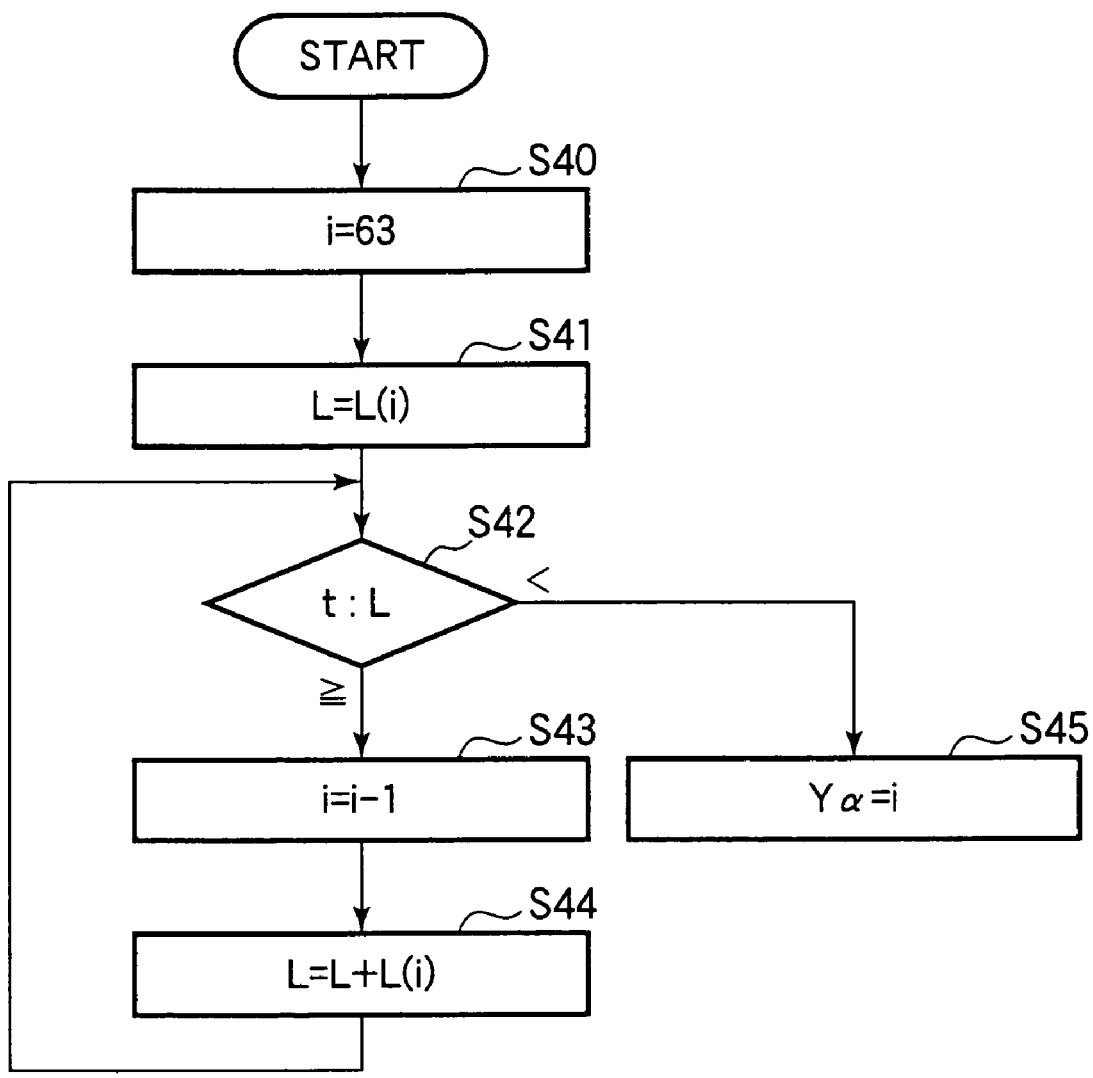
FIG. 14 is a flowchart showing a procedure of calculating threshold lightness Yα in the illumination device according to the third embodiment of the invention and the liquid crystal display device using the same.

FIG. 14 is a flowchart showing a procedure for calculating the threshold lightness Yα. In this procedure, on the basis of the number M of image display pixels and a specified number p, the lightness Y lower than the highest lightness by t=Mp pixels in sequence is made the threshold lightness Yα. The specified number p indicates the ratio of pixels saturated in brightness by image processing, and from the subjective evaluation result shown in FIG. 10, it is preferable that the number p is p=0.02 (=2%) or less. When the specified number p is 2%, and the number M of image display pixels is 80000, the specified number t=Mp=80000×2(%)=1600. In order to select 1600 lightnesses Y in descending order of lightness, i=63 is set at step S1, and the initial value of the frequency L is set to L=L(63) (step S41).

At step S42, t=1600 and L=L(63) are compared with each other, and if the frequency L(63) is larger, the procedure proceeds to step S45, and the threshold lightness is made Yα=63. If t=1600≧L=L(63), 1 is subtracted from i=63 at step S43 to make i=62, and L=L(63)+L(62) is calculated at step S44. The procedure again returns to the step S42, t=1600 and the calculated L are compared with each other, and if the frequency L is larger than t, the procedure proceeds to the step S45, and the threshold lightness is made Yα=62. If t=1600≧L, L=L(63)+L(62)+L(61) . . . is repeated to obtain Yα. In this routine, although the lightness L is sequentially added like L(63)+L(62)+L(61), it is needless to say that a judgment may be sequentially made as to, for example, whether 1600−L(63) is 0 or higher, and whether 1600−L(63)−L(62) is 0 or higher.

When the threshold lightness Yα is obtained by the procedure shown in FIG. 14, next, a control value of illumination is determined. For example, it is assumed that the display is a 64-gradation display, γ (gamma) correction or the like is carried out, and the characteristics of gradation and brightness are determined. FIG. 15 shows a duty ratio selection lookup table used for selection of a duty ratio of a light source. In the table shown in FIG. 15, the duty ratio (%) is determined to correspond to the value of the threshold lightness Yα obtained by the procedure shown in FIG. 14.

Although the duty ratio may be obtained by calculation, in the case where a calculation expression is complicated, it is simpler to prepare the table as shown in FIG. 15. The duty ratio selection lookup table is stored in a not-shown memory in the display data conversion circuit 20. The display data conversion circuit 20 selects the specified duty ratio data from the table on the basis of the threshold lightness Yα, and outputs it to the light source control part 22. The light source control part 22 controls the light source power supply circuits 35 to 38 on the basis of the inputted duty ratio data, and drives the cold cathode fluorescent lamps 30 to 33 at the specified duty ratio.

FIG. 16 shows a signal control value selection lookup table to determine control values when the processed gradation data are outputted to the plural data bus lines 8, which are made to correspond to the threshold lightness Yα. In the table, the uppermost row indicates the threshold lightness Yα in descending order from the left to the right, and the leftmost column indicates the original gradation in descending order. For example, in the case where the display brightness is 360 cd at the threshold lightness Yα=60 and 400 cd at the maximum threshold lightness Yα=63, the original gradation data is processed so that at the lightness Y=63 to 60, the light transmissivity in the liquid crystal layer becomes 100%. Besides, the original gradation data is processed so that at the lightness Y≦59, the light transmissivity of the liquid crystal layer becomes 400/360=10/9 times as high as the original light transmissivity. That is, the light transmissivity is converted to such light transmissivity that the display output brightness Ii of the lightness Yi not higher than the lightness Yα becomes (I+Iα) times as high. When the control values are made the table as shown in FIG. 16 and are stored in a memory, an arithmetic processing performed at all times can be omitted.

Besides, the duty ratio is determined by the lighting of a light-emitting part in accordance with the ratio of the output display brightness Iα of the threshold lightness Yα with respect to the maximum display output brightness I (=maximum light transmissivity×maximum illumination quantity).

By combining the structure and the procedure shown in FIGS. 11 to 16, the calculation of the lightness Y and the creation of the histogram L are performed while the gradation data (image data) of the one frame is read into a memory, and after all gradation data is read, the number M of image display pixels is calculated, the specific value t=Mp is calculated while the number p is made p=2%, and the threshold lightness Yα can be obtained. The duty ratio is selected by use of the table shown in FIG. 15 and is outputted to the light source control part 22, and in synchronization with this, gradation data processed in accordance with the table shown in FIG. 16 are outputted to the respective data bus lines 8.

Figure 17:
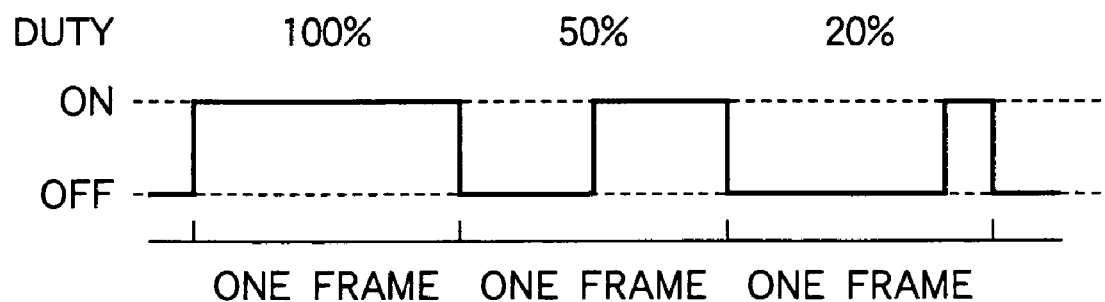
FIG. 17 is a view showing an example of duty driving in the illumination device according to the third embodiment of the invention and the liquid crystal display device using the same.

FIG. 17 shows an example of duty driving. The horizontal direction indicates time, and the vertical direction indicates lighting (On) and non-lighting (Off) of the light sources 30 to 33. From the left to the right, the drawing shows a duty ratio of 100% (lighting in the whole frame), a duty ratio of 50% (lighting in the latter 50% of the frame), and a duty ratio of 20% (lighting in 20% before the last of the frame).

As a specific example, a display device was fabricated in which a circuit as described above was constructed into an FPGA, a display area was 17 inch wide, a sidelight type backlight (fluorescent lamp was disposed above and below a display) or a direct type 8-lamp backlight was used, and display brightness was a brightness of 200 to 800 nit. A motion picture was reproduced using a commercially available DVD, the display device of this embodiment and a conventional normal display device were disposed side by side, and a comparison between motion picture images was made. As a result, it was confirmed that an image comparable to a conventional display could be obtained also in the display device of this embodiment. Besides, when the duty ratio of the backlighting of the conventional illumination device was made 100%, it was found that the average of the duty ratio of the display device of this embodiment was 50%, and an effect of power saving in the backlight could be obtained.

Besides, when the value of p (>2%) is made further large, if the pixels of the lightness Y exceeding the threshold lightness Yα are discrete, the influence on the picture quality is small, however, when the pixels are concentrated, there is a case where it is judged that the picture quality is degraded. Besides, especially in the case where the pixels are concentrated at the center of the screen, even if p is the same, there is a case where it is judged that the picture quality is degraded, and accordingly, it is needless to say that the collective/discrete state of pixels is extracted as data and may be used for preventing the picture quality degradation. In this case, the M pixels are divided into several partitions, and the numbers of elements in the respective partitions are made M1 to Ms, and the above procedure is used in each the elements of M1 to Ms.

Incidentally, a frame memory or the like did not exist in the control circuit 16, and even if the operation of this embodiment was applied with a delay of one frame (1/60 sec) while the image data was directly sent as the display data, in the motion picture by the commercially available DVD or the like, there did not occur a trouble that the image was seen to be odd or dark.

Besides, when the lightness Y was 0 to 255 (256 gradations), although the illumination control values and the signal control values should have been made the lookup table with respect to the threshold lightness Yα=0 to 255, the control values were simplified to 0 to 64, and the respective control values were converted into 0 when the threshold lightness Yα=0; 1 when the threshold lightness Yα=1 to 4;

2 when the threshold lightness Yα=5 to 8; . . . ; 64 when the threshold lightness Yα=253 to 255, and a display was carried out and the motion picture was observed, and as a result, an excellent result was obtained on the whole.

Figure 18:
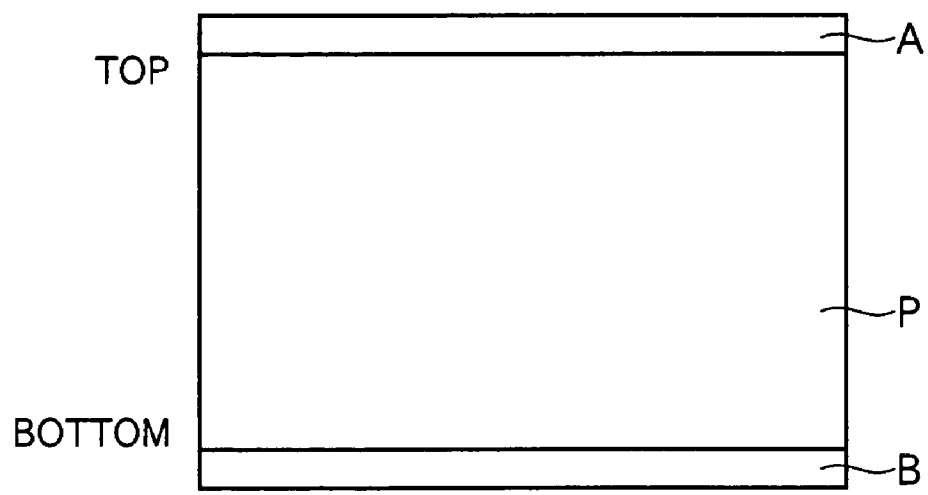
FIG. 18 is a view showing an example in which a sidelight type backlight unit as the illumination device according to the third embodiment of the invention is disposed in an LCD panel.
Figure 19:
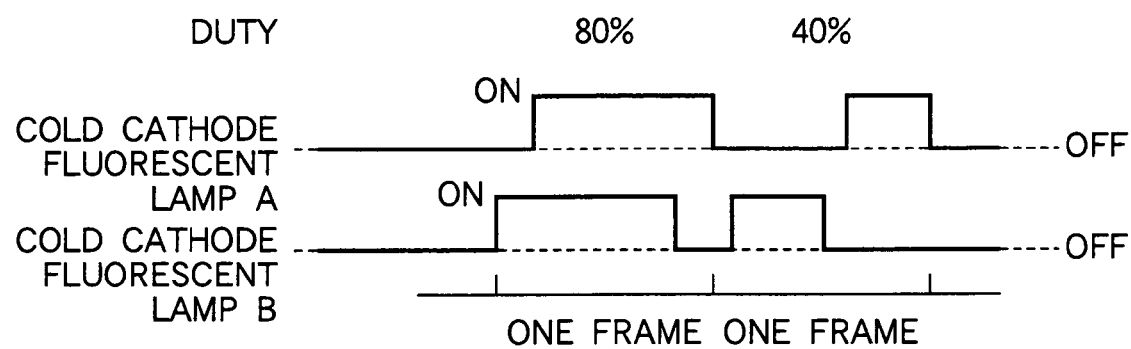
FIG. 19 is a view showing an example in which cold cathode fluorescent lamps A and B of the sidelight type backlight unit as the illumination device according to the third embodiment of the invention are duty driven.

FIGS. 18 to 27 show specific examples. FIG. 18 shows an example in which a sidelight type backlight unit is disposed in an LCD panel. Cold cathode fluorescent lamps A and B are disposed at an upper part and a lower part of a display area P. FIG. 19 shows an example in which the cold cathode fluorescent lamps A and B shown in FIG. 18 are duty driven. The horizontal direction indicates time, and the vertical direction indicates lighting (On) and non-lighting (Off) of the cold cathode fluorescent lamps A and B. From the left to the right in the drawing, although the duty ratio is 80% in both the cold cathode fluorescent lamps A and B in the first frame, the cold cathode fluorescent lamp A is turned on in 80% of the latter half of the frame, and the cold cathode fluorescent lamp B is turned on in 80% of the former half of the frame. In a next frame, although the duty ratio is 40% in both the cold cathode fluorescent lamps A and B, the cold cathode fluorescent lamp A is turned on in 40% of the latter half of the frame, and the cold cathode fluorescent lamp B is turned on in 40% of the former half of the frame.

Figure 20:
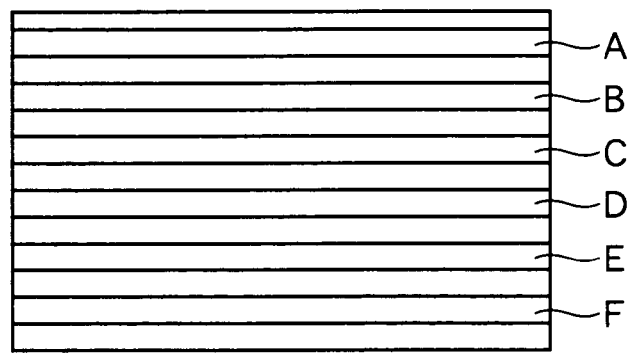
FIG. 20 is a view showing, as the illumination device according to the third embodiment of the invention, a scan type backlight unit in which cold cathode fluorescent lamps A to F are disposed at the rear surface of a panel display surface.
Figure 21:
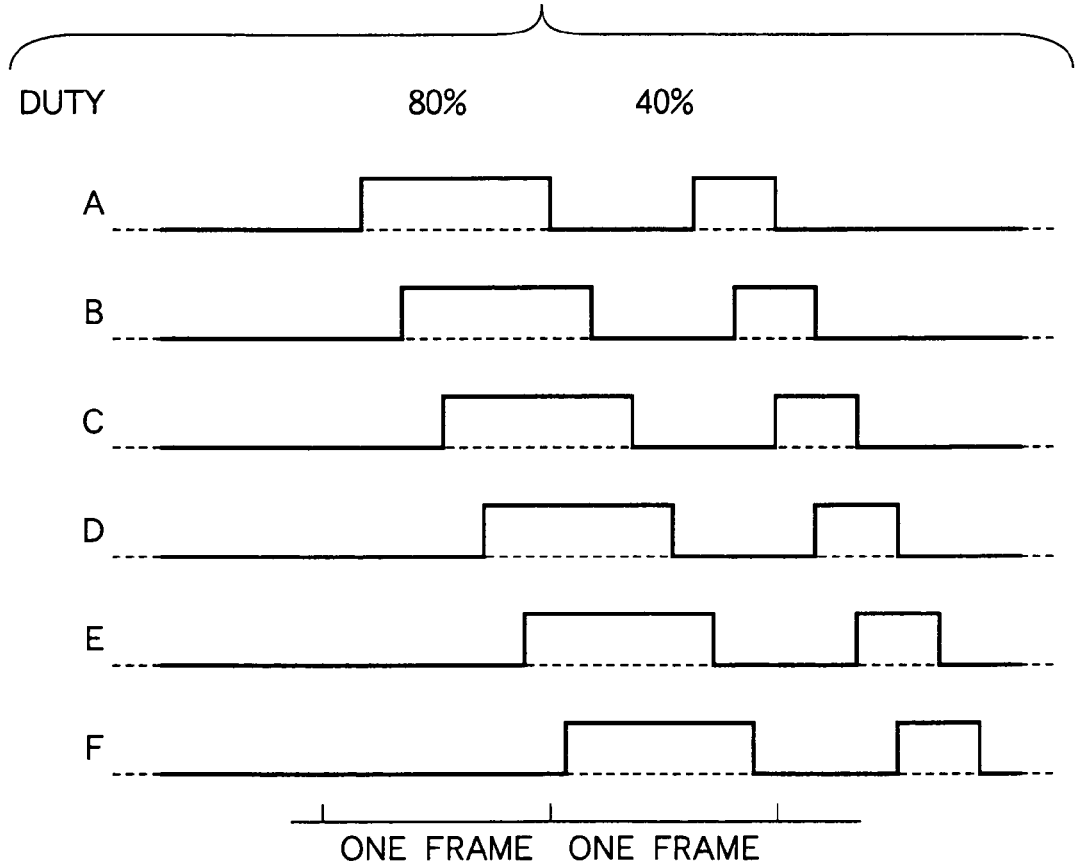
FIG. 21 is a view showing an example in which the cold cathode fluorescent lamps A to F of the illumination device according to the third embodiment of the invention are duty driven.

FIG. 20 shows a scan type backlight unit in which cold cathode fluorescent lamps A to F are disposed at the rear surface of a panel display surface. FIG. 21 shows an example in which the cold cathode fluorescent lamps A to F are duty driven. The horizontal direction indicates time, and the vertical direction indicates lighting (On) and non-lighting (Off) of the cold cathode fluorescent lamps A to F. From the left to the right in the drawing, the duty ratio becomes 40% from 80% in all of the cold cathode fluorescent lamps A to F. At this time, the lighting start points (or non-lighting points) of the cold cathode fluorescent lamps A to F are sequentially shifted by a specified time, and a scan state is formed.

Figure 22:
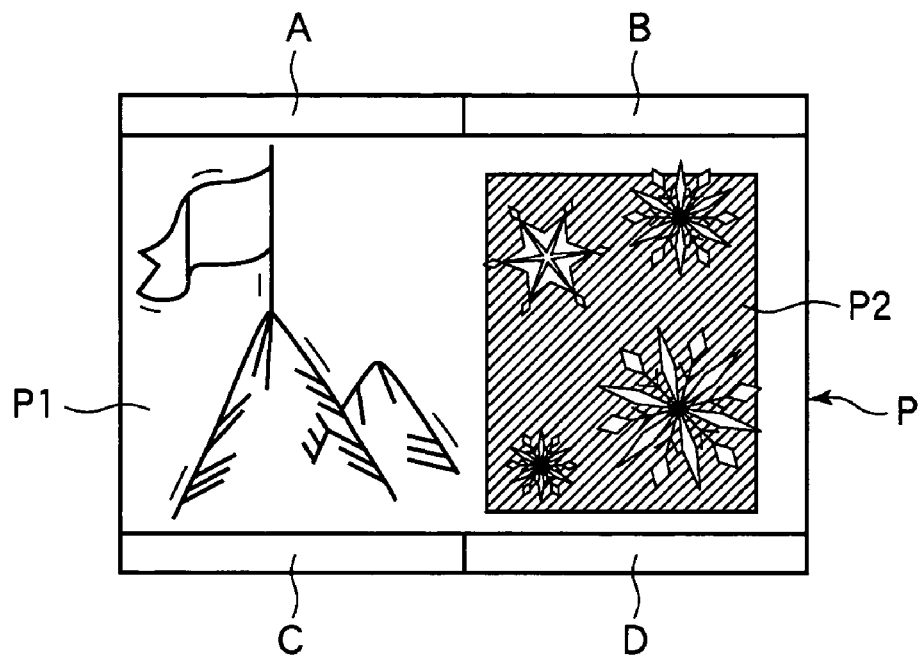
FIG. 22 is a view showing an example in which the sidelight type backlight unit of the illumination device according to the third embodiment of the invention is disposed in an LCD panel.
Figure 23:
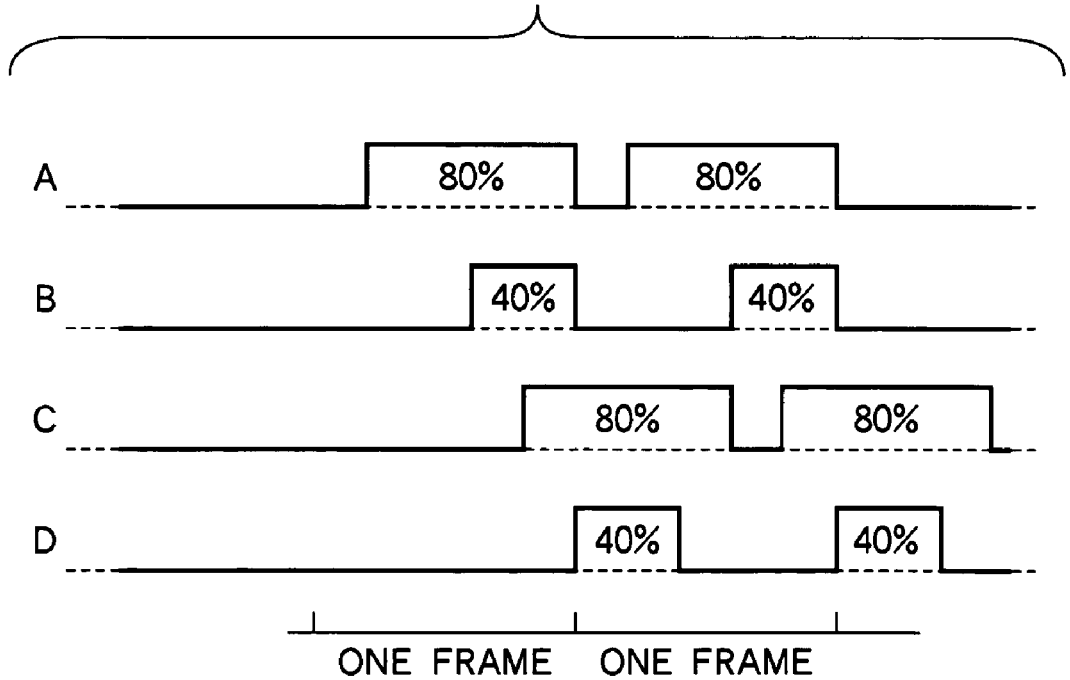
FIG. 23 is a view showing an example in which the cold cathode fluorescent lamps A to D of the sidelight type backlight unit of the illumination device according to the third embodiment of the invention are duty driven.

FIG. 22 shows an example in which a sidelight type backlight unit is disposed in an LCD panel. Cold cathode fluorescent lamps A and B are disposed on the right and the left with respect to the upper center of a display area P, and cold cathode fluorescent lamps C and D are disposed on the right and the left with respect to the lower center of the display area P. An image P1 is displayed on the left with respect to the center of the display area P, and an image P2 is displayed on the right. FIG. 23 shows an example in which the cold cathode fluorescent lamps A to D shown in FIG. 22 are duty driven.

Figure 24:
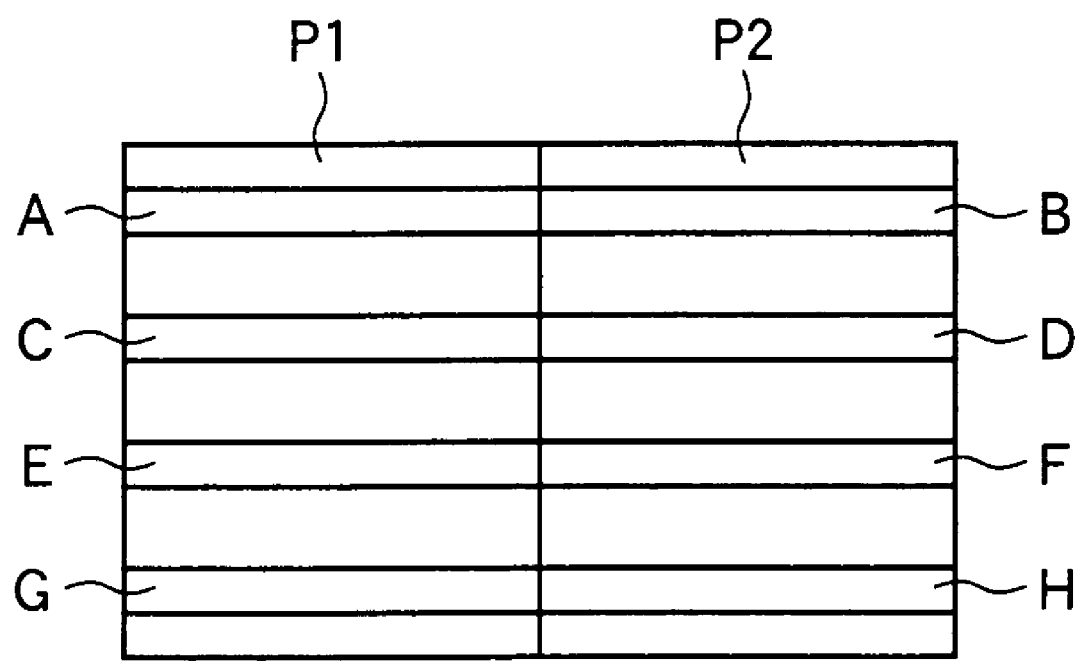
FIG. 24 is a view showing an example in which a direct type backlight unit of the illumination device according to the third embodiment of the invention is disposed in an LCD panel.
Figure 25:
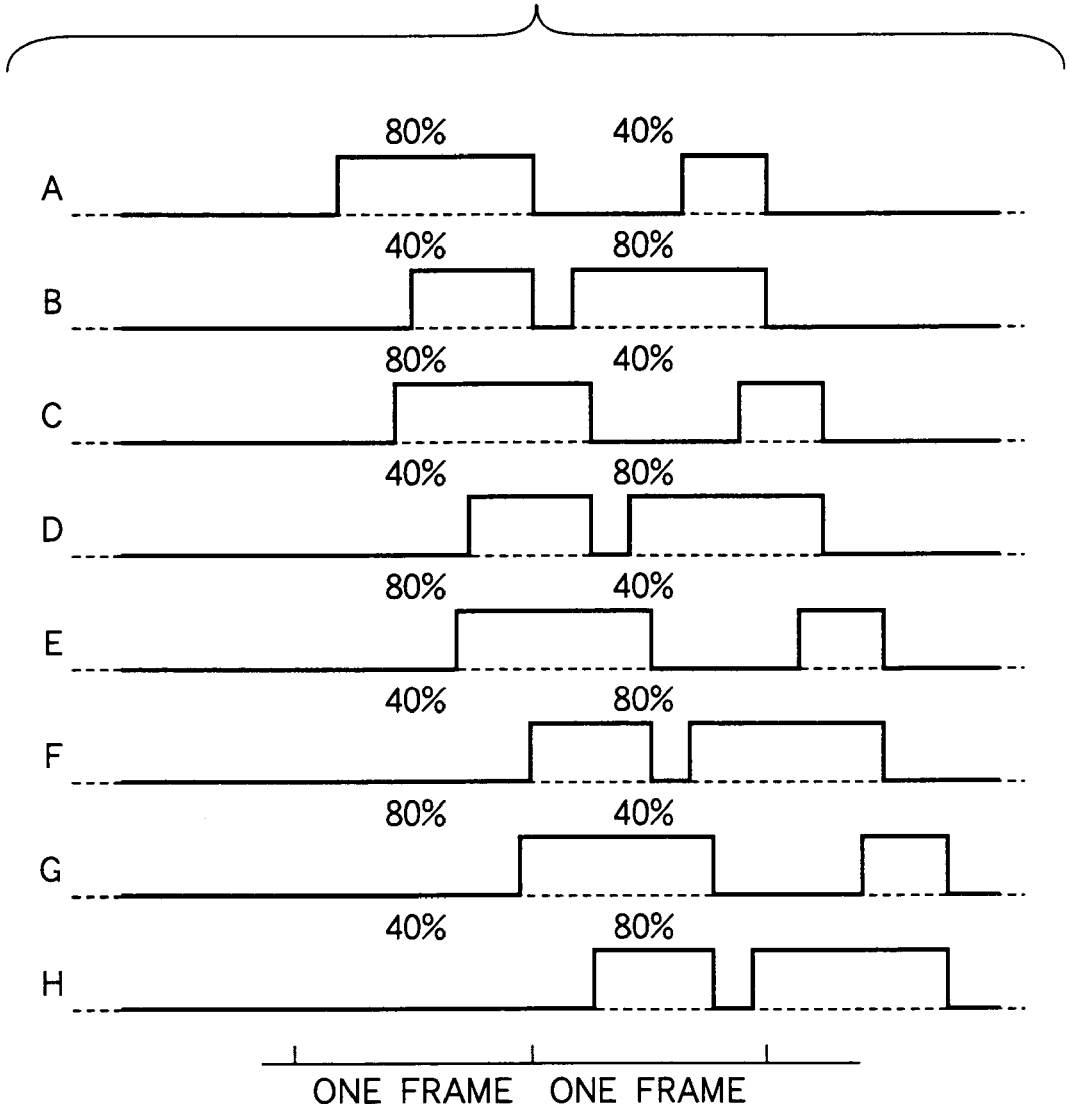
FIG. 25 is a view showing an example in which cold cathode fluorescent lamps A to H of the direct type backlight unit of the illumination device according to the third embodiment of the invention are duty driven.

FIG. 24 shows an example in which a direct type backlight unit is disposed in an LCD panel. Cold cathode fluorescent lamps A, C, E and G are disposed on the left with respect to the center of a display area P, and cold cathode fluorescent lamps B, D, F and H are disposed on the right with respect to the center of the display area P. An image P1 is displayed on the left with respect to the center of the display area P, and an image P2 is displayed on the right. FIG. 25 shows an example in which the cold cathode fluorescent lamps A to H shown in FIG. 24 are duty driven.

Figure 26:
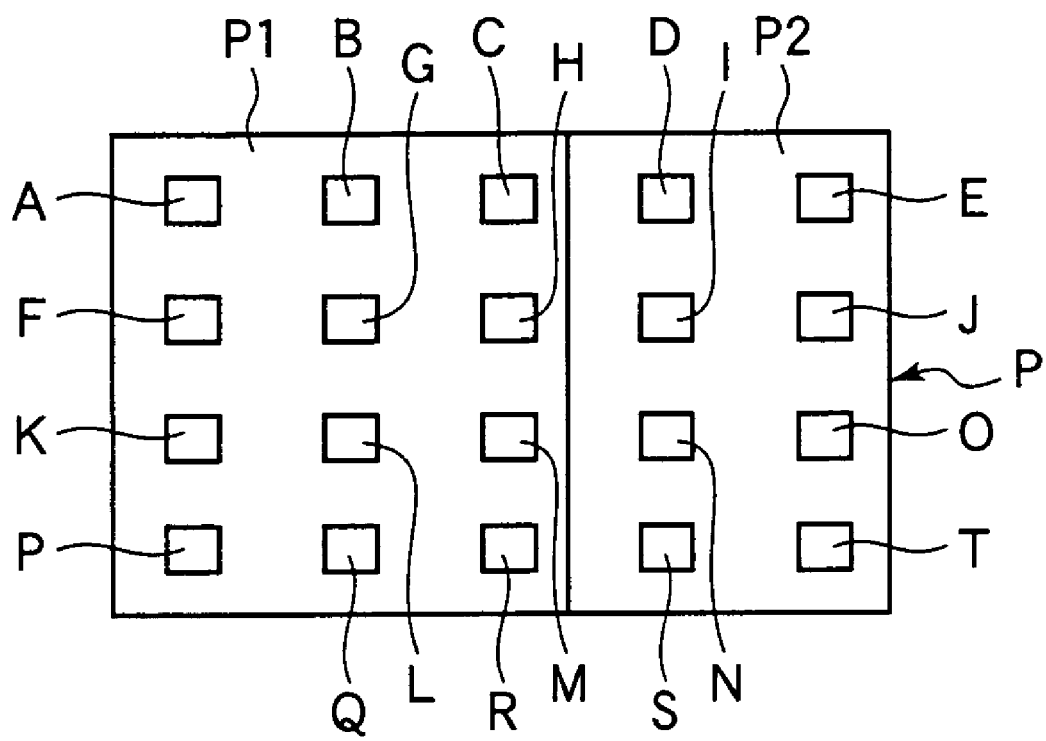
FIG. 26 is a view showing an example in which the direct type backlight unit of the illumination device according to the third embodiment of the invention is disposed in an LCD panel.
Figure 27:
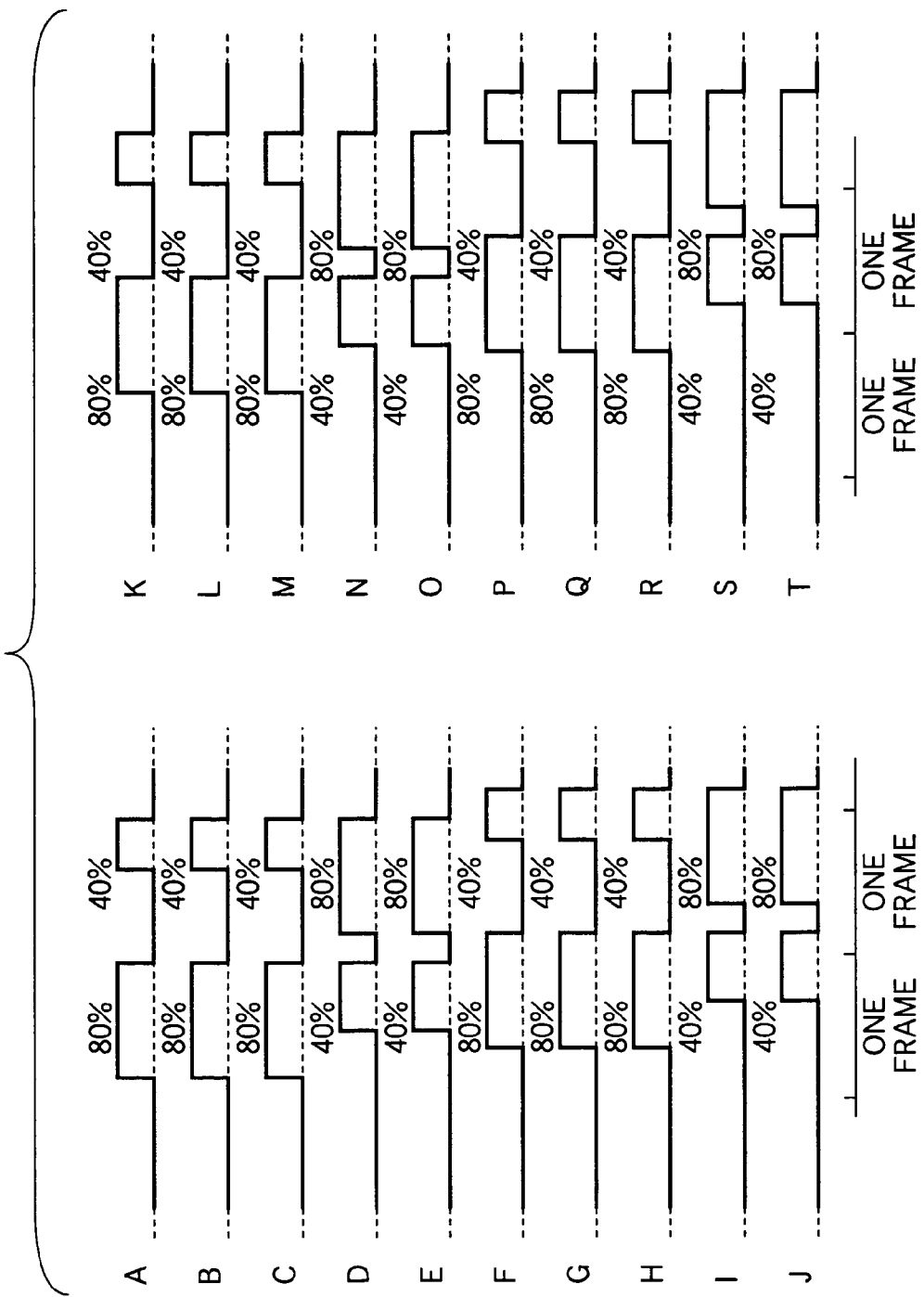
FIG. 27 is a view showing an example in which LEDs A to T of the direct type backlight unit of the illumination device according to the third embodiment of the invention are duty driven.

FIG. 26 shows an example in which a direct type backlight unit is disposed in an LCD panel. LEDs A to C, H to J, K to M and P to R are disposed in a matrix form on the ⅔ portion of the display area P at the left with respect to the center thereof, and LEDs D, E, I, J, N, O, S and T are disposed in a matrix form on the ⅓ portion of the display area P at the right with respect to the center thereof. An image P1 is displayed on the ⅔ portion of the display area P at the left with respect to the center thereof, and an image P2 is displayed on the ⅓ portion at the right. FIG. 27 shows an example in which the LEDs A to T shown in FIG. 26 are duty driven.

In an arbitrary display area of the display device shown in the above specific examples, as the emission time of the backlight becomes short, a blur of a motion picture image intrinsic to the liquid crystal display device can be improved.

In the above examples, although the average of the duty ratio of the backlight is 50%, when an image becomes clear in total, the duty ratio approaches 100%. When the duty ratio approaches 100%, the effect of improving the blur of the motion picture image becomes low. Then, as described in the first and the second embodiments, two kinds of lighting states, that is, the whole lighting state and the intermediate lighting state are provided in one frame, and the intermediate brightness as the display brightness at the time of the intermediate lighting is set to 50% of the whole lighting brightness as the display brightness at the time of the whole lighting.

Figure 28:
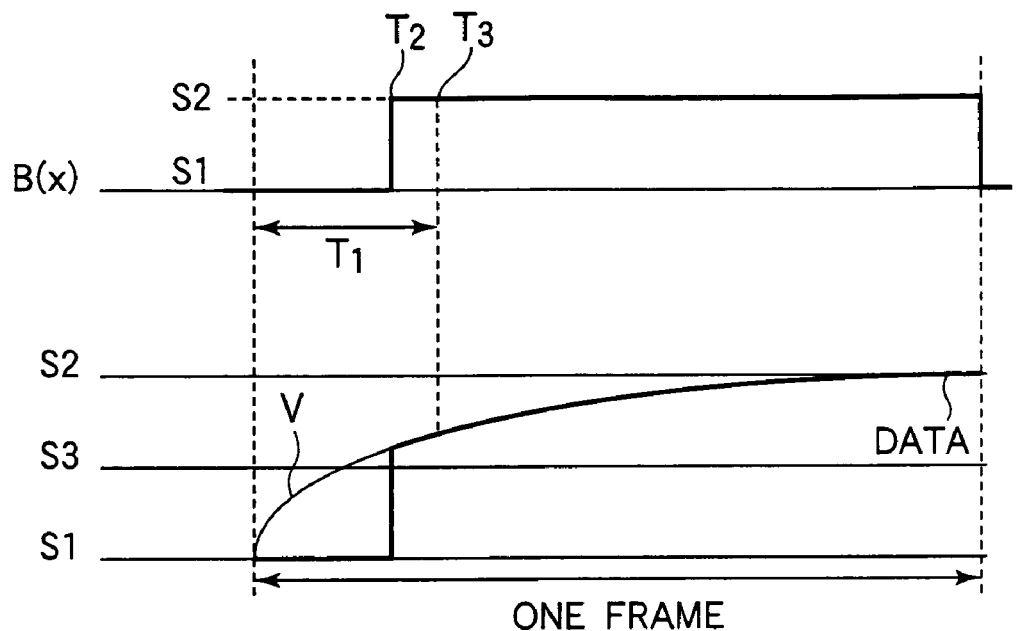

For example, in the display device including the scan type backlight shown in FIG. 1 in which one frame is divided into four areas in sequence from the above, and duty driving is performed in the respective areas, it is assumed that as shown in FIG. 28, the duty ratio is 80%, the first 20% of the one frame period is put in the non-lighting state, and the remaining 80% of the period is put in the whole lighting state. In this case, in a period between a point T2 of the first 20% (first area) of the one frame period and a point T3 of 25%, in spite of the fact that the gradation data is in the middle (indicated by V in the drawing) of a writing period T1 to a pixel, the backlight is changed at the point T2 from the non-lighting state S1 to the maximum lighting state S2. Besides, the backlight is turned off at the time of high transmissivity before next gradation data is written. In the one frame period, since the area of 20%, in total, of the four areas is in the lighting state when the gradation data is written, and are in the non-lighting state immediately before the next gradation data is written, the light quantity is felt to be lower than that in the remaining area of 80%, and the display quality is degraded.

Figure 29:
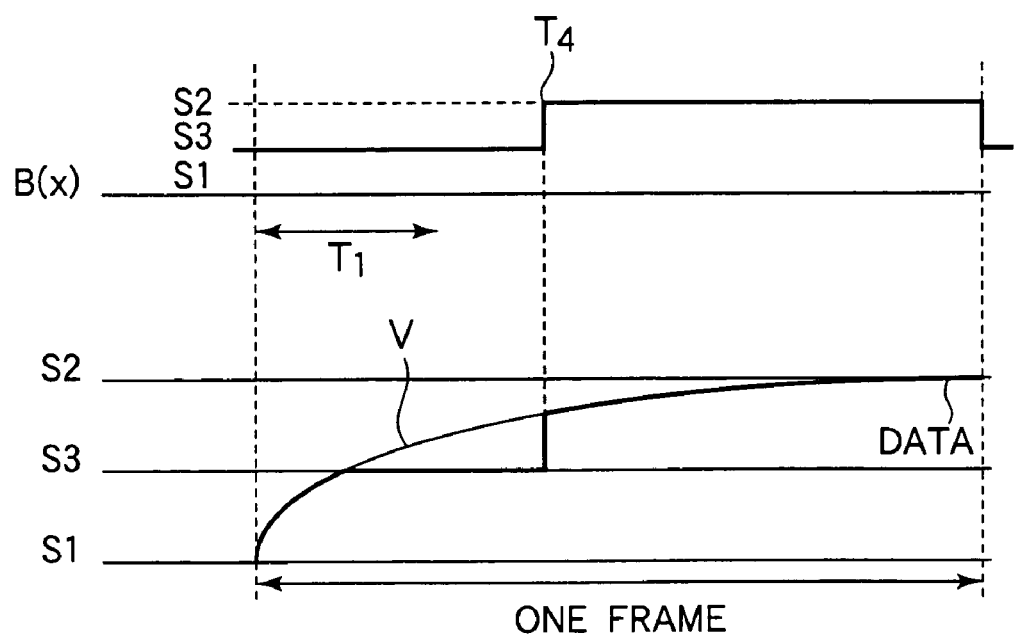
FIG. 29 is a view showing a duty driving method for solving a problem of the backlight of FIG. 28 by using the illumination device according to the third embodiment of the invention.

FIG. 29 shows a duty driving method for solving the above conventional problem. As shown in FIG. 29, in the first 40% of one frame period, the backlight is put in the intermediate lighting state S3 (gradation data is written into a pixel in the time T1 of the first 25% of the one frame period). Next, the backlight is put in the maximum lighting state in the remaining 60%. By doing so, the display brightness visually sensed does not change, and illumination is performed by the whole lighting at the point when the liquid crystal almost completes the response, and therefore, a desired image is branded on the eye. Accordingly, the motion picture blur of the image does not occur all over the display area and the excellent display quality is obtained.

As described above, according to this embodiment, pixels having a specified ratio and selected in descending order of brightness in a motion image are made to have the maximum display brightness, and the respective brightnesses of the remaining pixels except for those are reproduced by lowering the duty ratio of the backlight and raising the transmissivity of the liquid crystal. By this, even if the duty ratio of the backlight is lowered, it is possible to make the motion picture display quality equivalent to the original image, and power saving of the backlight becomes possible. Besides, by the combination with a scan type backlight or a blinking type backlight, it is possible to realize a higher quality liquid crystal display device in which the image blur is improved while the display quality of the motion picture image is kept.

Incidentally, although this embodiment is applied to the liquid crystal display device, it can also be used for emission control of an EL (Electro Luminescence) element.

Fourth Embodiment

An illumination device according to a fourth embodiment of the invention and a liquid crystal display device using the same will be described with reference to FIGS. 30 to 51. According to duty driving, in synchronization with a writing timing of gradation data, the brightness of a light source of an illumination device which performs plane emission is directly modulated, however, the degree of modulation is conventionally very high, and it has been considered that the degree is required to make, for example, a brightness ratio of 20 or higher. However, as described in the first embodiment, even if the duty driving in which the light source is completely turned on or off is not used, the display quality of the motion picture is not degraded. The present inventor et al. have found that when the brightness ratio is 2 or higher, a sufficient display can be obtained. By performing new duty driving described below in accordance with this finding, the display can be made to have high brightness without damaging the display quality of the motion picture, luminescence efficiency (electric power ratio) of the cold cathode fluorescent lamp can be made high, and the electric power can be reduced. Further, the lifetime of the light source can be prolonged, and the power source can be made small, light and thin.

EXAMPLE 4-1

Figure 30:
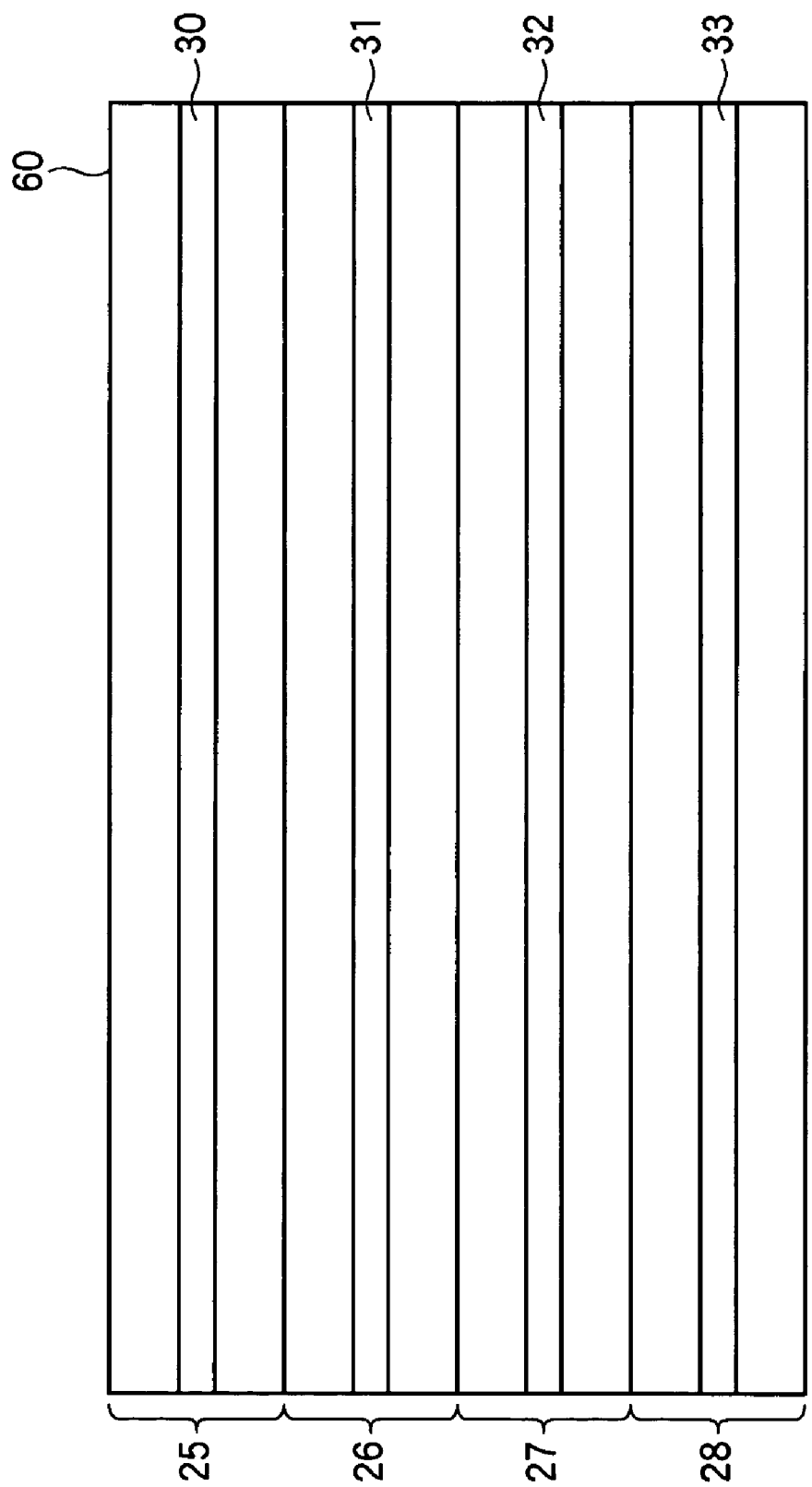
FIG. 30 is a view showing a backlight structure according to example 1 of a fourth embodiment of the invention.
Figure 31:
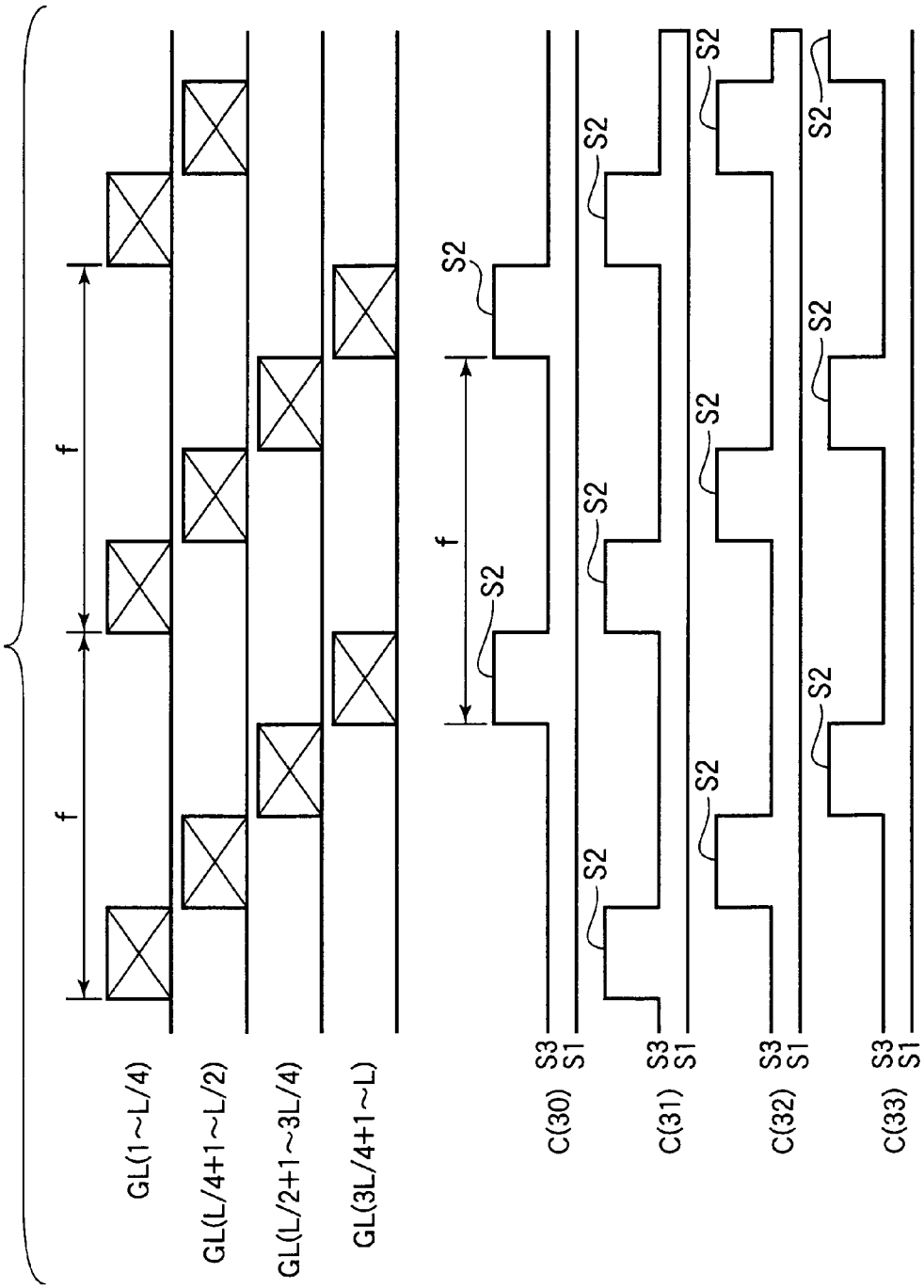
FIG. 31 is a view showing driving waveforms of a backlight according to the example 1 of the fourth embodiment of the invention.

FIG. 30 shows a backlight structure of example 1 of this embodiment. In this example, a TFT-LCD 1 of the first embodiment shown in FIG. 1 is used, and FIG. 30 shows a state in which an illumination device 24 is seen from the side of light emission openings of a first to a fourth light-emitting areas. At the side of the light emission openings, a diffusion sheet 60 or the like described in the second embodiment is also disposed. The backlight is of the direct type. Other than that, this illumination device is the similar as the illumination device 24 shown in FIG. 1. FIG. 31 shows driving waveforms of the backlight of the example 1. FIG. 31 is substantially the same as FIG. 2, and is identical in that it shows output timings of gate pulses GP outputted to gate bus lines 6 from a gate driver 12, however, there is a difference in that FIG. 2 shows the light emission brightnesses B(25) to B(28), while FIG. 31 shows currents C(30) to C(33) fed to cold cathode fluorescent lamps 30 to 33 of the respective light-emitting areas 25 to 28.

As shown in FIG. 31, the currents to be fed to the respective cold cathode fluorescent lamps 30 to 33 are duty driven so that gradation data is written into a specified pixel, the liquid crystal sufficiently responds and the transmissivity becomes high, and then, illumination is performed in the maximum lighting state S2. Although the current states (or electric power states) of the respective cold cathode fluorescent lamps 30 to 33 have the maximum current (or maximum electric power) when illumination is performed at the maximum light quantity, a current is fed (or electric power is supplied) at the other time as well, and the intermediate lighting state S3 is kept. In this duty driving, the above current state (or electric power state) is repeated at the same cycle as the writing cycle of display data. As stated above, this example has a feature that even when the maximum current (or maximum electric power) is not fed, a current is fed (or electric power is supplied).

In the duty driving, whether a human being senses a motion picture blur of a motion picture display or a tailing phenomenon greatly depends on a maximum value of illumination light quantity in the maximum irradiation state S2 and a time length. Even if the intermediate lighting state S3 of about one half of the maximum value is made to occur between the maximum lighting states S2 repeated at a specified frequency, the quality of the motion picture display is not changed.

Thus, according to this embodiment, since the brightness can be made high while an increase in electric power is suppressed, it is not necessary to enlarge a stabilizer of the cold cathode fluorescent lamp, and the stabilizer is made light and thin, and can be manufactured at low cost. Further, since a rise in drive voltage due to an increase in current in the related art can also be suppressed, a drop in current-to-light conversion efficiency of the cold cathode fluorescent lamp is suppressed, and the tube lifetime can be made long. As stated above, as compared with the conventional system in which illumination is performed in the maximum lighting state S2 only for a specified time, and illumination is not performed for a time other than that, according to this embodiment, the quality of the motion picture display is equivalent, and it is possible to raise the brightness, to reduce the electric power, to reduce the weight, thickness and size of the device, and to prolong the lifetime.

EXAMPLE 4-2

Figure 32:
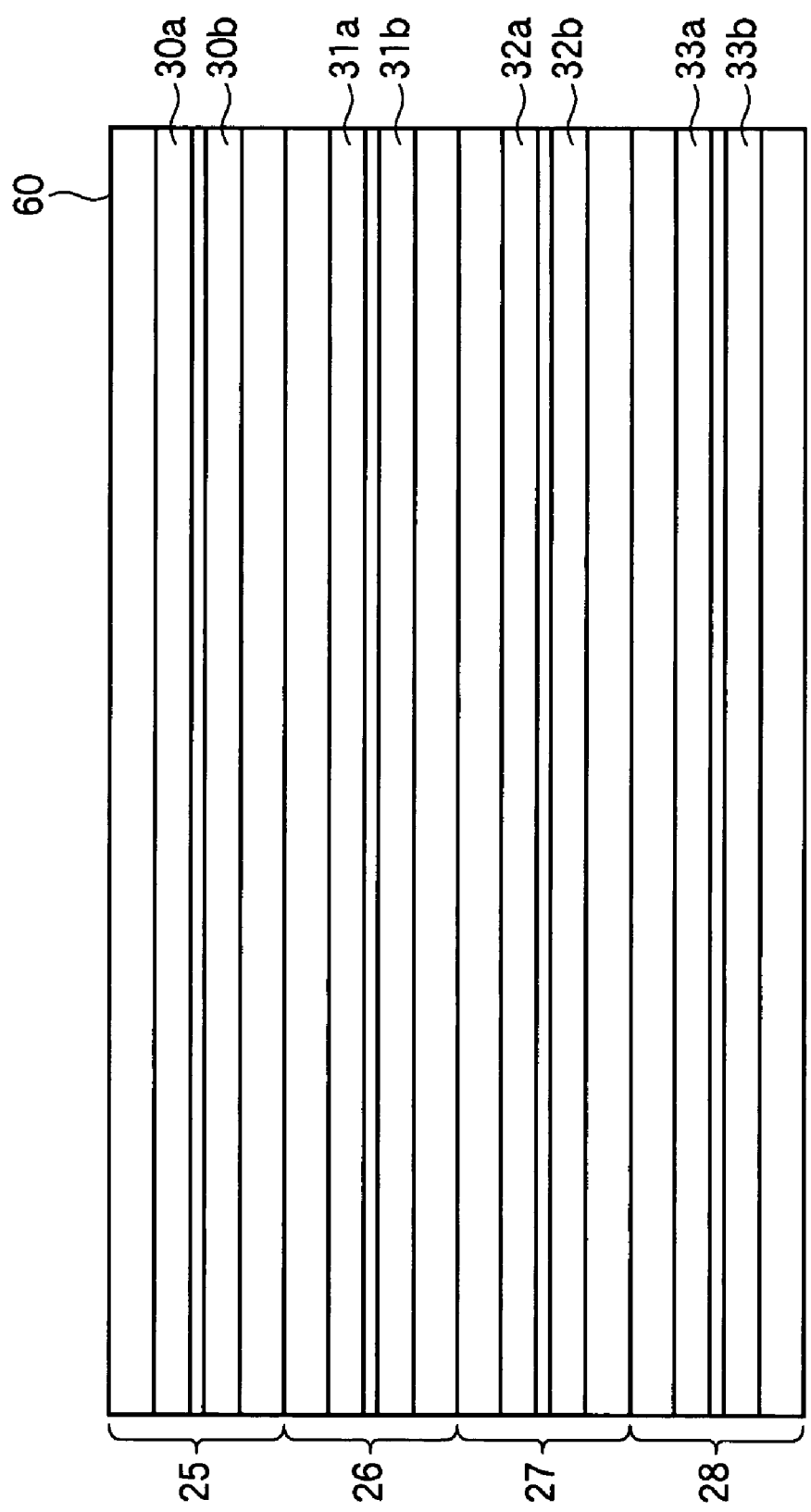
FIG. 32 is a view showing a backlight structure according to example 2 of the fourth embodiment of the invention.

FIG. 32 shows a backlight structure of example 2 of this embodiment. In this example, a TFT-LCD 1 similar to the example 1 is used, and FIG. 32 shows a state viewed in the same direction as FIG. 30 of the example 1. The backlight is of the direct type. Two cold cathode fluorescent lamps (30*a*, 30*b*), (31*a*, 31*b*), (32*a*, 32*b*) and (33*a*, 33*b*) are disposed in the respective light-emitting areas 25 to 28.

Figure 33:
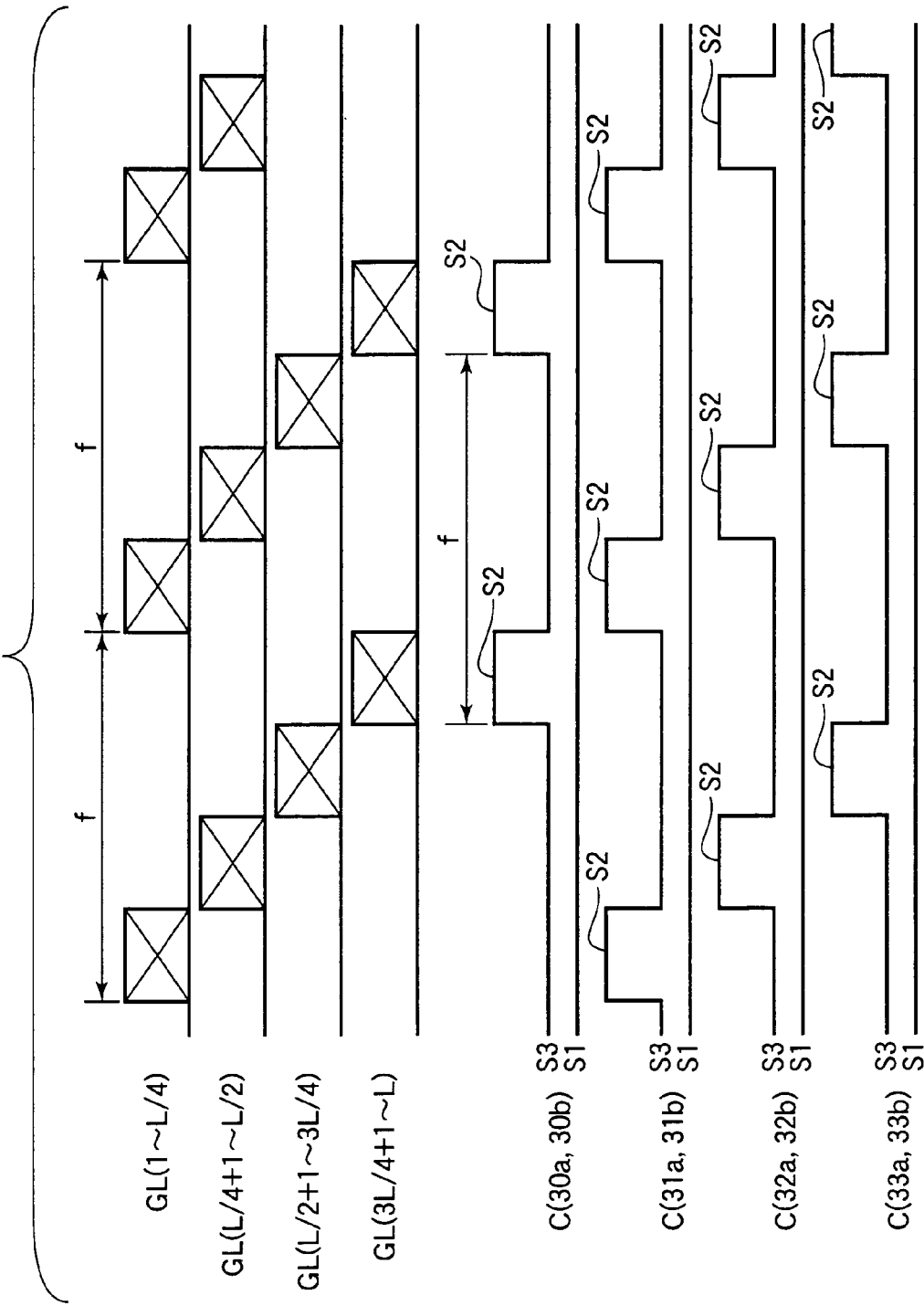
FIG. 33 is a view showing driving waveforms of a backlight according to the example 2 of the fourth embodiment of the invention.

FIG. 33 shows drive waveforms of the backlight of the example 2. Although the respective waveforms of FIG. 33 are substantially the same as those of FIG. 31 of the example 1, in this example, since each of the light-emitting areas 25 to 28 is illuminated by the pair of cold cathode fluorescent lamps, there is a merit that the respective current waveforms shown in FIG. 33 can be realized by the combination of the two cold cathode fluorescent lamps.

Figure 34:
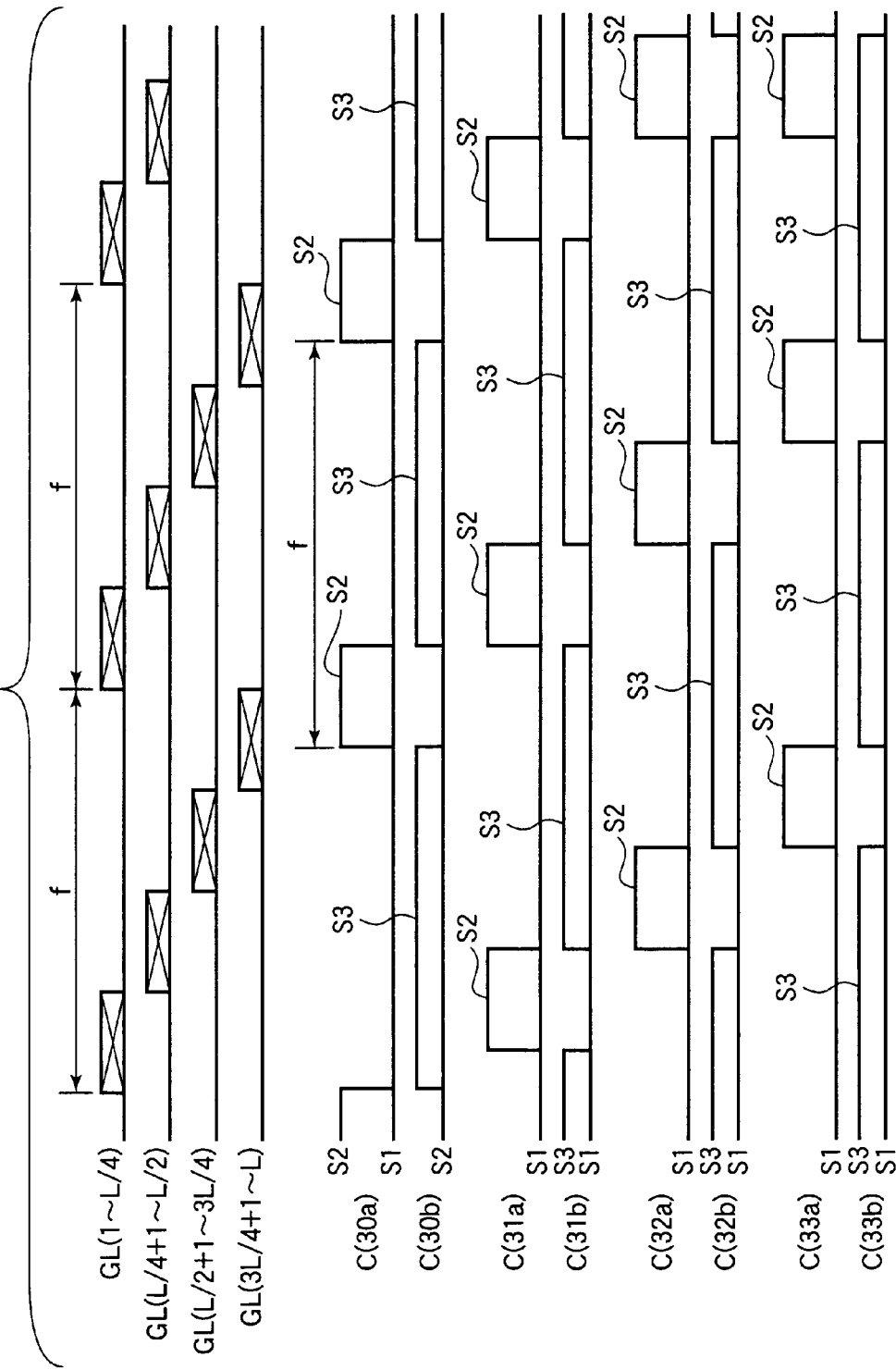
FIG. 34 is a view showing a specific timing chart of the backlight according to the example 2 of the fourth embodiment of the invention.
Figure 35:
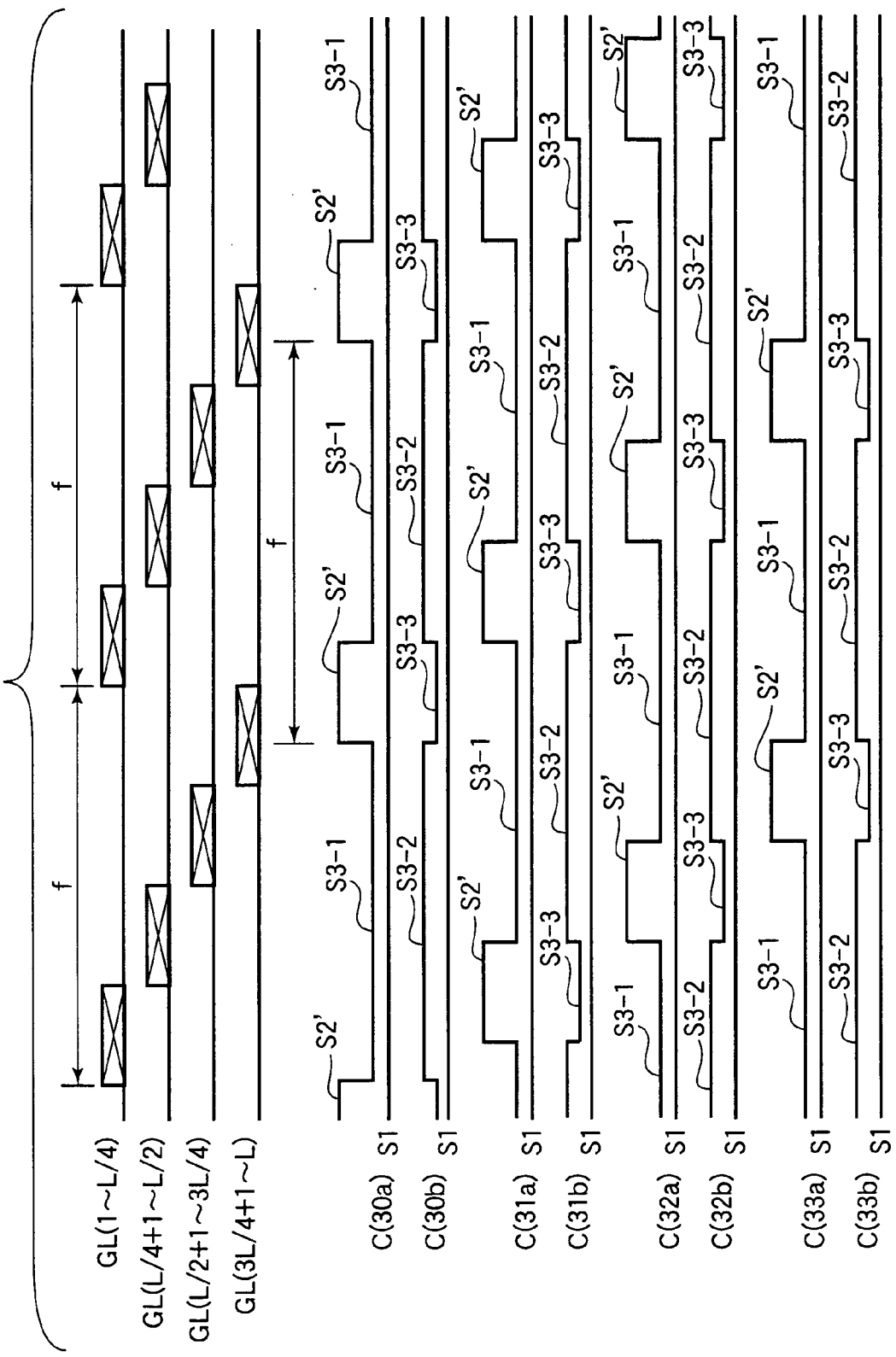
FIG. 35 is a view showing a specific timing chart of the backlight according to the example 2 of the fourth embodiment of the invention.
Figure 36:
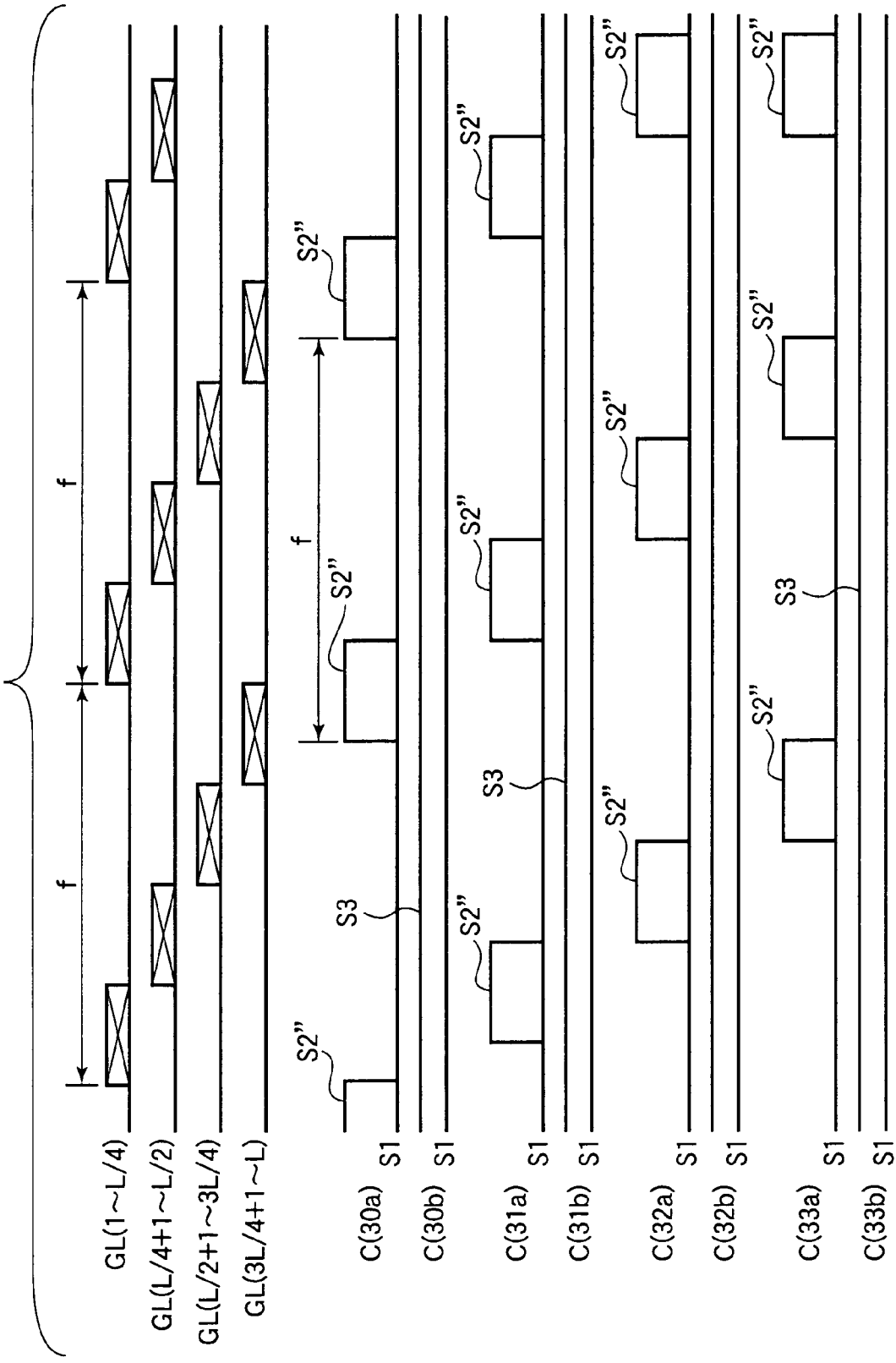
FIG. 36 is a view showing a specific timing chart of the backlight according to the example 2 of the fourth embodiment of the invention.

A description will be given more specifically with reference to FIGS. 34 to 36. FIGS. 34 to 36 show timing charts similar to FIG. 33. In a case shown in FIG. 34, illumination driving is performed by supplying such current to the cold cathode fluorescent lamps 30*a*, 31*a*, 32*a* and 33*a* of the respective light-emitting areas that the maximum lighting state S2 occurs at a specified cycle, and the non-lighting state S1 occurs at the other time. Besides, illumination driving is performed by supplying such current to the cold cathode fluorescent lamps 30*b*, 31*b*, 32*b* and 33*b* of the light-emitting areas that the non-lighting state S1 occurs in the maximum lighting state S2 of the paired cold cathode fluorescent lamps 30*a*, 31*a*, 32*a* and 33*a*, and the intermediate lighting state S2 occurs at the other time. By this, it is possible to perform illumination with the brightness equal to the brightness obtained by the illumination driving current waveforms shown in FIG. 33.

In a case of FIG. 35, the cold cathode fluorescent lamps 30*a*, 31*a*, 32*a* and 33*a* of the light-emitting areas are respectively driven by such low current that an intermediate lighting state S2' lower than the maximum lighting state S2 occurs at a specified cycle, and at the other time, the lamps are driven by such low current that an intermediate lighting state S3-1 lower than the intermediate lighting state S3 shown in FIG. 33 occurs. The respective cold cathode fluorescent lamps 30b, 31b, 32b and 33b of the light-emitting areas are driven by such low current that a differential intermediate lighting state S3-3 occurs at the intermediate lighting state S2' of the respective paired cold cathode fluorescent lamps 30a, 31a, 32a and 33a so that the total becomes the maximum lighting state S2, and are driven by such low current that a differential intermediate lighting state S3-2 occurs at the intermediate lighting state S3-1 of the respective cold cathode fluorescent lamps 30a, 31a, 32a and 33a so that the total becomes the intermediate lighting state S3. By this, it is possible to perform illumination with the brightness equal to the brightness obtained by the illumination driving current waveforms shown in FIG. 33.

In a case shown in FIG. 36, the cold cathode fluorescent lamps 30a, 31a, 32a and 33a of the respective light-emitting areas are driven by such low current that an intermediate lighting state S2" lower than the maximum lighting state S2 occurs at a specified cycle, and the current supply is interrupted at the other time so that the non-lighting state S1 occurs. The cold cathode fluorescent lamps 30b, 31b, 32b and 33b of the respective light-emitting areas are continuously driven by such low current that a differential intermediate lighting state S3 occurs at the intermediate lighting state S2" of the respective paired cold cathode fluorescent lamps 30a, 31a, 32a and 33a so that the total becomes the maximum lighting state S2. By this, it is possible to perform illumination with the brightness equal to the brightness obtained by the illumination driving current waveforms shown in FIG. 33.

As stated above, by controlling the current fed to the pair of the cold cathode fluorescent lamps of the respective light-emitting areas 25 to 28, the illumination state shown in FIG. 33 can be obtained. By performing the duty driving shown in this example, the brightness can be raised while the increase in electric power is suppressed, and accordingly, it is not necessary to enlarge the stabilizer of the cold cathode fluorescent lamp, and the stabilizer can be made light and thin, and can be manufactured at low cost. Further, since the rise in drive voltage due to the increase in current as in the related art can also be suppressed, the drop in the current-to-light conversion efficiency of the cold cathode fluorescent lamp is suppressed and the tube lifetime can be made long. As stated above, according to this embodiment, the quality of the motion picture display is the same, and it is possible to raise the brightness, to reduce the electric power, to reduce the weight, thickness and size of the device, and to prolong the lifetime.

EXAMPLE 4-3

Figure 37:
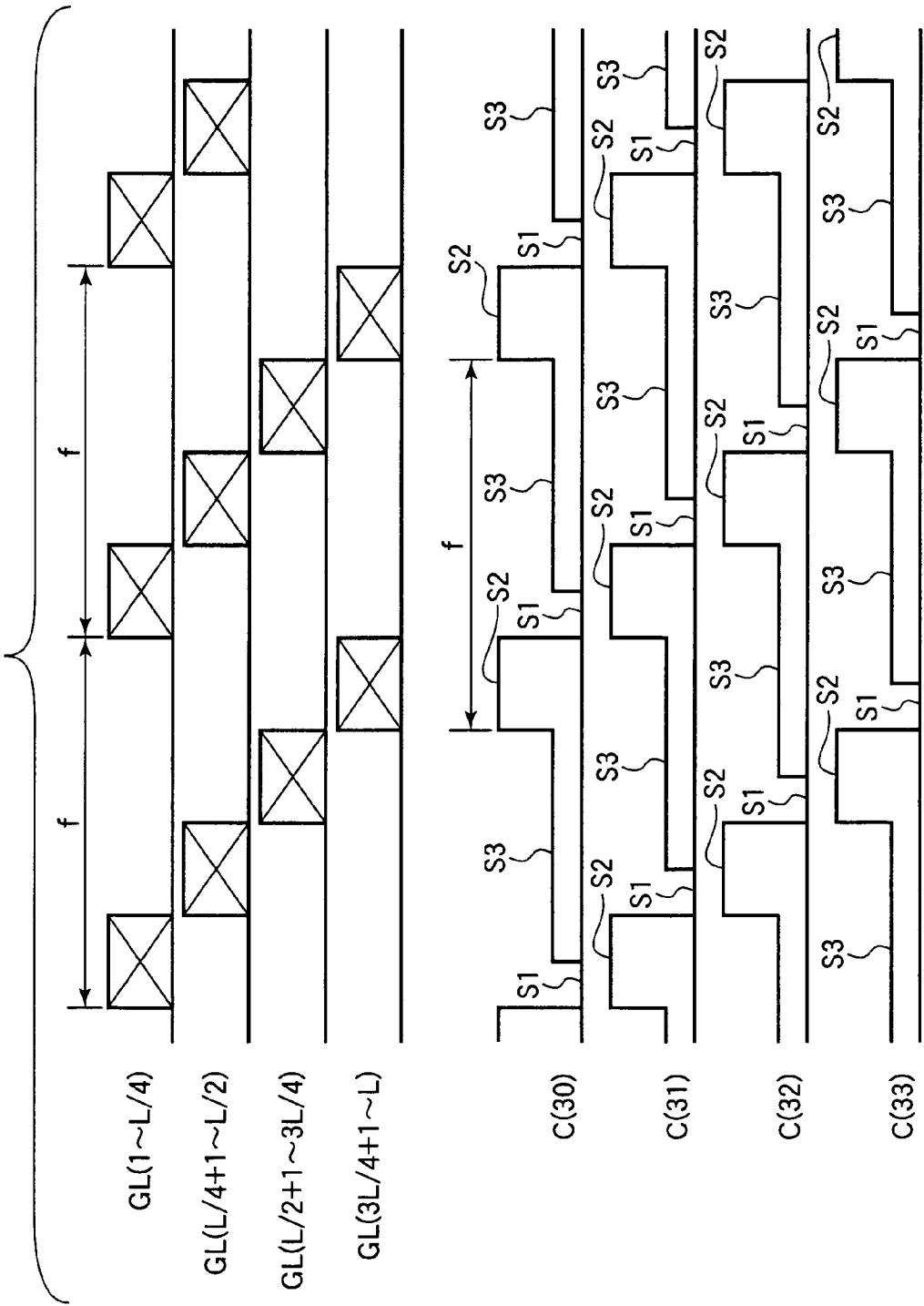
FIG. 37 is a view showing a specific timing chart of a backlight according to example 3 of the fourth embodiment of the invention.

An example 3 will be described with reference to FIGS. 37 and 38. FIG. 37 shows drive waveforms of backlights similarly to FIG. 31 of the example 1. The backlight structure of this example is the same as that of the example 1 shown in FIG. 30. In a case shown in FIG. 37, the cold cathode fluorescent lamps 30, 31, 32 and 33 of the respective light-emitting areas are driven by such current that the maximum lighting state S2 occurs at a specified cycle, and at the other time, they are driven by such low current (50% of the current value of the maximum lighting state S2) that the intermediate lighting state S3 occurs, and further, a period in which the current supply is stopped is provided so that when the maximum lighting state S2 is changed to the intermediate lighting state S3, the non-lighting state S1 occurs only for a specified time.

Figure 38:
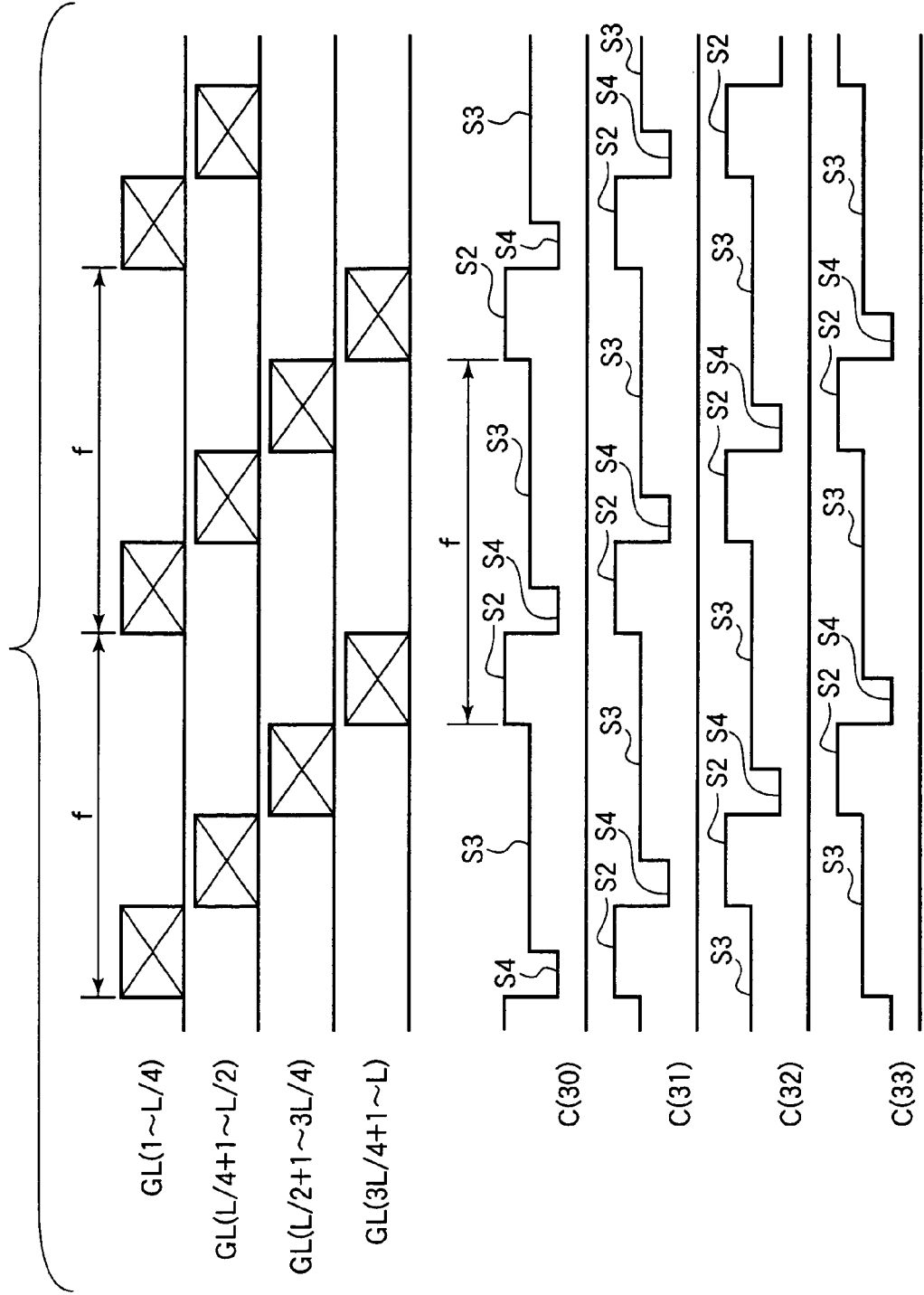
FIG. 38 is a view showing a specific timing chart of the backlight according to the example 3 of the fourth embodiment of the invention.

In the case shown in FIG. 38, the cold cathode fluorescent lamps 30, 31, 32 and 33 of the respective light-emitting areas are driven by such current that the maximum lighting state S2 occurs at a specified cycle, and at the other time, they are driven by such low current (50% of the current value of the maximum lighting state S2) that the intermediate lighting state S3 occurs, and when the maximum lighting state S2 is changed to the intermediate lighting state S3, there is provided a period in which low current (20% of the current value of the maximum lighting state S2) is supplied such that an intermediate lighting state S4 clearer than the non-lighting state S1 and darker than the intermediate lighting state S3 occurs only for a specified time.

As shown in FIGS. 37 and 38, the current value (or electric power or light quantity value) is instantaneously and largely reduced immediately after the state of the maximum current value (or maximum electric power or maximum light quantity value), so that the image is instantaneously visually recognized and disappears immediately thereafter, and an impulse effect felt by a human being can be made great.

Figure 39:
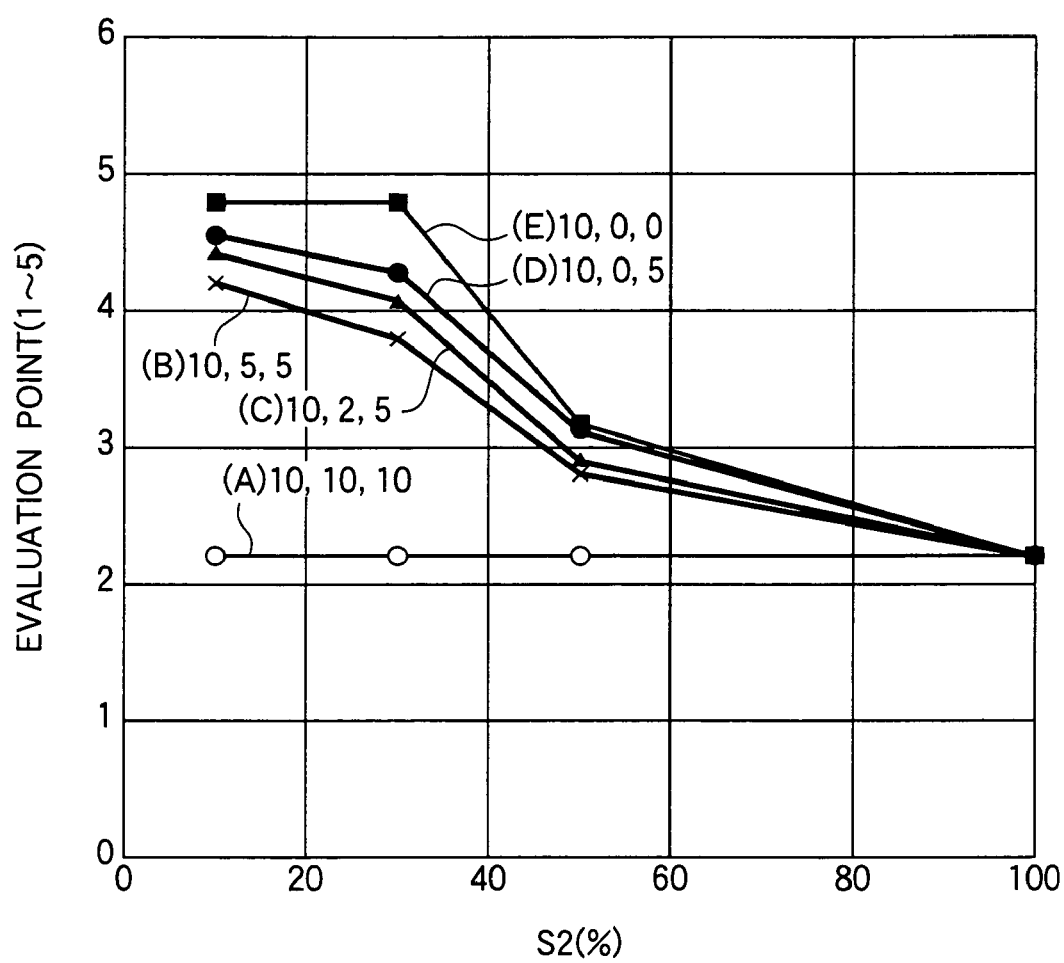
FIG. 39 is view showing, as subjective evaluations by plural observers, display quality when motion pictures are displayed on a display area of a TFT-LCD 1, while a current value (relative value) in a maximum lighting state S2 is made 10 and intermediate lighting states S3 and S4 of FIG. 38 are changed in the backlight according to the example 3 of the fourth embodiment of the invention.

FIG. 39 shows a graph in which the current value (relative value) at the maximum lighting state S2 is made 10, the intermediate lighting states S3 and S4 in FIG. 38 are changed, and the display quality obtained at the time when a motion picture display is carried out on the display area of the TFT-LCD 1 is graphed as subjective evaluations by plural observers.

In FIG. 39, the horizontal axis indicates the ratio (%) of the maximum lighting state S2 to one frame period f, and the vertical axis indicates the evaluation according to evaluation points of from first to fifth stages. The evaluation point 1 indicates a case where a motion picture blur, a tailing phenomenon and the like on the motion picture display are "very obstructive", and the evaluation point 2 indicates a case where those becomes "obstructive". The evaluation point 3 indicates a case where the motion picture blur is "annoying but tolerable", the evaluation 4 indicates a case where "a difference is seen but is tolerable", and the evaluation point 5 indicates a case where "picture quality is equivalent to a still picture and is excellent".

In the drawing, a straight line (A) connecting circular marks indicates a case of (current value of the maximum lighting state S2, current value of the intermediate lighting state S4, current value of the intermediate lighting state S3)=(10, 10, 10). In this case, irrespective of the ratio of the maximum lighting state S2 to the one frame period f (hereinafter abbreviated to "ratio of the maximum lighting state S2"), illumination is performed with the maximum brightness level in the whole area of the one frame period f. That is, the display is equivalent to the hold type driving, and accordingly, the image quality is such that the motion picture blur and the tailing phenomenon becomes very obstructive, and the evaluation point becomes 1.

In the drawing, a polygonal line (B) connecting x marks indicates a case of (current value of the maximum lighting state S2, current value of the intermediate lighting state S4, current value of the intermediate lighting state S3)=(10, 5, 5). In this case, when the ratio of the maximum lighting state S2 is in the range of from about 10% to 30%, the motion picture blur and the tailing phenomenon are hardly visually recognized, and the excellent image quality is obtained, so that the evaluation point is 4. Besides, when the ratio of the maximum lighting state S2 exceeds 30%, the evaluation is gradually lowered, however, the evaluation point 3 is obtained up to about 50%.

A polygonal line (C) indicates a case of (current value of the maximum lighting state S2, current value of the intermediate lighting state S4, current value of the intermediate lighting state S3)=(10, 2, 5). In this case, when the ratio of the maximum lighting state S2 is within the range of from about 10% to 30%, the motion picture blur and the tailing phenomenon are hardly visually recognized, and the excellent image quality is obtained, so that the evaluation point is close to 5. Besides, when the ratio of the maximum lighting state S2 exceeds 30%, the evaluation is gradually lowered, however, the evaluation point 3 is obtained up to about 50%.

In the drawing, a polygonal line (D) connecting black circular marks indicates a case of (current value of the maximum lighting state S2, current value of the intermediate lighting state S4, current value of the intermediate lighting state S3)=(10, 0, 5). In this case, when the ratio of the maximum lighting state S2 is within the range of from about 10% to 30%, the motion picture blur and the tailing phenomenon are hardly visually recognized, and the excellent image quality is obtained, so that the evaluation point is close to 5. Besides, when the ratio of the maximum lighting state S2 exceeds 30%, the evaluation is gradually lowered, however, the evaluation point 3 or higher is obtained up to about 50%.

In the drawing, a polygonal line (E) connecting square marks indicates a case of (current value of the maximum lighting state S2, current value of the intermediate lighting state S4, current value of the intermediate lighting state S3)=(10, 0, 0). This is the same as the illumination method of the conventional scan type LCD. In this case, when the ratio of the maximum lighting state S2 is within the range of from about 10% to 30%, the motion picture blur and the tailing phenomenon are hardly visually recognized, and the excellent image quality is obtained, so that the evaluation point becomes further close to 5. Besides, when the ratio of the maximum lighting state S2 exceeds 30%, the evaluation is gradually lowered, however, the evaluation point 3 or higher is obtained up to about 50%.

From FIG. 39, it is understood that even if the intermediate lighting state S3 is made the brightness level of about 30% of the brightness level of the maximum lighting state S2, it is possible to obtain the display quality comparable to the conventional scan type LCD indicated by the polygonal line (E). Further, the brightness level of the intermediate lighting state S3 up to about 50% of the brightness level of the maximum lighting state S2 can be regarded as being in the allowable range.

Besides, when the illumination time of the maximum lighting state S2 is 30% or less of the one frame time f, the motion picture blur and the tailing phenomenon hardly occur, and the time up to 50% can be regarded as being in the allowable range.

FIG. 40 shows characteristics of a cold cathode fluorescent lamp, the horizontal axis indicates current fed to the cold cathode fluorescent lamp, and the vertical axis indicates a duty ratio. In the drawing, two thick solid lines indicate contour lines of supplied electric power, one of them indicates a case of an electric power of 1.0, and the other indicate a case of an electric power of 0.6. The other nine thin solid lines indicate contour lines of brightness when the brightness from a brightness of 20 to a brightness of 100 is divided at intervals of ten. From FIG. 40, it is understood that as the value of the current fed to the cold cathode fluorescent lamp becomes large, the current-to-light conversion efficiency of the cold cathode fluorescent lamp is lowered, and there is a remarkable tendency that the lifetime becomes short. Besides, with respect to a stabilizer for driving the cold cathode fluorescent lamp, when the value of the current to be fed becomes large, it becomes necessary to enlarge a transformer and the like, so that the stabilizer becomes heavy, thick and expensive.

According to this embodiment, it is possible to solve the problem of the current-to-light conversion efficiency of the cold cathode fluorescent lamp and the tube lifetime as shown in FIG. 40. FIGS. 41A and 41B and FIGS. 42A and 42B show effects in the case where the illumination device of this embodiment and the duty driving method thereof are used. The horizontal axis shown in FIGS. 41A and 41B and FIGS. 42A and 42B indicates time, and the vertical axis indicate light quantity.

Figure 41A:
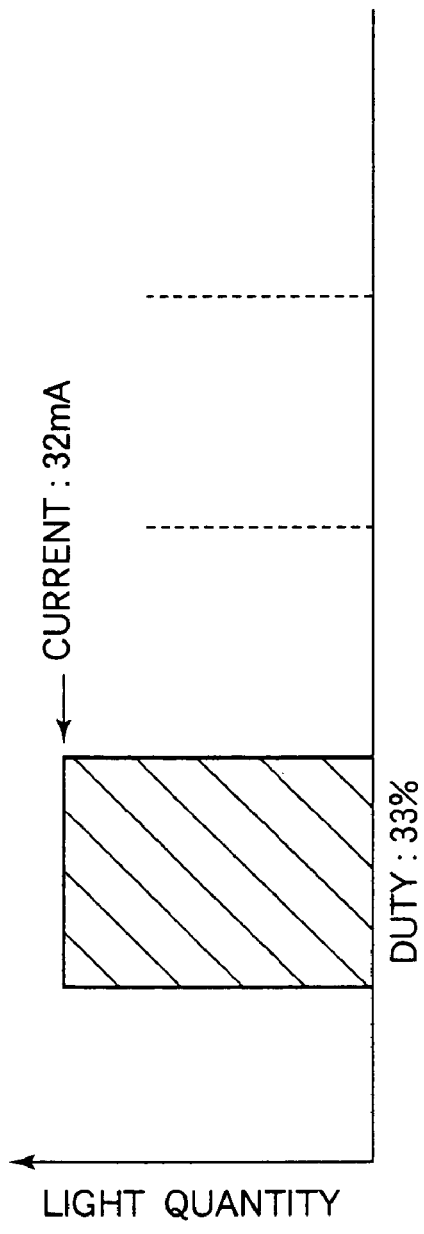
FIGS. 41A and 41B are views showing an effect obtained when an illumination device according to the fourth embodiment of the invention and its duty driving method are used.
Figure 41B:
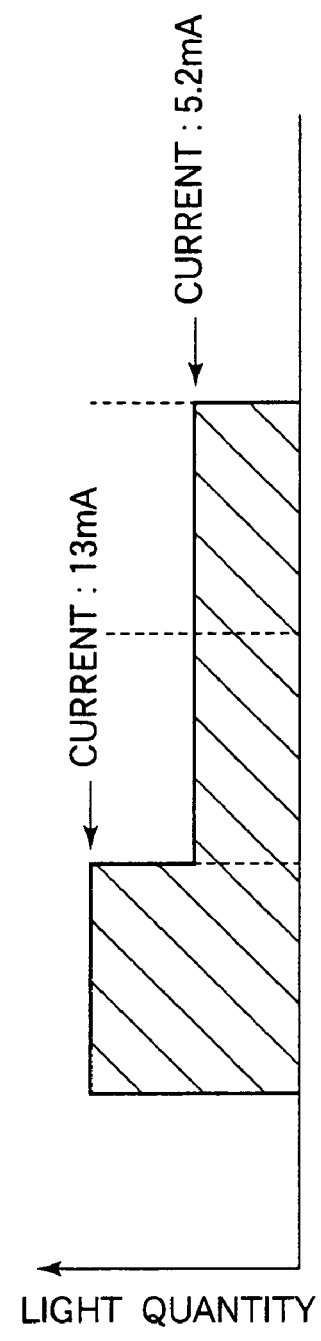

FIG. 41A shows conventional duty driving, and shows light quantity when the electric power is 1.0 (arbitrary unit: hereinafter abbreviated to a.u.) and a current of 32 mA is fed to the cold cathode fluorescent lamp at a duty ratio of 33%, and shows a state in which a (time average) brightness of 1.0 (a.u.) is obtained by this. On the other hand, FIG. 41B shows duty driving according to this embodiment, and shows the light quantity when the electric power is 1.0 (a.u.), a current of 13 mA is fed in the maximum lighting state S2 to the cold cathode fluorescent lamp at a duty ratio of 33%, and a current of 5.2 mA is supplied to the cold cathode fluorescent lamp in the remainder of 67% to produce the intermediate lighting state S3. By this, a brightness of 1.4 (a.u.) is obtained.

As stated above, according to this embodiment, when the electric power is constant, as compared with the related art, the brightness becomes 1.4 times as high, and the current-to-light conversion efficiency also becomes 1.4 times as high. According to this embodiment, a large current value may be 13 mA which is ⅖ of a conventional value. By this, for example, when the electric power is the same, a conventional display device having a display brightness of 300 candela can be made to have a brightness of 420 candela without damaging the motion picture quality. Further, the stabilizer is light, thin, short and small, and can be produced at low cost.

Figure 42A:
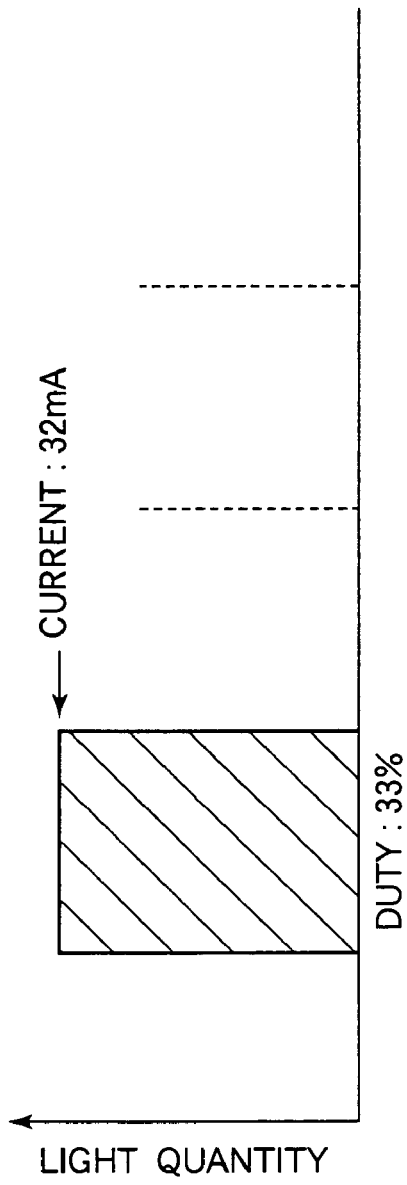
FIGS. 42A and 42B are views showing an effect obtained when the illumination device according to the fourth embodiment of the invention and its duty driving method are used.
Figure 42B:
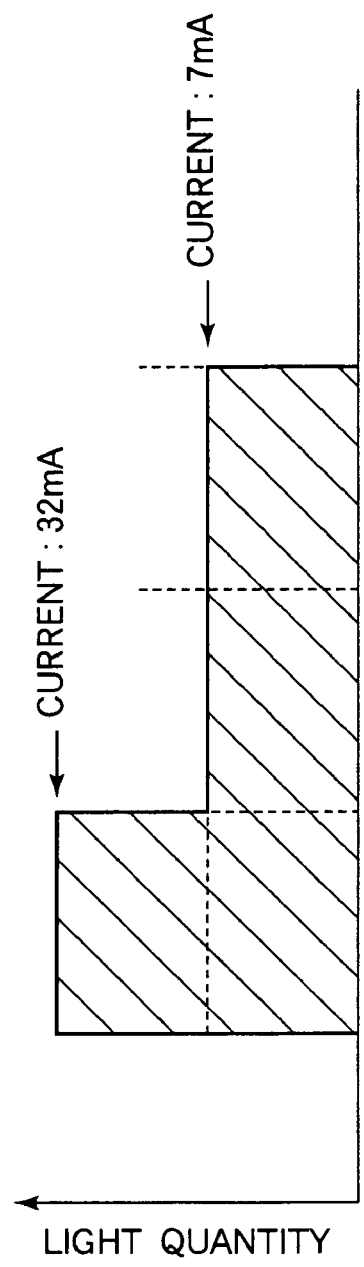

FIG. 42A is the same as FIG. 41A. On the other hand, FIG. 42B indicates duty driving according to this embodiment, and shows light quantity when the electric power is 1.0 (a. u.), a current of 32 mA similar to the conventional case is fed to the cold cathode fluorescent lamp in the maximum lighting state S2 at a duty ratio of 33%, and a current of 7 mA is supplied to the cold cathode fluorescent lamp in the remainder of 67% to produce the intermediate lighting state S3. According to this, the electric power 1.5 times as large as that of the conventional system can be supplied, and the display brightness can be doubled. That is, according to this embodiment, while the same stabilizer is used, a display device having a display brightness of 300 candela in the conventional system can be made to have a brightness of 600 candela without damaging the motion picture quality. Further, the current-to-light conversion efficiency can also be improved by a factor of 1.33.

EXAMPLE 4-4

Figure 43A:
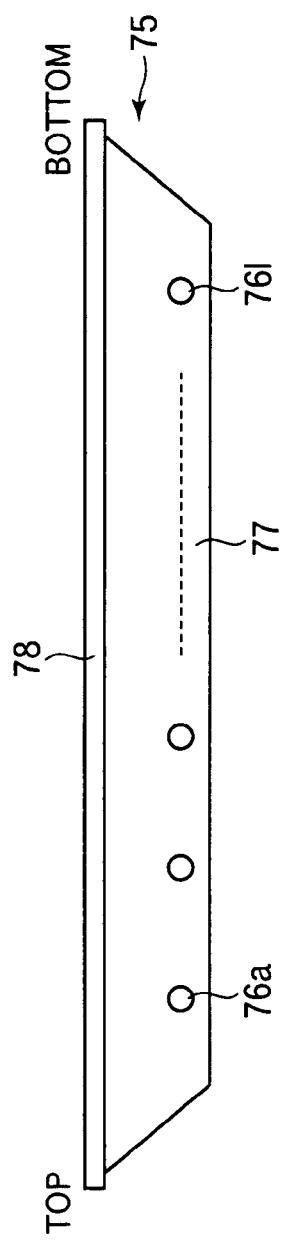
FIGS. 43A and 43B are views for explaining example 4 of the illumination device according to the fourth embodiment of the invention.

An example 4 will be described with reference to FIGS. 43A and 43B. FIG. 43A shows a simple section of a backlight unit 75 of this example. The left side of the drawing corresponds to the upper side of the display area of the LCD panel 2 shown in FIG. 1, and the right side of the drawing corresponds to the lower side of the display area. For example, 12 cold cathode fluorescent lamps 76a to 76l are divided into groups each including four lamps, and are provided in such a way that their tube axes are substantially in parallel to the gate bus lines 6. The cold cathode fluorescent lamps 76a to 76l are contained in thin dish-like housings, and diffuse reflection plates 77 are disposed on the inner walls of the housings. The lights from the cold cathode fluorescent lamps 76a to 76l are emitted to a not-shown LCD panel 2 in FIG. 43A through a diffused plate 78 provided at light emission openings. When this structure is seen as a hold type LCD backlight unit, it is a normal structure. Since scan driving is not performed, partitions do not exist between the respective illumination areas.

In the backlight unit 75 of the structure as stated above, when the light source is duty driven, light overflows into the surrounding area as well, and the effect of suppressing the motion picture blur is sufficiently obtained even if the partition is not provided, and further, when the duty driving of this embodiment is performed, the effect of high brightness, power saving, long lifetime and the like can be further obtained. FIG. 43B shows a relation between a frame position and brightness at an instant in a period in which the cold cathode fluorescent lamps 76a to 76l are scan driven at a duty ratio of 33% in the backlight unit 75 of the structure shown in FIG. 43A so that any four adjacent lamps are always turned on. The left side of the drawing corresponds to the upper side of the display area of the LCD panel 2 shown in FIG. 1, and the right side of the drawing corresponds to the lower side of the display area. Although a curved line at an X position becomes smooth by a persistence time (8 ms) of a G (green) fluorescent substance in the cold cathode fluorescent lamp and the tailing phenomenon occurs, the picture quality capable of sufficiently supporting a motion picture is obtained.

Figure 43B:
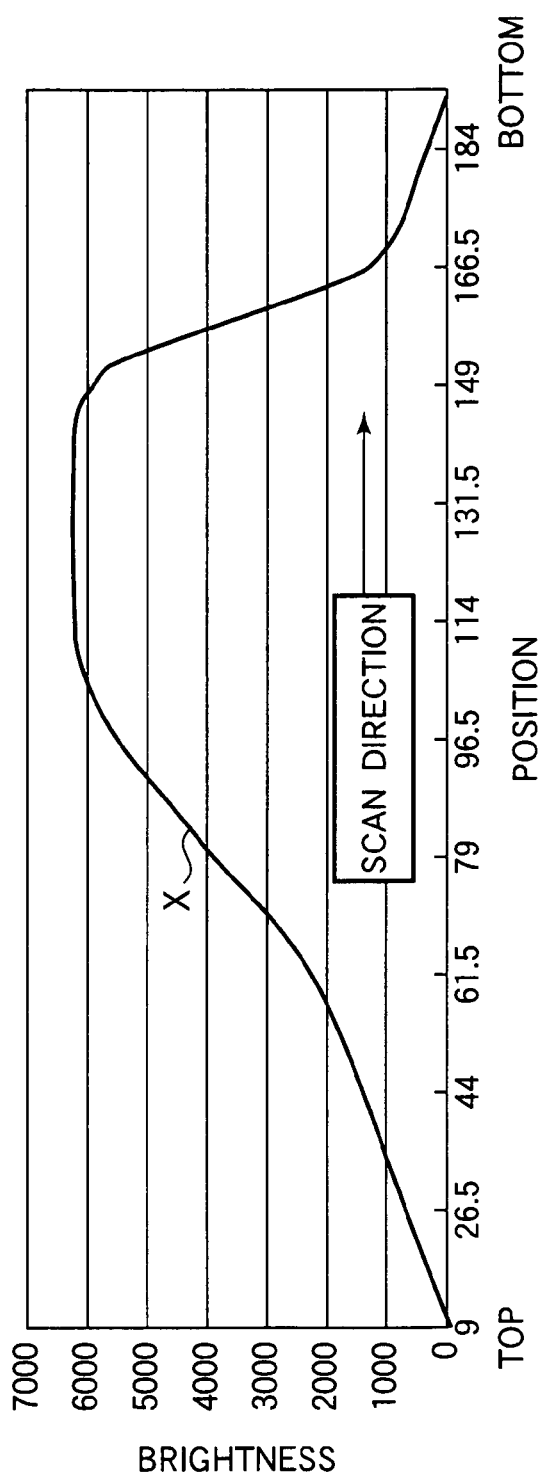
Figure 44:
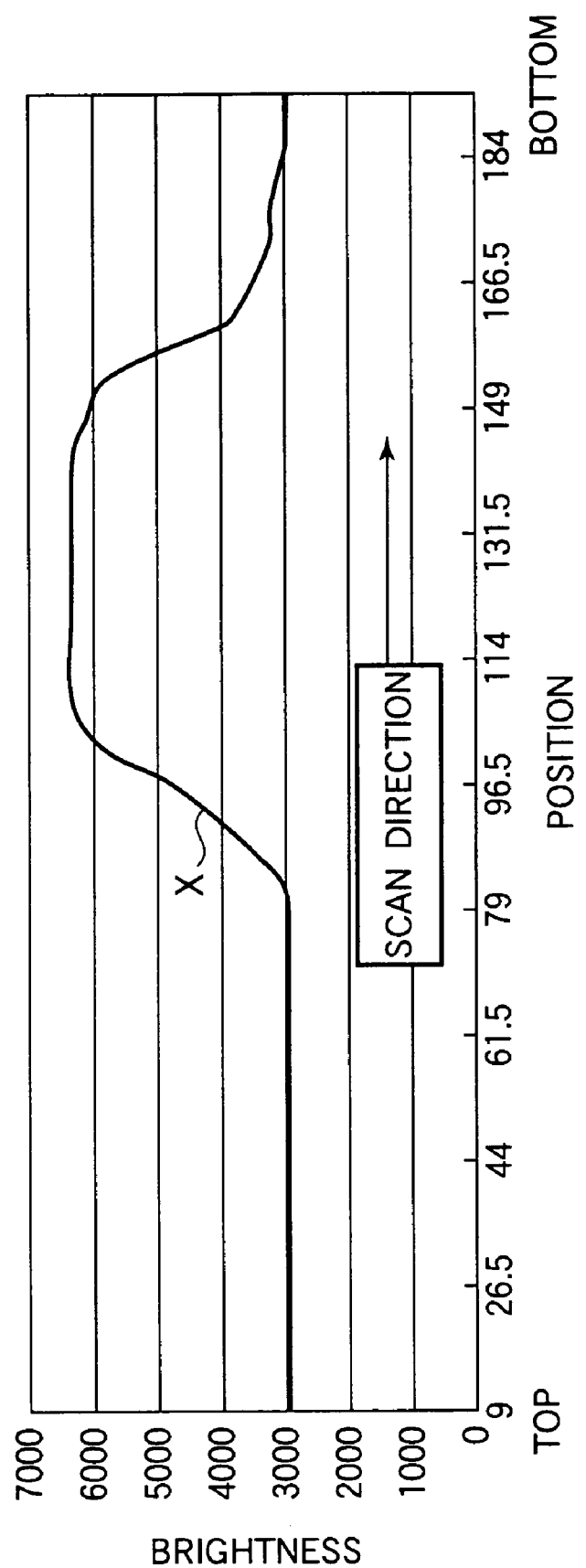
FIG. 44 is a view showing a result obtained when the duty driving shown in FIG. 37 or 38 is performed for a backlight unit 75 of the example 4 of the illumination device according to the fourth embodiment of the invention.

FIG. 44 shows a result obtained when the duty driving shown in FIG. 37 or 38 is performed to the backlight unit 75. The horizontal axis and the vertical axis of FIG. 44 are the same as FIG. 43B. An X position of a curved line shown in FIG. 44 is steeper than that shown in FIG. 43B, and it is understood that the tailing phenomenon is more effectively suppressed.

More specifically, in the normal direct type backlight shown in FIGS. 43A, 43B and 44, the duty driving of this embodiment is used, and a current supply state is not simply made to have two values (on/off) as in the related art, but is made to have the flatness in a state of a small light quantity. Besides, the brightness distributions (illumination light quantity distributions) of FIGS. 43B and 44 are realized by experimentally making an adjustment, as current modulation performing smooth temporal change, in view of illumination light quantity from the other cold cathode fluorescent lamps, and the persistence characteristic of a fluorescent substance (when a drive cycle of a liquid crystal display device and a backlight is 60 cycle, and one frame period is 16.7 msec, the persistence time of a G fluorescent substance is about 8 msec which can not be neglected). The duty driving method shown in FIG. 37 or 38 is adopted, and immediately after driving with a large current, in order to cancel the persistence of the fluorescent substance, the current is greatly lowered, and then, the current is smoothly increased.

According to this example, the conventional normal direct type backlight structure is used as it is, and the scan driving without degradation of the motion picture quality can be performed, and further, light quantities of many lamps can be mixed, and accordingly, even if relatively large color irregularity and brightness irregularity exist in the cold cathode fluorescent lamps, those are made uniform and can be made not to be visually recognized. Further, since it is also possible to make color irregularity and brightness irregularity due to degradation unable to be visually recognized, the lifetime of the display device can be made long.

Figure 46:
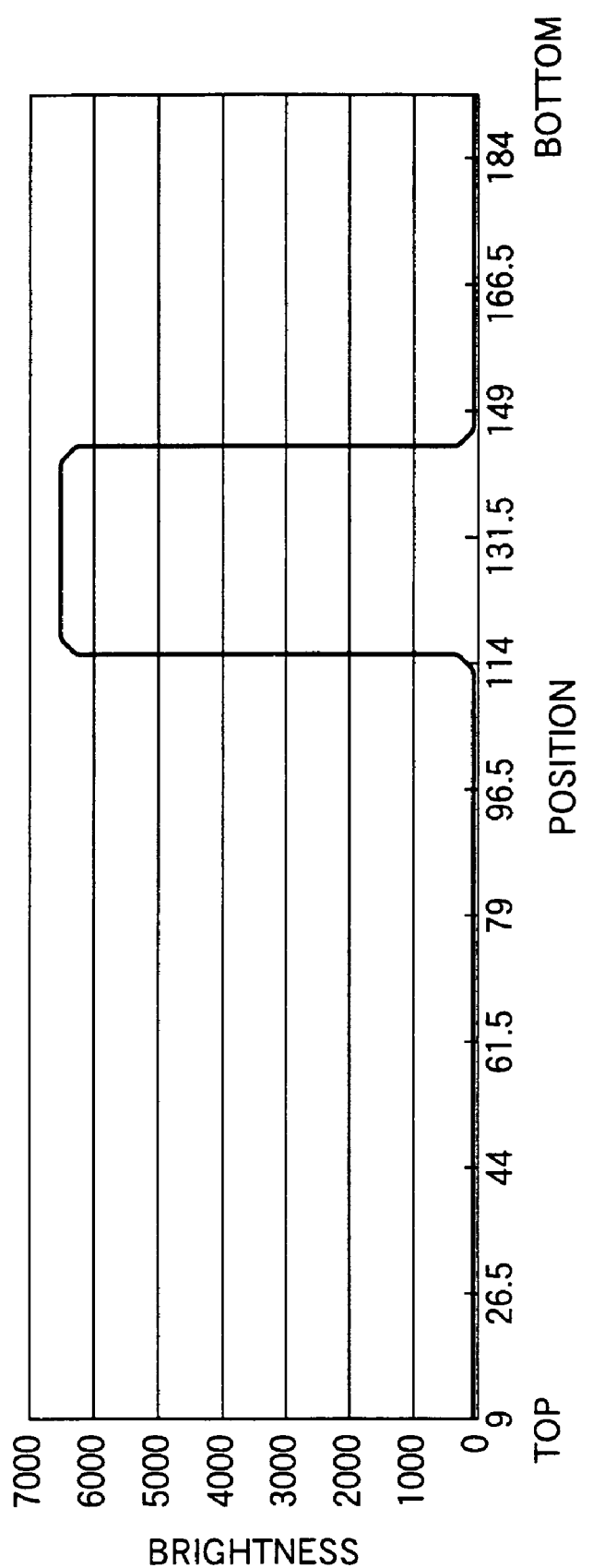
FIG. 46 is a view showing the duty driving of the conventional direct type backlight unit as the comparative example of the illumination device according to the fourth embodiment of the invention.

As a comparative example, FIGS. 45A and 45B and FIG. 46 show a conventional direct type backlight unit structure and duty driving. In a backlight 74 shown in FIG. 45A, partitions 77 are respectively disposed between respective cold cathode fluorescent lamps 76a to 76l. Then, at the time of the duty driving, as shown in FIG. 45B, current is sequentially supplied to the cold cathode fluorescent lamps 76a to 76l and they are individually turned on/off one by one. FIG. 46 shows a result obtained when the conventional duty driving is performed to the backlight unit 74. The horizontal axis and the vertical axis of FIG. 46 are the same as FIG. 43B. From FIG. 46, it is understood that the motion picture blur and the tailing phenomenon do not occur, however, it is understood that since only a part (in the drawing, positions 114 to 140 and their vicinities) is in a lighting state in the whole frame position, a desired brightness is not obtained.

EXAMPLE 4-5

Figure 47:
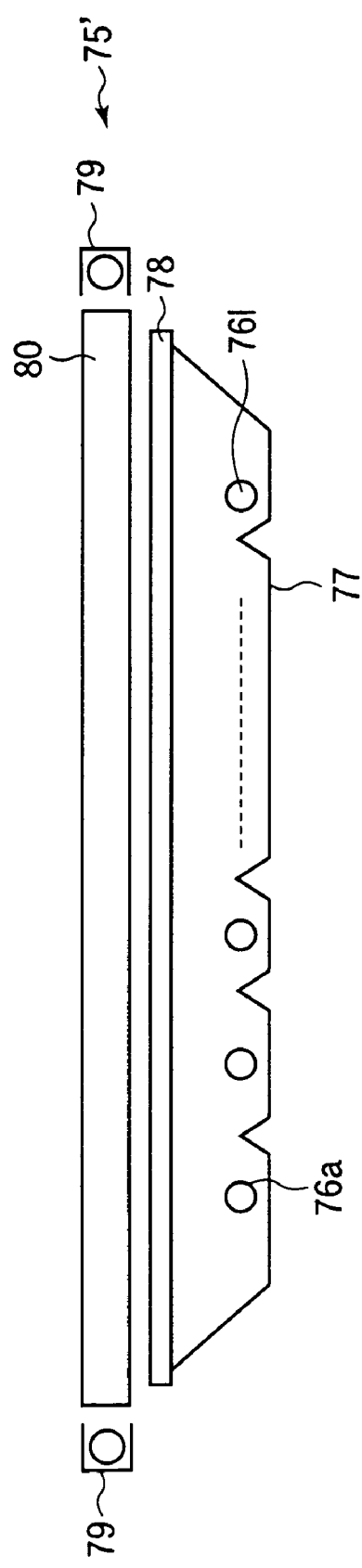
FIG. 47 is a view showing a backlight unit 75' according to example 5 of the illumination device of the fourth embodiment of the invention.

FIG. 47 shows a backlight unit 75' of example 5. This example shows the backlight unit 75' which includes the backlight unit 75 shown in FIG. 43A or the conventional backlight unit having incomplete partitions formed between the respective light-emitting areas and in which a sidelight type backlight unit is disposed above a diffused plate 78 of a light emission opening. In the sidelight type backlight unit, cold cathode fluorescent lamps 79 which are always turned on and are for uniform illumination are disposed at both ends of a prism light guide plate 80. Also by this structure, the same effect as the example 3 can be obtained.

EXAMPLE 4-6

Figure 48:
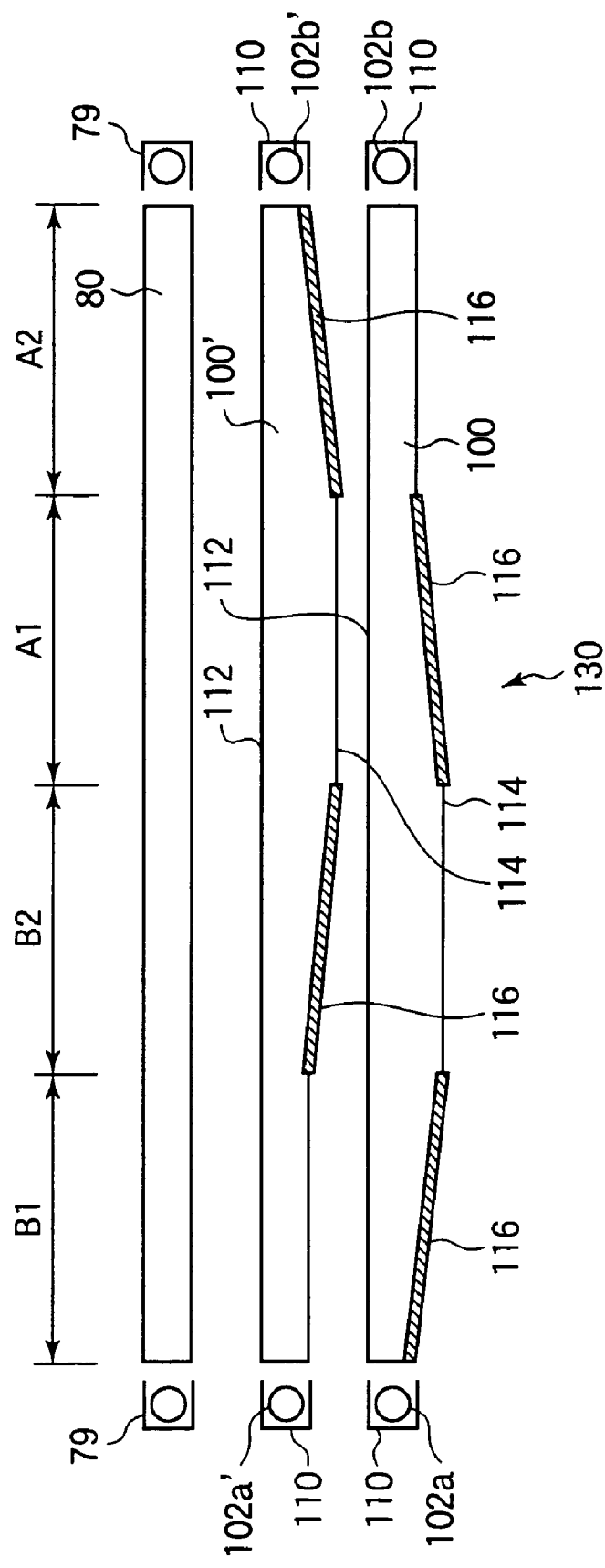
FIG. 48 is a view showing a backlight unit 130 according to example 6 of the illumination device of the fourth embodiment of the invention.

FIG. 48 shows a backlight unit 130 of example 6. The backlight unit 130 of this example includes two light guide plates 100 and 100' which are laminated and disposed. The light guide plates 100 and 100' include four light-emitting areas B1, B2, A1 and A2. A cold cathode fluorescent lamp 102a is disposed at one side end face of the lower light guide plate 100 in the drawing. Besides, a cold cathode fluorescent lamp 102b is disposed at the other side end face of the light guide plate 100. The light guide plate 100 includes a light guide area for guiding light from the cold cathode fluorescent lamps 102a and 102b. In the light guide plate 100 of the light-emitting area B1, an opposite surface 114 is inclined with respect to a light emission surface 112 so that the thickness at the side of the cold cathode fluorescent lamp 102a is thin and the thickness at the side of the cold cathode fluorescent lamp 102b is thick, and is formed into a wedge shape. Besides, in the light guide plate 100 of the light-emitting area A1, an opposite surface 114 is inclined with respect to the light emission surface 112 so that the thickness at the side of the cold cathode fluorescent lamp 102a is thick, and the thickness at the side of the cold cathode fluorescent lamp 102b is thin, and is formed into a wedge shape. Scattering layers 116 as light scattering elements are formed on the opposite surfaces 114 of the light-emitting areas A1 and B1. The light guide plate 100 includes the light guide area for guiding the light from the cold cathode fluorescent lamps 102a and 102b.

A cold cathode fluorescent lamp 102a' is disposed at one side end face of the light guide plate 100' laminated and disposed at the liquid crystal display panel 2 side of the light guide plate 100. Besides, a cold cathode fluorescent lamp 102*b*' is disposed at the other side end face of the light guide plate 100'. The light guide plate 100' includes a light guide area for guiding light from the cold cathode fluorescent lamps 102*a*' and 102*b*'. In the light guide plate 100' of the light-emitting area B2, an opposite surface 114 is inclined with respect to a light emission surface 112 so that the thickness at the side of the cold cathode fluorescent lamp 102*a*' is thin, and the thickness at the side of the cold cathode fluorescent lamp 102*b*' is thick, and is formed into a wedge shape. Besides, in the light guide plate 100' of the light-emitting area A2, an opposite surface 114 is inclined with respect to the light emission surface 112 so that the thickness at the side of the cold cathode fluorescent lamp 102*a*' is thick, and the thickness at the side of the cold cathode fluorescent lamp 102*b*' is thin, and is formed into a wedge shape. Scattering layers 116 as light scattering elements are formed on the opposite surfaces 116 of the areas A2 and B2.

In the light-emitting area B1 of the light guide plate 100, the light guided from the side of the cold cathode fluorescent lamp 102*b* is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102*b* is not kept being guided in the light-emitting area B1, and is emitted to the outside of the light guide plate 100. On the other hand, although light guided from the side of the cold cathode fluorescent lamp 102*a* to the light-emitting area B1 is scattered by the scattering layer 116 when it is reflected at the opposite surface, the light is concentrated by the wedge shape of the light guide plate 100 each time it is reflected, and the incident angle with respect to the light emission surface 112 becomes large. Thus, the light guided from the side of the cold cathode fluorescent lamp 102*a* to the light-emitting area B1 is kept being guided in the light-emitting area B1, and is not emitted to the outside of the light guide plate 100 much. That is, the light-emitting area B1 of the light guide plate 100 has a relation of (extracted light quantity from the side of the cold cathode fluorescent lamp 102*b*/guided light quantity from the side of the cold cathode fluorescent lamp 102*b*)>(extracted light quantity from the side of the cold cathode fluorescent lamp 102*a*/guided light quantity from the side of the cold cathode fluorescent lamp 102*a*).

In the light-emitting area A1 of the light guide plate 100, light guided from the side of the cold cathode fluorescent lamp 102*a* is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102 is not kept being guided in the light-emitting area Al, and is emitted to the outside of the light guide plate 100. On the other hand, although light guided from the side of the cold cathode fluorescent lamp 102*b* to the light-emitting area A1 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102*b* to the light-emitting area A1 is kept being guided in the light-emitting area A1, and is not emitted to the outside of the light guide plate 100 much. That is, the light-emitting area Al of the light guide plate 100 has a relation of (extracted light quantity from the side of the cold cathode fluorescent lamp 102*a*/guided light quantity from the side of the cold cathode fluorescent lamp 102*a*)>(extracted light quantity from the side of the cold cathode fluorescent lamp 102*b*/guided light quantity from the side of the cold cathode fluorescent lamp 102*b*).

In the light-emitting area B2 of the light guide plate 100', light guided from the side of the cold cathode fluorescent lamp 102*b*' is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102*b*' is not kept being guided in the light-emitting area B2, and is emitted to the outside of the light guide plate 100. On the other hand, although light guided from the side of the cold cathode fluorescent lamp 102*a*' to the light-emitting area B2 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102*a*' to the light-emitting area B2 is kept being guided in the light-emitting area B2, and is not emitted to the outside of the light guide plate 100 much. That is, the light-emitting area B2 of the light guide plate 100' has a relation of (extracted light quantity from the side of the cold cathode fluorescent lamp 102*b*'/guided light quantity from the side of the cold cathode fluorescent lamp 102*b*')>(extracted light quantity from the side of the cold cathode fluorescent lamp 102*a*'/guided light quantity from the side of the cold cathode fluorescent lamp 102*a*').

In the light-emitting area A2 of the light guide plate 100', light guided from the side of the cold cathode fluorescent lamp 102*a*' is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102*a*' is not kept being guided in the light-emitting area A2, and is emitted to the outside of the light guide plate 100. On the other hand, although light guided from the side of the cold cathode fluorescent lamp 102*b*' to the light-emitting area A2 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102*b*' to the light-emitting area A2 is kept being guided in the light-emitting area A2, and is not emitted to the outside of the light guide plate 100 much. That is, the light-emitting area B2 of the light guide plate 100' has a relation of (extracted light quantity from the side of the cold cathode fluorescent lamp 102*a*'/guided light quantity from the side of the cold cathode fluorescent lamp 102*a*')>(extracted light quantity from the side of the cold cathode fluorescent lamp 102*b*'/guided light quantity from the side of the cold cathode fluorescent lamp 102*b*').

The light-emitting areas B2 and A2 of the light guide plate 100 are non-light-extraction areas in which both the light from the cold cathode fluorescent lamp 102*a* and the light from the cold cathode fluorescent lamp 102*b* are hardly extracted. Besides, the light-emitting areas B1 and A1 of the light guide plate 100' are non-light-extraction areas in which both the light from the cold cathode fluorescent lamp 102a' and the light from the cold cathode fluorescent lamp 102b' are hardly extracted.

As stated above, in the light-emitting area Al of the light guide plate 100, the light guided from the side of the cold cathode fluorescent lamp 102a is more extracted, and in the light-emitting area B1, the light guided from the side of the cold cathode fluorescent lamp 102b is more extracted. In the light-emitting area A2 of the light guide plate 100', the light guided from the side of the cold cathode fluorescent lamp 102a' is more extracted, and in the light-emitting area B2, the light guided from the side of the cold cathode fluorescent lamp 102b' is more extracted. Besides, when the light guide plates 100 and 100' are laminated and disposed, the light is almost uniformly extracted in all the light-emitting areas B1, A1, B2 and A2.

A sidelight type backlight unit is further disposed on the above-described backlight unit. In the sidelight type backlight unit, cold cathode fluorescent lamps 79 which are always turned on and are for uniform illumination, are disposed at both ends of a prism light guide plate 80. Also in this structure, the same effect as the example 3 can be obtained.

EXAMPLE 4-7

Figure 49:
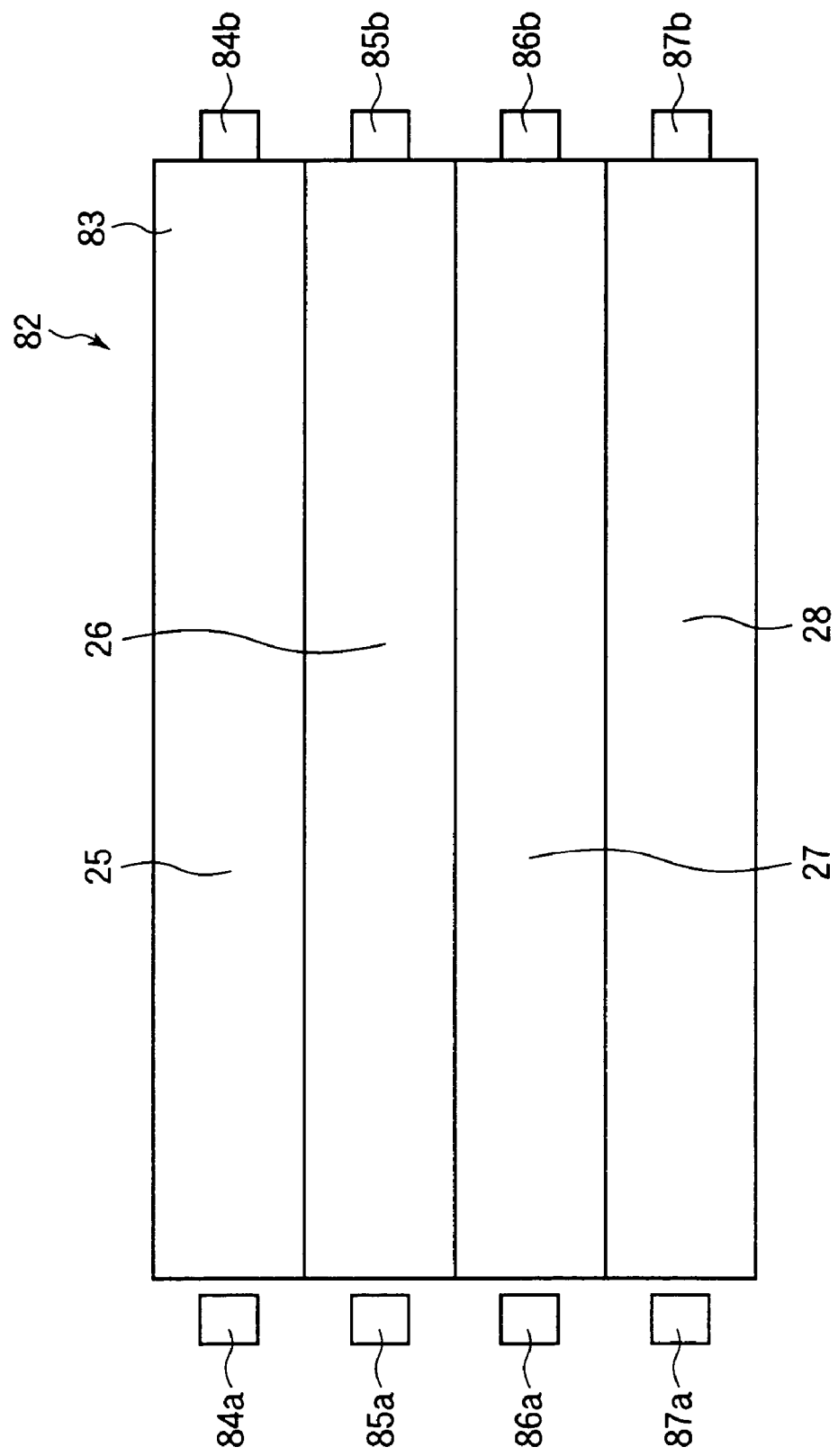
FIG. 49 is a view showing a backlight structure according to example 7 of the illumination device of the fourth embodiment of the invention.

FIG. 49 shows a backlight structure of example 7 of this embodiment. This example also uses the TFT-LCD 1 according to the first embodiment shown in FIG. 1, and FIG. 49 shows a state in which a sidelight type backlight unit 82 is viewed from the side of light emission openings of first to fourth light-emitting areas 25 to 28. In the sidelight type backlight unit 82, LEDs (Light-Emitting Diode) (84a, 84b), (85a, 85b), (86a, 86b) and (87a, 87b) are disposed at both sides of light guide plates 83 for the respective light-emitting areas 25 to 28. It is the similar as the illumination device 24 shown in FIG. 1. Also when the duty driving of this embodiment is applied to the backlight unit of the structure shown in FIG. 49, the effect equivalent to the above example can be obtained.

Figure 50:
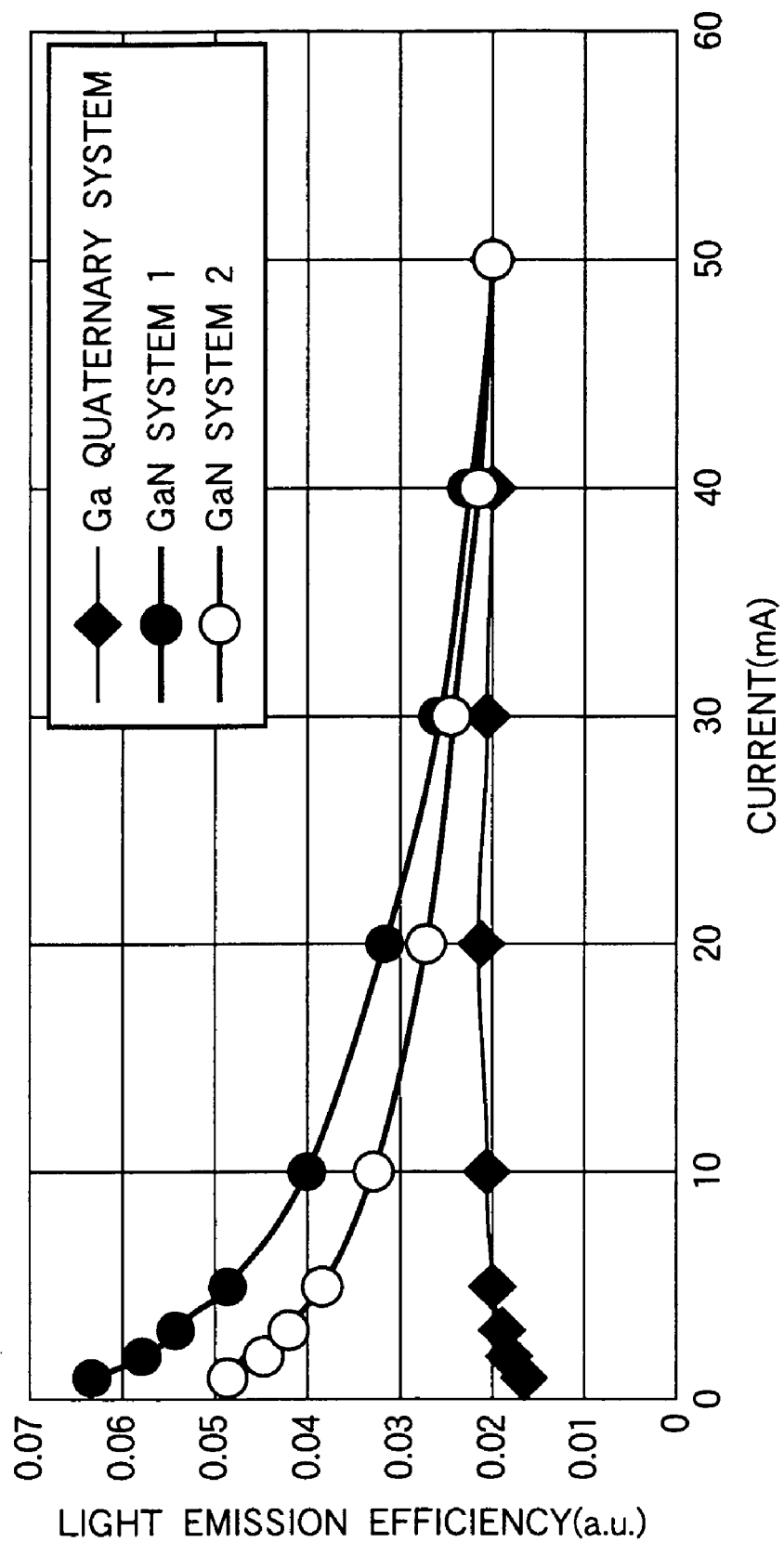
FIG. 50 is a view showing current dependency of light emission efficiency of an LED.
Figure 51:
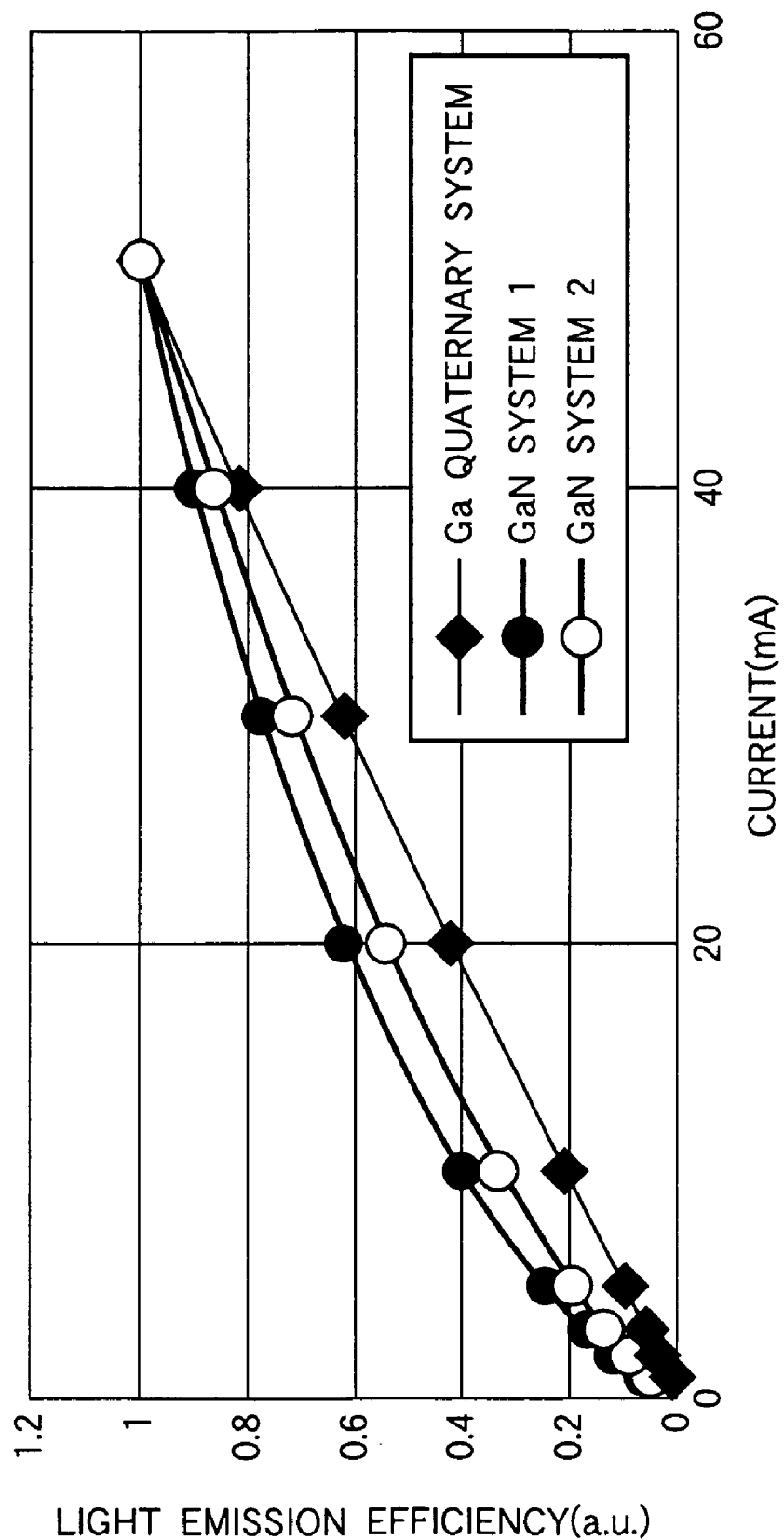
FIG. 51 is a view showing current dependency of light emission quantity of an LED.

FIG. 50 shows current dependency of light emission efficiency of an LED. The horizontal axis indicates current supplied to the LED, and the vertical axis indicates light emission efficiency (a.u.). FIG. 51 shows current dependency of light emission quantity of an LED. The horizontal axis indicates current supplied to the LED, and the vertical axis indicates light emission quantity (a.u.). In both the drawings, a curved line connecting rhombic marks indicates a characteristic of an LED of Ga quaternary system (for red), a curved line connecting black circular marks indicates a characteristic of an LED of GaN system 1 (for blue), and a curved line connecting white circular marks indicates a characteristic of an LED of GaN system 2 (for green).

As shown in FIGS. 50 and 51, it is understood that in the GaN system LED of green (G) light emission and blue (B) light emission, the current-to-light conversion efficiency is lowered by an increase in current similarly to the cold cathode fluorescent lamp. In addition, with respect to current, duty ratio, electric power, current-to-light conversion efficiency, light emission quantity and lifetime, the LED has similar characteristics to the cold cathode fluorescent lamp. Accordingly, almost all particulars explained on the cold cathode fluorescent lamp as an example in the above embodiment can be applied to the LED as well. Further, since another discharge lamp or solid light emission element also has a tendency to have almost similar characteristics, the above embodiment can be applied to almost all light sources.

As described above, according to this embodiment, it is possible to realize the display device which has high brightness, has high current-to-light conversion efficiency, has low cost, is light, thin, short and small, has long lifetime, is superior in uniformity of color and brightness, and is excellent in motion picture quality.

Fifth Embodiment

Figure 52:
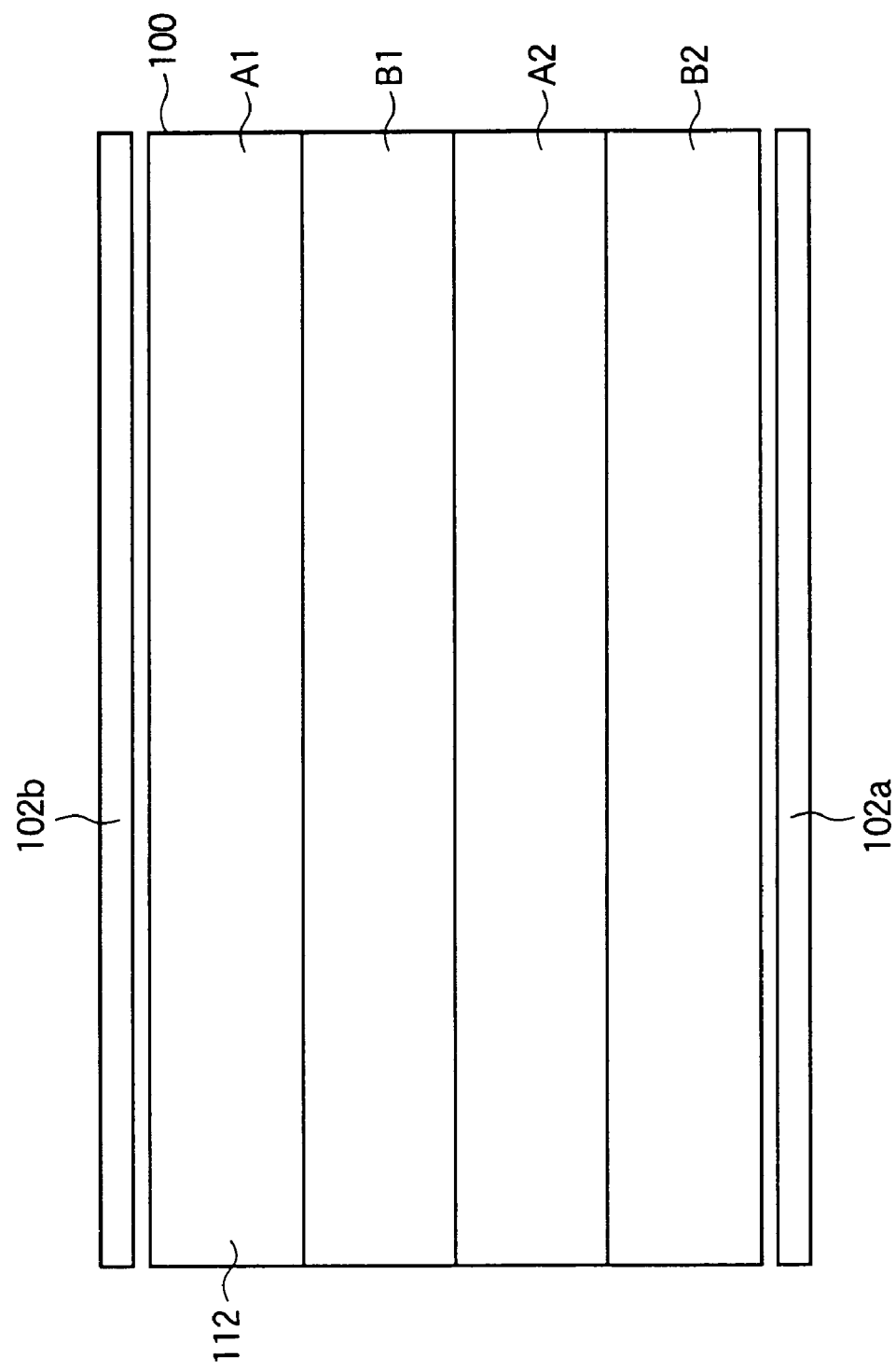
FIG. 52 is a view showing a basic structure of an illumination device according to a fifth embodiment of the invention.

An illumination device according to a fifth embodiment of the invention and a liquid crystal display device using the same will be described with reference to FIGS. 52 to 68. First, a basic structure of the illumination device according to this embodiment will be described with reference to FIGS. 52 to 56. FIG. 52 shows the basic structure of the illumination device according to this embodiment. As shown in FIG. 52, the illumination device of this basic structure includes a light guide plate 100 having substantially a plate shape and made of, for example, acryl. A linear light source, for example, a cold cathode fluorescent lamp 102b is disposed at the upper side end face of the light guide plate 100 in the drawing while the tube axial direction is substantially parallel to the long side direction of the light guide plate 100. Besides, a cold cathode fluorescent lamp 102a is disposed at the lower end face of the light guide plate 100 in the drawing while for example, the tube axial direction is substantially parallel to the long side direction of the light guide plate 100. The light guide plate 100 includes a light emission surface 112 for emitting light, and an opposite surface 114 opposite to the light emission surface 112. Besides, the light guide plate 100 includes four light-emitting areas A1, B1, A2 and B2 divided substantially parallel to the tube axial direction of the cold cathode fluorescent lamps 102a and 102b. The light-emitting areas A1, B1, A2 and B2 of the light guide plate 100 are integrally formed, and a slit is not formed at boundaries of the respective light-emitting areas A1, B1, A2 and B2.

The light-emitting areas A1 and A2 include light extraction elements for mainly extracting light guided from the side of the cold cathode fluorescent lamp 102a (or the cold cathode fluorescent lamp 102b) to the outside of the light guide plate 110. The light-emitting areas B1 and B2 include light extraction elements for mainly extracting light guided from the side of the cold cathode fluorescent lamp 102b (or the cold cathode fluorescent lamp 102a) to the outside of the light guide plate 110. The light-emitting areas A1 and A2 (or B1 and B2) for selectively extracting light guided from the one cold cathode fluorescent lamp 102a (or 102b) are arranged alternately with the light-emitting areas B1 and B2 (or A1 and A2) for selectively extracting light guided from the other cold cathode fluorescent lamp 102b (or 102a). By this, the light-emitting areas A1 and A2 (B1 and B2) for selectively extracting the light guided from the same cold cathode fluorescent lamp 102a or 102b are not adjacent to each other.

The illumination device according to this basic structure is of the sidelight type that uses the linear light source. Thus, excellent display quality without uneven brightness can be obtained. Besides, in the illumination device according to this basic structure, even if the light-emitting area is divided in parallel to the long side direction of the light guide plate 100, the tube axial direction of the cold cathode fluorescent lamps 102a and 102b can be disposed to be substantially parallel to the long side direction of the light guide plate 100.

Thus, the linear light source having relatively large light emission quantity and long length can be used, and high brightness can be obtained.

Figure 53:
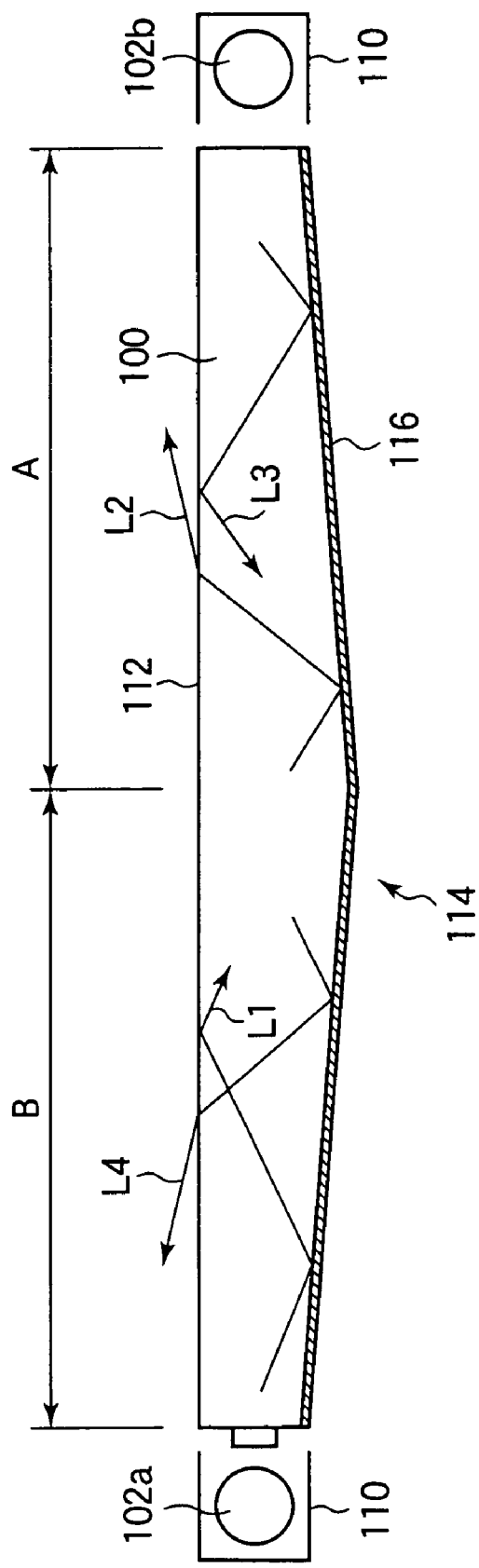
FIG. 53 is a view for explaining a first principle of a light extraction element of the illumination device according to the fifth embodiment of the invention.

FIG. 53 is a view for explaining a first principle of a light extraction element of the illumination device according to this basic structure. As shown in FIG. 53, a cold cathode fluorescent lamp 102a is disposed at one side end face (left end face in FIG. 53) of a light guide plate 100 while for example, the tube axial direction is substantially parallel to the long side direction of the light guide plate 100. Besides, a cold cathode fluorescent lamp 102b is disposed at the other side end face (right end face in FIG. 53) of the light guide plate 100 while the tube axial direction is substantially parallel to the long side direction of the light guide plate 100. Lamp reflectors 110 are disposed around the cold cathode fluorescent lamps 102a and 102b. The light guide plate 100 includes a light emission surface 112 for emitting light, and an opposite surface 114 opposite to the light emission surface 112. A scattering layer 116 as a light scattering element for scattering and reflecting light is formed on the surface of the opposite surface 114. The scattering layer 116 is made of, for example, resin in which beads or the like are mixed, and is formed to have a specified area and gradation. Besides, the light guide plate 100 includes two light-emitting areas A and B divided substantially in parallel to the tube axial direction of the cold cathode fluorescent lamps 102a and 102b. The light-emitting area B is disposed at the side of the cold cathode fluorescent lamp 102a, and the light-emitting area A is disposed at the side of the cold cathode fluorescent lamp 102b. The light-emitting areas A and B of the light guide plate 100 are integrally formed, and a slit is not formed at the boundary of the respective light-emitting areas A and B. The light guide plate 100 includes a light guide area for guiding the lights from the cold cathode fluorescent lamps 102a and 102b.

The light guide plate 100 of the light-emitting area A is formed into such a wedge shape that the thickness at a side end where the cold cathode fluorescent lamp 102b is disposed is thin, and the thickness at the center is thick. The light guide plate 100 of the light-emitting area B is formed into such a wedge shape that the thickness at the other side end where the cold cathode fluorescent lamp 102a is disposed is thin, and the thickness at the center is thick. The wedge shape of the light guide plate 100, together with the light scattering element, functions as the light extraction element.

In the light-emitting area B, light guided through the light guide plate 100 from the side of the cold cathode fluorescent lamp 102a is scattered by the scattering layer 116 when it is reflected at the opposite surface 114. However, the light is concentrated by the wedge shape of the light guide plate 100 each time it is reflected, and the incident angle with respect to the light emission surface 112 becomes large. Thus, the light guided from the side of the cold cathode fluorescent lamp 102a is kept being guided in the light-emitting area B like a light beam L1, and is not emitted to the outside of the light guide plate 100 much. On the other hand, light guided from the side of the cold cathode fluorescent lamp 102b is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, the light guided from the side of the cold cathode fluorescent lamp 102b is not kept being guided in the light-emitting area B, and is emitted to the outside of the light guide plate 100 like a light beam L4. That is, the light-emitting area B has a relation of (extracted light quantity from the side of the cold cathode fluorescent lamp 102b/guided light quantity from the side of the cold cathode fluorescent lamp 102b)>(extracted light quantity from the side of the cold cathode fluorescent lamp 102a/guided light quantity from the side of the cold cathode fluorescent lamp 102a).

In the light-emitting area A, light guided through the light guide plate 100 from the side of the cold cathode fluorescent lamp 102b is scattered by the scattering layer 116 when it is reflected at the opposite surface 114. However, the light is concentrated by the wedge shape of the light guide plate 100 each time it is reflected, and the incident angle with respect to the light emission surface 112 becomes large. Thus, the light guided from the side of the cold cathode fluorescent lamp 102b is kept being guided in the light-emitting area A like a light beam L3, and is not emitted to the outside of the light guide plate 100 much. On the other hand, light guided from the side of the cold cathode fluorescent lamp 102a is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, the light guided from the side of the cold cathode fluorescent lamp 102a is not kept being guided in the light-emitting area A, and is emitted to the outside of the light guide plate 100 like a light beam L2. That is, the light-emitting area A has a relation of (extracted light quantity from the side of the cold cathode fluorescent lamp 102a/guided light quantity from the side of the cold cathode fluorescent lamp 102a)>(extracted light quantity from the side of the cold cathode fluorescent lamp 102b/guided light quantity from the side of the cold cathode fluorescent lamp 102b).

As stated above, in the light-emitting area A of the light guide plate 100, the light guided from the side of the cold cathode fluorescent lamp 102a is more extracted, and in the light-emitting area B, the light guided from the side of the cold cathode fluorescent lamp 102b is more extracted. Incidentally, it is appropriate that the interface of the scattering layer 116 at the air side is formed to be flat (so-called bulk type scatter structure) rather than formed to be uneven. By this, it is possible to greatly reduce the ratio at which the light from the side of the cold cathode fluorescent lamp 102a (the side of the cold cathode fluorescent lamp 102b) is emitted from the interface of the scattering layer 116 of the light-emitting area B (light-emitting area A) to the side of the air layer.

Figure 54:
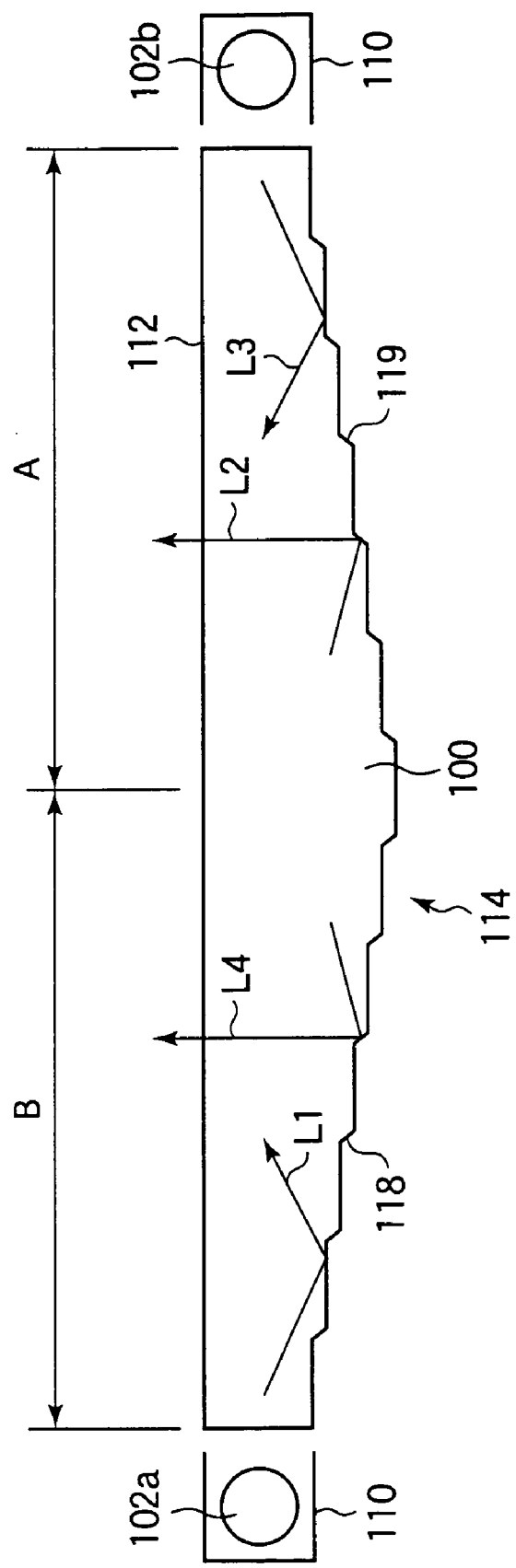
FIG. 54 is a view for explaining a second principle of a light extraction element of the illumination device according to the fifth embodiment of the invention.

FIG. 54 is a view for explaining a second principle of a light extraction element of the illumination device according to this basic structure. As shown in FIG. 54, a light guide plate 100 includes two light-emitting areas A and B divided substantially in parallel to the tube axial direction of cold cathode fluorescent lamps 102a and 102b. The light-emitting area B is disposed at the side of the cold cathode fluorescent lamp 102a, and the light-emitting area A is disposed at the side of the cold cathode fluorescent lamp 102b. The light-emitting areas A and B of the light guide plate 100 are integrally formed, and a slit is not formed at the boundary of the respective light-emitting areas A and B. An opposite surface 114 of the light guide plate 100 is formed into a prism shape. The prism shape functions as the light extraction element for extracting light.

The opposite surface 114 of the light-emitting area B has such a prism shape that light from the side of the cold cathode fluorescent lamp 102a is not incident on a prism surface 118, but is guided to the light-emitting area A as it is like a light beam L1. The prism surface 118 is formed to have an inclination angle of, for example, 40° to 45° with respect to a light emission surface 112. On the other hand, light from the side of the cold cathode fluorescent lamp 102b is incident on the prism surface 118 at a certain probability. The light incident on the prism surface comes not to satisfy a total reflection condition and is emitted to the outside of the light guide plate 100 like a light beam L4 by reflection or refraction.

The opposite surface 114 of the light-emitting area A has such a prism shape that light from the side of the cold cathode fluorescent lamp 102b is not incident on a prism surface 119, but is guided to the light-emitting area B as it is like a light beam L3. The prism surface 119 is formed to have an inclination angle of, for example, 40° to 45° with respect to the light emission surface 112. On the other hand, light from the side of the cold cathode fluorescent lamp 102a is incident on the prism surface 119 at a certain probability. The light incident on the prism surface 119 comes not to satisfy the total reflection condition and is emitted to the outside of the light guide plate 100 like a light beam L2 by reflection or refraction.

As stated above, in the light-emitting area A of the light guide plate 100, the light guided from the side of the cold cathode fluorescent lamp 102a is more extracted, and in the light-emitting area B, the light guided from the side of the cold cathode fluorescent lamp 102b is more extracted.

Figure 55:
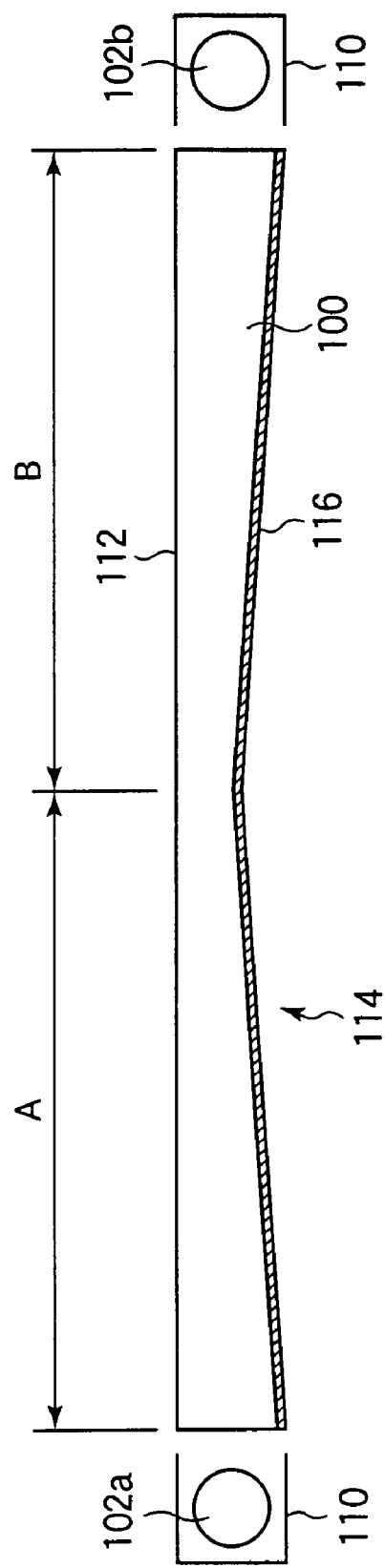
FIG. 55 is a view for explaining a third principle of a light extraction element of the illumination device according to the fifth embodiment of the invention.

FIG. 55 is a view for explaining a third principle of a light extraction element of the illumination device according to this basic structure. As shown in FIG. 55, a scattering layer 116 as a light scattering element for scattering and reflecting light is formed on the surface of an opposite surface 114 of a light guide plate 100. The light guide plate 100 includes two light-emitting areas A and B divided substantially in parallel to the tube axial direction of cold cathode fluorescent lamps 102a and 102b. The light-emitting area A is disposed at the side of the cold cathode fluorescent lamp 102a, and the light-emitting area B is disposed at the side of the cold cathode fluorescent lamp 102b.

The light guide plate 100 of the light-emitting area A is formed into such a wedge shape that the thickness at the side of a side end where the cold cathode fluorescent lamp 102a is disposed is thick, and the thickness at the center is thin. Similarly, the light guide plate 100 of the light-emitting area B is formed into such a wedge shape that the thickness at the side of a side end where the cold cathode fluorescent lamp 102b is disposed is thick, and the thickness at the center is thin. The light-emitting areas A and B of the light guide plate 100 are integrally formed and a slit is not formed at the boundary of the respective light-emitting areas A and B. Besides, the light-emitting areas A and B are not completely separated. The wedge shape of the light guide plate 100, together with the light scattering element, functions as the light extraction element.

In the light-emitting area A, light guided from the side of the cold cathode fluorescent lamp 102a is scattered by the scattering layer 116 when it is reflected at the opposite surface 114, and the incident angle with respect to a light emission surface 112 becomes small by the wedge shape of the light guide plate 100 each time it is reflected at the opposite surface 114. Thus, most of the light guided from the side of the cold cathode fluorescent lamp 102a is not kept being guided in the light-emitting area A and is emitted to the outside of the light guide plate 100. On the other hand, although the light guided to the light-emitting area B from the side of the cold cathode fluorescent lamp 102a is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided to the light-emitting area B from the side of the cold cathode fluorescent lamp 102a is kept being guided in the light-emitting area B, and is not emitted to the outside of the light guide plate 100 much.

In the light-emitting area B, light guided from the side of the cold cathode fluorescent lamp 102b is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102b is not kept being guided in the light-emitting area B and is emitted to the outside of the light guide plate 100. On the other hand, although the light guided to the light-emitting area A from the side of the cold cathode fluorescent lamp 102b is scattered by the scattering layer 116 when it is reflected at the opposite surface 114, the light is concentrated by the wedge shape of the light guide plate 100, and the incident angle with respect to the light emission surface 112 becomes large. Thus, the light guided to the light-emitting area A from the side of the cold cathode fluorescent lamp 102b is kept being guided in the light-emitting area A, and is not emitted to the outside of the light guide plate 100 much.

As stated above, in the light-emitting area A of the light guide plate 100, the light guided from the side of the cold cathode fluorescent lamp 102a is more extracted, and in the light-emitting area B, the light guided from the side of the cold cathode fluorescent lamp 102b is more extracted.

Figure 56:
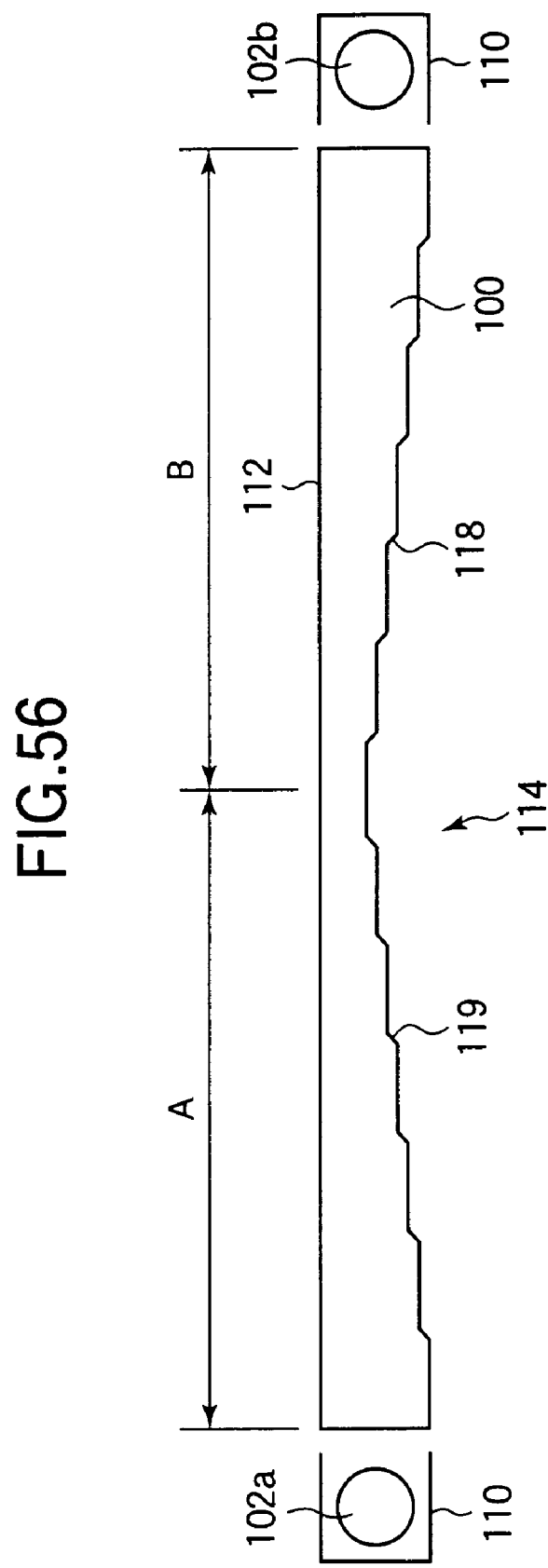
FIG. 56 is a view for explaining a fourth principle of a light extraction element of the illumination device according to the fifth embodiment of the invention.

FIG. 56 is a view for explaining a fourth principle of a light extraction element of the illumination device according to this basic structure. As shown in FIG. 56, a light guide plate 100 includes two light-emitting areas A and B divided substantially in parallel to the tube axial direction of cold cathode fluorescent lamps 102a and 102b. The light-emitting area A is disposed at the side of the cold cathode fluorescent lamp 102a, and the light-emitting area B is disposed at the side of the cold cathode fluorescent lamp 102b. An opposite surface 114 of the light guide plate 100 is formed into a prism shape. The prism shape functions as a light extraction element for extracting light. The light-emitting areas A and B of the light guide plate 100 are integrally formed, and a slit is not formed at the boundary of the respective light-emitting areas A and B.

The opposite surface 114 of the light-emitting area A has such a prism shape that light from the side of the cold cathode fluorescent lamp 102a is incident on a prism surface 119 at a certain probability, and light from the side of the cold cathode fluorescent lamp 102b is not incident on the prism surface 119. The prism surface 119 is formed to have an inclination angle of, for example, 40° to 45° with respect to the light emission surface 112. The light incident on the prism surface 119 comes not to satisfy the total reflection condition and is emitted to the outside of the light guide plate 100 by reflection or refraction.

The opposite surface 114 of the light-emitting area B has such a prism shape that light from the side of the cold cathode fluorescent lamp 102b is incident on a prism surface 118 at a certain probability, and light from the side of the cold cathode fluorescent lamp 102a is not incident on the prism surface 118. The prism surface 118 is formed to have an inclination angle of, for example, 40° to 45° with respect to the light emission surface 112. The light incident on the prism surface 118 comes not to satisfy the total reflection condition and is emitted to the outside of the light guide plate 100 by reflection or refraction.

As stated above, in the light-emitting area A of the light guide plate 100, the light guided from the side of the cold cathode fluorescent lamp 102a is more extracted, and in the light-emitting area B, the light guided from the side of the cold cathode fluorescent lamp 102b is more extracted.

Hereinafter, an illumination device according to this embodiment and a liquid crystal display device using the same will be described specifically with reference to examples 5-1 to 5-6.

EXAMPLE 5-1

Figure 57:
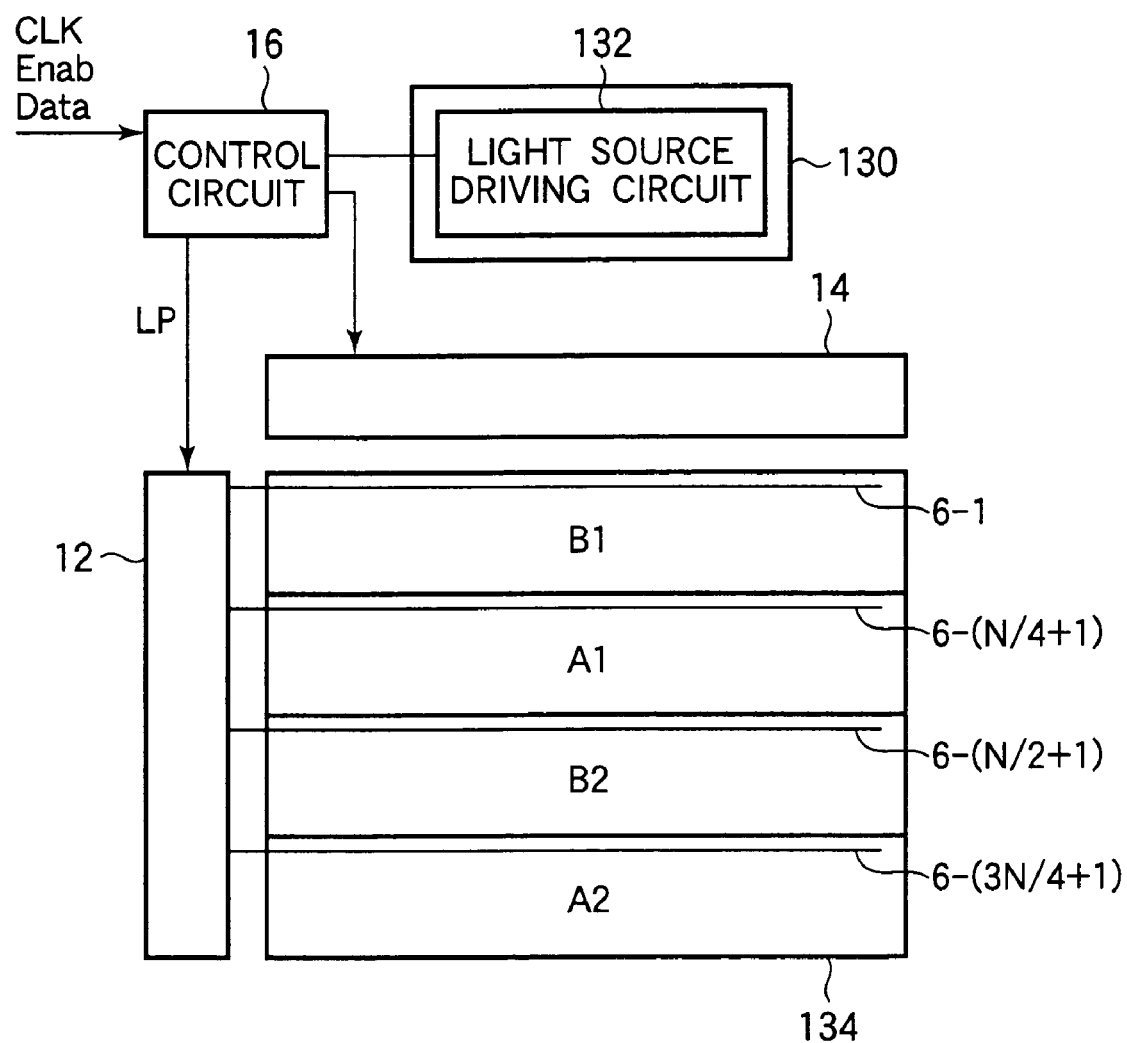
FIG. 57 is a block diagram showing a rough structure of a liquid crystal display device according to example 5-1 of the fifth embodiment of the invention.

An illumination device according to example 5-1 of this embodiment and a liquid crystal display device using the same will be described with reference to FIGS. 57 to 61. FIG. 57 is a block diagram showing a rough structure of the liquid crystal display device according to this example. As shown in FIG. 57, the liquid crystal display device includes a backlight unit 130, a control circuit 16, and a driving circuit composed of a gate driver 12 and a data driver 14. The backlight unit 130 includes a light source control part (light source driving circuit) 132. The light source control part 132 is connected to the control circuit 16. A clock CLK outputted from a system side such as a PC, a data enable signal Enab, gradation data Data and the like are inputted to the control circuit 16. Besides, the control circuit 16 includes a frame memory (not shown) for storing image signals of one frame. The gate driver 12 and the data driver 14 are connected to the control circuit 16. The gate driver 12 includes, for example, a shift register, receives a latch pulse signal LP from a gate driver control part in the control circuit 16, and sequentially outputs a gate pulse to lines starting from a display start line to perform line sequential driving.

The liquid crystal display device includes N gate bus lines 6-1 to 6-N (only four lines are shown in FIG. 57) in a display area 134. The respective gate bus lines 6-1 to 6-N are connected to the gate driver 12. The display area 134 is divided into four areas B1, A1, B2 and A2 extending in parallel to the gate bus line 6. The areas B1, A1, B2 and A2 are respectively illuminated by the corresponding light-emitting areas B1, A1, B2 and A2 of the backlight unit 130. The gate bus lines 6-1 to 6-(N/4) are disposed in the area B1. The gate bus lines 6-(N/4+1) to 6-(N/2) are disposed in the area A1. The gate bus lines 6-(N/2+1) to 6-(3×N/4) are disposed in the area B2. The gate bus lines 6-(3×N/4+1) to 6-N are disposed in the area A2.

Figure 58:
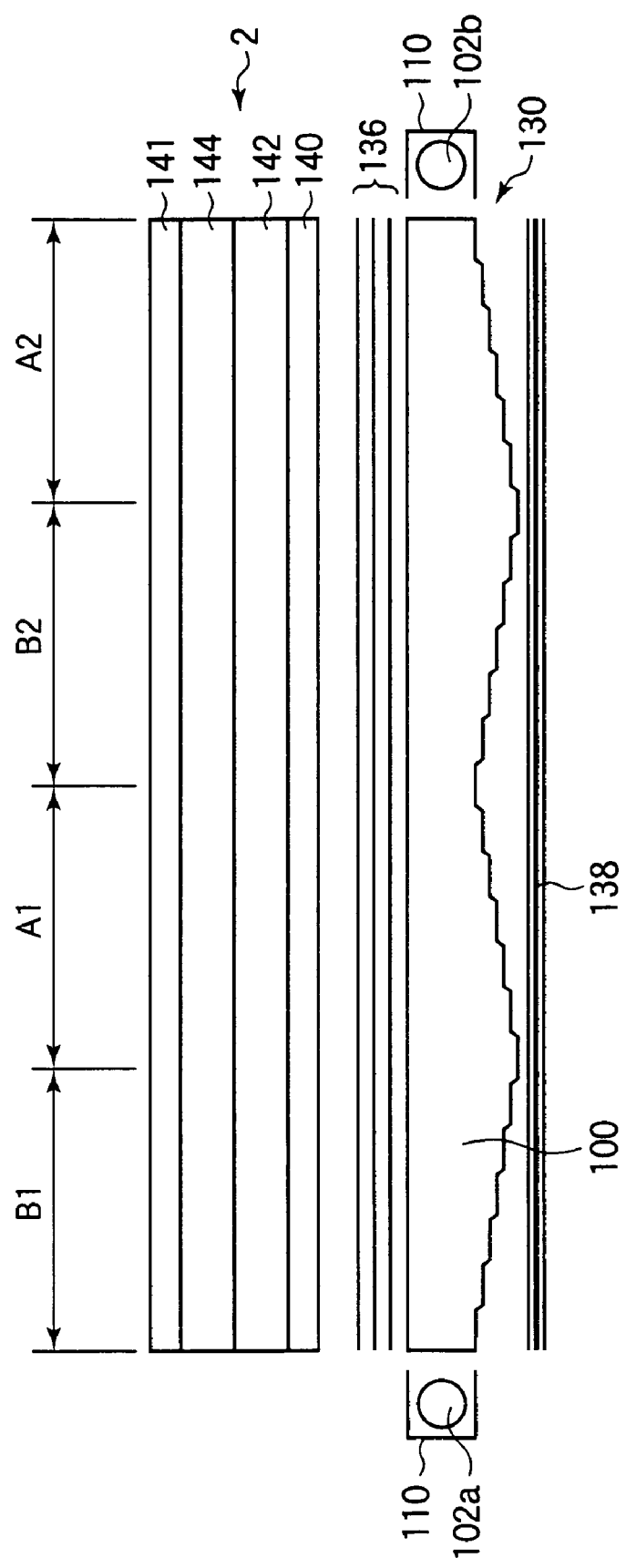
FIG. 58 is a view showing a sectional structure of the liquid crystal display device according to the example 5-1 of the fifth embodiment of the invention.
Figure 59:
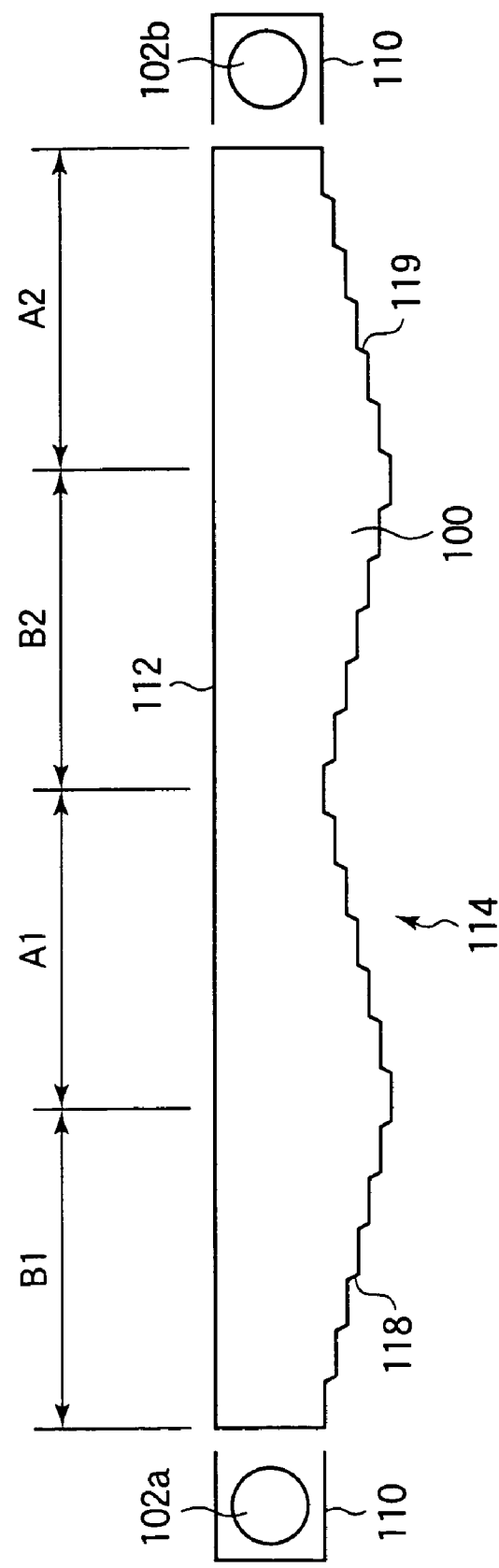
FIG. 59 is a view showing a sectional structure of a backlight unit 130 of the illumination device according to the example 5-1 of the fifth embodiment of the invention.

FIG. 58 shows a sectional structure of the liquid crystal display device according to this example. FIG. 59 shows a sectional structure of the backlight unit 130 of the illumination device according to this example. As shown in FIGS. 58 and 59, the liquid crystal display device includes a transmission type LCD panel 2 and the backlight unit 130. The backlight unit 130 includes a substantially plate-shaped light guide plate 100.

A cold cathode fluorescent lamp 102a of a linear light source is disposed at one end face (left end face in FIGS. 58 and 59) of the light guide plate 100 while for example, the tube axial direction is substantially parallel to the long side direction of the light guide plate 100. Besides, a cold cathode fluorescent lamp 102b is disposed at the other end face (right end face in FIGS. 58 and 59) of the light guide plate 100 while for example, the tube axial direction is substantially parallel to the long side direction of the light guide plate 100. Lamp reflectors 110 are disposed around the cold cathode fluorescent lamps 102a and 102b. The light guide plate 100 includes a light emission surface 112 for emitting light and an opposite surface 114 opposite to the light emission surface 112. A scattering layer 116 as a light scattering element is formed on the opposite surface 114. Besides, the light guide plate 100 includes four light-emitting areas B1, A1, B2 and A2 divided substantially in parallel to the tube axial direction of the cold cathode fluorescent lamps 102a and 102b. The light-emitting area B1 is disposed at the side of the cold cathode fluorescent lamp 102a, and the light-emitting area A1 is disposed to be adjacent to the light-emitting area B1. The light-emitting area B2 is disposed to be adjacent to the light-emitting area A1, and the light-emitting area A2 is disposed at the side of the cold cathode fluorescent lamp 102b. The light-emitting areas B1, A1, B2 and A2 are integrally formed, and a slit is not formed at boundaries of the respective light-emitting areas B1, A1, B2 and A2.

The opposite surface 114 of the light-emitting areas B1 and B2 has such a prism shape that light from the side of the cold cathode fluorescent lamp 102a is not incident on a prism surface 118, but is guided to the side of the cold cathode fluorescent lamp 102b as it is. The prism surface 118 is formed to have an inclination angle of, for example, 40° to 45° with respect to the light emission surface 112. On the other hand, light from the side of the cold cathode fluorescent lamp 102b is incident on the prism surface 118 at a certain probability. The light incident on the prism surface 118 comes not to satisfy the total reflection condition and is emitted to the outside of the light guide plate 100 by reflection or refraction.

The opposite surface 114 of the light-emitting areas A1 and A2 has such a prism shape that light from the side of the cold cathode fluorescent lamp 102b is not incident on a prism surface 119, but is guided to the side of the cold cathode fluorescent lamp 102b as it is. The prism surface 119 is formed to have an inclination angle of, for example, 40° to 45° with respect to the light emission surface 112. On the other hand, light from the side of the cold cathode fluorescent lamp 102a is incident on the prism surface 119 at a certain probability. The light incident on the prism surface 119 comes not to satisfy the total reflection condition and is emitted to the outside of the light guide plate 100 by reflection or refraction.

As stated above, in the light-emitting areas A1 and A2 of the light guide plate 100, the light guided from the side of the cold cathode fluorescent lamp 102a is more extracted, and in the light-emitting areas B1 and B2, the light guided from the side of the cold cathode fluorescent lamp 102b is more extracted. Besides, in the light guide plate 100, light can be extract almost uniformly in all the light-emitting areas B1, A1, B2 and A2.

A light distribution sheet group 136 including plural light distribution sheets, for improving a light distribution characteristic is disposed between the LCD panel 2 and the light guide plate 100. Besides, a reflection scattering sheet 138 for scattering and reflecting light is disposed at the side of the opposite surface 114 of the light guide plate 100.

Figure 60:
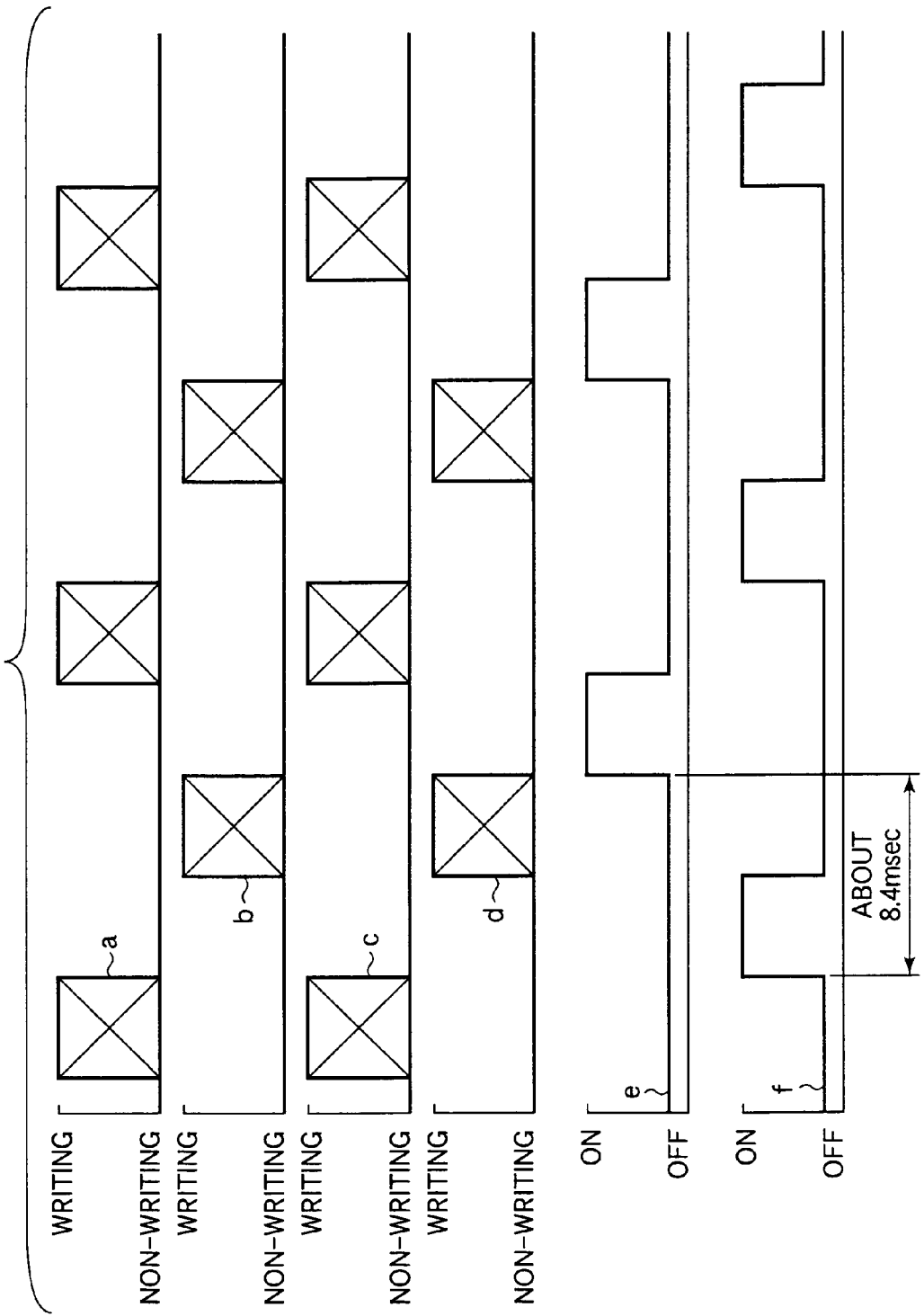
FIG. 60 is view showing a driving method of the illumination device according to the example 5-1 of the fifth embodiment of the invention and a liquid crystal display device using the same.

FIG. 60 shows a driving method of the illumination device according to this example and the liquid crystal display device using the same. The horizontal axis direction indicates time, and the vertical axis direction indicates a writing state (writing/non-writing) of gradation data and a blinking state (ON/OFF) of the illumination device. A waveform "a" indicates a writing state of gradation data in the area B1, and a waveform "b" indicates a writing state of gradation data in the area A1. A waveform "c" indicates a writing state of gradation data in the area B2, and a waveform "d" indicates a writing state of gradation data in the area A2. Besides, a waveform "e" indicates a blinking state of the cold cathode fluorescent lamp 102a, and a waveform "f" indicates a blinking state of the cold cathode fluorescent lamp 102b. As shown in FIG. 60, the light source control part 132 synchronizes with the latch pulse signal LP and causes the cold cathode fluorescent lamps 102a and 102b to emit light for a specified time at a blinking frequency equal to a frame frequency (for example, 60 Hz). Besides, the light source control part 132 causes a timing at which light emission brightness of the cold cathode fluorescent lamp 102a is made maximum to be different from a timing at which light emission brightness of the cold cathode fluorescent lamp 102b is made maximum by about 8.4 msec (½ period).

The gradation data is written into the pixels of the areas B1 and B2 substantially at the same timing. The liquid crystal display device of this example is of the multi-scan type, and the gate driver 12 outputs the gate pulse GP in the order of the gate bus lines 6-1, 6-(N/2+1), 6-2, 6-(N/2+2), . . . . That is, the gate bus lines 6 of the areas B1 and B2 are alternately scanned. Besides, after the ½ period has passed since the gate pulse GP was outputted to the gate bus line 6-1, the gate pulse GP is outputted to the gate bus line 6-(N/4+1), and thereafter, scanning is performed in the order of the gate bus lines 6-(3×N/4+1), 6-(N/4+2), 12-(3×N/4+2), . . . .

After a specified time has passed since the gradation data were written into the pixels of the areas B1 and B2, the cold cathode fluorescent lamp 102b for causing the light-emitting areas B1 and B2 to emit light is turned on. Besides, after the cold cathode fluorescent lamp 102b is turned off, the gradation data are written into the pixels of the areas B1 and B2. Similarly, after a specified time has passed since the gradation data were written into the pixels of the areas A1 and A2, the cold cathode fluorescent lamp 102a for causing the light-emitting areas A1 and A2 to emit light is turned on. Besides, after the cold cathode fluorescent lamp 102a is turned off, the gradation data are written into the pixels of the areas A1 and A2. As stated above, the cold cathode fluorescent lamp at the side of the areas in which the gradation data are written is turned off. In the liquid crystal display device, since it takes a time of several msec to several tens msec until a liquid crystal molecule is inclined at a specified inclination angle from the writing of the gradation data into the pixel, when a time from the writing of the gradation data to the lighting of the cold cathode fluorescent lamp is secured to the extent possible, more excellent display quality of a motion picture can be obtained. Thus, in this example, immediately after the cold cathode fluorescent lamp 102a (102b) is turned off, the writing (rewriting) of gradation data into the areas A1, A2 (B1, B2) is started, and the time from the end of the writing of the gradation data into the areas A1 and A2 (B1 and B2) to the lighting of the cold cathode fluorescent lamp 102a (102b) is secured as the response time of the liquid crystal molecule.

In this example, although the lighting times of the cold cathode fluorescent lamps 102a and 102b are made equal to each other, the lighting times of the cold cathode fluorescent lamps 102a and 102b may be made different from each other. Besides, in this example, although the cold cathode fluorescent lamps 102a and 102b are turned on/off at the specified frequency, the light emission brightnesses of the cold cathode fluorescent lamps 102a and 102b may be changed at a specified frequency.

The illumination device according to this example is of the sidelight type using the cold cathode fluorescent lamps 102a and 102b as the linear light sources. Thus, the excellent display quality without uneven brightness can be obtained. Besides, in the illumination device according to this example, even if the light-emitting area is divided in parallel to the long side direction of the light guide plate 100, the cold cathode fluorescent lamps 102a and 102b can be disposed while the tube axial direction is made substantially parallel to the long side direction of the light guide plate 100. Thus, the linear light source having a relatively large light emission quantity and a long length can be used. Accordingly, the scan type illumination device having a high brightness can be realized, and also when a motion picture is displayed, excellent display quality without contour blurring can be obtained.

Figure 61:
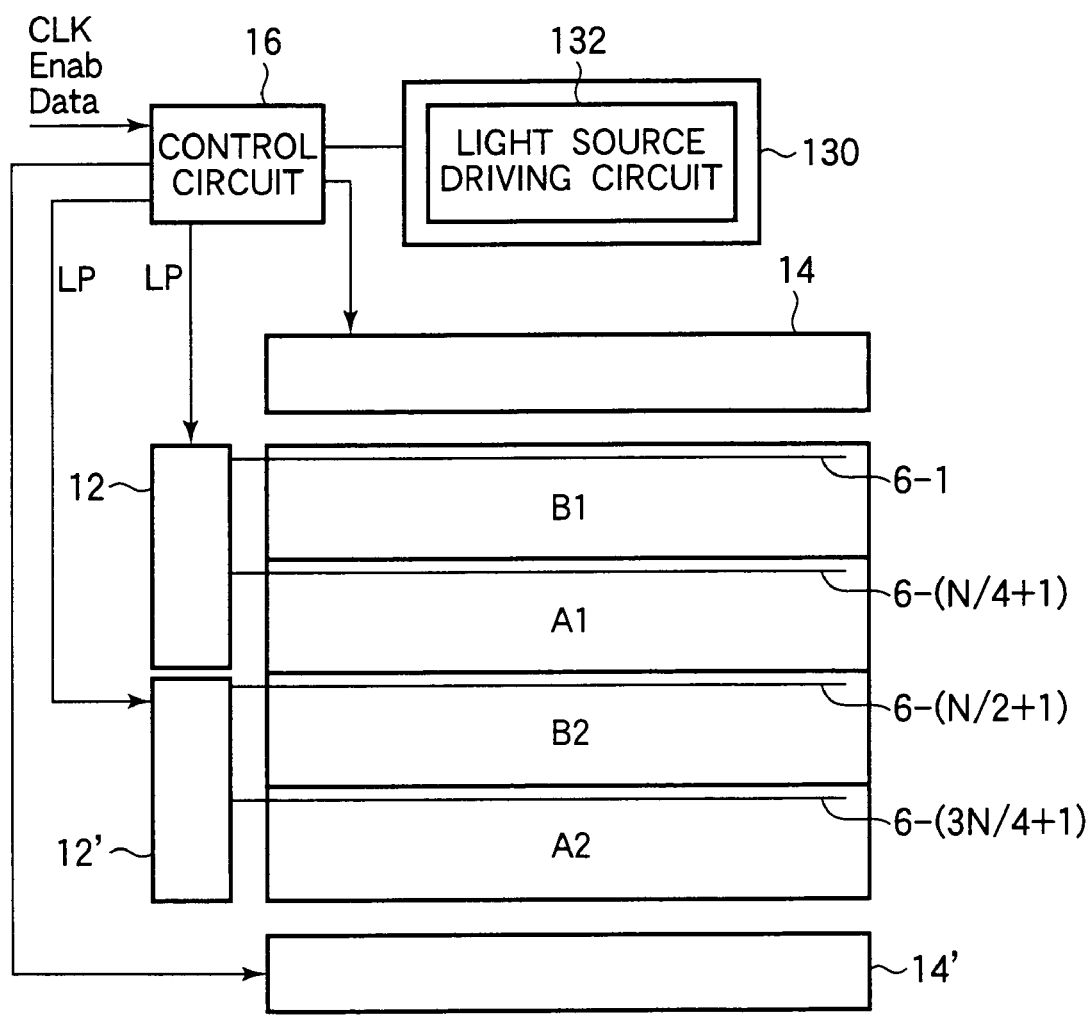
FIG. 61 is a block diagram showing a modified example of the structure of the liquid crystal display device according to the example 5-1 of the fifth embodiment of the invention.

FIG. 61 is a block diagram showing a modified example of the structure of the liquid crystal display device according to this example. As shown in FIG. 61, in this modified example, a gate driver 12 for driving gate bus lines 6-1 to 6-(N/2) of areas B1 and A1 and a gate driver 12' for driving gate bus lines 6-(N/2+1) to 6-N of areas B2 and A2 are provided to be independent of each other. Both the gate drivers 12 and 12' are connected to a control circuit 16. The gate driver 12 synchronizes with a latch pulse LP inputted from the control circuit 16 to output a gate pulse GP to the gate bus line 6-1, and at the same time, the gate driver 12' outputs a gate pulse GP to the gate bus line 6-(N/2+1). In this way, in this modified example, the gate driver 12 scans in the order of the gate bus lines 6-1, 6-2, . . . , 6-(N/2), and at the same time, the gate driver 12' can scan in the order of the gate bus lines 6-(N/2+1), 6-(N/2+2), . . . , 6-N. Also by this modified example, the same effect as the above example can be obtained.

EXAMPLE 5-2

Figure 62:
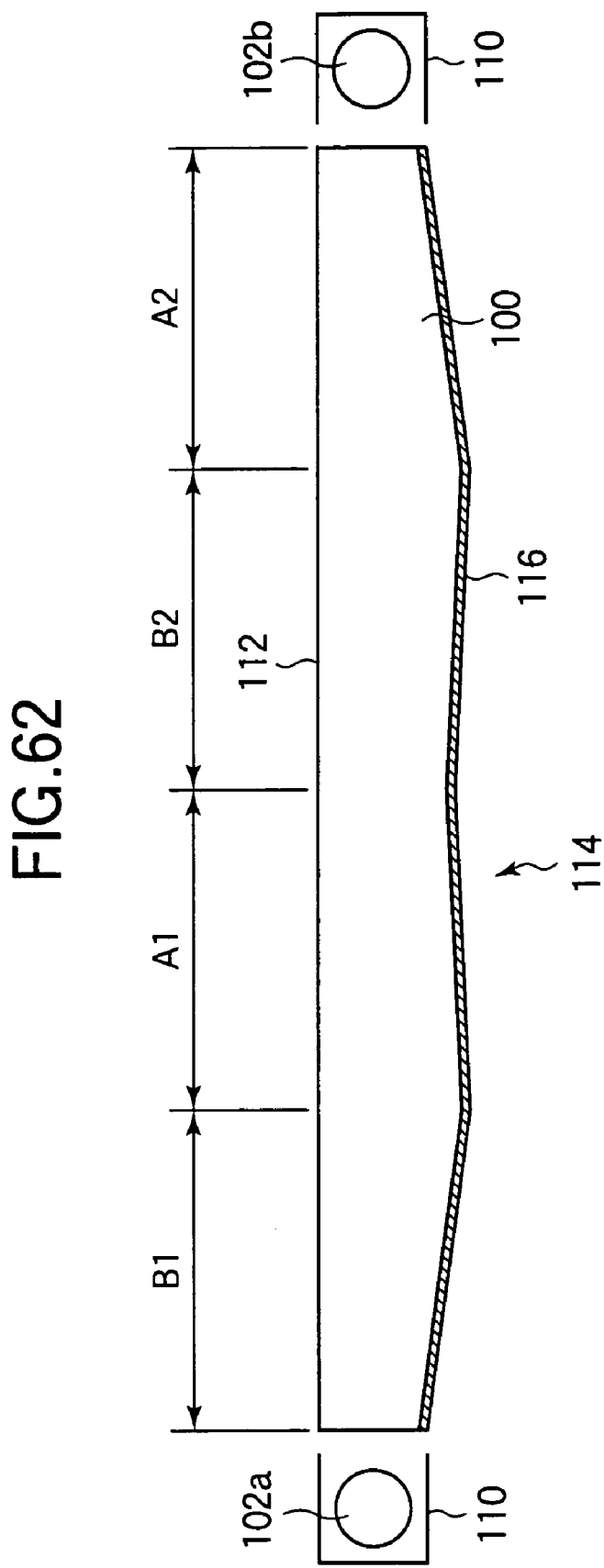
FIG. 62 is a view showing a sectional structure of an illumination device according to example 5-2 of the fifth embodiment of the invention.

First, an illumination device according to example 5-2 of this embodiment will be described with reference to FIG. 62. FIG. 62 shows a sectional structure of the illumination device according to this example. As shown in FIG. 62, a light guide plate 100 includes four light-emitting areas B1, A1, B2 and A2 divided substantially in parallel to the tube axial direction of cold cathode fluorescent lamps 102a and 102b. The light-emitting area B1 is disposed at the side of the cold cathode fluorescent lamp 102a, and the light-emitting area A1 is disposed to be adjacent to the light-emitting area B1. The light-emitting area B2 is disposed to be adjacent to the light-emitting area A1, and the light-emitting area A2 is disposed at the side of the cold cathode fluorescent lamp 102b. The light-emitting areas B1, A1, B2 and A2 of the light guide plate 100 are integrally formed, and a slit is not formed at boundaries of the respective light-emitting areas B1, A1, B2 and A2.

In the light guide plate 100, an opposite surface 114 is inclined at a specified inclination angle with respect to a light emission surface 112, and is formed into different wedge shapes for the respective areas. The light guide plate 100 of the light-emitting areas A1 and A2 is formed into such a wedge shape that the thickness at the side of a side end where the cold cathode fluorescent lamp 102a is disposed is thick, and the thickness at the side of a side end where the cold cathode fluorescent lamp 102b is disposed is thin. The light guide plate 100 of the light-emitting areas B1 and B2 is formed into such a wedge shape that the thickness at the side of the side end where the cold cathode fluorescent lamp 102a is disposed is thin, and the thickness at the side of the side end where the cold cathode fluorescent lamp 102b is disposed is thick. For example, the inclination angles of the opposite surface 114 of the areas A1 and B2 are small as compared with the inclination angles of the opposite surface 114 of the areas B1 and A2. The wedge shapes of the light guide plate 100, together with a light scattering element, function as light extraction elements.

In the light-emitting areas B1 and B2, light guided through the light guide plate 100 from the side of the cold cathode fluorescent lamp 102a is scattered by a scattering layer 116 when it is reflected at the opposite surface 114. However, the light is concentrated by the wedge shape of the light guide plate 100 each time it is reflected, and the incident angle with respect to the light emission surface 112 becomes large. Thus, the light guided from the side of the cold cathode fluorescent lamp 102a is kept being guided in the light-emitting areas B1 and B2, and is not emitted to the outside of the light guide plate 100 much. On the other hand, light guided from the side of the cold cathode fluorescent lamp 102b is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, part of the light guided from the side of the cold cathode fluorescent lamp 102b is not kept being guided in the light-emitting areas B1 and B2, and is emitted to the outside of the light guide plate 100.

In the light-emitting areas A1 and A2, light guided through the light guide plate 100 from the side of the cold cathode fluorescent lamp 102b is scattered by the scattering layer 116 when it is reflected at the opposite surface 114. However, the light is concentrated by the wedge shape of the light guide plate 100 each time it is reflected, and the incident angle with respect to the light emission surface 112 becomes large. Thus, the light guided from the side of the cold cathode fluorescent lamp 102b is kept being guided in the light-emitting areas A1 and A2, and is not emitted to the outside of the light guide plate 100 much. On the other hand, light guided from the side of the cold cathode fluorescent lamp 102a is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, part of the light guided from the side of the cold cathode fluorescent lamp 102a is not kept being guided in the light-emitting areas A1 and A2, and is emitted to the outside of the light guide plate 100.

As stated above, in the light-emitting areas A1 and A2, the light guided from the side of the cold cathode fluorescent lamp 102a is more extracted, and in the light-emitting areas B1 and B2, the light guided from the side of the cold cathode fluorescent lamp 102b is more extracted. Besides, in the light guide plate 100, light can be extracted almost uniformly in all the light-emitting areas B1, A1, B2 and A2. According to this example, the same effect as the example 5-1 can be obtained.

EXAMPLE 5-3

Figure 63:
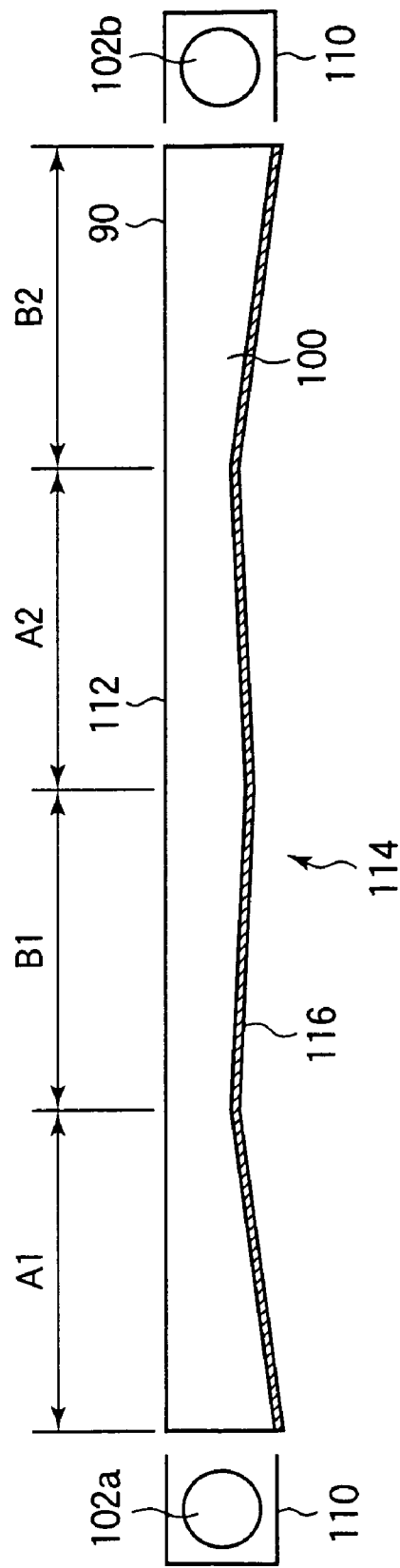
FIG. 63 is a view showing a sectional structure of an illumination device according to example 5-3 of the fifth embodiment of the invention.

Next, an illumination device according to example 5-3 of this embodiment will be described with reference to FIG. 63. FIG. 63 shows a sectional structure of the illumination device according to this example. As shown in FIG. 63, a light guide plate 100 includes four light-emitting areas A1, B1, A2 and B2 divided substantially in parallel to the tube axial direction of cold cathode fluorescent lamps 102a and 102b. The light-emitting area A1 is disposed at the side of the cold cathode fluorescent lamp 102a, and the light-emitting area B1 is disposed to be adjacent to the light-emitting area A1. The light-emitting area A2 is disposed to be adjacent to the light-emitting area B1, and the light-emitting area B2 is disposed at the side of the cold cathode fluorescent lamp 102b. The light-emitting areas A1, B1, A2 and B2 of the light guide plate 100 are integrally formed, and a slit is not formed at boundaries of the respective light-emitting areas A1, B1, A2 and B2.

In the light guide plate 100, an opposite surface 114 is inclined at specified inclination angles with respect to a light emission surface 112, and is formed into different wedge shapes for the respective areas. The light guide plate 100 of the light-emitting areas A1 and A2 is formed into such a wedge shape that the thickness at the side of a side end where the cold cathode fluorescent lamp 102a is disposed is thick, and the thickness at the side of a side end where the cold cathode fluorescent lamp 102b is disposed is thin. The light guide plate 100 of the light-emitting areas B1 and B2 is formed into such a wedge shape that the thickness at the side of the side end where the cold cathode fluorescent lamp 102a is disposed is thin, and the thickness at the side of the side end where the cold cathode fluorescent lamp 102b is disposed is thick. For example, the inclination angles of the opposite surface 114 of the areas A2 and B1 are small as compared with the inclination angles of the opposite surface 114 of the areas A1 and B2. The wedge shapes of the light guide plate 100, together with a light scattering element, function as light extraction elements.

In the light-emitting areas B1 and B2, light guided through the light guide plate 100 from the side of the cold cathode fluorescent lamp 102a is scattered by a scattering layer 116 when it is reflected at the opposite surface 114. However, the light is concentrated by the wedge shape of the light guide plate 100 each time it is reflected, and the incident angle with respect to the light emission surface 112 becomes large. Thus, the light guided from the side of the cold cathode fluorescent lamp 102a is kept being guided in the light-emitting areas B1 and B2, and is not emitted to the outside of the light guide plate 100 much. On the other hand, light guided from the side of the cold cathode fluorescent lamp 102b is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, part of the light guided from the side of the cold cathode fluorescent lamp 102b is not kept being guided in the light-emitting areas B1 and B2, and is emitted to the outside of the light guide plate 100.

In the light-emitting areas A1 and A2, light guided through the light guide plate 100 from the side of the cold cathode fluorescent lamp 102b is scattered by the scattering layer 116 when it is reflected at the opposite surface 114. However, the light is concentrated by the wedge shape of the light guide plate 100 each time it is reflected, and the incident angle with respect to the light emission surface 112 becomes large. Thus, the light guided from the side of the cold cathode fluorescent lamp 102b is kept being guided in the light-emitting areas A1 and A2, and is not emitted to the outside of the light guide plate 100 much. On the other hand, light guided from the side of the cold cathode fluorescent lamp 102a is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, part of the light guided from the side of the cold cathode fluorescent lamp 102a is not kept being guided in the light-emitting areas A1 and A2, and is emitted to the outside of the light guide plate 100.

As stated above, in the light-emitting areas A1 and A2 of the light guide plate 100, the light guided from the side of the cold cathode fluorescent lamp 102a is more extracted, and in the light-emitting areas B1 and B2, the light guided from the side of the cold cathode fluorescent lamp 102b is more extracted. Besides, in the light guide plate 100, light can be extracted almost uniformly in all the light-emitting areas B1, A1, B2 and A2.

According to this example, the same effect as the example 5-1 can be obtained. Besides, in the liquid crystal display device using the backlight unit 130 according to this example, the timing of brightness modulation of the cold cathode fluorescent lamps 102a and 102b is made opposite to the timing of brightness modulation of the example 5-1 shown in FIG. 60, so that the scan type illumination device having high brightness can be realized, and also when a motion picture is displayed, excellent display quality without contour blurring can be obtained.

EXAMPLE 5-4

Figure 64:
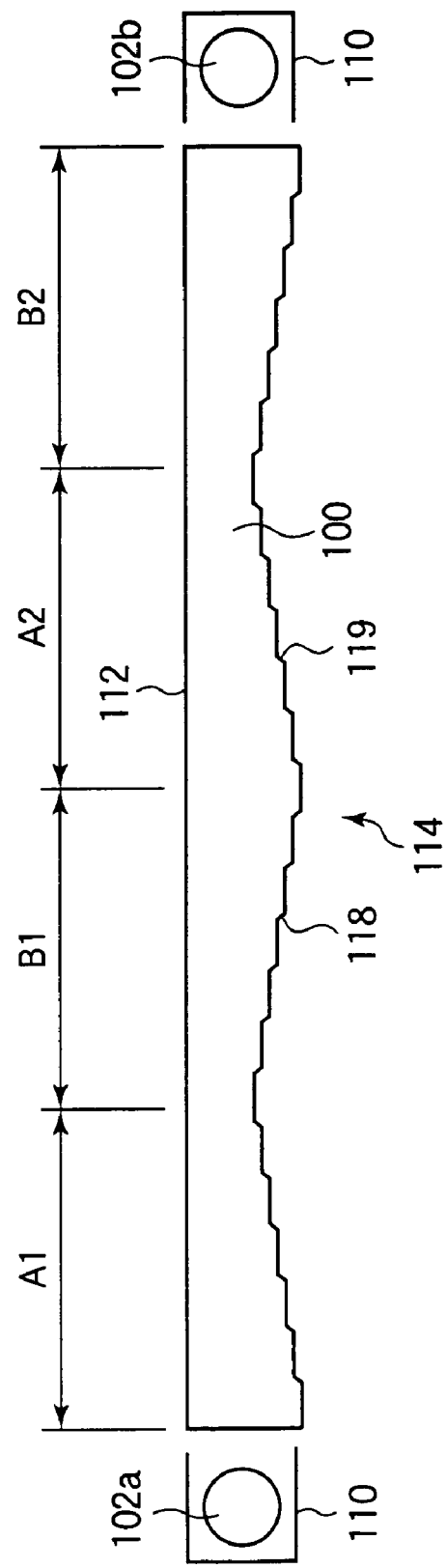
FIG. 64 is a view showing a sectional structure of an illumination device according to example 5-4 of the fifth embodiment of the invention.

Next, an illumination device according to example 5-4 of this embodiment will be described with reference to FIG. 64. FIG. 64 shows a sectional structure of the illumination device according to this example. As shown in FIG. 64, a light guide plate 100 includes four light-emitting areas A1, B1, A2 and B2 divided substantially in parallel to the tube axial direction of cold cathode fluorescent lamps 102a and 102b. The light-emitting area A1 is disposed at the side of the cold cathode fluorescent lamp 102a, and the light-emitting area B1 is disposed to be adjacent to the light-emitting area A1. The light-emitting area A2 is disposed to be adjacent to the light-emitting area B1, and the light-emitting area B2 is disposed at the side of the cold cathode fluorescent lamp 102b. The light-emitting areas A1, B1, A2 and B2 of the light guide plate 100 are integrally formed, and a slit is not formed at boundaries of the respective light-emitting areas A1, B1, A2 and B2. An opposite surface 114 of the light guide plate 100 is formed into a prism shape, and the prism shape functions as a light extraction element for extracting light.

The opposite surface 114 of the light-emitting areas B1 and B2 has such a prism shape that light from the side of the cold cathode fluorescent lamp 102a is not incident on the prism surface 118, but is guided to the side of the cold cathode fluorescent lamp 102b as it is. The prism surface 118 is formed to have an inclination angle of, for example, 40° to 45° with respect to the light emission surface 112. On the other hand, light from the side of the cold cathode fluorescent lamp 102b is incident on the prism surface 118 at a certain probability. The light incident on the prism surface 118 comes not to satisfy the total reflection condition and is emitted to the outside of the light guide plate 100 by reflection or refraction.

The opposite surface 114 of the light-emitting areas A1 and A2 has such a prism shape that light from the side of the cold cathode fluorescent lamp 102b is not incident on a prism surface 119, but is guided to the side of the cold cathode fluorescent lamp 102b as it is. The prism surface 119 is formed to have an inclination angle of, for example, 40° to 45° with respect to the light emission surface 112. On the other hand, light from the cold cathode fluorescent lamp 102a is incident on the prism surface 119 at a certain probability. The light incident on the prism surface 119 comes not to satisfy the total reflection condition and is emitted to the outside of the light guide plate 100 by reflection or refraction.

As stated above, in the light-emitting areas A1 and A2 of the light guide plate 100, the light guided from the side of the cold cathode fluorescent lamp 102a is more extracted, and in the light-emitting areas B1 and B2, the light guided from the side of the cold cathode fluorescent lamp 102b is more extracted. Besides, in the light guide plate 100, light can be extracted almost uniformly in all the light-emitting areas B1, A1, B2 and A2. According to this example, the same effect as the example 5-1 can be obtained.

EXAMPLE 5-5

Figure 65:
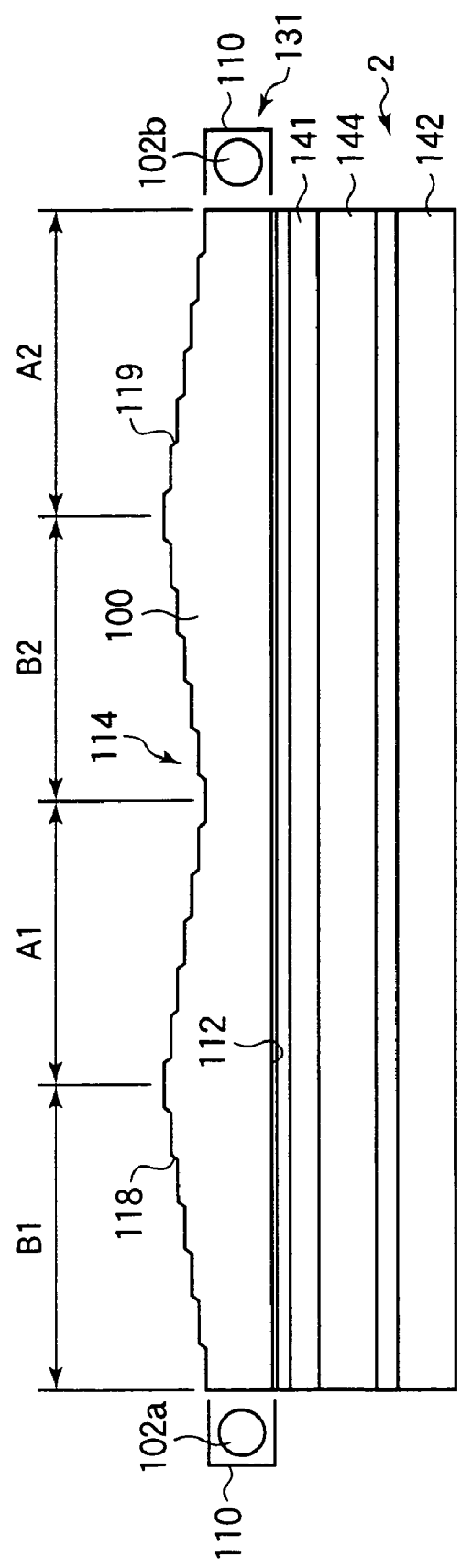
FIG. 65 is a view showing a sectional structure of an illumination device according to example 5-5 of the fifth embodiment of the invention.

Next, a liquid crystal display device according to example 5-5 of this embodiment will be described with reference to FIG. 65. FIG. 65 shows a sectional structure of the liquid crystal display device according to this example. As shown in FIG. 65, the liquid crystal display device according to this example is of a front light system, and includes a reflection type LCD panel 2 and a front light unit 131. A light guide plate 100 of the front light unit 131 includes four light-emitting areas B1, A1, B2 and A2 divided substantially in parallel to the tube axial direction of cold cathode fluorescent lamps 102a and 102b. The light-emitting area B1 is disposed at the side of the cold cathode fluorescent lamp 102a, and the light-emitting area A1 is disposed to be adjacent to the light-emitting area B1. The light-emitting area B2 is disposed to be adjacent to the light-emitting area A1, and the light-emitting area A2 is disposed at the side of the cold cathode fluorescent lamp 102b. The light-emitting areas B1, A1, B2 and A2 of the light guide plate 100 are integrally formed, and a slit is not formed at boundaries of the respective light-emitting areas B1, A1, B2 and A2. An opposite surface 114 of the light guide plate 100 is formed into a prism shape. The prism shape functions as a light extraction element for extracting light.

In the front light system, it is not wise to use a scattering layer 116 or the like as a light extraction element. This is because scattered light by the scattering layer 116 is not emitted in the direction vertical to the LCD panel 2, so that it becomes a cause of low contrast and low brightness. Besides, since light is directly emitted to an observer side as well, it becomes a cause of stray light and low contrast, and display quality is lowered. Accordingly, in this example, the light extraction element is made the prism shape. Besides, the light guide plate 100 and a polarizing plate 141 are bonded to each other, and are further bonded to the LCD panel 2, so that interface reflection is lowered and the display quality can be further improved.

EXAMPLE 5-6

Figure 66:
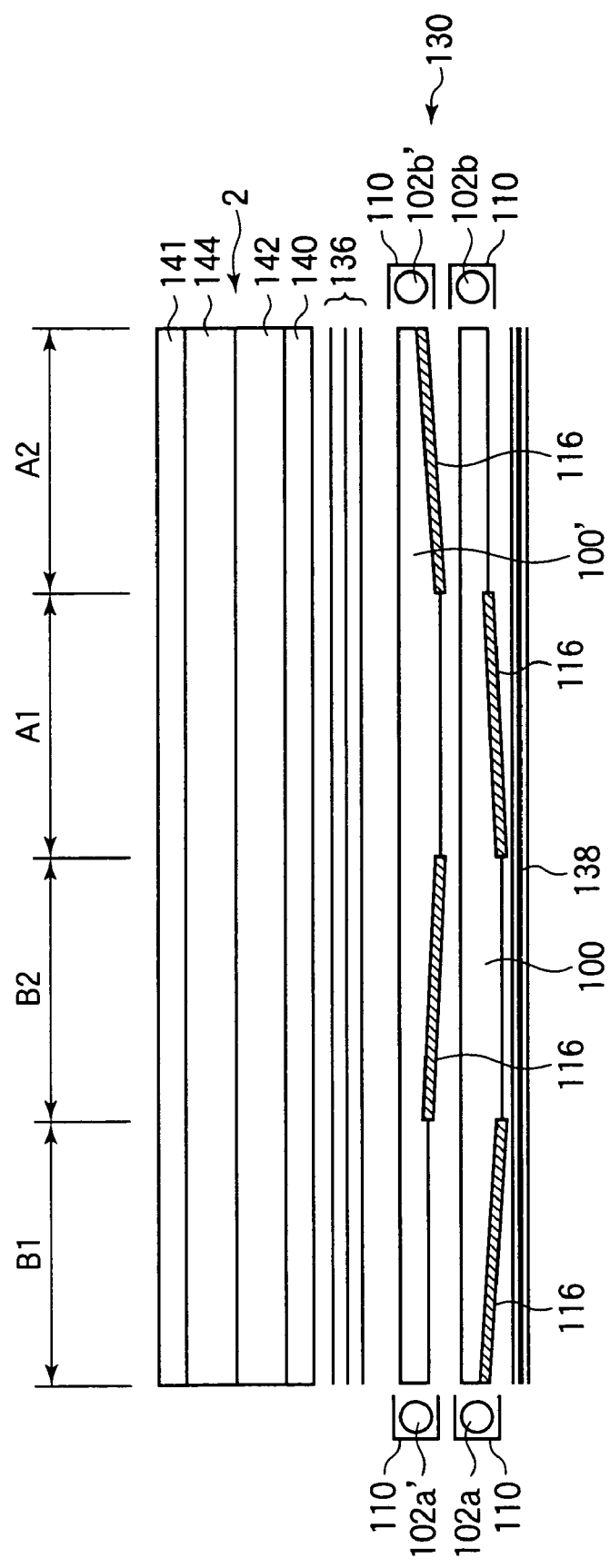
FIG. 66 is a view showing a sectional structure of an illumination device according to example 5-6 of the fifth embodiment of the invention.
Figure 67:
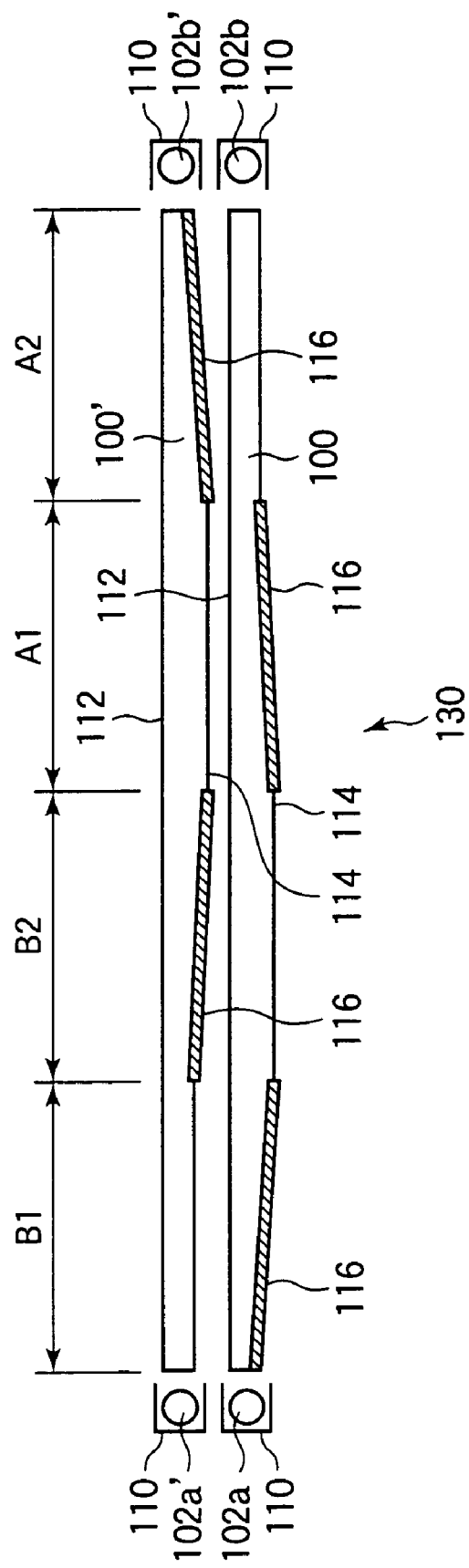
FIG. 67 is a view showing a sectional structure of the illumination device according to the example 5-6 of the fifth embodiment of the invention.

Next, an illumination device according to example 5-6 of this embodiment and a liquid crystal display device using the same will be described with reference to FIGS. 66 to 68. FIG. 66 shows a sectional structure of the liquid crystal display device according to this example. FIG. 67 shows a sectional structure of the illumination device according to this example. As shown in FIGS. 66 and 67, a backlight unit 130 according to this example includes two light guide plates 100 and 100' which are laminated and disposed. The light guide plates 100 and 100' include four light-emitting areas B1, B2, A1 and A2. A cold cathode fluorescent lamp 102a is disposed at one side end face (left end face in FIGS.

66 and 67) of the lower light guide plate 100 in the drawing. Besides, a cold cathode fluorescent lamp 102b is disposed at the other side end face (right end face in FIGS. 66 and 67) of the light guide plate 100. The light guide plate 100 includes a light guide area for guiding light from the cold cathode fluorescent lamps 102a and 102b. In the light guide plate 100 of the light-emitting area B1, an opposite surface 114 is inclined with respect to a light emission surface 112 so that the thickness at the side of the cold cathode fluorescent lamp 102a is thin and the thickness at the side of the cold cathode fluorescent lamp 102b is thick, and is formed into a wedge shape. Besides, in the light guide plate 100 of the light-emitting area A1, an opposite surface 114 is inclined with respect to the light emission surface 112 so that the thickness at the cold cathode fluorescent lamp 102a is thick and the thickness at the cold cathode fluorescent lamp 102b is thin, and is formed into a wedge shape. Scattering layers 116 as light scattering elements are formed on the opposite surfaces 114 of the light-emitting areas A1 and B1. The light guide plate 100 includes the light guide area for guiding light from the cold cathode fluorescent lamps 102a and 102b.

A cold cathode fluorescent lamp 102a' is disposed at one side end face (left end face in FIGS. 66 and 67) of the light guide plate 100' laminated and disposed at the liquid crystal display panel 2 side of the light guide plate 100. Besides, a cold cathode fluorescent lamp 102b' is disposed at the other side end face (right end face in FIGS. 66 and 67) of the light guide plate 100'. The light guide plate 100' includes a light guide area for guiding light from the cold cathode fluorescent lamps 102a' and 102b'. In the light guide plate 100' of the light-emitting area B2, an opposite surface 114 is inclined with respect to a light emission surface 112 so that the thickness at the side of the cold cathode fluorescent lamp 102a' is thin and the thickness at the side of the cold cathode fluorescent lamp 102b' is thick, and is formed into a wedge shape. Besides, in the light guide plate 100' of the light-emitting area A2, an opposite surface 114 is inclined with respect to the light emission surface 112 so that the thickness at the side of the cold cathode fluorescent lamp 102a' is thick and the thickness at the side of the cold cathode fluorescent lamp 102b' is thin, and is formed into a wedge shape. Scattering layers 116 as light scattering elements are formed on the opposite surfaces 114 of the areas A2 and B2.

In the light-emitting area B1 of the light guide plate 100, light guided from the side of the cold cathode fluorescent lamp 102b is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102b is not kept being guided in the light-emitting area B1, and is emitted to the outside of the light guide plate 100. On the other hand, although light guided from the side of the cold cathode fluorescent lamp 102a to the light-emitting area B1 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102a to the light-emitting area B1 is kept being guided in the light-emitting area B1, and is not emitted to the outside of the light guide plate 100 much. That is, the light-emitting area B1 of the light guide plate 100 has a relation of (extracted light quantity from the side of the cold cathode fluorescent lamp 102b/guided light quantity from the side of the cold cathode fluorescent lamp 102b)>(extracted light quantity from the side of the cold cathode fluorescent lamp 102a/guided light quantity from the side of the cold cathode fluorescent lamp 102a).

In the light-emitting area A1 of the light guide plate 100, light guided from the side of the cold cathode fluorescent lamp 102a is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102 is not kept being guided in the light-emitting area A1, and is emitted to the outside of the light guide plate 100. On the other hand, although light guided from the side of the cold cathode fluorescent lamp 102b to the light-emitting area A1 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102b to the light-emitting area A1 is kept being guided in the light-emitting area A1, and is not emitted to the outside of the light guide plate 100 much. That is, the light-emitting area A1 of the light guide plate 100 has a relation of (extracted light quantity from the side of the cold cathode fluorescent lamp 102a/guided light quantity from the side of the cold cathode fluorescent lamp 102a)>(extracted light quantity from the side of the cold cathode fluorescent lamp 102b/guided light quantity from the side of the cold cathode fluorescent lamp 102b).

In the light-emitting area B2 of the light guide plate 100', light guided from the side of the cold cathode fluorescent lamp 102b' is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102b' is not kept being guided in the light-emitting area B2, and is emitted to the outside of the light guide plate 100. On the other hand, although light guided from the side of the cold cathode fluorescent lamp 102a' to the light-emitting area B2 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102a' to the light-emitting area B2 is kept being guided in the light-emitting area B2, and is not emitted to the outside of the light guide plate 100 much. That is, the light-emitting area B2 of the light guide plate 100' has a relation of (extracted light quantity from the side of the cold cathode fluorescent lamp 102b'/guided light quantity from the side of the cold cathode fluorescent lamp 102b')>(extracted light quantity from the side of the cold cathode fluorescent lamp 102a'/guided light quantity from the side of the cold cathode fluorescent lamp 102a').

In the light-emitting area A2 of the light guide plate 100', light guided from the side of the cold cathode fluorescent lamp 102a' is scattered by the scattering layer 116 when it is reflected at the opposite surface 114, and the incident angle with respect to the light emission surface 112 becomes small by the wedge shape of the light guide plate 100 each time it is reflected at the opposite surface 114. Thus, most of the light guided from the side of the cold cathode fluorescent lamp 102a' is not kept being guided in the light-emitting area A2, and is emitted to the outside of the light guide plate 100. On the other hand, although light guided from the side of the cold cathode fluorescent lamp 102b' to the light-emitting area A2 is scattered by the scattering layer 116 when it is reflected at the opposite surface 114, the light is concentrated by the wedge shape of the light guide plate 100 each time it is reflected, and the incident angle with respect to the light emission surface 112 becomes large. Thus, the light guided from the side of the cold cathode fluorescent lamp 102b' to the light-emitting area A2 is kept being guided in the light-emitting area A2, and is not emitted to the outside of the light guide plate 100 much. That is, the light-emitting area B2 of the light guide plate 100' has a relation of (extracted light quantity from the side of the cold cathode fluorescent lamp 102a'/guided light quantity from the side of the cold cathode fluorescent lamp 102a')>(extracted light quantity from the side of the cold cathode fluorescent lamp 102b'/guided light quantity from the side of the cold cathode fluorescent lamp 102b').

The light-emitting areas B2 and A2 of the light guide plate 100 are non-light-extraction areas in which both the light from the side of the cold cathode fluorescent lamp 102a and the light from the side of the cold cathode fluorescent lamp 102b are hardly extracted. Besides, the light-emitting areas B1 and A1 of the light guide plate 100' are non-light-extraction areas in which both the light from the side of the cold cathode fluorescent lamp 102a' and the light from the side of the cold cathode fluorescent lamp 102b' are hardly extracted.

As stated above, in the light-emitting area A1 of the light guide plate 100, the light guided from the side of the cold cathode fluorescent lamp 102a is more extracted, and in the light-emitting area B1, the light guided from the side of the cold cathode fluorescent lamp 102b is more extracted. In the light-emitting area A2 of the light guide plate 100', the light guided from the side of the cold cathode fluorescent lamp 102a' is more extracted, and in the light-emitting area B2, the light guided from the side of the cold cathode fluorescent lamp 102b' is more extracted. Besides, when the light guide plate 100 and 100' are laminated and disposed, light is almost uniformly extracted in all the light-emitting areas B1, A1, B2 and A2.

Figure 68:
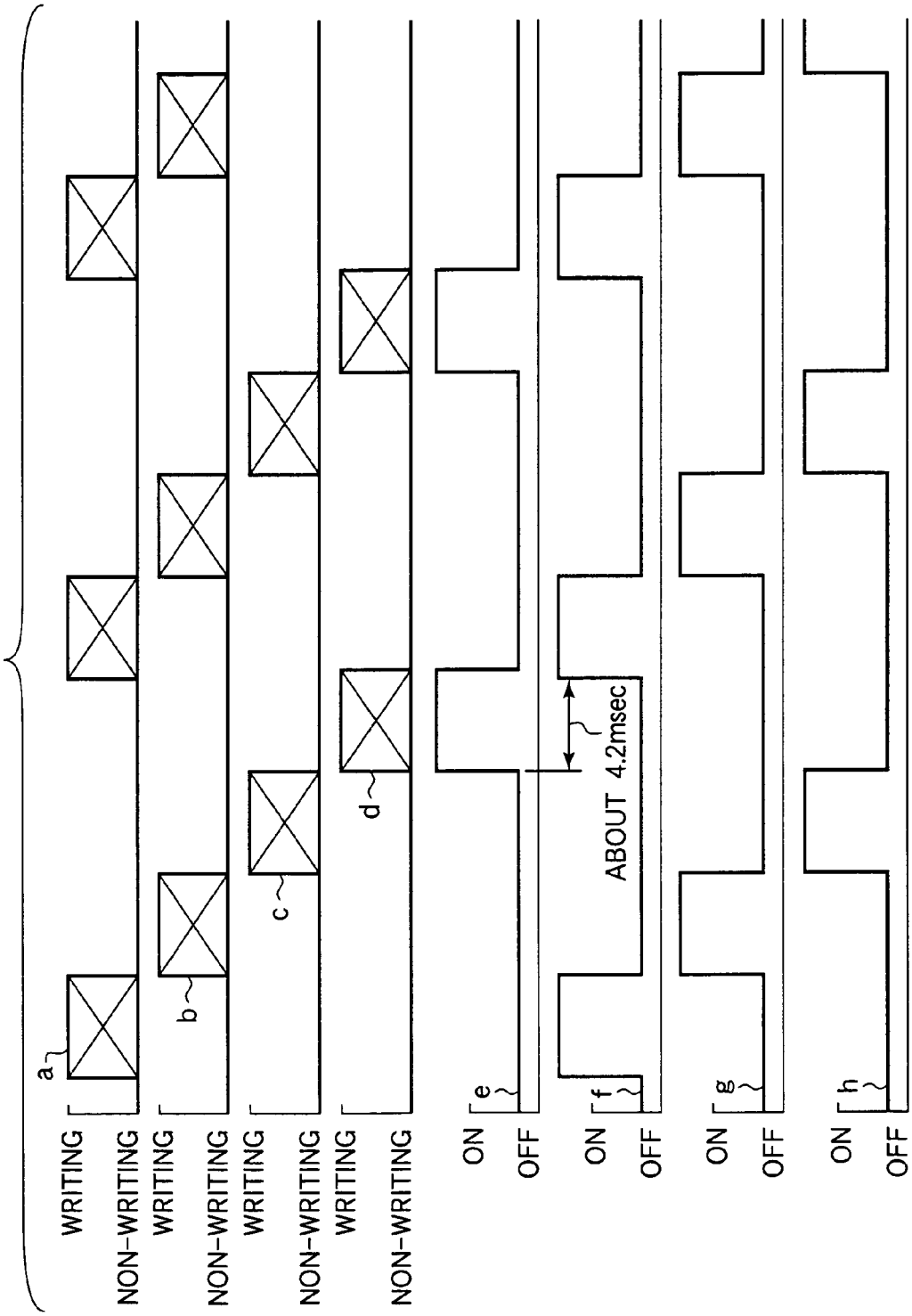
FIG. 68 is a view showing the illumination device according to the example 5-6 of the fifth embodiment of the invention and a liquid crystal display device using the same.

FIG. 68 shows a driving method of the illumination device according to this example and the liquid crystal display device using the same. The horizontal axis direction indicates time, and the vertical axis direction indicates a writing state (writing/non-writing) of gradation data and a blinking state (ON/OFF) of the backlight unit 130. A waveform "a" indicates a writing state of gradation data in the light-emitting area B1, and a waveform "b" indicates a writing state of gradation data in the area B2. A waveform "c" indicates a writing state of gradation data in the area A1, and a waveform "d" indicates a writing state of gradation data in the area A2. Besides, a waveform "e" indicates a blinking state of the cold cathode fluorescent lamp 102b, and a waveform "f" indicates a blinking state of the cold cathode fluorescent lamp 102b'. A waveform "g" indicates a blinking state of the cold cathode fluorescent lamp 102a, and a waveform "h" indicates a blinking state of the cold cathode fluorescent lamp 102a'.

As shown in FIG. 68, a light source control part 132 (not shown in FIG. 66) synchronizes with a latch pulse signal LP and causes the cold cathode fluorescent lamps 102a, 102b, 102a' and 102b' to emit light for a specified time at a blinking frequency equal to a frame frequency (for example, 60 Hz). Besides, the light source control part 132 causes a timing at which the light emission brightness of the cold cathode fluorescent lamp 102b is made maximum to be different from a timing at which the light emission brightness of the cold cathode fluorescent lamp 102b' is made maximum by about 4.2 msec (¼ period). Similarly, a timing at which the light emission brightness of the cold cathode fluorescent lamp 102b' is made maximum is different from a timing at which the light emission brightness of the cold cathode fluorescent lamp 102a is made maximum by about 4.2 msec, and a timing at which the light emission brightness of the cold cathode fluorescent lamp 102a is made maximum is different from a timing at which the light emission brightness of the cold cathode fluorescent lamp 102a' is made maximum by about 4.2 msec. Besides, a timing at which the light emission brightness of the cold cathode fluorescent lamp 102a' is made maximum is different from a timing at which the light emission brightness of the cold cathode fluorescent lamp 102b is made maximum by about 4.2 msec.

After a specified time has passed since gradation data was written into pixels of the area B1, the cold cathode fluorescent lamp 102b for causing the light-emitting area B1 to emit light is turned on. Besides, after the cold cathode fluorescent lamp 102b is turned off, gradation data is written into pixels of the area B1. After a specified time has passed since gradation data was written into pixels of the area B2, the cold cathode fluorescent lamp 102b' for causing the light-emitting area B2 to emit light is turned on. Besides, after the cold cathode fluorescent lamp 102b' is turned off, gradation data is written into pixels of the area B2. Similarly, a specified time has passed since gradation data was written into pixels of the area A1, the cold cathode fluorescent lamp 102a for causing the light-emitting area A1 to emit light is turned on. Besides, after the cold cathode fluorescent lamp 102a is turned off, gradation data is written into pixels of the area A1. A specified time has passed since gradation data was written into pixels of the area A2, the cold cathode fluorescent lamp 102a' for causing the light-emitting area A2 to emit light is turned on. Besides, after the cold cathode fluorescent lamp 102a' is turned off, gradation data is written into pixels of the area A2.

As stated above, the cold cathode fluorescent lamp for illuminating the area into which the gradation data is written is turned off. In the liquid crystal display device, since it takes a time of several msec to several tens msec until a liquid crystal molecule is inclined at a specified inclination angle from the writing of the gradation data into the pixel, when a time from the writing of the gradation data of a certain area to the lighting of the cold cathode fluorescent lamp for illuminating the area is secured to the extent possible, more excellent display quality of a motion picture can be obtained. Thus, in this example, immediately after the cold cathode fluorescent lamp 102a is turned off, the writing of the gradation data is started.

According to this example, the same effect as the example 5-1 can be obtained. Besides, in this embodiment, contrary to the example 5-1, a multi-scan type liquid crystal display device is not required, the scan-type illumination device and the liquid crystal display device can be realized without complicating the driving circuit. Incidentally, in this example, although the light guide plate 100 and 100' include four divided light-emitting areas A1, A2, B1 and B2, the number of divided areas is arbitrary.

According to this embodiment, it is possible to realize the scan type illumination device and the liquid crystal display device, which has the simple structure, is small, thin and light, and has uniform brightness and color. Besides, according to this embodiment, the liquid crystal display device without contour blurring and excellent in the motion picture quality can be realized.

Sixth Embodiment

An illumination device according to a sixth embodiment of the invention and a liquid crystal display device using the same will be described with reference to FIGS. 69 to 73. This embodiment is characterized by a polarizing plate bonded to a liquid crystal display device or an illumination device used for that, and is characterized by a manufacturing method in a case where the polarizing plate is bonded to a panel surface of the liquid crystal display device or to a light guide plate of the illumination device.

In general, a transmission liquid crystal display device is constructed such that transmissivity of light incident from the rear surface of a liquid crystal panel is modulated in a liquid crystal layer and the light is emitted to the panel surface, and a backlight unit as an illumination device is disposed at the rear side of the liquid crystal panel. On the other hand, a reflection liquid crystal display device for a mobile use is constructed such that outside light is incident from the surface of a liquid crystal panel, is made to pass through a liquid crystal layer and to be reflected at a reflection electrode, is modulated in the liquid crystal layer and is emitted to the panel surface.

In general, in the reflection liquid crystal display device, as an auxiliary illumination light source at the time of less outside light, a front light unit (for example, see the example 5-5 (FIG. 65) of the fifth embodiment) is disposed at the side of a liquid crystal panel surface. The front light unit includes a transparent plate-like light guide plate disposed at the side of the liquid crystal panel surface, and a light source disposed at at least the side of one side surface of the light guide plate. A prism is formed stepwise at the surface side (outside light incident side) of the light guide plate at a small pitch of, for example, 1 mm or less, and incident light from a light source at the side of the light guide plate is reflected, refracted and transmitted in the in-plane direction, and almost vertical light is emitted to the whole surface of the liquid crystal panel surface. Since the light guide plate is required to have high transmissivity, to be easily molded, and to be light, the same acryl material as the light guide plate for the backlight unit is often used.

A polarizing plate is disposed between the light emission surface of the light guide plate at the side of the liquid crystal panel surface and the liquid crystal panel surface. When this polarizing plate is bonded to the light emission surface of the light guide plate at the side of the liquid crystal panel surface, it is possible to absorb unnecessary light incident on the liquid crystal panel surface from the light guide plate at a relatively large incident angle, to suppress the degradation (black floating or the like) of picture quality, and to obtain a high contrast display.

Since the front light unit is mainly used for a small liquid crystal display device, the light guide plate is required to be light and small. Thus, the light guide plate is formed of a very thin plate having a thickness of about 1 mm and has such a structure that it is easily deformed. On the other hand, in the polarizing plate bonded to the light guide plate, a heat shrinkage of 0.3% to 0.5% occurs under a high temperature. Thus, there arises a problem that when the polarizing plate is heat shrunk under a high temperature, the light guide plate is deformed. For example, in the case where a liquid crystal display device is left in, for example, an automobile on a summer day and is put under a high temperature on the day, the polarizing plate is shrunk and bends the light guide plate, and even if it is again put in the place of room temperature, the shrinkage is kept as it is, and therefore, the deformation of the light guide plate remains. Although a protection cover to prevent the surface prism of the light guide plate from being soiled is provided at the outside light incident side of the light guide plate of the front light unit, when the light guide plate is bent and comes in contact with this protection cover, both are rubbed and the light guide plate is scratched, and a bad influence is given on the display quality to cause uneven brightness or the like. In order to avoid this, when a distance between the light guide plate and the protection cover is previously made long, a gap of about 5 mm is required, which increases the thickness of the device. Besides, when the light guide plate itself is deformed, the center of the light guide plate expands to become a crest, circular moire fringes are produced and the display quality is degraded.

In order to solve this problem, in this embodiment, it has been found that the heat shrinkage of the polarizing plate is irreversible, and the heat shrinkage is saturated at 0.3 to 0.5%, and therefore, the polarizing plate is previously subjected to heat treatment to cause irreversible shrinkage and then used. The heat treatment is performed in such a way that the polarizing plate is left in a specified temperature environment for a specific time. At this time, when the heat treatment temperature is made 100° C. or higher, the degradation of the polarizing plate itself occurs so that the degree of polarization is rapidly lowered and the contrast of a display is lowered, and accordingly, attention must be paid. Besides, when the heat treatment temperature becomes 40° C. or less, since the progress of the heat shrinkage of the polarizing plate becomes slow, it takes a long time to perform the heat treatment, and attention must be paid in an actual manufacture process.

When the polarizing plate is subjected to a suitable heat treatment while attention is given to such a range of the heat treatment temperature, even in the case where the liquid crystal display device is left under a high temperature, the deformation quantity of the light guide plate can be made small, and accordingly, the distance between the light guide plate and the protection cover is made small, and the device volume can be made small. Besides, since the deformation of the light guide plate can be made small, the degradation of the display quality due to the moire fringes can also be made slight. Further, when the environment temperature is returned to room temperature, the deformation of the light guide plate is returned to the original, so that the display quality is also not damaged.

Figure 69:
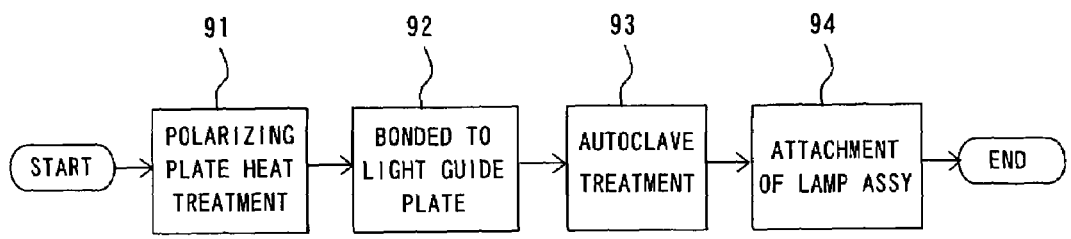
FIG. 69 is a view showing a manufacture method of an illumination device according to a sixth embodiment of the invention.

Hereinafter, a description will be given of specific examples. FIG. 69 shows a manufacturing method of an illumination device according to this embodiment. As shown in FIG. 69, first, at a polarizing plate heat treatment step 91, a polarizing plate is subjected to heat treatment in a constant temperature bath at a specified temperature. Thereafter, the temperature is returned to the room temperature, and then a bonding step 92 to the light guide plate is started, and the polarizing plate is bonded to the surface of the light guide plate by a bonding machine. Next, an autoclave treatment is performed (autoclave treatment step 93). Next, at an attachment step 94 of a lamp assembly, a light source and the like are attached to the light guide plate, and a front light is completed.

Next, conditions and the like for suitably carrying out the polarizing plate heat treatment step 91 will be described in detail. First, an examination is carried out on a change of wavelength (hereinafter referred to as a cut wavelength shift amount) at which transmissivity of the polarizing plate in an absorption axis becomes 50% and a change of shrinkage percentage according to a heat treatment temperature and a heat treatment time (see FIG. 70). It is known that the use upper temperature of a polarizing plate recommended by a manufacture maker is usually about 70° C., and when it is exposed to a temperature higher than that, the deterioration of the polarizing plate is accelerated. The deterioration of the polarizing plate is the deterioration of the degree of polarization, and the degree of deterioration is found by measuring the cut wavelength in the absorption axis and examining the shift (see FIG. 71).

Figure 70:
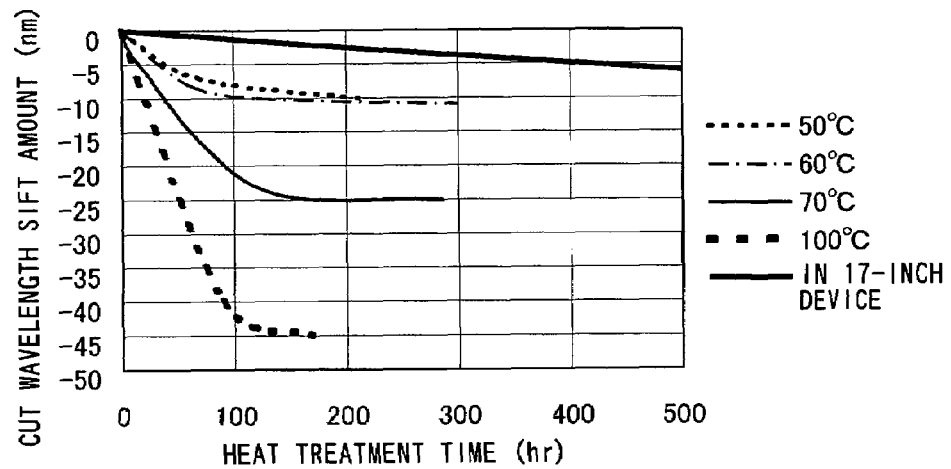
FIG. 70 is a view showing a cut wavelength change of a polarizing plate absorption axis with respect to a heat treatment time in the heat treatment of a polarizing plate in the illumination device according to the sixth embodiment of the invention.

FIG. 70 shows the cut wavelength change in the polarizing plate absorption axis with respect to the heat treatment time in the heat treatment of the polarizing plate in the illumination device according to this embodiment. The horizontal axis indicates the heat treatment time (hr), and the vertical axis indicates the cut wavelength shift amount (nm). In the drawing, a broken line having a short pitch indicates data obtained when the heat treatment temperature to the polarizing plate is 50° C. Similarly, an alternate long and short dash line indicates data obtained when the heat treatment temperature is 60° C., a thin solid line indicates data obtained when the heat treatment temperature is 70° C., and a broken line having a long pitch indicates data obtained when the heat treatment temperature is 100° C. Besides, a thick solid line indicates the cut wavelength shift amount of a polarizing plate used for a 17-inch liquid crystal display device, which is comparative data obtained for a case where the polarizing plate not subjected to heat treatment is bonded to a light guide plate, and is denoted by "in 17-inch device" in the drawing.

As shown in FIG. 70, the cut wavelength shift amount of "in 17-inch device" indicated by the thick solid line is −6 nm at the heat treatment of 500 hr, and −11 nm at the heat treatment of 1000 hr. As compared with this, in the polarizing plate subjected to heat treatment at a temperature of 50° C. or higher, as the heat treatment temperature becomes high, the cut wavelength shift amount in the same heat treatment time is increased, and the deterioration is accelerated. Here, it is understood that when the heat treatment temperature is 70° C. or lower, and the heat treatment time does not exceed 50 hr, the cut wavelength shift amount is −11 nm or less, and is equivalent to the degradation of 1000 hr in the comparative data of "in 17-inch device". The time of 1000 hr is 3% of the lifetime of the 17-inch liquid crystal display device, and is put in an allowable range in terms of the quantity of deterioration at the polarizing plate heat treatment.

Figure 71:
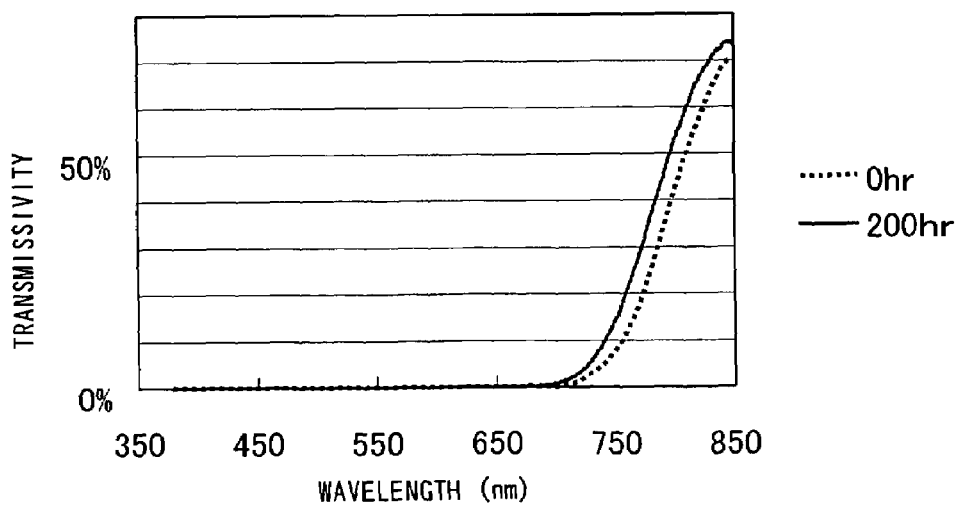
FIG. 71 is a view showing a transmissivity characteristic of the polarizing plate in an absorption axis direction in a case where the polarizing plate is subjected to heat treatment at 70° C. in the illumination device according to the sixth embodiment of the invention.

FIG. 71 shows a transmission characteristic of the polarizing plate in an absorption axis direction in a case where the polarizing plate is subjected to heat treatment at 70° C. The horizontal axis indicates a wavelength (mm), and the vertical axis indicates a transmissivity (%). In the drawing, a solid line indicates a transmission characteristic in a case where the heat treatment time is 2000 hours, and a broken line indicates a transmission characteristic in a case where the heat treatment time is 0 hour (that is, heat treatment is not performed). As compared with the case where the heat treatment is not performed, the cut wavelength of the polarizing plate in the absorption axis is lowered from about 810 nm to about 785 nm.

Figure 72:
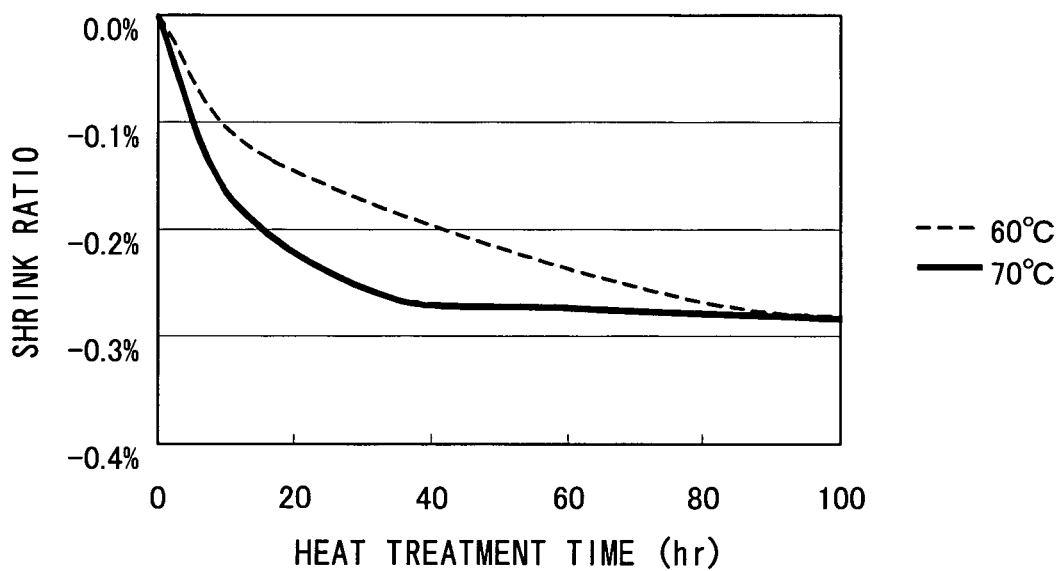
FIG. 72 is a view showing a shrinkage ratio of the polarizing plate with respect to the heat treatment time in the illumination device according to the sixth embodiment of the invention.

FIG. 72 shows a change of shrinkage percentage of the polarizing plate with respect to a heat treatment time in the illumination device according to this embodiment. The horizontal axis indicates a heat treatment time (hr), and the vertical axis indicates a shrinkage percentage. A solid line in the drawing indicates a case where the heat treatment temperature is 70° C., and a broken line indicates a case where the heat treatment temperature is 60° C. With respect to the shrinkage percentage of the polarizing plate, the lengths of the horizontal and vertical sides of the polarizing plate are measured before and after the heat treatment, and an average of the changes with respect to the original length is calculated. As the heat treatment temperature becomes high, the shrinkage of the polarizing plate is accelerated, and therefore, in this example, the changes at the heat treatment temperatures of 60° C. and 70° C. are indicated. Although the heat shrinkage percentages of both become identical in the case where the heat treatment time is 100 hr or more, the rate of the heat shrinkage is faster when the heat treatment temperature is 70° C., and the shrinkage of the polarizing plate becomes almost saturated by the treatment of 40 to 50 hr. Also with respect to the cut wavelength shift amount in the polarizing plate absorption axis shown in FIG. 70, since it is apparent as described above that the heat treatment time of 50 hr or less is preferable, it is understood that the heat treatment is suitable when the heat treatment temperature is 70° C. Besides, from FIG. 72, when the heat treatment temperature is made 70° C., the heat treatment time of 40 hr in which the heat shrinkage is almost saturated is desirable.

Then, the polarizing plate subjected to the heat treatment at the heat treatment temperature of 70° C. and the heat treatment time of 40 hr is bonded to the light guide plate, and the deformation quantity of the light guide plate is measured using a thermal shock test machine. Specifically, four sides of a front light unit in which light sources are attached to ends of the light guide plate to which the polarizing plate is bonded, are fixed onto the liquid crystal panel and a thermal shock test of a temperature of 60° C. for 25 minutes and a temperature of −20° C. for 35 minutes is performed. With respect to the deformation quantity of the light guide plate, a distance between a most raised portion of the center of the light guide plate and an edge of the light guide plate is measured and is made the deformation quantity.

Figure 73:
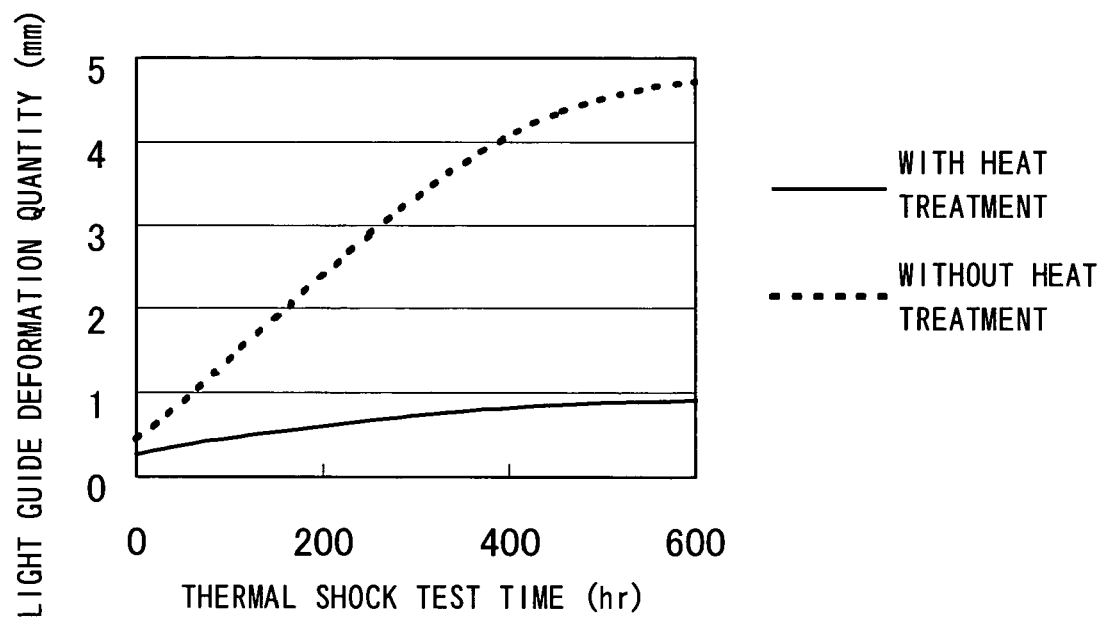
FIG. 73 is a view showing a relation between a thermal shock test time and a light guide plate deformation quantity in the illumination device according to the sixth embodiment of the invention.
Figure 74:
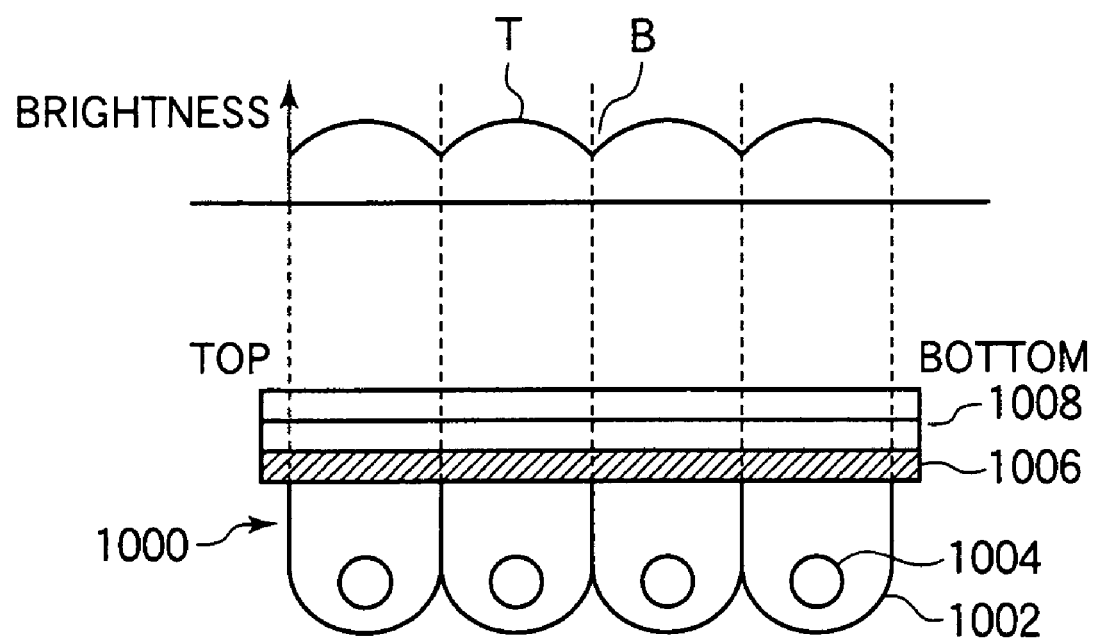
FIG. 74 is a view showing a section obtained by cutting a conventional direct type backlight unit, which is used for a TFT-LCD to support a motion picture display, along a plane orthogonal to a tube axial direction, and a brightness distribution of illumination light from the backlight unit.
Figure 75:
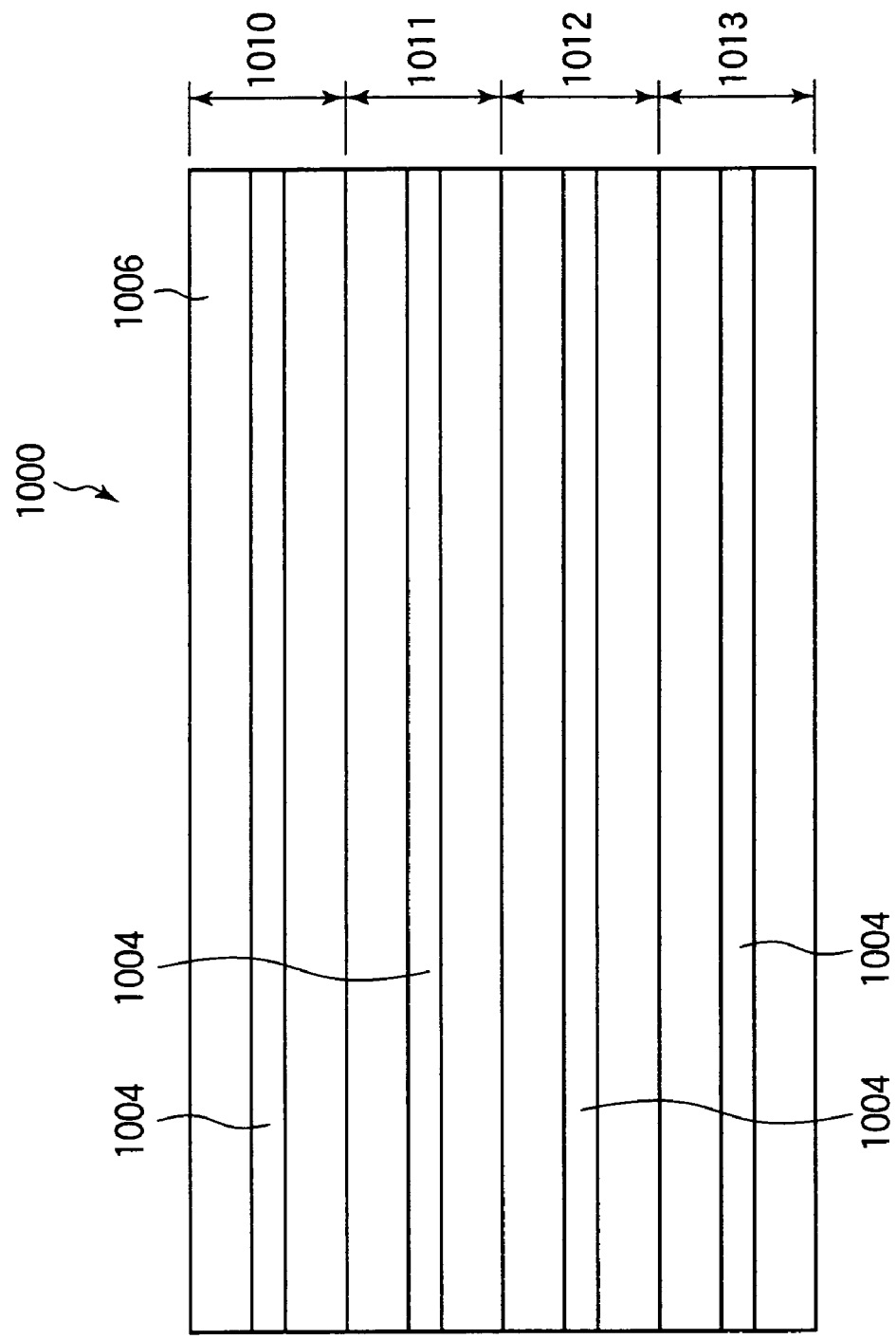
FIG. 75 is a view showing a structure of the conventional direct type backlight unit, which is used for the TFT-LCD to support the motion picture display, viewed from the side of a display area.
Figure 76:
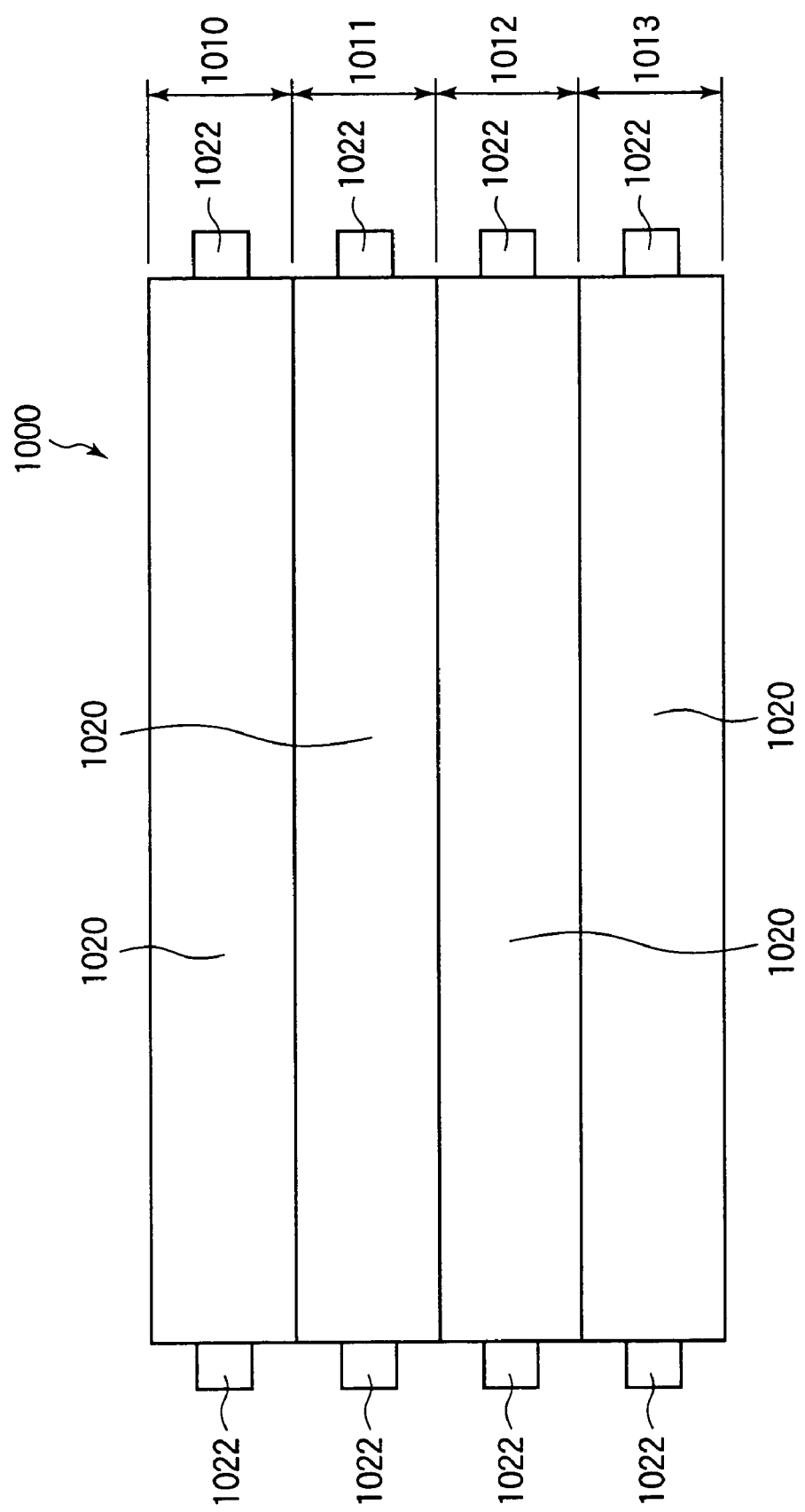
FIG. 76 is a view showing a structure of a sidelight type backlight unit as another conventional scan type illumination device.

FIG. 73 shows a relation between a thermal shock test time and a light guide plate deformation quantity in the illumination device according to this embodiment. The horizontal axis indicates a thermal shock test time (hr) and the vertical axis indicates a deformation quantity (mm) of a light guide plate. In the drawing, a solid line indicates a polarizing plate subjected to heat treatment, and a broken line indicates a polarizing plate not subjected to heat treatment.

In the conventional polarizing plate (broken line) which is not subjected to the heat treatment, the deformation quantity is 4.6 mm when the thermal shock test time is 600 hr, and on the other hand, in the polarizing plate (solid line) subjected to the heat treatment, the deformation quantity is 1.0 mm when the shock test time is 600 hr, and the deformation can be suppressed to 39% of the related art.

As described above, according to this embodiment, the polarizing plate is subjected to a suitable heat treatment to cause irreversible heat shrinkage in advance and then, it is bonded to a light guide plate, and a front light unit is manufactured. Especially, it is preferable that a heat shrinkage quantity $\alpha$ is in a range of $0 < \alpha \leq 0.3\%$. By doing so, even in the case where the liquid crystal display device is left under a high temperature, the deformation quantity of the light guide plate can be greatly suppressed. Accordingly, the distance between the light guide plate and the protection cover can be shortened by 1 to 2 mm, and the device volume can be made small. Besides, since the deformation quantity of the light guide plate is small, the moire fringes become slight, and when the environmental temperature is returned to the room temperature, the deformation is removed and the shape returns to an original one, and therefore, the display quality is also not damaged.

Incidentally, in this embodiment, although the description has been given of the case, as an example, where the polarizing plate is bonded to the light emission surface of the light guide plate of the front light unit at the side of the liquid crystal panel surface, in addition to this case, a desired effect can be obtained also when this embodiment is applied to a case where the light guide plate is bonded to the light guide plate at the side of the outside light incident surface, a case where it is bonded to the liquid crystal panel surface, or a case where it is bonded to the light guide plate of the backlight unit.

Besides, the structure of the polarizing plate will be specifically described. As the polarizing plate, there is, for example, a polarizing film single body in which polyvinyl alcohol (PVA) is drawn and is colored with iodine, a polarizing plate having such a structure that for example, triacetyl cellulose (TAC) films as protection films are bonded to both sides of the polarizing film, or a polarizing plate in which retardation films having different linear expansion coefficients are laminated. This embodiment can be applied to all of the above polarizing plates.

The invention is not limited to the above embodiment, but can be variously modified.

For example, in the above embodiment, although the active matrix type liquid crystal display device is exemplified, the invention is not limited to this, but can also be applied to a simple matrix liquid crystal display device.

Besides, in the above embodiment, although the description has been given of the case where the light-emitting area is divided into four areas, the invention is not limited to this, and the area can be divided into an arbitrary number of areas.

Further, in the above embodiment, although the TN mode liquid crystal display device is exemplified, the invention is not limited to this, but can be applied to another liquid crystal display device such as an MVA mode one or an IPS mode one.

Seventh Embodiment

A liquid crystal display device according to a seventh embodiment of the invention will be described with reference to FIGS. 77 to 85. This embodiment relates to the liquid crystal display device including a vertical aligned liquid crystal display area.

Figure 84:
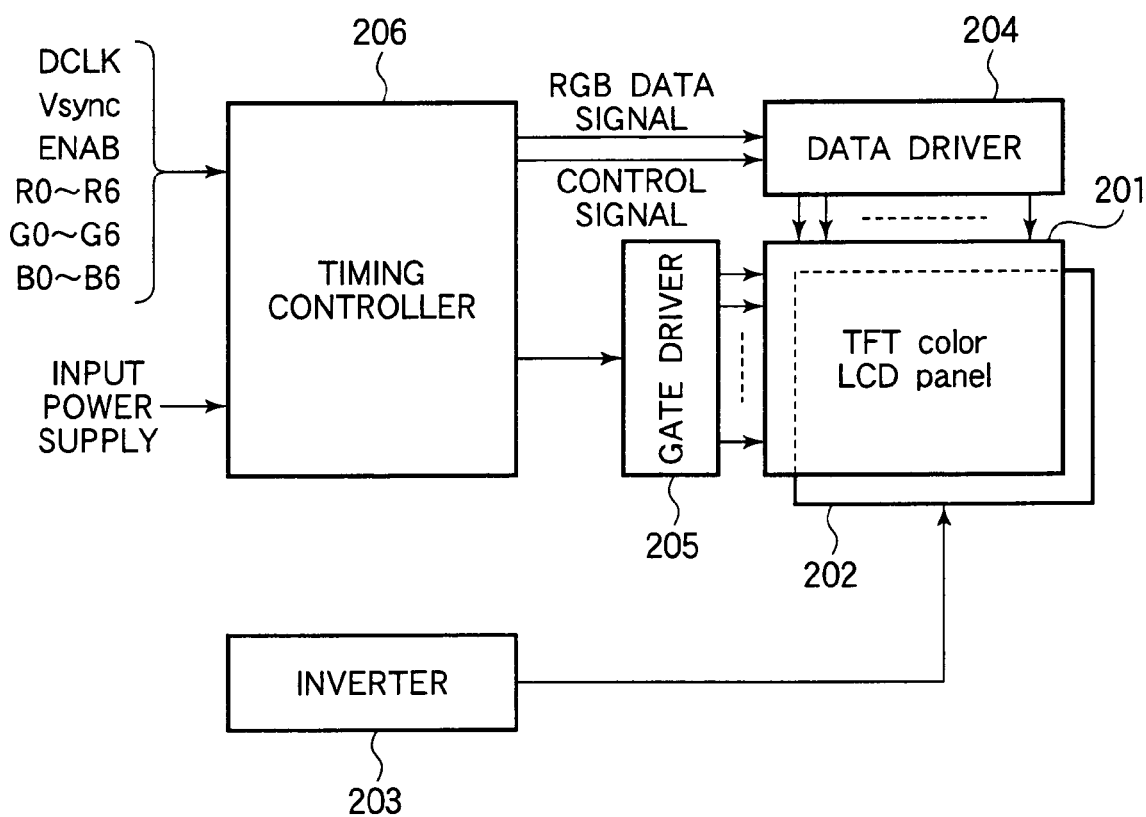
FIG. 84 is a schematic sectional view showing a main part of an example of a conventional liquid crystal display device.

FIG. 84 is a schematic structural view showing a main part of an example of a conventional liquid crystal display device (for example, see patent document 8). In FIG. 84, reference numeral 201 denotes an active matrix type color liquid crystal display panel in which thin film transistors (TFTS) are used as switching elements and which operates in a vertical alignment mode; 202, a backlight as a light source of the color liquid crystal display panel; and 203, an inverter as a power source of the backlight 202.

Reference numeral 204 denotes a data driver (data line driving circuit) for outputting RGB signals to data lines formed in the color liquid crystal display panel 201; and 205, a gate driver (gate line driving circuit) for outputting gate signals (scanning signals) to gate lines formed in the color liquid crystal display panel 201.

Reference numeral 206 denotes a timing controller which receives a dot clock DCLK given from a display signal source (for example, a computer), a vertical synchronization signal Vsync, a display signal synchronization signal (display signal effective area specified signal) ENAB and RGB data signals R0 to R6, G0 to G6, and B0 to B6, and supplies various signals necessary for driving the color liquid crystal display panel 201 to the data driver 204 and the gate driver 205.

Figure 85:
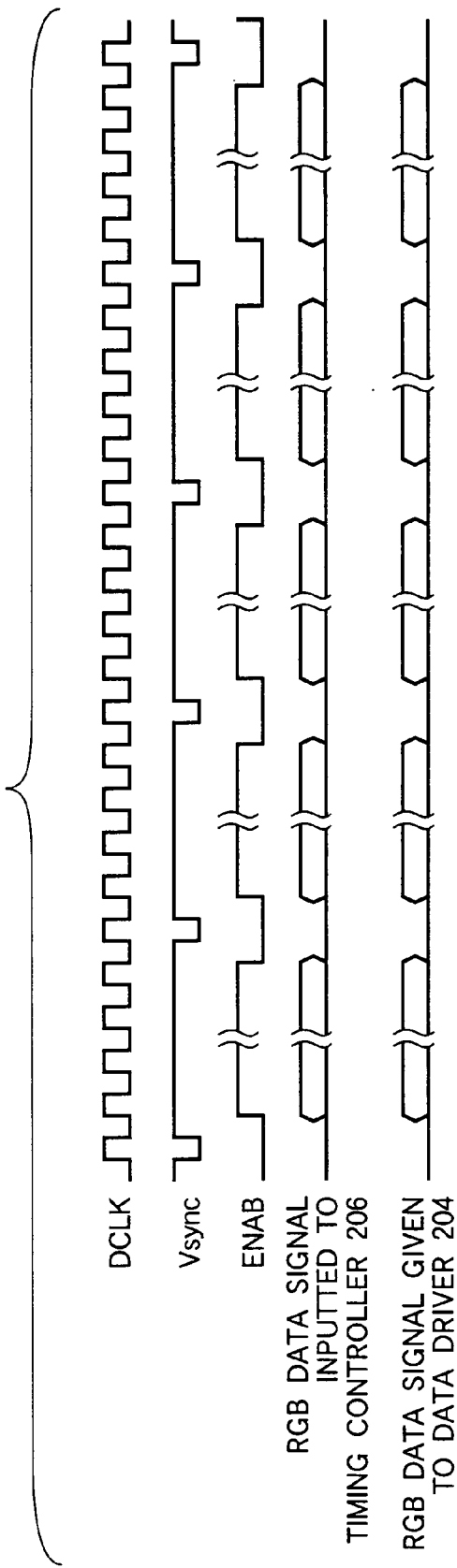
FIG. 85 is a timing chart showing an operation of the conventional liquid crystal display device shown in FIG. 84.

FIG. 85 is a timing chart showing the operation of the conventional liquid crystal display device shown in FIG. 84, and shows the dot clock DCLK inputted to the timing controller 206, the vertical synchronization signal Vsync inputted to the timing controller 206, the display signal synchronization signal ENAB inputted to the timing controller 206, the RGB data signal inputted to the timing controller 206, and the RGB data signal given from the timing controller 206 to the data driver 204.

In the conventional liquid crystal display device shown in FIG. 84, the RGB data signals R0 to R6, G0 to G6 and B0 to B6 given from the display signal source are captured in the timing controller 206 in synchronization with the display signal synchronization signal ENAB, are subjected to timing adjustment and are supplied to the data driver 204.

In the conventional liquid crystal display device shown in FIG. 84, the vertical aligned liquid crystal display panel operating in the vertical alignment mode is provided as the color liquid crystal display panel 201, and the vertical aligned liquid crystal display panel has a problem that when a picture plane is changed, in the case where an "edge" exists in the gradation displayed on a former picture plane (for example, in the case where the background is black and a gray object having an "edge" is displayed), and a next screen is a white display, a holding type afterimage is apt to occur.

The holding type afterimage occurs in such a way that in a portion where a picture plane is changed from an intermediate gradation (for example, gray) to white, when the picture plane is changed, a state in which the alignment of a liquid crystal is disturbed is held as it is, and a difference is seen against a portion where black having a uniform alignment is changed to white.

In view of the above pint, this embodiment has an object to provide a liquid crystal display device in which even in the case where a vertical aligned liquid crystal display area is included, a holding type afterimage is made not to occur easily, and a high quality image display can be carried out.

This embodiment is a liquid crystal display device including a vertical aligned liquid crystal display area, and includes a black display control part which can cause a specified area of a screen to produce a black display at a time of driving of the liquid crystal display area.

According to this embodiment, at the time of the driving of the liquid crystal display area, since the picture plane can be made to produce the black display by the black display control part, the alignment of the liquid crystal can be made uniform. Accordingly, the holding type afterimage can be made not to occur easily.

Hereinafter, examples 7-1 to 7-3 of this embodiment will be described with reference to FIGS. 77 to 83. Incidentally, in FIGS. 77, 80 and 82, portions corresponding to those of FIG. 84 are denoted by the same symbols and the duplicate description will be omitted.

EXAMPLE 7-1

Figure 77:
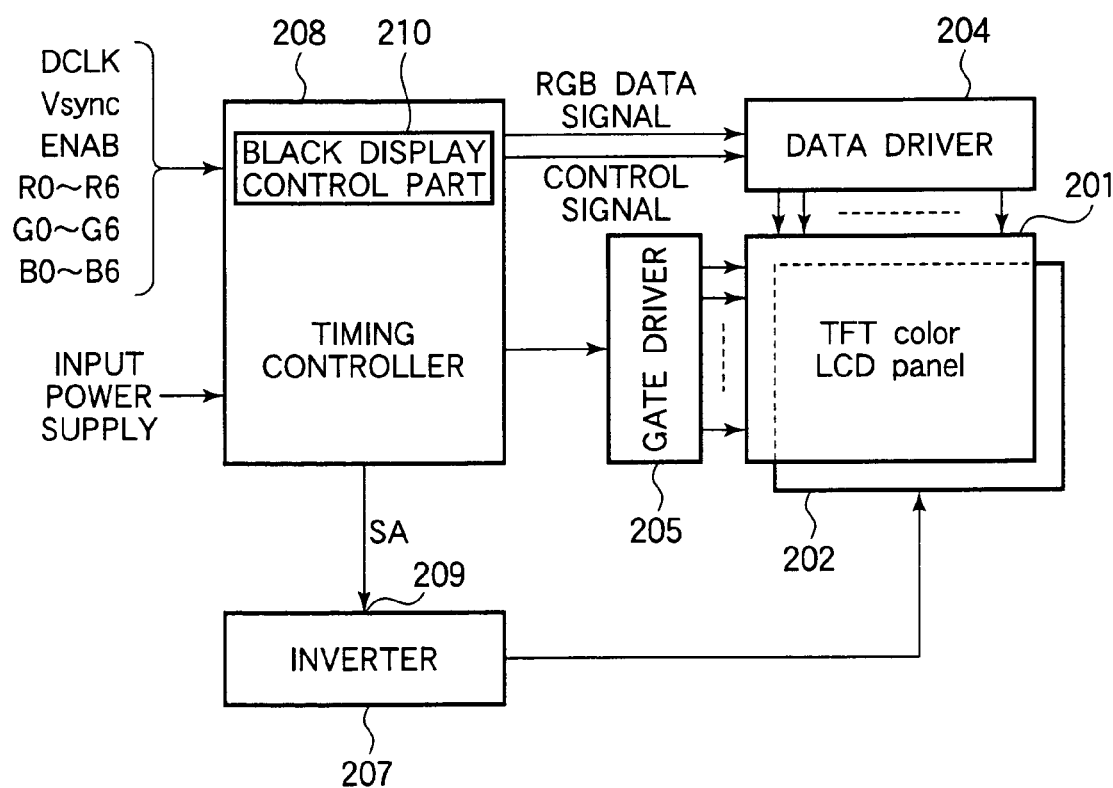
FIG. 77 is a schematic sectional view showing a main part of example 7-1 of a seventh embodiment of the invention.

FIG. 77 is a schematic structural view showing a main part of example 7-1. The example 7-1 includes an inverter 207 and a timing controller 208 which are different in structure from the inverter 203 and the timing controller 206 included in the conventional liquid crystal display device shown in FIG. 84, and the other structure is the same as the conventional liquid crystal display device shown in FIG. 84.

The inverter 207 includes a lighting control terminal 209, and in a period in which the lighting control terminal 209 is made to have an L level, a lighting state of a backlight 202 is kept, and in a period in which the lighting control terminal 209 is made to have an H level, the backlight 202 is put in a non-lighting state. A lighting control signal SA is given to the lighting control terminal 209 from the timing controller 208.

The timing controller 208 includes a black display control part 210, supplies RGB data signals R0 to R6, G0 to G6 and B0 to B6 outputted from the black display control part 210 to a data driver 204, and outputs a black display control signal generated by the black display control part 210 as the lighting control signal SA, and the other part of the timing controller is the same as the conventionally known structure.

Figure 78:
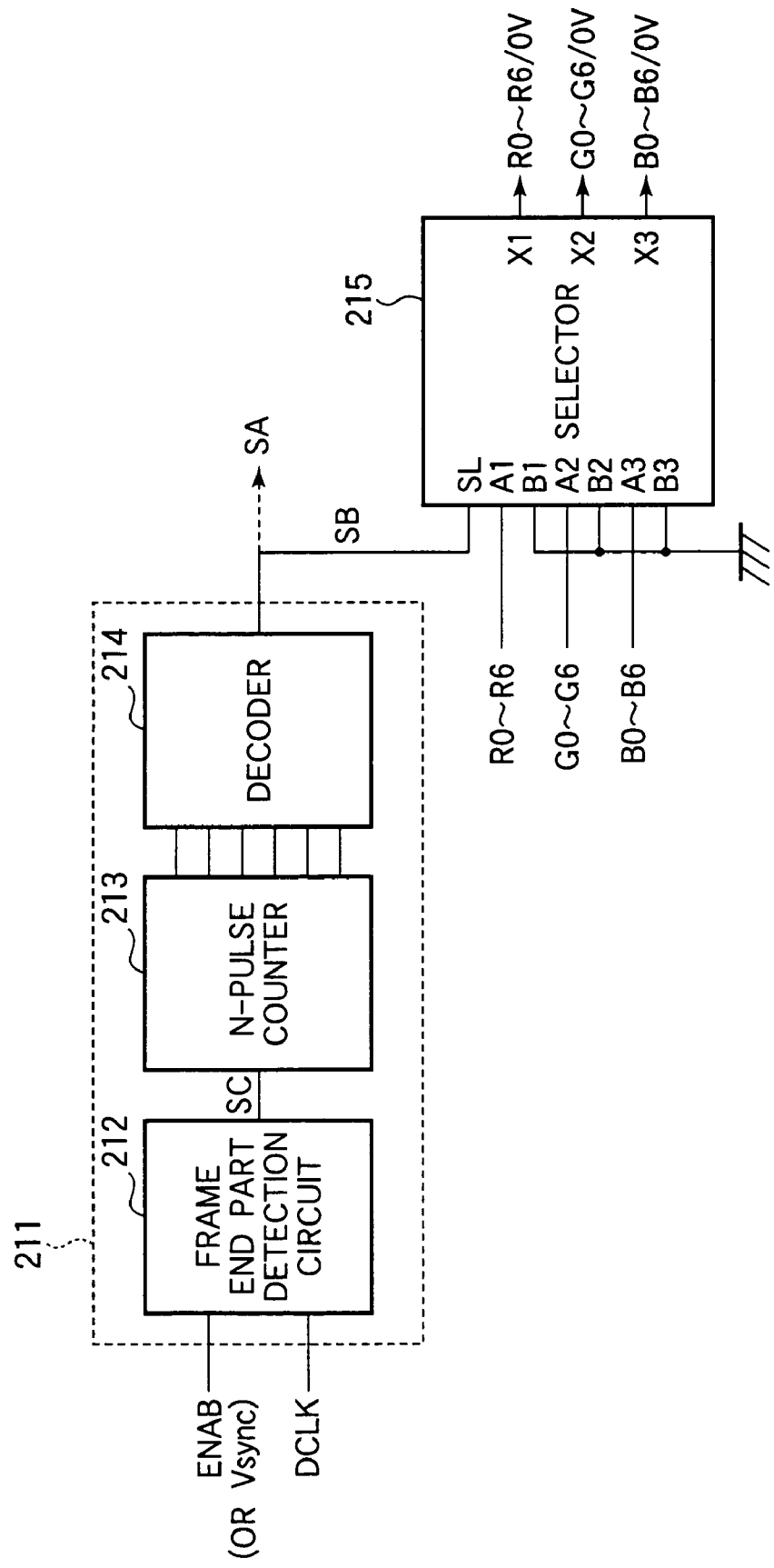
FIG. 78 is a circuit diagram showing a structure of a black display control part in a timing controller of the example 7-1 of the seventh embodiment of the invention.

FIG. 78 is a circuit diagram showing the structure of the black display control part 210. In FIG. 78, reference numeral 211 denotes a black display control signal generation circuit for generating a black display control signal SB; and 212, a frame end part detection circuit which receives a display signal synchronization signal ENAB (or a vertical synchronization signal Vsync) and a dot clock DCLK, detects an end part of a frame, and outputs one frame end part detection pulse SC for one frame.

Reference numeral 213 denotes an N-pulse counter (N is, for example, 60) for counting the frame end part detection pulse SC outputted from the frame end part detection part 212; and 214, a decoder for decoding the output of the N-pulse counter 213 and outputting, once every N frames, a black display control signal SB to cause one frame period to have the H level.

Reference numeral 215 denotes a three-system two-input one-output selector for selecting the RGB data signals R0 to R6, G0 to G6 and B0 to B6, or the black display data signal and supplying it to the data driver 204; SL, a select control signal input terminal; A1 to A3 and B1 to B3, selected signal input terminals; and X1 to X3, output terminals.

The black display control signal SB is given to the select control signal input terminal SL, the R data signals R0 to R6 are given to the selected signal input terminal A1, the G data signals G0 to G6 are given to the selected signal input terminal A2, the B data signals B0 to B6 are given to the selected signal input terminal A3, and the ground potential of 0 V is given to the selected signal input terminals B1 to B3.

In the case of the black display control signal SB=L level, the selector 215 selects the RGB data signals R0 to R6, G0 to G6 and B0 to B6 given to the selected signal input terminals A1 to A3 and supplies them to the data driver 204, and in the case of the black display control signal SC=H level, the selector supplies the ground potential of 0 V given to the selected signal input terminals B1 to B3 as the black data signal to the data driver 204.

Figure 79:
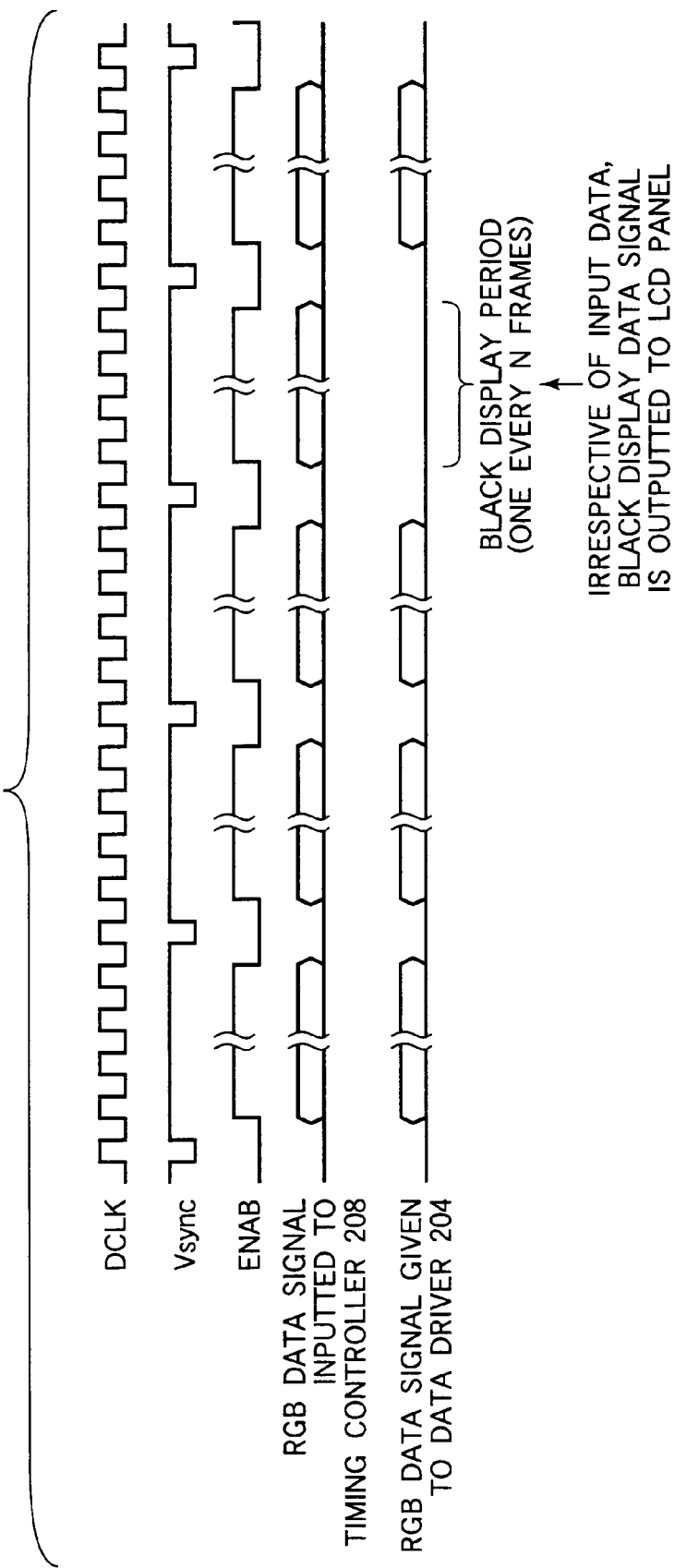
FIG. 79 is a timing chart showing an operation of the example 7-1 of the seventh embodiment of the invention.

FIG. 79 is a timing chart showing the operation of the example 7-1, and shows the dot clock DCLK inputted to the timing controller 208, the vertical synchronization signal Vsync inputted to the timing controller 208, the display synchronization signal ENAB inputted to the timing controller 208, the RGB data signal inputted to the timing controller 208, and the RGB data signal given from the timing controller 208 to the data driver 204.

That is, in the example 7-1, since the black display control signal generation circuit 211 outputs, once every N frames (for example, 60 frames), the black display control signal SB to cause one frame period to have the H level, the selector 215 supplies the RGB data signals R0 to R6, G0 to G6 and B0 to B6 to the data driver 204 in the (N−1) frame periods of the N frame periods, and supplies the black display data signal in one frame period of the N frame periods so that a black picture plane is displayed on the color liquid crystal display panel 201.

Besides, the black display control signal SB outputted from the black display control signal generation circuit 211 is supplied as the lighting control signal SA to the lighting control terminal 209 of the inverter 207. Accordingly, in the case where the black picture plane is displayed on the color liquid crystal display panel 201 by the control of the black display control part 210, the backlight 202 is put in the non-lighting state.

As stated above, according to the example 7-1, since the black picture plane is displayed on the color liquid crystal display panel 201 in the one frame period of the N frame periods, even if the vertical alignment mode color liquid crystal display panel 201 is provided, the alignment of the liquid crystal of the whole screen can be made uniform, and the holding type afterimage can be cancelled, so that the high quality image display can be carried out.

Besides, in the case where the black picture plane is displayed on the color liquid crystal display panel 201 by the control of the black display control part 210, since the backlight 202 is put in the non-lighting state, it is possible to avoid perceptually recognizing the black display picture plane. Incidentally, also in the case where the black picture plane is displayed on the color liquid crystal display panel 201 by the control of the black display control part 210, the backlight 202 may keep the lighting state.

EXAMPLE 7-2

Figure 80:
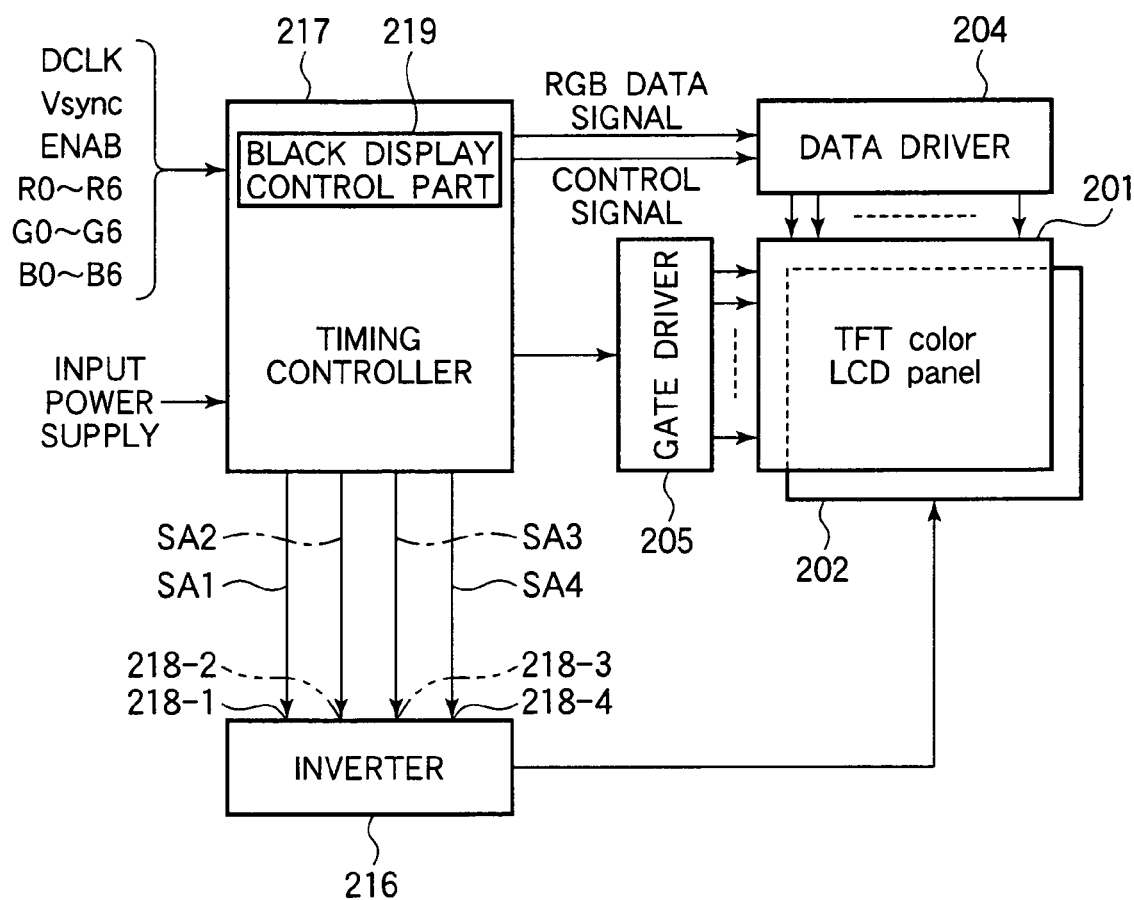
FIG. 80 is a schematic sectional view showing a main part of example 7-2 of the seventh embodiment of the invention.

FIG. 80 is a schematic structural view showing a main part of example 7-2. The example 7-2 includes an inverter 216 and a timing controller 217 which are different in structure from the inverter 203 and the timing controller 206 included in the conventional liquid crystal display device shown in FIG. 84, and the other structure is the same as the conventional liquid crystal display device shown in FIG. 84.

When the number of horizontal lines of a color liquid crystal display panel 201 is 4m (m is, for example, 192), a backlight 202 includes a first fluorescent lamp corresponding to the first to m-th horizontal lines, a second fluorescent lamp corresponding to the (m+1)-th to 2m-th horizontal lines, a third fluorescent lamp corresponding to the (2m+1)-th to 3m-th horizontal lines, and a fourth fluorescent lamp corresponding to the (3m+1)-th to 4m-th horizontal lines. The inverter 216 includes lighting control terminals 218-1 to 218-4 corresponding to the first to the fourth fluorescent lamps.

Then, the inverter 216 keeps the lighting state of the i-th fluorescent lamp in the period when the lighting control terminal 218-i (i=1, 2, 3, 4) is made to have the L level, and the inverter brings the i-th fluorescent lamp into the non-lighting state in the period when the lighting control terminal 218-i is made to have the H level. A lighting control signal SAi is given to the lighting control terminal 218-i from the timing controller 217.

The timing controller 217 includes a black display control part 219, supplies RGB data signals R0 to R6, G0 to G6 and B0 to B6 outputted from the black display control part 219 to a data driver 204, and generates lighting control signals SA1 to SA4 by the black display control part 219, and the other part of the timing controller is the same as the conventionally known structure.

Figure 81:
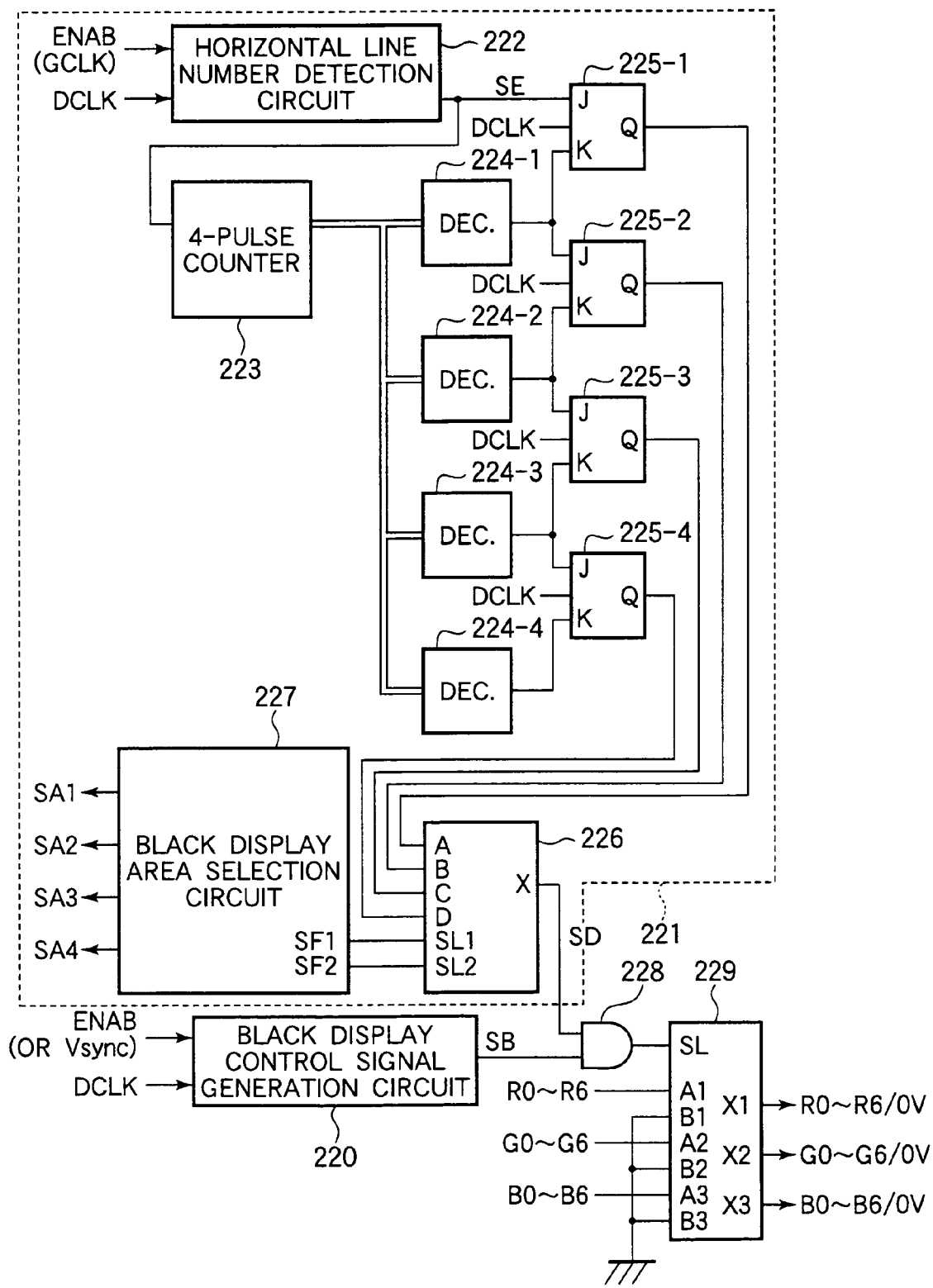
FIG. 81 is a circuit diagram showing a structure of a black display control part in a timing controller of the example 7-2 of the seventh embodiment of the invention.

FIG. 81 is a circuit diagram showing the structure of the black display control circuit 219. In FIG. 81, reference numeral 220 denotes a black display control signal generation circuit which receives a display signal synchronization signal ENAB (or a vertical synchronization signal Vsync) and a dot clock DCLK, and generates a first black display control signal SB, and has the same circuit structure as the black display control signal generation circuit 211 shown in FIG. 78.

Reference numeral 221 denotes a black display control signal generation circuit for generating a second black display control signal SD; 222, a horizontal line number detection circuit which receives a display signal synchronization signal ENAB (or a clock GCLK for a gate driver 205), detects the number of horizontal lines, and outputs one pulse SE each time m horizontal lines are detected; and 223, a 4-pulse counter for counting the pulse SE outputted from the horizontal line number detection circuit 222.

Reference numeral 224-1 denotes a decoder which decodes the output of the 4-pulse counter 223, outputs the L level in a period when the count value of the 4-pulse counter 223 is 2, and outputs the H level in the other period. Reference numeral 224-2 denotes a decoder which decodes the output of the 4-pulse counter 223, outputs the L level when the count value of the 4-pulse counter 223 is 3, and outputs the H level in the other period.

Reference numeral 224-3 denotes a decoder which decodes the output of the 4-pulse counter 223, outputs the L level in a period when the count value of the 4-pulse counter 223 is 4, and outputs the H level in the other period. Reference numeral 224-4 denotes a decoder which decodes the output of the 4-pulse counter 223, outputs the L level in a period when the count value of the 4-pulse counter 223 is 1, and outputs the H level in the other period.

Reference numerals 225-1 to 225-4 denote JK flip-flops. In the JK flip-flop 225-1, the pulse SE outputted from the horizontal line number detection circuit 222 is given to a J terminal, and the output of the decoder 224-1 is given to a K terminal. In the JK flip-flop 225-2, the output of the decoder 224-1 is given to a J terminal, and the output of the decoder 224-2 is given to a K terminal.

In the JK flip-flop 225-3, the output of the decoder 224-2 is given to a J terminal, and the output of the decoder 224-3 is given to a K terminal. In the JK flip-flop 225-4, the output of the decoder 224-3 is given to a J terminal, and the output of the decoder 224-4 is given to a K terminal.

Reference numeral 226 denotes a 4-input 1-output selector; A to D, selected signal input terminals; and SL1 and SL2, select control signal input terminals. The selector 226 selects the selected signal input terminal A at the time of SL1=L level and SL2=L level, selects the selected signal input terminal B at the time of SL1=L level and SL2=H level, selects the selected signal input terminal C at the time of SL1=H level and SL2=L level, and selects the selected signal input terminal D at the time of SL1=H level and SL2=H level.

The output of the JK flip-flop 225-1 is given to the selected signal input terminal A, the output of the JK flip-flop 225-2 is given to the selected signal input terminal B, the output of the JK flip-flop 225-3 is given to the selected signal input terminal C, and the output of the JK flip-flop 225-4 is given to the selected signal input terminal D.

Reference numeral 227 denotes a black display area selection circuit, which outputs black display area selection signals SF1 and SF2 and lighting control signals SA1 to SA4, gives the black display area selection signals SF1 and SF2 to the select control signal input terminals SL1 and SL2 of the selector 226, and gives the lighting control signals SA1 to SA4 to the lighting control terminals 218-1 to 218-4 of the inverter 216.

The black display area selection circuit 227 takes a state of SF1=L level and SF2=L level, a state of SF1=L level and SF2=H level, a state of SF1=H level and SF2=L level, and a state of SF1=H level and SF2=H level in sequence one by one every N frames, and as a result, the selector 226 selects and outputs the outputs of the JK flip-flops 225-1 to 225-4 in sequence one by one every N frame.

Reference numeral 228 denotes an AND circuit for performing an AND operation of the black display control signal SB outputted from the black display control signal generation circuit 220 and the black display control signal SD outputted from the black display control signal generation circuit 221; 229, a 3-system 2-input 1-output selector; SL, a select control signal input terminal; A1 to A3 and B1 to B3, selected signal input terminals; and X1 to X3, output terminals.

The output of the AND circuit 228 is given to the select control signal input terminal SL, the R data signals R0 to R6 are given to the selected signal input terminal A1, the G data signals G0 to G6 are given to the selected signal input terminal A2, the B data signals B0 to B6 are given to the selected signal input terminal A3, and the ground potential of 0 V is given to the selected signal input terminals B1 to B3.

In the case where the output of the AND circuit 228 is the L level, the selector 229 selects the RGB data signals R0 to R6, G0 to G6, B0 to B6 given to the selected signal input terminals A1 to A3 and supplies them to the data driver 204, and in the case where the output of the AND circuit 228 is the H level, the selector supplies the ground potential of 0 V given to the selected signal input terminals B1 to B3 as the black display data signal to the data driver 204.

In the example 7-2, the black display control signal generation circuit 220 outputs, once every N frames (for example, 60 frames), the black display control signal SB to cause one frame period to have the H level, and the black display control signal generation circuit 221 selects and outputs the outputs of the JK flip-flops 225-1 to 225-4 in sequence one by one every N frames.

As a result, the AND circuit 228 outputs the H level in the scanning period of the first to the m-th horizontal lines of the (N+1)-th frame, outputs the H level in the scanning period of the (m+1)-th to the 2m-th horizontal lines of the (2N+1)-th frame, outputs the H level in the scanning period of the (2m+1)-th to the 3m-th horizontal lines of the (3N+1)-th frame, and outputs the H level in the scanning period of the (3m+1)-th to the 4m-th horizontal lines of the (4N+1)-th frame, and subsequently, this operation is repeated.

That is, the area of the first to the m-th horizontal lines, the area of the (m+1)-th to the 2m-th horizontal lines, the area of the (2m+1)-th to the 3m-th horizontal lines, and the area of the (3m+1)-th to the 4m-th horizontal lines are black displayed in sequence one by one every N frames.

Then, in this example, the black display area selection circuit 227 is constructed to output the lighting control signals SA1 to SA4 so that the first fluorescent lamp is turned off when the area of the first to the m-th horizontal lines is black displayed, the second fluorescent lamp is turned off when the area of the (m+1)-th to the 2m-th horizontal lines is black displayed, the third fluorescent lamp is turned off when the area of the (2m+1)-th to the 3m-th horizontal lines is black displayed, and the fourth fluorescent lamp is turned off when the area of the (3m+1)-th to the 4m-th horizontal lines is black-displayed.

As stated above, according to the example 7-2, since the black picture plane can be displayed in the four divided screen areas in the vertical direction in sequence one by one every N frames, even if the vertical alignment mode color liquid crystal display panel 201 is included, the alignment of the liquid crystal of the whole screen can be made uniform, and the holding type afterimage can be cancelled. Accordingly, the high quality image display can be carried out.

Besides, since the fluorescent tubes provided correspondingly to the black-displayed picture plane areas can be turned off by the lighting control signals SA1 to SA4 outputted by the black display area selection circuit 227, it is possible to avoid perceptually recognizing the black display picture plane. Incidentally, also in the case where the black picture plane is displayed on the color liquid crystal display panel 201 by the control of the black display control part 219, the backlight 202 may keep the lighting state.

EXAMPLE 7-3

Figure 82:
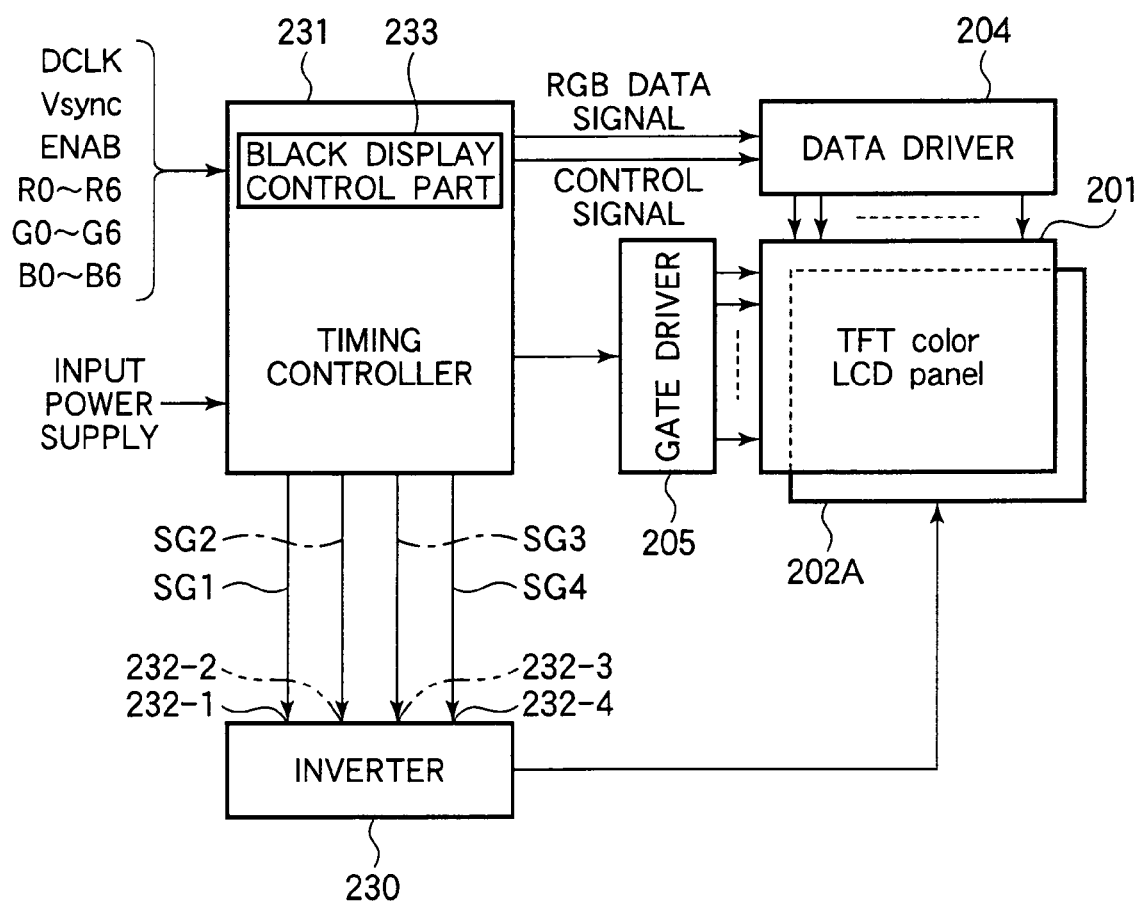
FIG. 82 is a schematic sectional view showing a main part of example 7-3 of the seventh embodiment of the invention.

FIG. 82 is a schematic structural view showing a main part of example 7-3. The example 7-3 includes a backlight 202A, an inverter 230 and a timing controller 231 which are different in structure from the backlight 202, the inverter 203 and the timing controller 206 included in the conventional liquid crystal display device shown in FIG. 84, and the other structure is the same as the conventional liquid crystal display device shown in FIG. 84.

When the number of vertical lines of a color liquid crystal display panel 201 is 4n (n is, for example, 256), the backlight 202A includes a first fluorescent lamp corresponding to the first to the n-th vertical lines, a second fluorescent lamp corresponding to the (n+1)-th to the 2n-th vertical lines, a third fluorescent lamp corresponding to the (2n+1)-th to the 3n-th vertical lines, and a fourth fluorescent lamp corresponding to the (3n+1)-th to the 4n-th vertical lines. The inventor 230 includes lighting control terminals 232-1 to 232-4 correspondingly to the first to the fourth fluorescent lamps.

Then, the inventor 230 keeps the lighting state of the i-th fluorescent lamp in a period when the lighting control terminal 232-i (i=1, 2, 3, 4) is made to have the L level, and brings the ith fluorescent lamp into the non-lighting state in a period when the lighting control terminal 232-i is made to have the H level. A lighting control signal SGi is given to the lighting control terminal 232-i from the timing controller 231.

The timing controller 231 includes a black display control part 233, supplies RGB data signals R0 to R6, G0 to G6 and B0 to B6 outputted from the black display control part 233 to a data driver 204, and generates lighting control signals SG1 to SG4 by the black display control part 233, and the other part of the timing controller is the same as the conventionally known structure.

Figure 83:
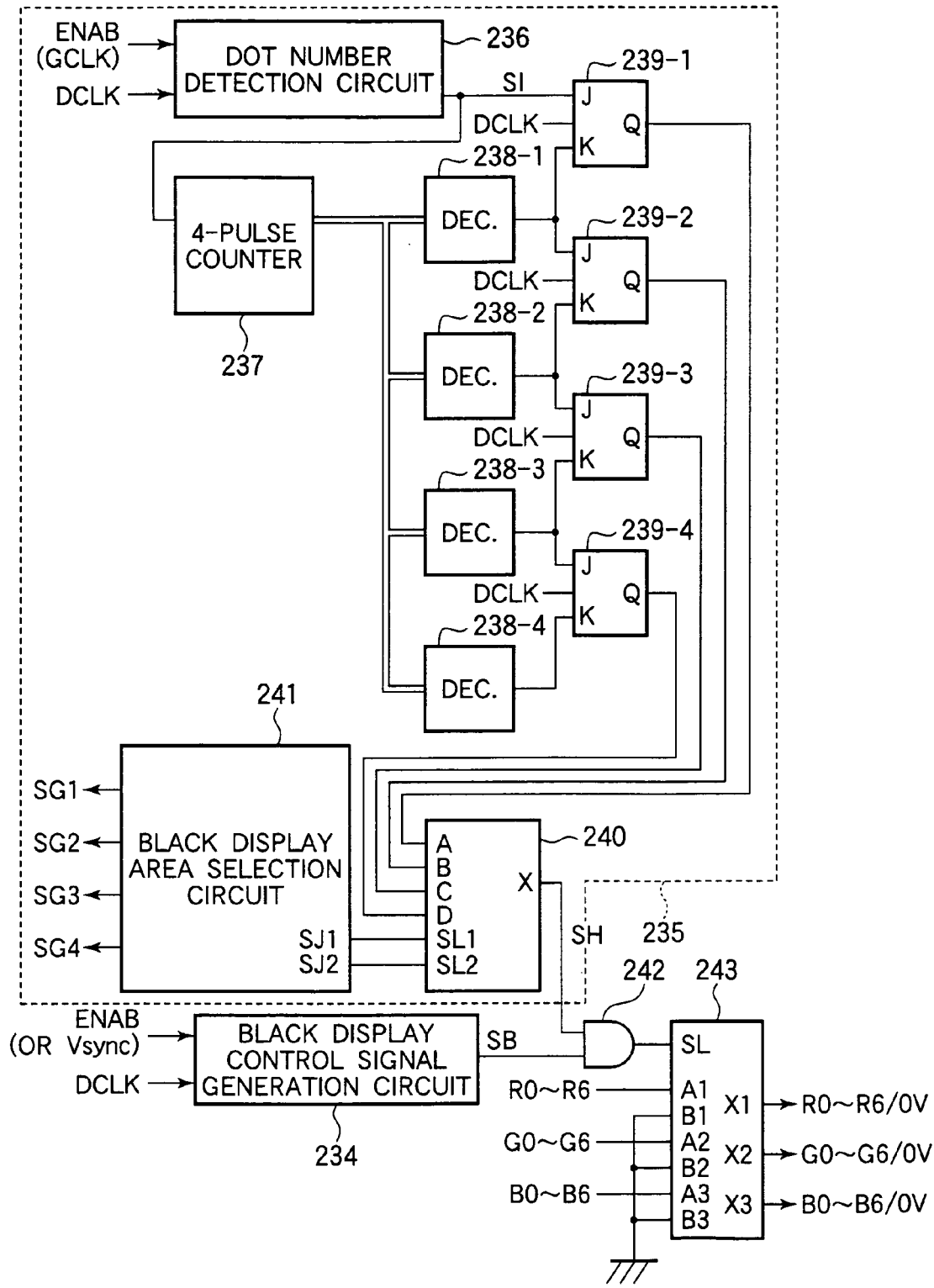
FIG. 83 is a circuit diagram showing a structure of a black display control part in a timing controller of the example 7-3 of the seventh embodiment of the invention.

FIG. 83 is a circuit diagram showing the structure of the black display control part 233. In FIG. 83, reference numeral 234 denotes a black display control signal generation circuit which receives a display signal synchronization signal ENAB (or a vertical synchronization signal Vsync) and a dot clock DCLK and generates a first black display control signal SB, and has the same circuit structure as the black display control signal generation circuit 211 shown in FIG. 78.

Reference numeral 235 denotes a black display control signal generation circuit for generating a second black display control signal SH; 236, a dot number detection circuit which receives a display signal synchronization signal ENAB (or a gate clock GCLK) and a dot clock DCLK, detects the number of dots, and outputs one pulse SI each time n dots are detected; and 237, a 4-pulse counter for counting the pulse SI outputted from the dot number detection circuit 236.

Reference numeral 238-1 denotes a decoder which decodes the output of the 4-pulse counter 237, outputs the L level in a period when the count value of the 4-pulse counter 237 is 2, and outputs the H level in the other period. Reference numeral 238-2 denotes a decoder which decodes the output of the 4-pulse counter 237, outputs the L level in a period when the count value of the 4-pulse counter 237 is 3, and outputs the H level in the other period.

Reference numeral 238-3 denotes a decoder which decodes the output of the 4-pulse counter 237, outputs the L level in a period when the count value of the 4-pulse counter 237 is 4, and outputs the H level in the other period. Reference numeral 238-4 denotes a decoder which decodes the output of the 4-pulse counter 237, outputs the L level in a period when the count value of the 4-pulse counter 237 is 1, and outputs the H level in the other period.

Reference numerals 239-1 to 239-4 denote JK flip-flops. In the JK flip-flop 239-1, the pulse SI outputted from the dot number detection circuit 236 is given to a J terminal, and the output of the decoder 238-1 is given to a K terminal. In the JK flip-flop 239-2, the output of the decoder 238-1 is given to a J terminal, and the output of the decoder 238-2 is given to a K terminal.

In the JK flip-flop 239-3, the output of the decoder 239-2 is given to a J terminal, and the output of the decoder 238-3 is given to a K terminal. In the JK flip-flop 239-4, the output of the decoder 238-3 is given to a J terminal, and the output of the decoder 238-4 is given to a K terminal.

Reference numeral 240 denotes a 4-input 1-output selector; A to D, selected signal input terminals; and SL1 and SL2, select control signal input terminals. The selector 240 selects the selected signal input terminal A at the time of SL1=L level and SL2=L level, selects the selected signal input terminal B at the time of SL1=L level and SL2=H level, selects the selected signal input terminal C at the time of SL1=H level and SL2=L level, and selects the selected signal input terminal D at the time of SL1=H level and SL2=H level.

The output of the JK flip-flop 239-1 is given to the selected signal input terminal A, the output of the JK flip-flop 239-2 is given to the selected signal input terminal B, the output of the JK flip-flop 239-3 is given to the selected signal input terminal C, and the output of the JK flip-flop 239-4 is given to the selected signal input terminal D.

Reference numeral 241 denotes a black display area selection circuit, outputs black display area selection signals SJ1 and SJ2 and lighting control signals SG1 to SG4, supplies the black display area selection signals SJ1 and SJ2 to the select control signal input terminals SL1 and SL2 of the selector 240, and supplies the lighting control signals SG1 to SG4 to the lighting control terminals 232-1 to 232-4 of the inverter 230.

The black display area selection circuit 241 takes a state of SJ1=L level and SJ2=L level, a state of SJ1=L level and SJ2=H level, a state of SJ1=H level and SJ2=L level, and a state of SJ1=H level and SJ2=H level in sequence one by one every horizontal scanning, and as a result, the selector 240 selects and outputs the outputs of the JK flip-flop 239-1 to 239-4 in sequence one by one every horizontal scanning.

Reference numeral 242 denotes an AND circuit for performing an AND operation of the black display control signal SB outputted from the black display control signal generation circuit 234 and the black display control signal SH outputted from the black display control signal generation circuit 235; 243, a 3-system 2-input 1-output selector; SL, a select control signal input terminal; A1 to A3 and B1 to B3, selected signal input terminals; and X1 to X3, output terminals.

The output of the AND circuit 242 is given to the select control signal input terminal SL, the R data signals R0 to R6 are given to the selected signal input terminal A1, the G data signals G0 to G6 are given to the selected signal input terminal A2, the B data signals B0 to B6 are given to the selected signal input terminal A3, and the ground potential of 0 V is given to the selected signal input terminals B1 to B3.

The selector 243 selects and outputs the RGB data signals R0 to R6, G0 to G6 and B0 to B6, which are given to the selected signal input terminals A1 to A3, to the data driver 204 in the case where the output of the AND circuit 242 is the L level, and supplies the ground potential of 0 V, which is given to the selected signal input terminals B1 to B3, as the black display data signal to the data driver 204 in the case where the output of the AND circuit 242 is the H level.

In the example 7-3, the black display control signal generation circuit 234 outputs, once every N frames (for example, 60 frames), the black display control signal SB to cause one frame period to have the H level, and the black display control signal generation circuit 235 selects and outputs the outputs of the JK flip-flops 239-1 to 239-4 in sequence one by one every horizontal scanning.

As a result, the AND circuit 242 outputs the H level in the scanning period of the first to the n-th vertical lines of the (N+1)-th frame, outputs the H level in the scanning period of the (n+1)-th to the 2n-th vertical lines of the (2N+1) frame, outputs the H level in the scanning period of the (2n+1)-th to the 3n-th vertical lines of the (3N+1)-th frame, and outputs the H level in the scanning period of the (3n+1)-th to the 4n-th vertical lines of the (4N+1)-th frame, and subsequently, this operation is repeated.

That is, the area of the first to the n-th vertical lines, the area of the (n+1)-th to the 2n-th vertical lines, the area of the (2n+1)-th to the 3n-th vertical lines, and the area of the (3n+1)-th to the 4n-th vertical lines are black displayed in sequence one by one every N frames.

Then, in this example, the black display area selection circuit 241 is constructed to output the lighting control signals SG1 to SG4 so that the first fluorescent lamp is turned off when the area of the first to the n-th vertical lines is black displayed, the second fluorescent lamp is turned off when the area of the (n+1)-th to the 2n-th vertical lines is black displayed, the third fluorescent lamp is turned off when the area of the (2n+1)-th to the 3n-th vertical lines is black displayed, and the fourth fluorescent lamp is turned off when the area of the (3n+1)-th to the 4n-th vertical lines are black displayed.

As stated above, according to the example 7-3, since the black picture plane can be displayed in the four divided screen areas in the horizontal direction in sequence one by one every N frames, even if the vertical alignment mode color liquid crystal display panel 201 is included, the alignment of the liquid crystal of the whole screen can be made uniform, and the holding type afterimage can be cancelled. Accordingly, the high quality image display can be carried out.

Besides, since the fluorescent tubes provided correspondingly to the black-displayed screen areas can be turned off by the lighting control signals SG1 to SG4 outputted by the black display area selection circuit 241, it is possible to avoid perceptually recognizing the black display picture plane. Incidentally, also in the case where the black picture plane is displayed on the color liquid crystal display panel 201 by the control of the black display control part 233, the backlight 202A may keep the lighting state.

Incidentally, in the example 7-1 to the example 7-3, although the whole area or partial area of the screen is black displayed in one frame period every N frames, instead of this, the whole area or partial area of the screen may be black displayed in several continuous frame periods every N frames.

As described above, according to this embodiment, since the screen can be black displayed by the black display control part at the time of the driving of the liquid crystal display area, the alignment of the liquid crystal can be made uniform, and even in the case where the vertical aligned liquid crystal display area is included, the holding type afterimage is made not to easily occur, and the high quality image display can be carried out.

As described above, according to the invention, it is possible to realize the illumination device in which while the drop of the display brightness is suppressed, the movement blurring and the tailing phenomenon in the motion picture display can be reduced, and the liquid crystal display device using the same.

Besides, according to the invention, it is possible to realize the illumination device which can suppress consumed electric power and in which the device can be made to be small and light and to have long lifetime, and the liquid crystal display device using the same.

What is claimed is:

1. An illumination device for illuminating a display area of an active matrix type liquid crystal display device, comprising:
   at least one light source capable of changing light emission brightness;
   at least one light-emitting area for emitting light from the light source;
   a light source power supply circuit for switching between a maximum lighting state in which the light source is made to emit light at a specified maximum brightness and an intermediate lighting state in which the light source is made to emit light at a specified intermediate brightness lower than the maximum brightness;
   a first light source unit including a first light guide plate and a first light source disposed at an end thereof, for mainly illuminating a first light-emitting area and supplying part of light to an adjacent second light-emitting area; and
   a second light source unit laminated on the first light source unit and including a second light guide plate and a second light source disposed at an end thereof, for mainly illuminating the second light-emitting area and supplying part of light to the adjacent first light-emitting area,
   wherein the second light guide plate is disposed in the first and the second light-emitting areas, and the first light guide plate is disposed in only the first light-emitting area.

2. An illumination device according to claim 1, further comprising:
   a third light source unit including a third light guide plate and a third light source disposed at an end thereof, for mainly illuminating a third light-emitting area and supplying part of light to an adjacent fourth light-emitting area; and a fourth light source unit laminated on the third light source unit and including a fourth light guide plate and a fourth light source disposed at an end thereof, for mainly illuminating the fourth light-emitting area and supplying part of light to the adjacent third light-emitting area.

3. An illumination device according to claim 2, wherein the third light guide plate is disposed in the third and the fourth light-emitting areas, and the fourth light guide plate is disposed in only the fourth light-emitting area.

4. An illumination device according to claim 3, wherein the first light guide plate and the fourth light guide plate are disposed on a same plane, and the second light guide plate and the third light guide plate are disposed on a same plane.

5. An illumination device according to claim 4, further comprising:

a transmission diffused plate disposed above the first to the fourth illumination areas; and a light mixing area disposed between the transmission diffused plate and the first to the fourth illumination areas.

6. An illumination device according to claim 5, wherein the light mixing area is a space or a transparent member having a thickness of 0.5 mm to 4 mm.

7. An illumination device according to claim 4, wherein a double-sided reflection plate for performing regular reflection or diffuse reflection is disposed between opposite end parts of the second light guide plate and the third light guide plate.

8. An illumination device according to claim 7, wherein a portion between the opposite end parts of the second light guide plate and the third light guide plate is formed into a $\Lambda$ shape opening to a rear surface side.

9. An illumination device according to claim 8, wherein when refractivity of a light guide substance is n, an apex angle $\theta$ of the $\Lambda$ shape satisfies a relation of $\theta \leq 180° - 4 \times \sin^{-1}(1/n)$.

* * * * *

UNITED STATES PATENT AND TRADEMARK OFFICE
CERTIFICATE OF CORRECTION

PATENT NO. : 7,277,079 B2 Page 1 of 1
APPLICATION NO. : 10/696504
DATED : October 2, 2007
INVENTOR(S) : Kobayashi et al.

It is certified that error appears in the above-identified patent and that said Letters Patent is hereby corrected as shown below:

On the Title Page Item -75-

Under Inventors, please delete "Toshihiro Suzuki" "Mari Sugawara", "Tetsuya Hamada", "Keiji Hayashi", "Yasutake Furukoshi", and "Masanori Nishido".

Column 76, line 6, delete "4mm" and insert --10mm--.

Signed and Sealed this

Fifteenth Day of April, 2008

JON W. DUDAS
*Director of the United States Patent and Trademark Office*